US006961387B2

(12) United States Patent
Kim et al.

(10) Patent No.: US 6,961,387 B2

(45) Date of Patent: Nov. 1, 2005

(54) APPARATUS AND METHOD FOR CODING/DECODING OPTIMAL (11,5) CODEWORD IN A MOBILE COMMUNICATION SYSTEM

(75) Inventors: Jae-Yoel Kim, Kunpo-shi (KR); Hyun-Woo Lee, Suwon-shi (KR); Kook-Heui Lee, Songnam-shi (KR)

(73) Assignee: Samsung Electronics Co., Ltd. (KR)

( * ) Notice: Subject to any disclaimer, the term of this patent is extended or adjusted under 35 U.S.C. 154(b) by 807 days.

(21) Appl. No.: 09/957,967

(22) Filed: Sep. 21, 2001

(65) Prior Publication Data

US 2002/0114268 A1 Aug. 22, 2002

(30) Foreign Application Priority Data

Sep. 21, 2000 (KR) ........................................ 2000-56309

(51) Int. Cl.$^{7}$ ............................ H04L 23/02; H04L 5/12

(52) U.S. Cl. ....................... 375/262; 375/295; 375/341; 714/752; 714/762

(58) Field of Search ................................ 370/208, 209, 370/342, 335; 375/146, 257, 259, 295, 262, 316, 341; 714/752, 762, 781, 786, 787

(56) References Cited

U.S. PATENT DOCUMENTS 6,341,125 B1 * 1/2002 Hong et al. ................. 370/335
2002/0044542 A1 * 4/2002 Kim ........................... 370/342

OTHER PUBLICATIONS

A.E. Brouwer, et al., █ An Updated Table of MinimumDistance Bounds for Binary Linear Codes█ , *IEEE Transactions on Information Theory*, vol. 39, No. 2, Mar. 1993.
U.S. Appl. No. 10/076,156, filed Feb. 2002, Kim, Jae–Yoel.

* cited by examiner

*Primary Examiner*—Tesfaldet Bocure
*Assistant Examiner*—Juan Alberto Torres
(74) *Attorney, Agent, or Firm*—Dilworth & Barrese LLP

(57) ABSTRACT

An apparatus encodes an input information bit stream comprised of 5 bits into a (11,5) codeword comprised of 11 coded symbols. The apparatus comprises a Reed-Muller encoder for encoding the input information bit stream into a first order Reed-Muller codeword comprised of 16 coded symbols; and a puncturer for selecting a second coded symbol position or a third coded symbol position out of the 16 coded symbols constituting the first order Reed-Muller codeword, puncturing the coded symbols at intervals of 3 symbols beginning at the selected position, and thus outputting an optimal (11,5) codeword.

20 Claims, 5 Drawing Sheets

APPARATUS AND METHOD FOR CODING/DECODING OPTIMAL (11,5) CODEWORD IN A MOBILE COMMUNICATION SYSTEM

PRIORITY

This application claims priority to an application entitled "Channel Coding/Decoding Apparatus and Method in a Mobile Communication System" filed in the Korean Industrial Property Office on Sep. 21, 2000 and assigned Serial No. 2000-56309, the contents of which are hereby incorporated by reference.

BACKGROUND OF THE INVENTION

1. Field of the Invention

The present invention relates generally to a CDMA (Code Division Multiple Access) mobile communication system, and in particular, to an apparatus and method for coding and decoding optimal (11,5) codewords.

2. Description of the Related Art

An IMT-2000 system, a future CDMA mobile communication system, transmits user data for a voice service, an image service and a data service, along with control data for performing the services. It is important to minimize errors occurring during transmission of such data in order to improve the quality of the services (QoS). To this end, error correcting codes for correcting data bit errors are used to minimize the errors occurring during transmission of the data. Since using the error correcting codes is aimed at minimizing the data bit errors of the transmission data, it is very important to use optimal error correcting codes.

Typically, linear codes are often used for the error correcting codes, because it is easy to analyze their capabilities. Hamming distance distribution for codewords of the error correcting codes can serve as a measure indicating the capability of the error correcting codes. The "Hamming distance" means the number of non-zero symbols in a codeword. That is, for a certain codeword '0111', the number of 1's included in the codeword is 3, so that the Hamming distance is 3. The least value out of the hamming distance values is called a "minimum distance", and an increase in the minimum distance of the codeword improves the error correcting capability of the codeword. In other words, the "optimal code" means a code having the optimal error correcting capability.

A reference, *An Updated Table of Minimum-Distance Bounds for Binary Linear Codes* (A. E. Brouwer and Tom Verhoeff, IEEE Transactions on information Theory, VOL 39, NO. 2, MARCH 1993), discloses an intercode minimum distance which depends on the input and output values of the binary linear codes to be optimal codes depending on the number of coded symbols generated by encoding input information bits.

The above reference discloses a (11,5) linear code of which the number of input information bits is 5 and the number of output coded symbols is 11, and its optimal code has the minimum distance of 4. Therefore, in using the (11,5) linear code, it is necessary to consider both using the optimal code having the minimum distance of 4 and creating the optimal code having the minimum distance of 4 while minimizing hardware complexity.

SUMMARY OF THE INVENTION

It is, therefore, an object of the present invention to provide an apparatus and method for creating an optimal (11,5) codeword in a CDMA mobile communication system using error correcting codes.

It is another object of the present invention to provide an apparatus and method for determining puncturing positions used to create an optimal (11,5) codeword by puncturing a first order Reed-Muller codeword comprised of 16 coded symbols.

It is further another object of the present invention to provide an apparatus and method for decoding a (11,5) codeword received in a CDMA mobile communication system using error correcting codes.

According to one aspect of the present invention, there is provided an apparatus for coding an input information bit stream comprised of 5 bits into a (11,5) codeword comprised of 11 coded symbols. The apparatus comprises a Reed-Muller encoder for encoding the input information bit stream into a first order Reed-Muller codeword comprised of 16 coded symbols; and a puncturer for selecting a second coded symbol position or a third coded symbol position out of the 16 coded symbols constituting the first order Reed-Muller codeword, puncturing the coded symbols at intervals of 3 symbols beginning at the selected position, and then outputting an optimal (11,5) codeword.

According to another aspect of the present invention, there is provided an apparatus for decoding an optimal (11,5) codeword transmitted from a transmitter which encodes an input information bit stream comprised of 5 bits into a first order Reed-Muller codeword comprised of 16 coded symbols, selects a second coded symbol position or a third coded symbol position out of 16 coded symbols constituting the first order Reed-Muller codeword, and punctures the coded symbols at intervals of 3 symbols beginning at the selected position. The apparatus comprises a zero inserter for receiving the (11,5) codeword and inserting all zero as a coded symbols in the puncturing positions of the coded symbols punctured in the transmitter to create the received (11,5) codeword; an inverse fast Hadamard transform part for calculating reliabilities by comparing the 16 coded symbols obtained by inserting the all zero as a coded symbols in the puncturing positions with every first order Reed-Muller codeword comprised of 16 coded symbols, and outputting in pairs the calculated reliabilities and the input information bit streams each comprised of 5 bits corresponding to said every first order Reed-Muller codeword; and a comparator for outputting as a decoded bit stream the input information bit stream corresponding to the first order Reed-Muller codeword having a highest reliability.

According to a further aspect of the present invention, there is provided a method for coding an input information bit stream comprised of 5 bits into a (11,5) codeword comprised of 11 coded symbols. The method comprises the steps of encoding the input information bit stream into a first order Reed-Muller codeword comprised of 16 coded symbols; and selecting a second coded symbol position or a third coded symbol position out of the 16 coded symbols constituting the first order Reed-Muller codeword, puncturing 5 coded symbols at intervals of 3 symbols beginning at the selected position, and then outputting an optimal (11,5) codeword.

According to yet another aspect of the present invention, there is provided a method for decoding an optimal (11,5) codeword transmitted from a transmitter which encodes an input information bit stream comprised of 5 bits into a first order Reed-Muller codeword comprised of 16 coded symbols, selects a second coded symbol position or a third coded symbol position out of 16 coded symbols constituting the first order Reed-Muller codeword, and punctures the 5 coded symbols at intervals of 3 symbols beginning at the selected position. The method comprises the steps of receiving the (11,5) codeword and inserting all zero as a coded symbols in the puncturing positions of the coded symbols punctured in the transmitter to create the received (11,5) codeword; calculating reliabilities by comparing the 16 coded symbols obtained by inserting the all zero as a coded symbols in the puncturing positions with every first order Reed-Muller codeword comprised of 16 coded symbols, and outputting in pairs the calculated reliabilities and the input information bit streams each comprised of 5 bits corresponding to said every first order Reed-Muller codeword; and outputting as a decoded bit stream the input information bit stream corresponding to the first order Reed-Muller codeword having a highest reliability.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Figure 1:
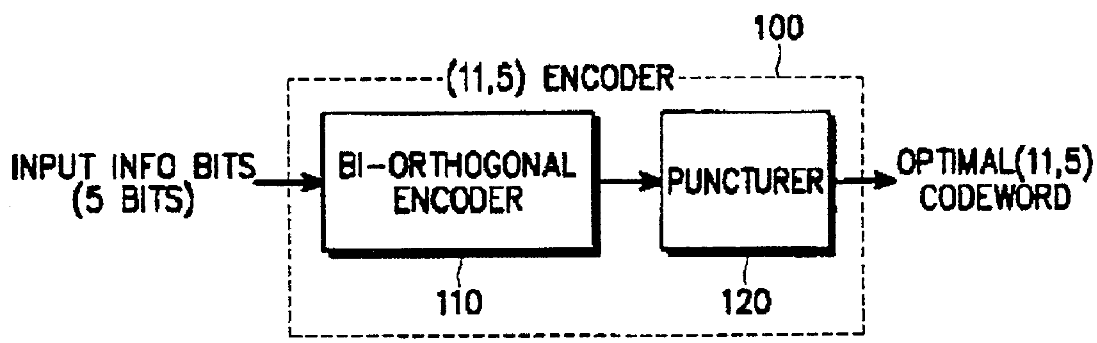
FIG. 1 is a block diagram illustrating a structure of an apparatus for encoding a (11,5) codeword according to an embodiment of the present invention.

A preferred embodiment of the present invention will be described herein below with reference to the accompanying drawings. In the following description, well-known functions or constructions are not described in detail since they would obscure the invention in unnecessary detail.

The present invention discloses a method for creating an optimal (11,5) codeword and decoding the created (11,5) codeword in a CDMA communication system. That is, the present invention applies a (11,5) first order Reed-Muller codeword obtained by puncturing 5 symbols out of coded symbols output from a length=16 (11,5) first order Reed-Muller encoder to the CDMA system as error correcting codes. Although there are innumberable ways to create the linear (11,5) codewords, an embodiment of the present invention discloses a method for creating an optimal (11,5) codeword and minimizing hardware complexity by puncturing the first order Reed-Muller codeword. In addition, the embodiment minimizes the hardware complexity by minimizing a length of the first order Reed-Muller codeword before puncturing and creates the optimal (11,5) codeword by puncturing the first order Reed-Muller codeword, thereby increasing the error correcting capability. The embodiment of the present invention creates the error correcting codes using the first order Reed-Muller codeword, for which a bi-orthogonal codeword is used herein.

As stated above, the (11,5) codeword is obtained by puncturing 5 coded symbols from the first order Reed-Muller codeword comprised of 16 coded symbols output from a first order Reed-Muller codeword generator. Here, if the puncturing positions where the 5 coded symbols are punctured from the first order Reed-Muller codeword comprised of 16 coded symbols are varied, the finally created (11,5) codeword has a different minimum distance $d_{min}$. The minimum distance indicates the least value out of the Hamming distance values of the (11,5) codeword, and an increase in the minimum distance improves the error correcting capability when the (11,5) codeword serves as linear error correcting codes. Therefore, it is very important to calculate puncturing positions of the coded symbols to be punctured, in order to create a (11,5) codeword having a superior error correcting capability from a first order Reed-Muller codeword comprised of 16 coded symbols.

The 5 puncturing positions required for creating the optimal codes for the (11,5) codeword can be calculated through experiments patterns '2,5,8,11,14' and '1,4,7,10,13' are shown herein by way of example. The puncturing pattern '1,4,7,10,13' is a puncturing pattern for puncturing 5 coded symbols among the 16 coded symbols constituting the first order Reed-Muller codeword at regular intervals of 3 symbols beginning at a second code symbol position (i.e., a coded symbol position #1). Similarly, the puncturing pattern '2,5,8,11,14' is a puncturing pattern for puncturing 5 coded symbols among the 16 coded symbols at regular intervals of 3 symbols, beginning at a third coded symbol two (i.e., a coded symbol position #2). The puncturing positions of two puncturing patterns are uniformly distributed so that the interval between the positions of the punctured coded symbols is constant. Although the two puncturing patterns have been described by way of example, there exist a total of 2688 puncturing patterns for puncturing the 5 coded symbols among the 16 coded symbols constituting the first order Reed-Muller codeword, as shown in Tables 1 to 9 below. Thus, it is possible to create an optimal (11,5) codeword by selecting one of the 2688 puncturing patterns and then puncturing the 5 coded symbols according to the selected puncturing pattern of a plural of puncturing patterns.

TABLE 1

| |
|---|
| {0, 1, 2, 4, 8}, |
| {0, 1, 2, 4, 9}, |
| {0, 1, 2, 4, 10}, |
| {0, 1, 2, 4, 11}, |
| {0, 1, 2, 4, 12}, |
| {0, 1, 2, 4, 13}, |
| {0, 1, 2, 4, 14}, |
| {0, 1, 2, 4, 15}, |
| {0, 1, 2, 5, 8}, |
| {0, 1, 2, 5, 9}, |
| {0, 1, 2, 5, 10}, |
| {0, 1, 2, 5, 11}, |
| {0, 1, 2, 5, 12}, |
| {0, 1, 2, 5, 13}, |
| {0, 1, 2, 5, 14}, |
| {0, 1, 2, 5, 15}, |
| {0, 1, 2, 6, 8}, |
| {0, 1, 2, 6, 9}, |
| {0, 1, 2, 6, 10}, |
| {0, 1, 2, 6, 11}, |
| {0, 1, 2, 6, 12}, |
| {0, 1, 2, 6, 13}, |
| {0, 1, 2, 6, 14}, |
| {0, 1, 2, 6, 15}, |
| {0, 1, 2, 7, 8}, |
| {0, 1, 2, 7, 9}, |
| {0, 1, 2, 7, 10}, |
| {0, 1, 2, 7, 11}, |
| {0, 1, 2, 7, 12}, |
| {0, 1, 2, 7, 13}, |

TABLE 1-continued

| |
|---|
| {0, 1, 2, 7, 14}, |
| {0, 1, 2, 7, 15}, |
| {0, 1, 2, 8, 12}, |
| {0, 1, 2, 8, 13}, |
| {0, 1, 2, 8, 14}, |
| {0, 1, 2, 8, 15}, |
| {0, 1, 2, 9, 12}, |
| {0, 1, 2, 9, 13}, |
| {0, 1, 2, 9, 14}, |
| {0, 1, 2, 9, 15}, |
| {0, 1, 2, 10, 12}, |
| {0, 1, 2, 10, 13}, |
| {0, 1, 2, 10, 14}, |
| {0, 1, 2, 10, 15}, |
| {0, 1, 2, 11, 12}, |
| {0, 1, 2, 11, 13}, |
| {0, 1, 2, 11, 14}, |
| {0, 1, 2, 11, 15}, |
| {0, 1, 3, 4, 8}, |
| {0, 1, 3, 4, 9}, |
| {0, 1, 3, 4, 10}, |
| {0, 1, 3, 4, 11}, |
| {0, 1, 3, 4, 12}, |
| {0, 1, 3, 4, 13}, |
| {0, 1, 3, 4, 14}, |
| {0, 1, 3, 4, 15}, |
| {0, 1, 3, 5, 8}, |
| {0, 1, 3, 5, 9}, |
| {0, 1, 3, 5, 10}, |
| {0, 1, 3, 5, 11}, |
| {0, 1, 3, 5, 12}, |
| {0, 1, 3, 5, 13}, |
| {0, 1, 3, 5, 14}, |
| {0, 1, 3, 5, 15}, |
| {0, 1, 3, 6, 8}, |
| {0, 1, 3, 6, 9}, |
| {0, 1, 3, 6, 10}, |
| {0, 1, 3, 6, 11}, |
| {0, 1, 3, 6, 12}, |
| {0, 1, 3, 6, 13}, |
| {0, 1, 3, 6, 14}, |
| {0, 1, 3, 6, 15}, |
| {0, 1, 3, 7, 8}, |
| {0, 1, 3, 7, 9}, |
| {0, 1, 3, 7, 10}, |
| {0, 1, 3, 7, 11}, |
| {0, 1, 3, 7, 12}, |
| {0, 1, 3, 7, 13}, |
| {0, 1, 3, 7, 14}, |
| {0, 1, 3, 7, 15}, |
| {0, 1, 3, 8, 12}, |
| {0, 1, 3, 8, 13}, |
| {0, 1, 3, 8, 14}, |
| {0, 1, 3, 8, 15}, |
| {0, 1, 3, 9, 12}, |
| {0, 1, 3, 9, 13}, |
| {0, 1, 3, 9, 14}, |
| {0, 1, 3, 9, 15}, |
| {0, 1, 3, 10, 12}, |
| {0, 1, 3, 10, 13}, |
| {0, 1, 3, 10, 14}, |
| {0, 1, 3, 10, 15}, |
| {0, 1, 3, 11, 12}, |
| {0, 1, 3, 11, 13}, |
| {0, 1, 3, 11, 14}, |
| {0, 1, 3, 11, 15}, |
| {0, 1, 4, 6, 8}, |
| {0, 1, 4, 6, 9}, |
| {0, 1, 4, 6, 10}, |
| {0, 1, 4, 6, 11}, |
| {0, 1, 4, 6, 12}, |
| {0, 1, 4, 6, 13}, |
| {0, 1, 4, 6, 14}, |
| {0, 1, 4, 6, 15}, |
| {0, 1, 4, 7, 8}, |
| {0, 1, 4, 7, 9}, |
| {0, 1, 4, 7, 10}, |
| {0, 1, 4, 7, 11}, |
| {0, 1, 4, 7, 12}, |

TABLE 1-continued

| |
|---|
| {0, 1, 4, 7, 13}, |
| {0, 1, 4, 7, 14}, |
| {0, 1, 4, 7, 15}, |
| {0, 1, 4, 8, 10}, |
| {0, 1, 4, 8, 11}, |
| {0, 1, 4, 8, 14}, |
| {0, 1, 4, 8, 15}, |
| {0, 1, 4, 9, 10}, |
| {0, 1, 4, 9, 11}, |
| {0, 1, 4, 9, 14}, |
| {0, 1, 4, 9, 15}, |
| {0, 1, 4, 10, 12}, |
| {0, 1, 4, 10, 13}, |
| {0, 1, 4, 11, 12}, |
| {0, 1, 4, 11, 13}, |
| {0, 1, 4, 12, 14}, |
| {0, 1, 4, 12, 15}, |
| {0, 1, 4, 13, 14}, |
| {0, 1, 4, 13, 15}, |
| {0, 1, 5, 6, 8}, |
| {0, 1, 5, 6, 9}, |
| {0, 1, 5, 6, 10}, |
| {0, 1, 5, 6, 11}, |
| {0, 1, 5, 6, 12}, |
| {0, 1, 5, 6, 13}, |
| {0, 1, 5, 6, 14}, |
| {0, 1, 5, 6, 15}, |
| {0, 1, 5, 7, 8}, |
| {0, 1, 5, 7, 9}, |
| {0, 1, 5, 7, 10}, |
| {0, 1, 5, 7, 11}, |
| {0, 1, 5, 7, 12}, |
| {0, 1, 5, 7, 13}, |
| {0, 1, 5, 7, 14}, |
| {0, 1, 5, 7, 15}, |
| {0, 1, 5, 8, 10}, |
| {0, 1, 5, 8, 11}, |
| {0, 1, 5, 8, 14}, |
| {0, 1, 5, 8, 15}, |
| {0, 1, 5, 9, 10}, |
| {0, 1, 5, 9, 11}, |
| {0, 1, 5, 9, 14}, |
| {0, 1, 5, 9, 15}, |
| {0, 1, 5, 10, 12}, |
| {0, 1, 5, 10, 13}, |
| {0, 1, 5, 11, 12}, |
| {0, 1, 5, 11, 13}, |
| {0, 1, 5, 12, 14}, |
| {0, 1, 5, 12, 15}, |
| {0, 1, 5, 13, 14}, |
| {0, 1, 5, 13, 15}, |
| {0, 1, 6, 8, 10}, |
| {0, 1, 6, 8, 11}, |
| {0, 1, 6, 8, 12}, |
| {0, 1, 6, 8, 13}, |
| {0, 1, 6, 9, 10}, |
| {0, 1, 6, 9, 11}, |
| {0, 1, 6, 9, 12}, |
| {0, 1, 6, 9, 13}, |
| {0, 1, 6, 10, 14}, |
| {0, 1, 6, 10, 15}, |
| {0, 1, 6, 11, 14}, |
| {0, 1, 6, 11, 15}, |
| {0, 1, 6, 12, 14}, |
| {0, 1, 6, 12, 15}, |
| {0, 1, 6, 13, 14}, |
| {0, 1, 6, 13, 15}, |
| {0, 1, 7, 8, 10}, |
| {0, 1, 7, 8, 11}, |
| {0, 1, 7, 8, 12}, |
| {0, 1, 7, 8, 13}, |
| {0, 1, 7, 9, 10}, |
| {0, 1, 7, 9, 11}, |
| {0, 1, 7, 9, 12}, |
| {0, 1, 7, 9, 13}, |
| {0, 1, 7, 10, 14}, |
| {0, 1, 7, 10, 15}, |
| {0, 1, 7, 11, 14}, |
| {0, 1, 7, 11, 15}, |

TABLE 1-continued

| |
|---|
| {0, 1, 7, 12, 14}, |
| {0, 1, 7, 12, 15}, |
| {0, 1, 7, 13, 14}, |
| {0, 1, 7, 13, 15}, |
| {0, 1, 8, 10, 12}, |
| {0, 1, 8, 10, 13}, |
| {0, 1, 8, 10, 14}, |
| {0, 1, 8, 10, 15}, |
| {0, 1, 8, 11, 12}, |
| {0, 1, 8, 11, 13}, |
| {0, 1, 8, 11, 14}, |
| {0, 1, 8, 11, 15}, |
| {0, 1, 8, 12, 14}, |
| {0, 1, 8, 12, 15}, |
| {0, 1, 8, 13, 14}, |
| {0, 1, 8, 13, 15}, |
| {0, 1, 9, 10, 12}, |
| {0, 1, 9, 10, 13}, |
| {0, 1, 9, 10, 14}, |
| {0, 1, 9, 10, 15}, |
| {0, 1, 9, 11, 12}, |
| {0, 1, 9, 11, 13}, |
| {0, 1, 9, 11, 14}, |
| {0, 1, 9, 11, 15}, |
| {0, 1, 9, 12, 14}, |
| {0, 1, 9, 12, 15}, |
| {0, 1, 9, 13, 14}, |
| {0, 1, 9, 13, 15}, |
| {0, 1, 10, 12, 14}, |
| {0, 1, 10, 12, 15}, |
| {0, 1, 10, 13, 14}, |
| {0, 1, 10, 13, 15}, |
| {0, 1, 11, 12, 14}, |
| {0, 1, 11, 12, 15}, |
| {0, 1, 11, 13, 14}, |
| {0, 1, 11, 13, 15}, |
| {0, 2, 3, 4, 8}, |
| {0, 2, 3, 4, 9}, |
| {0, 2, 3, 4, 10}, |
| {0, 2, 3, 4, 11}, |
| {0, 2, 3, 4, 12}, |
| {0, 2, 3, 4, 13}, |
| {0, 2, 3, 4, 14}, |
| {0, 2, 3, 4, 15}, |
| {0, 2, 3, 5, 8}, |
| {0, 2, 3, 5, 9}, |
| {0, 2, 3, 5, 10}, |
| {0, 2, 3, 5, 11}, |
| {0, 2, 3, 5, 12}, |
| {0, 2, 3, 5, 13}, |
| {0, 2, 3, 5, 14}, |
| {0, 2, 3, 5, 15}, |
| {0, 2, 3, 6, 8}, |
| {0, 2, 3, 6, 9}, |
| {0, 2, 3, 6, 10}, |
| {0, 2, 3, 6, 11}, |
| {0, 2, 3, 6, 12}, |
| {0, 2, 3, 6, 13}, |
| {0, 2, 3, 6, 14}, |
| {0, 2, 3, 6, 15}, |
| {0, 2, 3, 7, 8}, |
| {0, 2, 3, 7, 9}, |
| {0, 2, 3, 7, 10}, |
| {0, 2, 3, 7, 11}, |
| {0, 2, 3, 7, 12}, |
| {0, 2, 3, 7, 13}, |
| {0, 2, 3, 7, 14}, |
| {0, 2, 3, 7, 15}, |
| {0, 2, 3, 8, 12}, |
| {0, 2, 3, 8, 13}, |
| {0, 2, 3, 8, 14}, |
| {0, 2, 3, 8, 15}, |
| {0, 2, 3, 9, 12}, |
| {0, 2, 3, 9, 13}, |
| {0, 2, 3, 9, 14}, |
| {0, 2, 3, 9, 15}, |
| {0, 2, 3, 10, 12}, |
| {0, 2, 3, 10, 13}, |
| {0, 2, 3, 10, 14}, |
| {0, 2, 3, 10, 15}, |
| {0, 2, 3, 11, 12}, |
| {0, 2, 3, 11, 13}, |
| {0, 2, 3, 11, 14}, |
| {0, 2, 3, 11, 15}, |
| {0, 2, 4, 5, 8}, |
| {0, 2, 4, 5, 9}, |
| {0, 2, 4, 5, 10}, |
| {0, 2, 4, 5, 11}, |
| {0, 2, 4, 5, 12}, |
| {0, 2, 4, 5, 13}, |
| {0, 2, 4, 5, 14}, |
| {0, 2, 4, 5, 15}, |
| {0, 2, 4, 7, 8}, |
| {0, 2, 4, 7, 9}, |
| {0, 2, 4, 7, 10}, |
| {0, 2, 4, 7, 11}, |
| {0, 2, 4, 7, 12}, |
| {0, 2, 4, 7, 13}, |
| {0, 2, 4, 7, 14}, |
| {0, 2, 4, 7, 15}, |
| {0, 2, 4, 8, 9}, |
| {0, 2, 4, 8, 11}, |
| {0, 2, 4, 8, 13}, |
| {0, 2, 4, 8, 15}, |
| {0, 2, 4, 9, 10}, |
| {0, 2, 4, 9, 12}, |
| {0, 2, 4, 9, 14}, |
| {0, 2, 4, 10, 11}, |
| {0, 2, 4, 10, 13}, |
| {0, 2, 4, 10, 15}, |
| {0, 2, 4, 11, 12}, |
| {0, 2, 4, 11, 14}, |
| {0, 2, 4, 12, 13}, |
| {0, 2, 4, 12, 15}, |
| {0, 2, 4, 13, 14}, |
| {0, 2, 4, 13, 15}, |
| {0, 2, 5, 6, 8}, |
| {0, 2, 5, 6, 9}, |
| {0, 2, 5, 6, 10}, |
| {0, 2, 5, 6, 11}, |
| {0, 2, 5, 6, 12}, |
| {0, 2, 5, 6, 13}, |
| {0, 2, 5, 6, 14}, |
| {0, 2, 5, 6, 15}, |
| {0, 2, 5, 8, 9}, |
| {0, 2, 5, 8, 11}, |
| {0, 2, 5, 8, 12}, |

TABLE 2

| |
|---|
| {0, 2, 5, 8, 14}, |
| {0, 2, 5, 9, 10}, |
| {0, 2, 5, 9, 13}, |
| {0, 2, 5, 9, 15}, |
| {0, 2, 5, 10, 11}, |
| {0, 2, 5, 10, 12}, |
| {0, 2, 5, 10, 14}, |
| {0, 2, 5, 11, 13}, |
| {0, 2, 5, 11, 15}, |
| {0, 2, 5, 12, 13}, |
| {0, 2, 5, 12, 15}, |
| {0, 2, 5, 13, 14}, |
| {0, 2, 5, 14, 15}, |
| {0, 2, 6, 7, 8}, |
| {0, 2, 6, 7, 9}, |
| {0, 2, 6, 7, 10}, |
| {0, 2, 6, 7, 11}, |
| {0, 2, 6, 7, 12}, |
| {0, 2, 6, 7, 13}, |
| {0, 2, 6, 7, 14}, |
| {0, 2, 6, 7, 15}, |
| {0, 2, 6, 8, 9}, |
| {0, 2, 6, 8, 11}, |
| {0, 2, 6, 8, 13}, |
| {0, 2, 6, 8, 15}, |

TABLE 2-continued

| |
|---|
| {0, 2, 6, 9, 10}, |
| {0, 2, 6, 9, 12}, |
| {0, 2, 6, 9, 14}, |
| {0, 2, 6, 10, 11}, |
| {0, 2, 6, 10, 13}, |
| {0, 2, 6, 10, 15}, |
| {0, 2, 6, 11, 12}, |
| {0, 2, 6, 11, 14}, |
| {0, 2, 6, 12, 13}, |
| {0, 2, 6, 12, 15}, |
| {0, 2, 6, 13, 14}, |
| {0, 2, 6, 14, 15}, |
| {0, 2, 7, 8, 9}, |
| {0, 2, 7, 8, 11}, |
| {0, 2, 7, 8, 12}, |
| {0, 2, 7, 8, 14}, |
| {0, 2, 7, 9, 10}, |
| {0, 2, 7, 9, 13}, |
| {0, 2, 7, 9, 15}, |
| {0, 2, 7, 10, 11}, |
| {0, 2, 7, 10, 12}, |
| {0, 2, 7, 10, 14}, |
| {0, 2, 7, 11, 13}, |
| {0, 2, 7, 11, 15}, |
| {0, 2, 7, 12, 13}, |
| {0, 2, 7, 12, 15}, |
| {0, 2, 7, 13, 14}, |
| {0, 2, 7, 14, 15}, |
| {0, 2, 8, 9, 12}, |
| {0, 2, 8, 9, 13}, |
| {0, 2, 8, 9, 14}, |
| {0, 2, 8, 9, 15}, |
| {0, 2, 8, 11, 12}, |
| {0, 2, 8, 11, 13}, |
| {0, 2, 8, 11, 14}, |
| {0, 2, 8, 11, 15}, |
| {0, 2, 8, 12, 13}, |
| {0, 2, 8, 12, 15}, |
| {0, 2, 8, 13, 14}, |
| {0, 2, 8, 14, 15}, |
| {0, 2, 9, 10, 12}, |
| {0, 2, 9, 10, 13}, |
| {0, 2, 9, 10, 14}, |
| {0, 2, 9, 10, 15}, |
| {0, 2, 9, 12, 13}, |
| {0, 2, 9, 12, 15}, |
| {0, 2, 9, 13, 14}, |
| {0, 2, 9, 14, 15}, |
| {0, 2, 10, 11, 12}, |
| {0, 2, 10, 11, 13}, |
| {0, 2, 10, 11, 14}, |
| {0, 2, 10, 11, 15}, |
| {0, 2, 10, 12, 13}, |
| {0, 2, 10, 12, 15}, |
| {0, 2, 10, 13, 14}, |
| {0, 2, 10, 14, 15}, |
| {0, 2, 11, 12, 13}, |
| {0, 2, 11, 12, 15}, |
| {0, 2, 11, 13, 14}, |
| {0, 2, 11, 14, 15}, |
| {0, 3, 4, 5, 8}, |
| {0, 3, 4, 5, 9}, |
| {0, 3, 4, 5, 10}, |
| {0, 3, 4, 5, 11}, |
| {0, 3, 4, 5, 12}, |
| {0, 3, 4, 5, 13}, |
| {0, 3, 4, 5, 14}, |
| {0, 3, 4, 5, 15}, |
| {0, 3, 4, 6, 8}, |
| {0, 3, 4, 6, 9}, |
| {0, 3, 4, 6, 10}, |
| {0, 3, 4, 6, 11}, |
| {0, 3, 4, 6, 12}, |
| {0, 3, 4, 6, 13}, |
| {0, 3, 4, 6, 14}, |
| {0, 3, 4, 6, 15}, |
| {0, 3, 4, 8, 9}, |
| {0, 3, 4, 8, 10}, |
| {0, 3, 4, 8, 13}, |

TABLE 2-continued

| |
|---|
| {0, 3, 4, 8, 14}, |
| {0, 3, 4, 9, 11}, |
| {0, 3, 4, 9, 12}, |
| {0, 3, 4, 9, 15}, |
| {0, 3, 4, 10, 11}, |
| {0, 3, 4, 10, 12}, |
| {0, 3, 4, 10, 15}, |
| {0, 3, 4, 11, 13}, |
| {0, 3, 4, 11, 14}, |
| {0, 3, 4, 12, 13}, |
| {0, 3, 4, 12, 14}, |
| {0, 3, 4, 13, 15}, |
| {0, 3, 4, 14, 15}, |
| {0, 3, 5, 7, 8}, |
| {0, 3, 5, 7, 9}, |
| {0, 3, 5, 7, 10}, |
| {0, 3, 5, 7, 11}, |
| {0, 3, 5, 7, 12}, |
| {0, 3, 5, 7, 13}, |
| {0, 3, 5, 7, 14}, |
| {0, 3, 5, 7, 15}, |
| {0, 3, 5, 8, 9}, |
| {0, 3, 5, 8, 10}, |
| {0, 3, 5, 8, 12}, |
| {0, 3, 5, 8, 15}, |
| {0, 3, 5, 9, 11}, |
| {0, 3, 5, 9, 13}, |
| {0, 3, 5, 9, 14}, |
| {0, 3, 5, 10, 11}, |
| {0, 3, 5, 10, 13}, |
| {0, 3, 5, 10, 14}, |
| {0, 3, 5, 11, 12}, |
| {0, 3, 5, 11, 15}, |
| {0, 3, 5, 12, 13}, |
| {0, 3, 5, 12, 14}, |
| {0, 3, 5, 13, 15}, |
| {0, 3, 5, 14, 15}, |
| {0, 3, 6, 7, 8}, |
| {0, 3, 6, 7, 9}, |
| {0, 3, 6, 7, 10}, |
| {0, 3, 6, 7, 11}, |
| {0, 3, 6, 7, 12}, |
| {0, 3, 6, 7, 13}, |
| {0, 3, 6, 7, 14}, |
| {0, 3, 6, 7, 15}, |
| {0, 3, 6, 8, 9}, |
| {0, 3, 6, 8, 10}, |
| {0, 3, 6, 8, 12}, |
| {0, 3, 6, 8, 15}, |
| {0, 3, 6, 9, 11}, |
| {0, 3, 6, 9, 13}, |
| {0, 3, 6, 9, 14}, |
| {0, 3, 6, 10, 11}, |
| {0, 3, 6, 10, 13}, |
| {0, 3, 6, 10, 14}, |
| {0, 3, 6, 11, 12}, |
| {0, 3, 6, 11, 15}, |
| {0, 3, 6, 12, 13}, |
| {0, 3, 6, 12, 14}, |
| {0, 3, 6, 13, 15}, |
| {0, 3, 6, 14, 15}, |
| {0, 3, 7, 8, 9}, |
| {0, 3, 7, 8, 10}, |
| {0, 3, 7, 8, 13}, |
| {0, 3, 7, 8, 14}, |
| {0, 3, 7, 9, 11}, |
| {0, 3, 7, 9, 12}, |
| {0, 3, 7, 9, 15}, |
| {0, 3, 7, 10, 11}, |
| {0, 3, 7, 10, 12}, |
| {0, 3, 7, 10, 15}, |
| {0, 3, 7, 11, 13}, |
| {0, 3, 7, 11, 14}, |
| {0, 3, 7, 12, 13}, |
| {0, 3, 7, 12, 14}, |
| {0, 3, 7, 13, 15}, |
| {0, 3, 7, 14, 15}, |
| {0, 3, 8, 9, 12}, |
| {0, 3, 8, 9, 13}, |

TABLE 2-continued

| |
|---|
| {0, 3, 8, 9, 14}, |
| {0, 3, 8, 9, 15}, |
| {0, 3, 8, 10, 12}, |
| {0, 3, 8, 10, 13}, |
| {0, 3, 8, 10, 14}, |
| {0, 3, 8, 10, 15}, |
| {0, 3, 8, 12, 13}, |
| {0, 3, 8, 12, 14}, |
| {0, 3, 8, 13, 15}, |
| {0, 3, 8, 14, 15}, |
| {0, 3, 9, 11, 12}, |
| {0, 3, 9, 11, 13}, |
| {0, 3, 9, 11, 14}, |
| {0, 3, 9, 11, 15}, |
| {0, 3, 9, 12, 13}, |
| {0, 3, 9, 12, 14}, |
| {0, 3, 9, 13, 15}, |
| {0, 3, 9, 14, 15}, |
| {0, 3, 10, 11, 12}, |
| {0, 3, 10, 11, 13}, |
| {0, 3, 10, 11, 14}, |
| {0, 3, 10, 11, 15}, |
| {0, 3, 10, 12, 13}, |
| {0, 3, 10, 12, 14}, |
| {0, 3, 10, 13, 15}, |
| {0, 3, 10, 14, 15}, |
| {0, 3, 11, 12, 13}, |
| {0, 3, 11, 12, 14}, |
| {0, 3, 11, 13, 15}, |
| {0, 3, 11, 14, 15}, |
| {0, 4, 5, 6, 8}, |
| {0, 4, 5, 6, 9}, |
| {0, 4, 5, 6, 10}, |
| {0, 4, 5, 6, 11}, |
| {0, 4, 5, 6, 12}, |
| {0, 4, 5, 6, 13}, |
| {0, 4, 5, 6, 14}, |
| {0, 4, 5, 6, 15}, |
| {0, 4, 5, 7, 8}, |
| {0, 4, 5, 7, 9}, |
| {0, 4, 5, 7, 10}, |
| {0, 4, 5, 7, 11}, |
| {0, 4, 5, 7, 12}, |
| {0, 4, 5, 7, 13}, |
| {0, 4, 5, 7, 14}, |
| {0, 4, 5, 7, 15}, |
| {0, 4, 5, 8, 10}, |
| {0, 4, 5, 8, 11}, |
| {0, 4, 5, 8, 14}, |
| {0, 4, 5, 8, 15}, |
| {0, 4, 5, 9, 10}, |
| {0, 4, 5, 9, 11}, |
| {0, 4, 5, 9, 14}, |
| {0, 4, 5, 9, 15}, |
| {0, 4, 5, 10, 12}, |
| {0, 4, 5, 10, 13}, |
| {0, 4, 5, 11, 12}, |
| {0, 4, 5, 11, 13}, |
| {0, 4, 5, 12, 14}, |
| {0, 4, 5, 12, 15}, |
| {0, 4, 5, 13, 14}, |
| {0, 4, 5, 13, 15}, |
| {0, 4, 6, 7, 8}, |
| {0, 4, 6, 7, 9}, |
| {0, 4, 6, 7, 10}, |
| {0, 4, 6, 7, 11}, |
| {0, 4, 6, 7, 12}, |
| {0, 4, 6, 7, 13}, |
| {0, 4, 6, 7, 14}, |
| {0, 4, 6, 7, 15}, |
| {0, 4, 6, 8, 9}, |
| {0, 4, 6, 8, 11}, |
| {0, 4, 6, 8, 13}, |
| {0, 4, 6, 8, 15}, |
| {0, 4, 6, 9, 10}, |
| {0, 4, 6, 9, 12}, |
| {0, 4, 6, 9, 14}, |
| {0, 4, 6, 10, 11}, |
| {0, 4, 6, 10, 13}, |

TABLE 2-continued

| |
|---|
| {0, 4, 6, 10, 15}, |
| {0, 4, 6, 11, 12}, |
| {0, 4, 6, 11, 14}, |
| {0, 4, 6, 12, 13}, |
| {0, 4, 6, 12, 15}, |
| {0, 4, 6, 13, 14}, |
| {0, 4, 6, 14, 15}, |
| {0, 4, 7, 8, 9}, |
| {0, 4, 7, 8, 10}, |
| {0, 4, 7, 8, 13}, |
| {0, 4, 7, 8, 14}, |
| {0, 4, 7, 9, 11}, |
| {0, 4, 7, 9, 12}, |
| {0, 4, 7, 9, 15}, |
| {0, 4, 7, 10, 11}, |
| {0, 4, 7, 10, 12}, |
| {0, 4, 7, 10, 15}, |
| {0, 4, 7, 11, 13}, |
| {0, 4, 7, 11, 14}, |
| {0, 4, 7, 12, 13}, |
| {0, 4, 7, 12, 14}, |
| {0, 4, 7, 13, 15}, |
| {0, 4, 7, 14, 15}, |
| {0, 4, 8, 9, 10}, |
| {0, 4, 8, 9, 11}, |
| {0, 4, 8, 9, 14}, |
| {0, 4, 8, 9, 15}, |
| {0, 4, 8, 10, 11}, |
| {0, 4, 8, 10, 13}, |
| {0, 4, 8, 10, 15}, |
| {0, 4, 8, 11, 13}, |
| {0, 4, 8, 11, 14}, |
| {0, 4, 8, 13, 14}, |
| {0, 4, 8, 13, 15}, |
| {0, 4, 8, 14, 15}, |
| {0, 4, 9, 10, 11}, |
| {0, 4, 9, 10, 12}, |
| {0, 4, 9, 10, 15}, |
| {0, 4, 9, 11, 12}, |
| {0, 4, 9, 11, 14}, |
| {0, 4, 9, 12, 14}, |
| {0, 4, 9, 12, 15}, |
| {0, 4, 9, 14, 15}, |
| {0, 4, 10, 11, 12}, |
| {0, 4, 10, 11, 13}, |
| {0, 4, 10, 12, 13}, |
| {0, 4, 10, 12, 15}, |
| {0, 4, 10, 13, 15}, |
| {0, 4, 11, 12, 13}, |
| {0, 4, 11, 12, 14}, |
| {0, 4, 11, 13, 14}, |
| {0, 4, 12, 13, 14}, |
| {0, 4, 12, 13, 15}, |

TABLE 3

| |
|---|
| {0, 4, 12, 14, 15}, |
| {0, 4, 13, 14, 15}, |
| {0, 5, 6, 7, 8}, |
| {0, 5, 6, 7, 9}, |
| {0, 5, 6, 7, 10}, |
| {0, 5, 6, 7, 11}, |
| {0, 5, 6, 7, 12}, |
| {0, 5, 6, 7, 13}, |
| {0, 5, 6, 7, 14}, |
| {0, 5, 6, 7, 15}, |
| {0, 5, 6, 8, 9}, |
| {0, 5, 6, 8, 10}, |
| {0, 5, 6, 8, 12}, |
| {0, 5, 6, 8, 15}, |
| {0, 5, 6, 9, 11}, |
| {0, 5, 6, 9, 13}, |
| {0, 5, 6, 9, 14}, |
| {0, 5, 6, 10, 11}, |
| {0, 5, 6, 10, 13}, |
| {0, 5, 6, 10, 14}, |

TABLE 3-continued

| |
|---|
| {0, 5, 6, 11, 12}, |
| {0, 5, 6, 11, 15}, |
| {0, 5, 6, 12, 13}, |
| {0, 5, 6, 12, 14}, |
| {0, 5, 6, 13, 15}, |
| {0, 5, 6, 14, 15}, |
| {0, 5, 7, 8, 9}, |
| {0, 5, 7, 8, 11}, |
| {0, 5, 7, 8, 12}, |
| {0, 5, 7, 8, 14}, |
| {0, 5, 7, 9, 10}, |
| {0, 5, 7, 9, 13}, |
| {0, 5, 7, 9, 15}, |
| {0, 5, 7, 10, 11}, |
| {0, 5, 7, 10, 12}, |
| {0, 5, 7, 10, 14}, |
| {0, 5, 7, 11, 13}, |
| {0, 5, 7, 11, 15}, |
| {0, 5, 7, 12, 13}, |
| {0, 5, 7, 12, 15}, |
| {0, 5, 7, 13, 14}, |
| {0, 5, 7, 14, 15}, |
| {0, 5, 8, 9, 10}, |
| {0, 5, 8, 9, 11}, |
| {0, 5, 8, 9, 14}, |
| {0, 5, 8, 9, 15}, |
| {0, 5, 8, 10, 11}, |
| {0, 5, 8, 10, 12}, |
| {0, 5, 8, 10, 14}, |
| {0, 5, 8, 11, 12}, |
| {0, 5, 8, 11, 15}, |
| {0, 5, 8, 12, 14}, |
| {0, 5, 8, 12, 15}, |
| {0, 5, 8, 14, 15}, |
| {0, 5, 9, 10, 11}, |
| {0, 5, 9, 10, 13}, |
| {0, 5, 9, 10, 14}, |
| {0, 5, 9, 11, 13}, |
| {0, 5, 9, 11, 15}, |
| {0, 5, 9, 13, 14}, |
| {0, 5, 9, 13, 15}, |
| {0, 5, 9, 14, 15}, |
| {0, 5, 10, 11, 12}, |
| {0, 5, 10, 11, 13}, |
| {0, 5, 10, 12, 13}, |
| {0, 5, 10, 12, 14}, |
| {0, 5, 10, 13, 14}, |
| {0, 5, 11, 12, 13}, |
| {0, 5, 11, 12, 15}, |
| {0, 5, 11, 13, 15}, |
| {0, 5, 12, 13, 14}, |
| {0, 5, 12, 13, 15}, |
| {0, 5, 12, 14, 15}, |
| {0, 5, 13, 14, 15}, |
| {0, 6, 7, 8, 10}, |
| {0, 6, 7, 8, 11}, |
| {0, 6, 7, 8, 12}, |
| {0, 6, 7, 8, 13}, |
| {0, 6, 7, 9, 10}, |
| {0, 6, 7, 9, 11}, |
| {0, 6, 7, 9, 12}, |
| {0, 6, 7, 9, 13}, |
| {0, 6, 7, 10, 14}, |
| {0, 6, 7, 10, 15}, |
| {0, 6, 7, 11, 14}, |
| {0, 6, 7, 11, 15}, |
| {0, 6, 7, 12, 14}, |
| {0, 6, 7, 12, 15}, |
| {0, 6, 7, 13, 14}, |
| {0, 6, 7, 13, 15}, |
| {0, 6, 8, 9, 10}, |
| {0, 6, 8, 9, 11}, |
| {0, 6, 8, 9, 12}, |
| {0, 6, 8, 9, 13}, |
| {0, 6, 8, 10, 11}, |
| {0, 6, 8, 10, 13}, |
| {0, 6, 8, 10, 15}, |
| {0, 6, 8, 11, 12}, |
| {0, 6, 8, 11, 15}, |

TABLE 3-continued

| |
|---|
| {0, 6, 8, 12, 13}, |
| {0, 6, 8, 12, 15}, |
| {0, 6, 8, 13, 15}, |
| {0, 6, 9, 10, 11}, |
| {0, 6, 9, 10, 13}, |
| {0, 6, 9, 10, 14}, |
| {0, 6, 9, 11, 12}, |
| {0, 6, 9, 11, 14}, |
| {0, 6, 9, 12, 13}, |
| {0, 6, 9, 12, 14}, |
| {0, 6, 9, 13, 14}, |
| {0, 6, 10, 11, 14}, |
| {0, 6, 10, 11, 15}, |
| {0, 6, 10, 13, 14}, |
| {0, 6, 10, 13, 15}, |
| {0, 6, 10, 14, 15}, |
| {0, 6, 11, 12, 14}, |
| {0, 6, 11, 12, 15}, |
| {0, 6, 11, 14, 15}, |
| {0, 6, 12, 13, 14}, |
| {0, 6, 12, 13, 15}, |
| {0, 6, 12, 14, 15}, |
| {0, 6, 13, 14, 15}, |
| {0, 7, 8, 9, 10}, |
| {0, 7, 8, 9, 11}, |
| {0, 7, 8, 9, 12}, |
| {0, 7, 8, 9, 13}, |
| {0, 7, 8, 10, 11}, |
| {0, 7, 8, 10, 12}, |
| {0, 7, 8, 10, 14}, |
| {0, 7, 8, 11, 13}, |
| {0, 7, 8, 11, 14}, |
| {0, 7, 8, 12, 13}, |
| {0, 7, 8, 12, 14}, |
| {0, 7, 8, 13, 14}, |
| {0, 7, 9, 10, 11}, |
| {0, 7, 9, 10, 12}, |
| {0, 7, 9, 10, 15}, |
| {0, 7, 9, 11, 13}, |
| {0, 7, 9, 11, 15}, |
| {0, 7, 9, 12, 13}, |
| {0, 7, 9, 12, 15}, |
| {0, 7, 9, 13, 15}, |
| {0, 7, 10, 11, 14}, |
| {0, 7, 10, 11, 15}, |
| {0, 7, 10, 12, 14}, |
| {0, 7, 10, 12, 15}, |
| {0, 7, 10, 14, 15}, |
| {0, 7, 11, 13, 14}, |
| {0, 7, 11, 13, 15}, |
| {0, 7, 11, 14, 15}, |
| {0, 7, 12, 13, 14}, |
| {0, 7, 12, 13, 15}, |
| {0, 7, 12, 14, 15}, |
| {0, 7, 13, 14, 15}, |
| {0, 8, 9, 10, 12}, |
| {0, 8, 9, 10, 13}, |
| {0, 8, 9, 10, 14}, |
| {0, 8, 9, 10, 15}, |
| {0, 8, 9, 11, 12}, |
| {0, 8, 9, 11, 13}, |
| {0, 8, 9, 11, 14}, |
| {0, 8, 9, 11, 15}, |
| {0, 8, 9, 12, 14}, |
| {0, 8, 9, 12, 15}, |
| {0, 8, 9, 13, 14}, |
| {0, 8, 9, 13, 15}, |
| {0, 8, 10, 11, 12}, |
| {0, 8, 10, 11, 13}, |
| {0, 8, 10, 11, 14}, |
| {0, 8, 10, 11, 15}, |
| {0, 8, 10, 12, 13}, |
| {0, 8, 10, 12, 15}, |
| {0, 8, 10, 13, 14}, |
| {0, 8, 10, 14, 15}, |
| {0, 8, 11, 12, 13}, |
| {0, 8, 11, 12, 14}, |
| {0, 8, 11, 13, 15}, |
| {0, 8, 11, 14, 15}, |

TABLE 3-continued

| |
|---|
| {0, 8, 12, 13, 14}, |
| {0, 8, 12, 13, 15}, |
| {0, 8, 12, 14, 15}, |
| {0, 8, 13, 14, 15}, |
| {0, 9, 10, 11, 12}, |
| {0, 9, 10, 11, 13}, |
| {0, 9, 10, 11, 14}, |
| {0, 9, 10, 11, 15}, |
| {0, 9, 10, 12, 13}, |
| {0, 9, 10, 12, 14}, |
| {0, 9, 10, 13, 15}, |
| {0, 9, 10, 14, 15}, |
| {0, 9, 11, 12, 13}, |
| {0, 9, 11, 12, 15}, |
| {0, 9, 11, 13, 14}, |
| {0, 9, 11, 14, 15}, |
| {0, 9, 12, 13, 14}, |
| {0, 9, 12, 13, 15}, |
| {0, 9, 12, 14, 15}, |
| {0, 9, 13, 14, 15}, |
| {0, 10, 11, 12, 14}, |
| {0, 10, 11, 12, 15}, |
| {0, 10, 11, 13, 14}, |
| {0, 10, 11, 13, 15}, |
| {0, 10, 12, 13, 14}, |
| {0, 10, 12, 13, 15}, |
| {0, 10, 12, 14, 15}, |
| {0, 10, 13, 14, 15}, |
| {0, 11, 12, 13, 14}, |
| {0, 11, 12, 13, 15}, |
| {0, 11, 12, 14, 15}, |
| {0, 11, 13, 14, 15}, |
| {1, 2, 3, 4, 8}, |
| {1, 2, 3, 4, 9}, |
| {1, 2, 3, 4, 10}, |
| {1, 2, 3, 4, 11}, |
| {1, 2, 3, 4, 12}, |
| {1, 2, 3, 4, 13}, |
| {1, 2, 3, 4, 14}, |
| {1, 2, 3, 4, 15}, |
| {1, 2, 3, 5, 8}, |
| {1, 2, 3, 5, 9}, |
| {1, 2, 3, 5, 10}, |
| {1, 2, 3, 5, 11}, |
| {1, 2, 3, 5, 12}, |
| {1, 2, 3, 5, 13}, |
| {1, 2, 3, 5, 14}, |
| {1, 2, 3, 5, 15}, |
| {1, 2, 3, 6, 8}, |
| {1, 2, 3, 6, 9}, |
| {1, 2, 3, 6, 10}, |
| {1, 2, 3, 6, 11}, |
| {1, 2, 3, 6, 12}, |
| {1, 2, 3, 6, 13}, |
| {1, 2, 3, 6, 14}, |
| {1, 2, 3, 6, 15}, |
| {1, 2, 3, 7, 8}, |
| {1, 2, 3, 7, 9}, |
| {1, 2, 3, 7, 10}, |
| {1, 2, 3, 7, 11}, |
| {1, 2, 3, 7, 12}, |
| {1, 2, 3, 7, 13}, |
| {1, 2, 3, 7, 14}, |
| {1, 2, 3, 7, 15}, |
| {1, 2, 3, 8, 12}, |
| {1, 2, 3, 8, 13}, |
| {1, 2, 3, 8, 14}, |
| {1, 2, 3, 8, 15}, |
| {1, 2, 3, 9, 12}, |
| {1, 2, 3, 9, 13}, |
| {1, 2, 3, 9, 14}, |
| {1, 2, 3, 9, 15}, |
| {1, 2, 3, 10, 12}, |
| {1, 2, 3, 10, 13}, |
| {1, 2, 3, 10, 14}, |
| {1, 2, 3, 10, 15}, |
| {1, 2, 3, 11, 12}, |
| {1, 2, 3, 11, 13}, |
| {1, 2, 3, 11, 14}, |

TABLE 3-continued

| |
|---|
| {1, 2, 3, 11, 15}, |
| {1, 2, 4, 5, 8}, |
| {1, 2, 4, 5, 9}, |
| {1, 2, 4, 5, 10}, |
| {1, 2, 4, 5, 11}, |
| {1, 2, 4, 5, 12}, |
| {1, 2, 4, 5, 13}, |
| {1, 2, 4, 5, 14}, |
| {1, 2, 4, 5, 15}, |
| {1, 2, 4, 6, 8}, |
| {1, 2, 4, 6, 9}, |
| {1, 2, 4, 6, 10}, |
| {1, 2, 4, 6, 11}, |
| {1, 2, 4, 6, 12}, |
| {1, 2, 4, 6, 13}, |
| {1, 2, 4, 6, 14}, |
| {1, 2, 4, 6, 15}, |
| {1, 2, 4, 8, 9}, |
| {1, 2, 4, 8, 10}, |
| {1, 2, 4, 8, 12}, |
| {1, 2, 4, 8, 15}, |
| {1, 2, 4, 9, 11}, |
| {1, 2, 4, 9, 13}, |
| {1, 2, 4, 9, 14}, |
| {1, 2, 4, 10, 11}, |
| {1, 2, 4, 10, 13}, |
| {1, 2, 4, 10, 14}, |
| {1, 2, 4, 11, 12}, |
| {1, 2, 4, 11, 15}, |
| {1, 2, 4, 12, 13}, |
| {1, 2, 4, 12, 14}, |
| {1, 2, 4, 13, 15}, |
| {1, 2, 4, 14, 15}, |
| {1, 2, 5, 7, 8}, |
| {1, 2, 5, 7, 9}, |
| {1, 2, 5, 7, 10}, |
| {1, 2, 5, 7, 11}, |
| {1, 2, 5, 7, 12}, |
| {1, 2, 5, 7, 13}, |
| {1, 2, 5, 7, 14}, |
| {1, 2, 5, 7, 15}, |
| {1, 2, 5, 8, 9}, |
| {1, 2, 5, 8, 10}, |
| {1, 2, 5, 8, 13}, |
| {1, 2, 5, 8, 14}, |
| {1, 2, 5, 9, 11}, |
| {1, 2, 5, 9, 12}, |
| {1, 2, 5, 9, 15}, |
| {1, 2, 5, 10, 11}, |
| {1, 2, 5, 10, 12}, |
| {1, 2, 5, 10, 15}, |
| {1, 2, 5, 11, 13}, |
| {1, 2, 5, 11, 14}, |
| {1, 2, 5, 12, 13}, |
| {1, 2, 5, 12, 14}, |
| {1, 2, 5, 13, 15}, |
| {1, 2, 5, 14, 15}, |
| {1, 2, 6, 7, 8}, |

TABLE 4

| |
|---|
| {1, 2, 6, 7, 9}, |
| {1, 2, 6, 7, 10}, |
| {1, 2, 6, 7, 11}, |
| {1, 2, 6, 7, 12}, |
| {1, 2, 6, 7, 13}, |
| {1, 2, 6, 7, 14}, |
| {1, 2, 6, 7, 15}, |
| {1, 2, 6, 8, 9}, |
| {1, 2, 6, 8, 10}, |
| {1, 2, 6, 8, 13}, |
| {1, 2, 6, 8, 14}, |
| {1, 2, 6, 9, 11}, |
| {1, 2, 6, 9, 12}, |
| {1, 2, 6, 9, 15}, |
| {1, 2, 6, 10, 11}, |

TABLE 4-continued

| |
|---|
| {1, 2, 6, 10, 12}, |
| {1, 2, 6, 10, 15}, |
| {1, 2, 6, 11, 13}, |
| {1, 2, 6, 11, 14}, |
| {1, 2, 6, 12, 13}, |
| {1, 2, 6, 12, 14}, |
| {1, 2, 6, 13, 15}, |
| {1, 2, 6, 14, 15}, |
| {1, 2, 7, 8, 9}, |
| {1, 2, 7, 8, 10}, |
| {1, 2, 7, 8, 12}, |
| {1, 2, 7, 8, 15}, |
| {1, 2, 7, 9, 11}, |
| {1, 2, 7, 9, 13}, |
| {1, 2, 7, 9, 14}, |
| {1, 2, 7, 10, 11}, |
| {1, 2, 7, 10, 13}, |
| {1, 2, 7, 10, 14}, |
| {1, 2, 7, 11, 12}, |
| {1, 2, 7, 11, 15}, |
| {1, 2, 7, 12, 13}, |
| {1, 2, 7, 12, 14}, |
| {1, 2, 7, 13, 15}, |
| {1, 2, 7, 14, 15}, |
| {1, 2, 8, 9, 12}, |
| {1, 2, 8, 9, 13}, |
| {1, 2, 8, 9, 14}, |
| {1, 2, 8, 9, 15}, |
| {1, 2, 8, 10, 12}, |
| {1, 2, 8, 10, 13}, |
| {1, 2, 8, 10, 14}, |
| {1, 2, 8, 10, 15}, |
| {1, 2, 8, 12, 13}, |
| {1, 2, 8, 12, 14}, |
| {1, 2, 8, 13, 15}, |
| {1, 2, 8, 14, 15}, |
| {1, 2, 9, 11, 12}, |
| {1, 2, 9, 11, 13}, |
| {1, 2, 9, 11, 14}, |
| {1, 2, 9, 11, 15}, |
| {1, 2, 9, 12, 13}, |
| {1, 2, 9, 12, 14}, |
| {1, 2, 9, 13, 15}, |
| {1, 2, 9, 14, 15}, |
| {1, 2, 10, 11, 12}, |
| {1, 2, 10, 11, 13}, |
| {1, 2, 10, 11, 14}, |
| {1, 2, 10, 11, 15}, |
| {1, 2, 10, 12, 13}, |
| {1, 2, 10, 12, 14}, |
| {1, 2, 10, 13, 15}, |
| {1, 2, 10, 14, 15}, |
| {1, 2, 11, 12, 13}, |
| {1, 2, 11, 12, 14}, |
| {1, 2, 11, 13, 15}, |
| {1, 2, 11, 14, 15}, |
| {1, 3, 4, 5, 8}, |
| {1, 3, 4, 5, 9}, |
| {1, 3, 4, 5, 10}, |
| {1, 3, 4, 5, 11}, |
| {1, 3, 4, 5, 12}, |
| {1, 3, 4, 5, 13}, |
| {1, 3, 4, 5, 14}, |
| {1, 3, 4, 5, 15}, |
| {1, 3, 4, 7, 8}, |
| {1, 3, 4, 7, 9}, |
| {1, 3, 4, 7, 10}, |
| {1, 3, 4, 7, 11}, |
| {1, 3, 4, 7, 12}, |
| {1, 3, 4, 7, 13}, |
| {1, 3, 4, 7, 14}, |
| {1, 3, 4, 7, 15}, |
| {1, 3, 4, 8, 9}, |
| {1, 3, 4, 8, 11}, |
| {1, 3, 4, 8, 12}, |
| {1, 3, 4, 8, 14}, |
| {1, 3, 4, 9, 10}, |
| {1, 3, 4, 9, 13}, |
| {1, 3, 4, 9, 15}, |

TABLE 4-continued

| |
|---|
| {1, 3, 4, 10, 11}, |
| {1, 3, 4, 10, 12}, |
| {1, 3, 4, 10, 14}, |
| {1, 3, 4, 11, 13}, |
| {1, 3, 4, 11, 15}, |
| {1, 3, 4, 12, 13}, |
| {1, 3, 4, 12, 15}, |
| {1, 3, 4, 13, 14}, |
| {1, 3, 4, 14, 15}, |
| {1, 3, 5, 6, 8}, |
| {1, 3, 5, 6, 9}, |
| {1, 3, 5, 6, 10}, |
| {1, 3, 5, 6, 11}, |
| {1, 3, 5, 6, 12}, |
| {1, 3, 5, 6, 13}, |
| {1, 3, 5, 6, 14}, |
| {1, 3, 5, 6, 15}, |
| {1, 3, 5, 8, 9}, |
| {1, 3, 5, 8, 11}, |
| {1, 3, 5, 8, 13}, |
| {1, 3, 5, 8, 15}, |
| {1, 3, 5, 9, 10}, |
| {1, 3, 5, 9, 12}, |
| {1, 3, 5, 9, 14}, |
| {1, 3, 5, 10, 11}, |
| {1, 3, 5, 10, 13}, |
| {1, 3, 5, 10, 15}, |
| {1, 3, 5, 11, 12}, |
| {1, 3, 5, 11, 14}, |
| {1, 3, 5, 12, 13}, |
| {1, 3, 5, 12, 15}, |
| {1, 3, 5, 13, 14}, |
| {1, 3, 5, 14, 15}, |
| {1, 3, 6, 7, 8}, |
| {1, 3, 6, 7, 9}, |
| {1, 3, 6, 7, 10}, |
| {1, 3, 6, 7, 11}, |
| {1, 3, 6, 7, 12}, |
| {1, 3, 6, 7, 13}, |
| {1, 3, 6, 7, 14}, |
| {1, 3, 6, 7, 15}, |
| {1, 3, 6, 8, 9}, |
| {1, 3, 6, 8, 11}, |
| {1, 3, 6, 8, 12}, |
| {1, 3, 6, 8, 14}, |
| {1, 3, 6, 9, 10}, |
| {1, 3, 6, 9, 13}, |
| {1, 3, 6, 9, 15}, |
| {1, 3, 6, 10, 11}, |
| {1, 3, 6, 10, 12}, |
| {1, 3, 6, 10, 14}, |
| {1, 3, 6, 11, 13}, |
| {1, 3, 6, 11, 15}, |
| {1, 3, 6, 12, 13}, |
| {1, 3, 6, 12, 15}, |
| {1, 3, 6, 13, 14}, |
| {1, 3, 6, 14, 15}, |
| {1, 3, 7, 8, 9}, |
| {1, 3, 7, 8, 11}, |
| {1, 3, 7, 8, 13}, |
| {1, 3, 7, 8, 15}, |
| {1, 3, 7, 9, 10}, |
| {1, 3, 7, 9, 12}, |
| {1, 3, 7, 9, 14}, |
| {1, 3, 7, 10, 11}, |
| {1, 3, 7, 10, 13}, |
| {1, 3, 7, 10, 15}, |
| {1, 3, 7, 11, 12}, |
| {1, 3, 7, 11, 14}, |
| {1, 3, 7, 12, 13}, |
| {1, 3, 7, 12, 15}, |
| {1, 3, 7, 13, 14}, |
| {1, 3, 7, 14, 15}, |
| {1, 3, 8, 9, 12}, |
| {1, 3, 8, 9, 13}, |
| {1, 3, 8, 9, 14}, |
| {1, 3, 8, 9, 15}, |
| {1, 3, 8, 11, 12}, |
| {1, 3, 8, 11, 13}, |

TABLE 4-continued

| |
|---|
| {1, 3, 8, 11, 14}, |
| {1, 3, 8, 11, 15}, |
| {1, 3, 8, 12, 13}, |
| {1, 3, 8, 12, 15}, |
| {1, 3, 8, 13, 14}, |
| {1, 3, 8, 14, 15}, |
| {1, 3, 9, 10, 12}, |
| {1, 3, 9, 10, 13}, |
| {1, 3, 9, 10, 14}, |
| {1, 3, 9, 10, 15}, |
| {1, 3, 9, 12, 13}, |
| {1, 3, 9, 12, 15}, |
| {1, 3, 9, 13, 14}, |
| {1, 3, 9, 14, 15}, |
| {1, 3, 10, 11, 12}, |
| {1, 3, 10, 11, 13}, |
| {1, 3, 10, 11, 14}, |
| {1, 3, 10, 11, 15}, |
| {1, 3, 10, 12, 13}, |
| {1, 3, 10, 12, 15}, |
| {1, 3, 10, 13, 14}, |
| {1, 3, 10, 14, 15}, |
| {1, 3, 11, 12, 13}, |
| {1, 3, 11, 12, 15}, |
| {1, 3, 11, 13, 14}, |
| {1, 3, 11, 14, 15}, |
| {1, 4, 5, 6, 8}, |
| {1, 4, 5, 6, 9}, |
| {1, 4, 5, 6, 10}, |
| {1, 4, 5, 6, 11}, |
| {1, 4, 5, 6, 12}, |
| {1, 4, 5, 6, 13}, |
| {1, 4, 5, 6, 14}, |
| {1, 4, 5, 6, 15}, |
| {1, 4, 5, 7, 8}, |
| {1, 4, 5, 7, 9}, |
| {1, 4, 5, 7, 10}, |
| {1, 4, 5, 7, 11}, |
| {1, 4, 5, 7, 12}, |
| {1, 4, 5, 7, 13}, |
| {1, 4, 5, 7, 14}, |
| {1, 4, 5, 7, 15}, |
| {1, 4, 5, 8, 10}, |
| {1, 4, 5, 8, 11}, |
| {1, 4, 5, 8, 14}, |
| {1, 4, 5, 8, 15}, |
| {1, 4, 5, 9, 10}, |
| {1, 4, 5, 9, 11}, |
| {1, 4, 5, 9, 14}, |
| {1, 4, 5, 9, 15}, |
| {1, 4, 5, 10, 12}, |
| {1, 4, 5, 10, 13}, |
| {1, 4, 5, 11, 12}, |
| {1, 4, 5, 11, 13}, |
| {1, 4, 5, 12, 14}, |
| {1, 4, 5, 12, 15}, |
| {1, 4, 5, 13, 14}, |
| {1, 4, 5, 13, 15}, |
| {1, 4, 6, 7, 8}, |
| {1, 4, 6, 7, 9}, |
| {1, 4, 6, 7, 10}, |
| {1, 4, 6, 7, 11}, |
| {1, 4, 6, 7, 12}, |
| {1, 4, 6, 7, 13}, |
| {1, 4, 6, 7, 14}, |
| {1, 4, 6, 7, 15}, |
| {1, 4, 6, 8, 9}, |
| {1, 4, 6, 8, 11}, |
| {1, 4, 6, 8, 12}, |
| {1, 4, 6, 8, 14}, |
| {1, 4, 6, 9, 10}, |
| {1, 4, 6, 9, 13}, |
| {1, 4, 6, 9, 15}, |
| {1, 4, 6, 10, 11}, |
| {1, 4, 6, 10, 12}, |
| {1, 4, 6, 10, 14}, |
| {1, 4, 6, 11, 13}, |
| {1, 4, 6, 11, 15}, |
| {1, 4, 6, 12, 13}, |

TABLE 4-continued

| |
|---|
| {1, 4, 6, 12, 15}, |
| {1, 4, 6, 13, 14}, |
| {1, 4, 6, 14, 15}, |
| {1, 4, 7, 8, 9}, |
| {1, 4, 7, 8, 10}, |
| {1, 4, 7, 8, 12}, |
| {1, 4, 7, 8, 15}, |
| {1, 4, 7, 9, 11}, |
| {1, 4, 7, 9, 13}, |
| {1, 4, 7, 9, 14}, |
| {1, 4, 7, 10, 11}, |
| {1, 4, 7, 10, 13}, |
| {1, 4, 7, 10, 14}, |
| {1, 4, 7, 11, 12}, |
| {1, 4, 7, 11, 15}, |
| {1, 4, 7, 12, 13}, |
| {1, 4, 7, 12, 14}, |
| {1, 4, 7, 13, 15}, |
| {1, 4, 7, 14, 15}, |
| {1, 4, 8, 9, 101, |
| {1, 4, 8, 9, 11}, |
| {1, 4, 8, 9, 14}, |
| {1, 4, 8, 9, 15}, |
| {1, 4, 8, 10, 11}, |
| {1, 4, 8, 10, 12}, |
| {1, 4, 8, 10, 14}, |
| {1, 4, 8, 11, 12}, |
| {1, 4, 8, 11, 15}, |
| {1, 4, 8, 12, 14}, |
| {1, 4, 8, 12, 15}, |
| {1, 4, 8, 14, 15}, |
| {1, 4, 9, 10, 11}, |
| {1, 4, 9, 10, 13}, |
| {1, 4, 9, 10, 14}, |
| {1, 4, 9, 11, 13}, |
| {1, 4, 9, 11, 15}, |
| {1, 4, 9, 13, 14}, |
| {1, 4, 9, 13, 15}, |
| {1, 4, 9, 14, 15}, |
| {1, 4, 10, 11, 12}, |
| {1, 4, 10, 11, 13}, |
| {1, 4, 10, 12, 13}, |
| {1, 4, 10, 12, 14}, |
| {1, 4, 10, 13, 14}, |
| {1, 4, 11, 12, 13}, |
| {1, 4, 11, 12, 15}, |
| {1, 4, 11, 13, 15}, |
| {1, 4, 12, 13, 14}, |
| {1, 4, 12, 13, 15}, |
| {1, 4, 12, 14, 15}, |
| {1, 4, 13, 14, 15}, |
| {1, 5, 6, 7, 8}, |
| {1, 5, 6, 7, 9}, |
| {1, 5, 6, 7, 10}, |
| {1, 5, 6, 7, 11}, |
| {1, 5, 6, 7, 12}, |
| {1, 5, 6, 7, 13}, |
| {1, 5, 6, 7, 14}, |
| {1, 5, 6, 7, 15}, |
| {1, 5, 6, 8, 9}, |
| {1, 5, 6, 8, 10}, |
| {1, 5, 6, 8, 13}, |
| {1, 5, 6, 8, 14}, |

TABLE 5

| |
|---|
| {1, 5, 6, 9, 11}, |
| {1, 5, 6, 9, 12}, |
| {1, 5, 6, 9, 15}, |
| {1, 5, 6, 10, 11}, |
| {1, 5, 6, 10, 12}, |
| {1, 5, 6, 10, 15}, |
| {1, 5, 6, 11, 13}, |
| {1, 5, 6, 11, 14}, |
| {1, 5, 6, 12, 13}, |
| {1, 5, 6, 12, 14}, |

TABLE 5-continued

| |
|---|
| {1, 5, 6, 13, 15}, |
| {1, 5, 6, 14, 15}, |
| {1, 5, 7, 8, 9}, |
| {1, 5, 7, 8, 11}, |
| {1, 5, 7, 8, 13}, |
| {1, 5, 7, 8, 15}, |
| {1, 5, 7, 9, 10}, |
| {1, 5, 7, 9, 12}, |
| {1, 5, 7, 9, 14}, |
| {1, 5, 7, 10, 11}, |
| {1, 5, 7, 10, 13}, |
| {1, 5, 7, 10, 15}, |
| {1, 5, 7, 11, 12}, |
| {1, 5, 7, 11, 14}, |
| {1, 5, 7, 12, 13}, |
| {1, 5, 7, 12, 15}, |
| {1, 5, 7, 13, 14}, |
| {1, 5, 7, 14, 15}, |
| {1, 5, 8, 9, 10}, |
| {1, 5, 8, 9, 11}, |
| {1, 5, 8, 9, 14}, |
| {1, 5, 8, 9, 15}, |
| {1, 5, 8, 10, 11}, |
| {1, 5, 8, 10, 13}, |
| {1, 5, 8, 10, 15}, |
| {1, 5, 8, 11, 13}, |
| {1, 5, 8, 11, 14}, |
| {1, 5, 8, 13, 14}, |
| {1, 5, 8, 13, 15}, |
| {1, 5, 8, 14, 15}, |
| {1, 5, 9, 10, 11}, |
| {1, 5, 9, 10, 12}, |
| {1, 5, 9, 10, 15}, |
| {1, 5, 9, 11, 12}, |
| {1, 5, 9, 11, 14}, |
| {1, 5, 9, 12, 14}, |
| {1, 5, 9, 12, 15}, |
| {1, 5, 9, 14, 15}, |
| {1, 5, 10, 11, 12}, |
| {1, 5, 10, 11, 13}, |
| {1, 5, 10, 12, 13}, |
| {1, 5, 10, 12, 15}, |
| {1, 5, 10, 13, 15}, |
| {1, 5, 11, 12, 13}, |
| {1, 5, 11, 12, 14}, |
| {1, 5, 11, 13, 14}, |
| {1, 5, 12, 13, 14}, |
| {1, 5, 12, 13, 15}, |
| {1, 5, 12, 14, 15}, |
| {1, 5, 13, 14, 15}, |
| {1, 6, 7, 8, 10}, |
| {1, 6, 7, 8, 11}, |
| {1, 6, 7, 8, 12}, |
| {1, 6, 7, 8, 13}, |
| {1, 6, 7, 9, 10}, |
| {1, 6, 7, 9, 11}, |
| {1, 6, 7, 9, 12}, |
| {1, 6, 7, 9, 13}, |
| {1, 6, 7, 10, 14}, |
| {1, 6, 7, 10, 15}, |
| {1, 6, 7, 11, 14}, |
| {1, 6, 7, 11, 15}, |
| {1, 6, 7, 12, 14}, |
| {1, 6, 7, 12, 15}, |
| {1, 6, 7, 13, 14}, |
| {1, 6, 7, 13, 15}, |
| {1, 6, 8, 9, 10}, |
| {1, 6, 8, 9, 11}, |
| {1, 6, 8, 9, 12}, |
| {1, 6, 8, 9, 13}, |
| {1, 6, 8, 10, 11}, |
| {1, 6, 8, 10, 12}, |
| {1, 6, 8, 10, 14}, |
| {1, 6, 8, 11, 13}, |
| {1, 6, 8, 11, 14}, |
| {1, 6, 8, 12, 13}, |
| {1, 6, 8, 12, 14}, |
| {1, 6, 8, 13, 14}, |
| {1, 6, 9, 10, 11}, |

TABLE 5-continued

| |
|---|
| {1, 6, 9, 10, 12}, |
| {1, 6, 9, 10, 15}, |
| {1, 6, 9, 11, 13}, |
| {1, 6, 9, 11, 15}, |
| {1, 6, 9, 12, 13}, |
| {1, 6, 9, 12, 15}, |
| {1, 6, 9, 13, 15}, |
| {1, 6, 10, 11, 14}, |
| {1, 6, 10, 11, 15}, |
| {1, 6, 10, 12, 14}, |
| {1, 6, 10, 12, 15}, |
| {1, 6, 10, 14, 15}, |
| {1, 6, 11, 13, 14}, |
| {1, 6, 11, 13, 15}, |
| {1, 6, 11, 14, 15}, |
| {1, 6, 12, 13, 14}, |
| {1, 6, 12, 13, 15}, |
| {1, 6, 12, 14, 15}, |
| {1, 6, 13, 14, 15}, |
| {1, 7, 8, 9, 10}, |
| {1, 7, 8, 9, 11}, |
| {1, 7, 8, 9, 12}, |
| {1, 7, 8, 9, 13}, |
| {1, 7, 8, 10, 11}, |
| {1, 7, 8, 10, 13}, |
| {1, 7, 8, 10, 15}, |
| {1, 7, 8, 11, 12}, |
| {1, 7, 8, 11, 15}, |
| {1, 7, 8, 12, 13}, |
| {1, 7, 8, 12, 15}, |
| {1, 7, 8, 13, 15}, |
| {1, 7, 9, 10, 11}, |
| {1, 7, 9, 10, 13}, |
| {1, 7, 9, 10, 14}, |
| {1, 7, 9, 11, 12}, |
| {1, 7, 9, 11, 14}, |
| {1, 7, 9, 12, 13}, |
| {1, 7, 9, 12, 14}, |
| {1, 7, 9, 13, 14}, |
| {1, 7, 10, 11, 14}, |
| {1, 7, 10, 11, 15}, |
| {1, 7, 10, 13, 14}, |
| {1, 7, 10, 13, 15}, |
| {1, 7, 10, 14, 15}, |
| {1, 7, 11, 12, 14}, |
| {1, 7, 11, 12, 15}, |
| {1, 7, 11, 14, 15}, |
| {1, 7, 12, 13, 14}, |
| {1, 7, 12, 13, 15}, |
| {1, 7, 12, 14, 15}, |
| {1, 7, 13, 14, 15}, |
| {1, 8, 9, 10, 12}, |
| {1, 8, 9, 10, 13}, |
| {1, 8, 9, 10, 14}, |
| {1, 8, 9, 10, 15}, |
| {1, 8, 9, 11, 12}, |
| {1, 8, 9, 11, 13}, |
| {1, 8, 9, 11, 14}, |
| {1, 8, 9, 11, 15}, |
| {1, 8, 9, 12, 14}, |
| {1, 8, 9, 12, 15}, |
| {1, 8, 9, 13, 14}, |
| {1, 8, 9, 13, 15}, |
| {1, 8, 10, 11, 12}, |
| {1, 8, 10, 11, 13}, |
| {1, 8, 10, 11, 14}, |
| {1, 8, 10, 11, 15}, |
| {1, 8, 10, 12, 13}, |
| {1, 8, 10, 12, 15}, |
| {1, 8, 10, 13, 14}, |
| {1, 8, 10, 14, 15}, |
| {1, 8, 11, 12, 13}, |
| {1, 8, 11, 12, 14}, |
| {1, 8, 11, 13, 15}, |
| {1, 8, 11, 14, 15}, |
| {1, 8, 12, 13, 14}, |
| {1, 8, 12, 13, 15}, |
| {1, 8, 12, 14, 15}, |
| {1, 8, 13, 14, 15}, |

TABLE 5-continued

| |
|---|
| {1, 9, 10, 11, 12}, |
| {1, 9, 10, 11, 13}, |
| {1, 9, 10, 11, 14}, |
| {1, 9, 10, 11, 15}, |
| {1, 9, 10, 12, 13}, |
| {1, 9, 10, 12, 14}, |
| {1, 9, 10, 13, 15}, |
| {1, 9, 10, 14, 15}, |
| {1, 9, 11, 12, 13}, |
| {1, 9, 11, 12, 15}, |
| {1, 9, 11, 13, 14}, |
| {1, 9, 11, 14, 15}, |
| {1, 9, 12, 13, 14}, |
| {1, 9, 12, 13, 15}, |
| {1, 9, 12, 14, 15}, |
| {1, 9, 13, 14, 15}, |
| {1, 10, 11, 12, 14}, |
| {1, 10, 11, 12, 15}, |
| {1, 10, 11, 13, 14}, |
| {1, 10, 11, 13, 15}, |
| {1, 10, 12, 13, 14}, |
| {1, 10, 12, 13, 15}, |
| {1, 10, 12, 14, 15}, |
| {1, 10, 13, 14, 15}, |
| {1, 11, 12, 13, 14}, |
| {1, 11, 12, 13, 15}, |
| {1, 11, 12, 14, 15}, |
| {1, 11, 13, 14, 15}, |
| {2, 3, 4, 6, 8}, |
| {2, 3, 4, 6, 9}, |
| {2, 3, 4, 6, 10}, |
| {2, 3, 4, 6, 11}, |
| {2, 3, 4, 6, 12}, |
| {2, 3, 4, 6, 13}, |
| {2, 3, 4, 6, 14}, |
| {2, 3, 4, 6, 15}, |
| {2, 3, 4, 7, 8}, |
| {2, 3, 4, 7, 9}, |
| {2, 3, 4, 7, 10}, |
| {2, 3, 4, 7, 11}, |
| {2, 3, 4, 7, 12}, |
| {2, 3, 4, 7, 13}, |
| {2, 3, 4, 7, 14}, |
| {2, 3, 4, 7, 15}, |
| {2, 3, 4, 8, 10}, |
| {2, 3, 4, 8, 11}, |
| {2, 3, 4, 8, 12}, |
| {2, 3, 4, 8, 13}, |
| {2, 3, 4, 9, 10}, |
| {2, 3, 4, 9, 11}, |
| {2, 3, 4, 9, 12}, |
| {2, 3, 4, 9, 13}, |
| {2, 3, 4, 10, 14}, |
| {2, 3, 4, 10, 15}, |
| {2, 3, 4, 11, 14}, |
| {2, 3, 4, 11, 15}, |
| {2, 3, 4, 12, 14}, |
| {2, 3, 4, 12, 15}, |
| {2, 3, 4, 13, 14}, |
| {2, 3, 4, 13, 15}, |
| {2, 3, 5, 6, 8}, |
| {2, 3, 5, 6, 9}, |
| {2, 3, 5, 6, 10}, |
| {2, 3, 5, 6, 11}, |
| {2, 3, 5, 6, 12}, |
| {2, 3, 5, 6, 13}, |
| {2, 3, 5, 6, 14}, |
| {2, 3, 5, 6, 15}, |
| {2, 3, 5, 7, 8}, |
| {2, 3, 5, 7, 9}, |
| {2, 3, 5, 7, 10}, |
| {2, 3, 5, 7, 11}, |
| {2, 3, 5, 7, 12}, |
| {2, 3, 5, 7, 13}, |
| {2, 3, 5, 7, 14}, |
| {2, 3, 5, 7, 15}, |
| {2, 3, 5, 8, 10}, |
| {2, 3, 5, 8, 11}, |
| {2, 3, 5, 8, 12}, |

TABLE 5-continued

| |
|---|
| {2, 3, 5, 8, 13}, |
| {2, 3, 5, 9, 10}, |
| {2, 3, 5, 9, 11}, |
| {2, 3, 5, 9, 12}, |
| {2, 3, 5, 9, 13}, |
| {2, 3, 5, 10, 14}, |
| {2, 3, 5, 10, 15}, |
| {2, 3, 5, 11, 14}, |
| {2, 3, 5, 11, 15}, |
| {2, 3, 5, 12, 14}, |
| {2, 3, 5, 12, 15}, |
| {2, 3, 5, 13, 14}, |
| {2, 3, 5, 13, 15}, |
| {2, 3, 6, 8, 10}, |
| {2, 3, 6, 8, 11}, |
| {2, 3, 6, 8, 14}, |
| {2, 3, 6, 8, 15}, |
| {2, 3, 6, 9, 10}, |
| {2, 3, 6, 9, 11}, |
| {2, 3, 6, 9, 14}, |
| {2, 3, 6, 9, 15}, |
| {2, 3, 6, 10, 12}, |
| {2, 3, 6, 10, 13}, |
| {2, 3, 6, 11, 12}, |
| {2, 3, 6, 11, 13}, |
| {2, 3, 6, 12, 141, |
| {2, 3, 6, 12, 15}, |
| {2, 3, 6, 13, 14}, |
| {2, 3, 6, 13, 15}, |
| {2, 3, 7, 8, 101, |
| {2, 3, 7, 8, 11}, |
| {2, 3, 7, 8, 14}, |
| {2, 3, 7, 8, 15}, |
| {2, 3, 7, 9, 10}, |
| {2, 3, 7, 9, 11}, |
| {2, 3, 7, 9, 14}, |
| {2, 3, 7, 9, 15}, |
| {2, 3, 7, 10, 12}, |
| {2, 3, 7, 10, 13}, |
| {2, 3, 7, 11, 12}, |
| {2, 3, 7, 11, 13}, |
| {2, 3, 7, 12, 14}, |
| {2, 3, 7, 12, 15}, |
| {2, 3, 7, 13, 14}, |
| {2, 3, 7, 13, 15}, |
| {2, 3, 8, 10, 12}, |
| {2, 3, 8, 10, 13}, |
| {2, 3, 8, 10, 14}, |
| {2, 3, 8, 10, 15}, |
| {2, 3, 8, 11, 12}, |
| {2, 3, 8, 11, 13}, |
| {2, 3, 8, 11, 14}, |
| {2, 3, 8, 11, 15}, |
| {2, 3, 8, 12, 14}, |
| {2, 3, 8, 12, 15}, |
| {2, 3, 8, 13, 14}, |
| {2, 3, 8, 13, 15}, |
| {2, 3, 9, 10, 12}, |
| {2, 3, 9, 10, 13}, |
| {2, 3, 9, 10, 14}, |
| {2, 3, 9, 10, 15}, |
| {2, 3, 9, 11, 12}, |
| {2, 3, 9, 11, 13}, |
| {2, 3, 9, 11, 14}, |
| {2, 3, 9, 11, 15}, |
| {2, 3, 9, 12, 14}, |
| {2, 3, 9, 12, 15}, |
| {2, 3, 9, 13, 14}, |

TABLE 6

| |
|---|
| {2, 3, 9, 13, 15}, |
| {2, 3, 10, 12, 14}, |
| {2, 3, 10, 12, 15}, |
| {2, 3, 10, 13, 14}, |
| {2, 3, 10, 13, 15}, |

TABLE 6-continued

| |
|---|
| {2, 3, 11, 12, 14}, |
| {2, 3, 11, 12, 15}, |
| {2, 3, 11, 13, 14}, |
| {2, 3, 11, 13, 15}, |
| {2, 4, 5, 6, 8}, |
| {2, 4, 5, 6, 9}, |
| {2, 4, 5, 6, 10}, |
| {2, 4, 5, 6, 11}, |
| {2, 4, 5, 6, 12}, |
| {2, 4, 5, 6, 13}, |
| {2, 4, 5, 6, 14}, |
| {2, 4, 5, 6, 15}, |
| {2, 4, 5, 7, 8}, |
| {2, 4, 5, 7, 9}, |
| {2, 4, 5, 7, 10}, |
| {2, 4, 5, 7, 11}, |
| {2, 4, 5, 7, 12}, |
| {2, 4, 5, 7, 13}, |
| {2, 4, 5, 7, 14}, |
| {2, 4, 5, 7, 15}, |
| {2, 4, 5, 8, 10}, |
| {2, 4, 5, 8, 11}, |
| {2, 4, 5, 8, 12}, |
| {2, 4, 5, 8, 13}, |
| {2, 4, 5, 9, 10}, |
| {2, 4, 5, 9, 11}, |
| {2, 4, 5, 9, 12}, |
| {2, 4, 5, 9, 13}, |
| {2, 4, 5, 10, 14}, |
| {2, 4, 5, 10, 15}, |
| {2, 4, 5, 11, 14}, |
| {2, 4, 5, 11, 15}, |
| {2, 4, 5, 12, 14}, |
| {2, 4, 5, 12, 15}, |
| {2, 4, 5, 13, 14}, |
| {2, 4, 5, 13, 15}, |
| {2, 4, 6, 7, 8}, |
| {2, 4, 6, 7, 9}, |
| {2, 4, 6, 7, 10}, |
| {2, 4, 6, 7, 11}, |
| {2, 4, 6, 7, 12}, |
| {2, 4, 6, 7, 13}, |
| {2, 4, 6, 7, 14}, |
| {2, 4, 6, 7, 15}, |
| {2, 4, 6, 8, 9}, |
| {2, 4, 6, 8, 11}, |
| {2, 4, 6, 8, 13}, |
| {2, 4, 6, 8, 15}, |
| {2, 4, 6, 9, 10}, |
| {2, 4, 6, 9, 12}, |
| {2, 4, 6, 9, 14}, |
| {2, 4, 6, 10, 11}, |
| {2, 4, 6, 10, 13}, |
| {2, 4, 6, 10, 15}, |
| {2, 4, 6, 11, 12}, |
| {2, 4, 6, 11, 14}, |
| {2, 4, 6, 12, 13}, |
| {2, 4, 6, 12, 15}, |
| {2, 4, 6, 13, 14}, |
| {2, 4, 6, 14, 15}, |
| {2, 4, 7, 8, 9}, |
| {2, 4, 7, 8, 10}, |
| {2, 4, 7, 8, 12}, |
| {2, 4, 7, 8, 15}, |
| {2, 4, 7, 9, 11}, |
| {2, 4, 7, 9, 13}, |
| {2, 4, 7, 9, 14}, |
| {2, 4, 7, 10, 11}, |
| {2, 4, 7, 10, 13}, |
| {2, 4, 7, 10, 14}, |
| {2, 4, 7, 11, 12}, |
| {2, 4, 7, 11, 15}, |
| {2, 4, 7, 12, 13}, |
| {2, 4, 7, 12, 14}, |
| {2, 4, 7, 13, 15}, |
| {2, 4, 7, 14, 15}, |
| {2, 4, 8, 9, 10}, |
| {2, 4, 8, 9, 11}, |
| {2, 4, 8, 9, 12}, |

TABLE 6-continued

| |
|---|
| {2, 4, 8, 9, 13}, |
| {2, 4, 8, 10, 11}, |
| {2, 4, 8, 10, 13}, |
| {2, 4, 8, 10, 15}, |
| {2, 4, 8, 11, 12}, |
| {2, 4, 8, 11, 15}, |
| {2, 4, 8, 12, 13}, |
| {2, 4, 8, 12, 15}, |
| {2, 4, 8, 13, 15}, |
| {2, 4, 9, 10, 11}, |
| {2, 4, 9, 10, 13}, |
| {2, 4, 9, 10, 14}, |
| {2, 4, 9, 11, 12}, |
| {2, 4, 9, 11, 14}, |
| {2, 4, 9, 12, 13}, |
| {2, 4, 9, 12, 14}, |
| {2, 4, 9, 13, 14}, |
| {2, 4, 10, 11, 14}, |
| {2, 4, 10, 11, 15}, |
| {2, 4, 10, 13, 14}, |
| {2, 4, 10, 13, 15}, |
| {2, 4, 10, 14, 15}, |
| {2, 4, 11, 12, 14}, |
| {2, 4, 11, 12, 15}, |
| {2, 4, 11, 14, 15}, |
| {2, 4, 12, 13, 14}, |
| {2, 4, 12, 13, 15}, |
| {2, 4, 12, 14, 15}, |
| {2, 4, 13, 14, 15}, |
| {2, 5, 6, 7, 8}, |
| {2, 5, 6, 7, 9}, |
| {2, 5, 6, 7, 10}, |
| {2, 5, 6, 7, 11}, |
| {2, 5, 6, 7, 12}, |
| {2, 5, 6, 7, 13}, |
| {2, 5, 6, 7, 14}, |
| {2, 5, 6, 7, 15}, |
| {2, 5, 6, 8, 9}, |
| {2, 5, 6, 8, 10}, |
| {2, 5, 6, 8, 13}, |
| {2, 5, 6, 8, 14}, |
| {2, 5, 6, 9, 11}, |
| {2, 5, 6, 9, 12}, |
| {2, 5, 6, 9, 15}, |
| {2, 5, 6, 10, 11}, |
| {2, 5, 6, 10, 12}, |
| {2, 5, 6, 10, 15}, |
| {2, 5, 6, 11, 13}, |
| {2, 5, 6, 11, 14}, |
| {2, 5, 6, 12, 13}, |
| {2, 5, 6, 12, 14}, |
| {2, 5, 6, 13, 15}, |
| {2, 5, 6, 14, 15}, |
| {2, 5, 7, 8, 9}, |
| {2, 5, 7, 8, 11}, |
| {2, 5, 7, 8, 12}, |
| {2, 5, 7, 8, 14}, |
| {2, 5, 7, 9, 10}, |
| {2, 5, 7, 9, 13}, |
| {2, 5, 7, 9, 15}, |
| {2, 5, 7, 10, 11}, |
| {2, 5, 7, 10, 12}, |
| {2, 5, 7, 10, 14}, |
| {2, 5, 7, 11, 13}, |
| {2, 5, 7, 11, 15}, |
| {2, 5, 7, 12, 13}, |
| {2, 5, 7, 12, 15}, |
| {2, 5, 7, 13, 14}, |
| {2, 5, 7, 14, 15}, |
| {2, 5, 8, 9, 10}, |
| {2, 5, 8, 9, 11}, |
| {2, 5, 8, 9, 12}, |
| {2, 5, 8, 9, 13}, |
| {2, 5, 8, 10, 11}, |
| {2, 5, 8, 10, 12}, |
| {2, 5, 8, 10, 14}, |
| {2, 5, 8, 11, 13}, |
| {2, 5, 8, 11, 14}, |
| {2, 5, 8, 12, 13}, |

TABLE 6-continued

| |
|---|
| {2, 5, 8, 12, 14}, |
| {2, 5, 8, 13, 14}, |
| {2, 5, 9, 10, 11}, |
| {2, 5, 9, 10, 12}, |
| {2, 5, 9, 10, 15}, |
| {2, 5, 9, 11, 13}, |
| {2, 5, 9, 11, 15}, |
| {2, 5, 9, 12, 13}, |
| {2, 5, 9, 12, 15}, |
| {2, 5, 9, 13, 15}, |
| {2, 5, 10, 11, 14}, |
| {2, 5, 10, 11, 15}, |
| {2, 5, 10, 12, 14}, |
| {2, 5, 10, 12, 15}, |
| {2, 5, 10, 14, 15}, |
| {2, 5, 11, 13, 14}, |
| {2, 5, 11, 13, 15}, |
| {2, 5, 11, 14, 15}, |
| {2, 5, 12, 13, 14}, |
| {2, 5, 12, 13, 15}, |
| {2, 5, 12, 14, 15}, |
| {2, 5, 13, 14, 15}, |
| {2, 6, 7, 8, 10}, |
| {2, 6, 7, 8, 11}, |
| {2, 6, 7, 8, 14}, |
| {2, 6, 7, 8, 15}, |
| {2, 6, 7, 9, 10}, |
| {2, 6, 7, 9, 11}, |
| {2, 6, 7, 9, 14}, |
| {2, 6, 7, 9, 15}, |
| {2, 6, 7, 10, 12}, |
| {2, 6, 7, 10, 13}, |
| {2, 6, 7, 11, 12}, |
| {2, 6, 7, 11, 13}, |
| {2, 6, 7, 12, 14}, |
| {2, 6, 7, 12, 15}, |
| {2, 6, 7, 13, 14}, |
| {2, 6, 7, 13, 15}, |
| {2, 6, 8, 9, 10}, |
| {2, 6, 8, 9, 11}, |
| {2, 6, 8, 9, 14}, |
| {2, 6, 8, 9, 15}, |
| {2, 6, 8, 10, 11}, |
| {2, 6, 8, 10, 13}, |
| {2, 6, 8, 10, 15}, |
| {2, 6, 8, 11, 13}, |
| {2, 6, 8, 11, 14}, |
| {2, 6, 8, 13, 14}, |
| {2, 6, 8, 13, 15}, |
| {2, 6, 8, 14, 15}, |
| {2, 6, 9, 10, 11}, |
| {2, 6, 9, 10, 12}, |
| {2, 6, 9, 10, 15}, |
| {2, 6, 9, 11, 12}, |
| {2, 6, 9, 11, 14}, |
| {2, 6, 9, 12, 14}, |
| {2, 6, 9, 12, 15}, |
| {2, 6, 9, 14, 15}, |
| {2, 6, 10, 11, 12}, |
| {2, 6, 10, 11, 13}, |
| {2, 6, 10, 12, 13}, |
| {2, 6, 10, 12, 15}, |
| {2, 6, 10, 13, 15}, |
| {2, 6, 11, 12, 13}, |
| {2, 6, 11, 12, 14}, |
| {2, 6, 11, 13, 14}, |
| {2, 6, 12, 13, 141, |
| {2, 6, 12, 13, 15}, |
| {2, 6, 12, 14, 15}, |
| {2, 6, 13, 14, 15}, |
| {2, 7, 8, 9, 10}, |
| {2, 7, 8, 9, 11}, |
| {2, 7, 8, 9, 14}, |
| {2, 7, 8, 9, 15}, |
| {2, 7, 8, 10, 11}, |
| {2, 7, 8, 10, 12}, |
| {2, 7, 8, 10, 14}, |
| {2, 7, 8, 11, 12}, |
| {2, 7, 8, 11, 15}, |

TABLE 6-continued

| |
|---|
| {2, 7, 8, 12, 14}, |
| {2, 7, 8, 12, 15}, |
| {2, 7, 8, 14, 15}, |
| {2, 7, 9, 10, 11}, |
| {2, 7, 9, 10, 13}, |
| {2, 7, 9, 10, 14}, |
| {2, 7, 9, 11, 13}, |
| {2, 7, 9, 11, 15}, |
| {2, 7, 9, 13, 14}, |
| {2, 7, 9, 13, 15}, |
| {2, 7, 9, 14, 15}, |
| {2, 7, 10, 11, 12}, |
| {2, 7, 10, 11, 13}, |
| {2, 7, 10, 12, 13}, |
| {2, 7, 10, 12, 14}, |
| {2, 7, 10, 13, 14}, |
| {2, 7, 11, 12, 13}, |
| {2, 7, 11, 12, 15}, |
| {2, 7, 11, 13, 15}, |
| {2, 7, 12, 13, 14}, |
| {2, 7, 12, 13, 15}, |
| {2, 7, 12, 14, 15}, |
| {2, 7, 13, 14, 15}, |
| {2, 8, 9, 10, 12}, |
| {2, 8, 9, 10, 13}, |
| {2, 8, 9, 10, 14}, |
| {2, 8, 9, 10, 15}, |
| {2, 8, 9, 11, 12}, |
| {2, 8, 9, 11, 13}, |
| {2, 8, 9, 11, 14}, |
| {2, 8, 9, 11, 15}, |
| {2, 8, 9, 12, 14}, |
| {2, 8, 9, 12, 15}, |
| {2, 8, 9, 13, 14}, |
| {2, 8, 9, 13, 15}, |
| {2, 8, 10, 11, 12}, |
| {2, 8, 10, 11, 13}, |
| {2, 8, 10, 11, 14}, |
| {2, 8, 10, 11, 15}, |
| {2, 8, 10, 12, 13}, |
| {2, 8, 10, 12, 15}, |
| {2, 8, 10, 13, 14}, |
| {2, 8, 10, 14, 15}, |
| {2, 8, 11, 12, 13}, |
| {2, 8, 11, 12, 14}, |
| {2, 8, 11, 13, 15}, |
| {2, 8, 11, 14, 15}, |
| {2, 8, 12, 13, 14}, |
| {2, 8, 12, 13, 15}, |
| {2, 8, 12, 14, 15}, |
| {2, 8, 13, 14, 15}, |
| {2, 9, 10, 11, 12}, |
| {2, 9, 10, 11, 13}, |
| {2, 9, 10, 11, 14}, |
| {2, 9, 10, 11, 15}, |
| {2, 9, 10, 12, 13}, |
| {2, 9, 10, 12, 14}, |
| {2, 9, 10, 13, 15}, |
| {2, 9, 10, 14, 15}, |
| {2, 9, 11, 12, 13}, |
| {2, 9, 11, 12, 15}, |
| {2, 9, 11, 13, 14}, |
| {2, 9, 11, 14, 15}, |
| {2, 9, 12, 13, 14}, |
| {2, 9, 12, 13, 15}, |
| {2, 9, 12, 14, 15}, |
| {2, 9, 13, 14, 15}, |
| {2, 10, 11, 12, 14}, |
| {2, 10, 11, 12, 15}, |
| {2, 10, 11, 13, 14}, |
| {2, 10, 11, 13, 15}, |
| {2, 10, 12, 13, 14}, |
| {2, 10, 12, 13, 15}, |

TABLE 7

| |
|---|
| {2, 10, 12, 14, 15}, |
| {2, 10, 13, 14, 15}, |
| {2, 11, 12, 13, 14}, |
| {2, 11, 12, 13, 15}, |
| {2, 11, 12, 14, 15}, |
| {2, 11, 13, 14, 15}, |
| {3, 4, 5, 6, 8}, |
| {3, 4, 5, 6, 9}, |
| {3, 4, 5, 6, 10}, |
| {3, 4, 5, 6, 11}, |
| {3, 4, 5, 6, 12}, |
| {3, 4, 5, 6, 13}, |
| {3, 4, 5, 6, 14}, |
| {3, 4, 5, 6, 15}, |
| {3, 4, 5, 7, 8}, |
| {3, 4, 5, 7, 9}, |
| {3, 4, 5, 7, 10}, |
| {3, 4, 5, 7, 11}, |
| {3, 4, 5, 7, 12}, |
| {3, 4, 5, 7, 13}, |
| {3, 4, 5, 7, 14}, |
| {3, 4, 5, 7, 15}, |
| {3, 4, 5, 8, 10}, |
| {3, 4, 5, 8, 11}, |
| {3, 4, 5, 8, 12}, |
| {3, 4, 5, 8, 13}, |
| {3, 4, 5, 9, 10}, |
| {3, 4, 5, 9, 11}, |
| {3, 4, 5, 9, 12}, |
| {3, 4, 5, 9, 13}, |
| {3, 4, 5, 10, 14}, |
| {3, 4, 5, 10, 15}, |
| {3, 4, 5, 11, 14}, |
| {3, 4, 5, 11, 15}, |
| {3, 4, 5, 12, 14}, |
| {3, 4, 5, 12, 15}, |
| {3, 4, 5, 13, 14}, |
| {3, 4, 5, 13, 15}, |
| {3, 4, 6, 7, 8}, |
| {3, 4, 6, 7, 9}, |
| {3, 4, 6, 7, 10}, |
| {3, 4, 6, 7, 11}, |
| {3, 4, 6, 7, 12}, |
| {3, 4, 6, 7, 13}, |
| {3, 4, 6, 7, 14}, |
| {3, 4, 6, 7, 15}, |
| {3, 4, 6, 8, 9}, |
| {3, 4, 6, 8, 11}, |
| {3, 4, 6, 8, 12}, |
| {3, 4, 6, 8, 14}, |
| {3, 4, 6, 9, 10}, |
| {3, 4, 6, 9, 13}, |
| {3, 4, 6, 9, 15}, |
| {3, 4, 6, 10, 11}, |
| {3, 4, 6, 10, 12}, |
| {3, 4, 6, 10, 14}, |
| {3, 4, 6, 11, 13}, |
| {3, 4, 6, 11, 15}, |
| {3, 4, 6, 12, 13}, |
| {3, 4, 6, 12, 15}, |
| {3, 4, 6, 13, 14}, |
| {3, 4, 6, 14, 15}, |
| {3, 4, 7, 8, 9}, |
| {3, 4, 7, 8, 10}, |
| {3, 4, 7, 8, 13}, |
| {3, 4, 7, 8, 14}, |
| {3, 4, 7, 9, 11}, |
| {3, 4, 7, 9, 12}, |
| {3, 4, 7, 9, 15}, |
| {3, 4, 7, 10, 11}, |
| {3, 4, 7, 10, 12}, |
| {3, 4, 7, 10, 15}, |
| {3, 4, 7, 11, 13}, |
| {3, 4, 7, 11, 14}, |
| {3, 4, 7, 12, 13}, |
| {3, 4, 7, 12, 14}, |
| {3, 4, 7, 13, 15}, |
| {3, 4, 7, 14, 15}, |
| {3, 4, 8, 9, 10}, |

TABLE 7-continued

| |
|---|
| {3, 4, 8, 9, 11}, |
| {3, 4, 8, 9, 12}, |
| {3, 4, 8, 9, 13}, |
| {3, 4, 8, 10, 11}, |
| {3, 4, 8, 10, 12}, |
| {3, 4, 8, 10, 14}, |
| {3, 4, 8, 11, 13}, |
| {3, 4, 8, 11, 14}, |
| {3, 4, 8, 12, 13}, |
| {3, 4, 8, 12, 14}, |
| {3, 4, 8, 13, 14}, |
| {3, 4, 9, 10, 11}, |
| {3, 4, 9, 10, 12}, |
| {3, 4, 9, 10, 15}, |
| {3, 4, 9, 11, 13}, |
| {3, 4, 9, 11, 15}, |
| {3, 4, 9, 12, 13}, |
| {3, 4, 9, 12, 15}, |
| {3, 4, 9, 13, 15}, |
| {3, 4, 10, 11, 14}, |
| {3, 4, 10, 11, 15}, |
| {3, 4, 10, 12, 14}, |
| {3, 4, 10, 12, 15}, |
| {3, 4, 10, 14, 15}, |
| {3, 4, 11, 13, 14}, |
| {3, 4, 11, 13, 15}, |
| {3, 4, 11, 14, 15}, |
| {3, 4, 12, 13, 14}, |
| {3, 4, 12, 13, 15}, |
| {3, 4, 12, 14, 15}, |
| {3, 4, 13, 14, 15}, |
| {3, 5, 6, 7, 8}, |
| {3, 5, 6, 7, 9}, |
| {3, 5, 6, 7, 10}, |
| {3, 5, 6, 7, 11}, |
| {3, 5, 6, 7, 12}, |
| {3, 5, 6, 7, 13}, |
| {3, 5, 6, 7, 14}, |
| {3, 5, 6, 7, 15}, |
| {3, 5, 6, 8, 9}, |
| {3, 5, 6, 8, 10}, |
| {3, 5, 6, 8, 12}, |
| {3, 5, 6, 8, 15}, |
| {3, 5, 6, 9, 11}, |
| {3, 5, 6, 9, 13}, |
| {3, 5, 6, 9, 14}, |
| {3, 5, 6, 10, 11}, |
| {3, 5, 6, 10, 13}, |
| {3, 5, 6, 10, 14}, |
| {3, 5, 6, 11, 12}, |
| {3, 5, 6, 11, 15}, |
| {3, 5, 6, 12, 13}, |
| {3, 5, 6, 12, 14}, |
| {3, 5, 6, 13, 15}, |
| {3, 5, 6, 14, 15}, |
| {3, 5, 7, 8, 9}, |
| {3, 5, 7, 8, 11}, |
| {3, 5, 7, 8, 13}, |
| {3, 5, 7, 8, 15}, |
| {3, 5, 7, 9, 10}, |
| {3, 5, 7, 9, 12}, |
| {3, 5, 7, 9, 14}, |
| {3, 5, 7, 10, 11}, |
| {3, 5, 7, 10, 13}, |
| {3, 5, 7, 10, 15}, |
| {3, 5, 7, 11, 12}, |
| {3, 5, 7, 11, 14}, |
| {3, 5, 7, 12, 13}, |
| {3, 5, 7, 12, 15}, |
| {3, 5, 7, 13, 14}, |
| {3, 5, 7, 14, 15}, |
| {3, 5, 8, 9, 10}, |
| {3, 5, 8, 9, 11}, |
| {3, 5, 8, 9, 12}, |
| {3, 5, 8, 9, 13}, |
| {3, 5, 8, 10, 11}, |
| {3, 5, 8, 10, 13}, |
| {3, 5, 8, 10, 15}, |
| {3, 5, 8, 11, 12}, |

TABLE 7-continued

| |
|---|
| {3, 5, 8, 11, 15}, |
| {3, 5, 8, 12, 13}, |
| {3, 5, 8, 12, 15}, |
| {3, 5, 8, 13, 15}, |
| {3, 5, 9, 10, 11}, |
| {3, 5, 9, 10, 13}, |
| {3, 5, 9, 10, 14}, |
| {3, 5, 9, 11, 12}, |
| {3, 5, 9, 11, 14}, |
| {3, 5, 9, 12, 13}, |
| {3, 5, 9, 12, 14}, |
| {3, 5, 9, 13, 14}, |
| {3, 5, 10, 11, 14}, |
| {3, 5, 10, 11, 15}, |
| {3, 5, 10, 13, 14}, |
| {3, 5, 10, 13, 15}, |
| {3, 5, 10, 14, 15}, |
| {3, 5, 11, 12, 14}, |
| {3, 5, 11, 12, 15}, |
| {3, 5, 11, 14, 15}, |
| {3, 5, 12, 13, 14}, |
| {3, 5, 12, 13, 15}, |
| {3, 5, 12, 14, 15}, |
| {3, 5, 13, 14, 15}, |
| {3, 6, 7, 8, 10}, |
| {3, 6, 7, 8, 11}, |
| {3, 6, 7, 8, 14}, |
| {3, 6, 7, 8, 15}, |
| {3, 6, 7, 9, 10}, |
| {3, 6, 7, 9, 11}, |
| {3, 6, 7, 9, 14}, |
| {3, 6, 7, 9, 15}, |
| {3, 6, 7, 10, 12}, |
| {3, 6, 7, 10, 13}, |
| {3, 6, 7, 11, 12}, |
| {3, 6, 7, 11, 13}, |
| {3, 6, 7, 12, 14}, |
| {3, 6, 7, 12, 15}, |
| {3, 6, 7, 13, 14}, |
| {3, 6, 7, 13, 15}, |
| {3, 6, 8, 9, 10}, |
| {3, 6, 8, 9, 11}, |
| {3, 6, 8, 9, 14}, |
| {3, 6, 8, 9, 15}, |
| {3, 6, 8, 10, 11}, |
| {3, 6, 8, 10, 12}, |
| {3, 6, 8, 10, 14}, |
| {3, 6, 8, 11, 12}, |
| {3, 6, 8, 11, 15}, |
| {3, 6, 8, 12, 14}, |
| {3, 6, 8, 12, 15}, |
| {3, 6, 8, 14, 15}, |
| {3, 6, 9, 10, 11}, |
| {3, 6, 9, 10, 13}, |
| {3, 6, 9, 10, 14}, |
| {3, 6, 9, 11, 13}, |
| {3, 6, 9, 11, 15}, |
| {3, 6, 9, 13, 14}, |
| {3, 6, 9, 13, 15}, |
| {3, 6, 9, 14, 15}, |
| {3, 6, 10, 11, 12}, |
| {3, 6, 10, 11, 13}, |
| {3, 6, 10, 12, 13}, |
| {3, 6, 10, 12, 14}, |
| {3, 6, 10, 13, 14}, |
| {3, 6, 11, 12, 13}, |
| {3, 6, 11, 12, 15}, |
| {3, 6, 11, 13, 15}, |
| {3, 6, 12, 13, 14}, |
| {3, 6, 12, 13, 15}, |
| {3, 6, 12, 14, 15}, |
| {3, 6, 13, 14, 15}, |
| {3, 7, 8, 9, 10}, |
| {3, 7, 8, 9, 11}, |
| {3, 7, 8, 9, 14}, |
| {3, 7, 8, 9, 15}, |
| {3, 7, 8, 10, 11}, |
| {3, 7, 8, 10, 13}, |
| {3, 7, 8, 10, 15}, |

TABLE 7-continued

| |
|---|
| {3, 7, 8, 11, 13}, |
| {3, 7, 8, 11, 14}, |
| {3, 7, 8, 13, 14}, |
| {3, 7, 8, 13, 15}, |
| {3, 7, 8, 14, 15}, |
| {3, 7, 9, 10, 11}, |
| {3, 7, 9, 10, 12}, |
| {3, 7, 9, 10, 15}, |
| {3, 7, 9, 11, 12}, |
| {3, 7, 9, 11, 14}, |
| {3, 7, 9, 12, 14}, |
| {3, 7, 9, 12, 15}, |
| {3, 7, 9, 14, 15}, |
| {3, 7, 10, 11, 12}, |
| {3, 7, 10, 11, 13}, |
| {3, 7, 10, 12, 13}, |
| {3, 7, 10, 12, 15}, |
| {3, 7, 10, 13, 15}, |
| {3, 7, 11, 12, 13}, |
| {3, 7, 11, 12, 14}, |
| {3, 7, 11, 13, 14}, |
| {3, 7, 12, 13, 14}, |
| {3, 7, 12, 13, 15}, |
| {3, 7, 12, 14, 15}, |
| {3, 7, 13, 14, 15}, |
| {3, 8, 9, 10, 12}, |
| {3, 8, 9, 10, 13}, |
| {3, 8, 9, 10, 14}, |
| {3, 8, 9, 10, 15}, |
| {3, 8, 9, 11, 12}, |
| {3, 8, 9, 11, 13}, |
| {3, 8, 9, 11, 14}, |
| {3, 8, 9, 11, 15}, |
| {3, 8, 9, 12, 14}, |
| {3, 8, 9, 12, 15}, |
| {3, 8, 9, 13, 14}, |
| {3, 8, 9, 13, 15}, |
| {3, 8, 10, 11, 12}, |
| {3, 8, 10, 11, 13}, |
| {3, 8, 10, 11, 14}, |
| {3, 8, 10, 11, 15}, |
| {3, 8, 10, 12, 13}, |
| {3, 8, 10, 12, 15}, |
| {3, 8, 10, 13, 14}, |
| {3, 8, 10, 14, 15}, |
| {3, 8, 11, 12, 13}, |
| {3, 8, 11, 12, 14}, |
| {3, 8, 11, 13, 15}, |
| {3, 8, 11, 14, 15}, |
| {3, 8, 12, 13, 14}, |
| {3, 8, 12, 13, 15}, |
| {3, 8, 12, 14, 15}, |
| {3, 8, 13, 14, 15}, |
| {3, 9, 10, 11, 12}, |
| {3, 9, 10, 11, 13}, |
| {3, 9, 10, 11, 14}, |
| {3, 9, 10, 11, 15}, |
| {3, 9, 10, 12, 13}, |
| {3, 9, 10, 12, 14}, |
| {3, 9, 10, 13, 15}, |
| {3, 9, 10, 14, 15}, |
| {3, 9, 11, 12, 13}, |
| {3, 9, 11, 12, 15}, |
| {3, 9, 11, 13, 14}, |
| {3, 9, 11, 14, 15}, |
| {3, 9, 12, 13, 14}, |
| {3, 9, 12, 13, 15}, |
| {3, 9, 12, 14, 15}, |
| {3, 9, 13, 14, 15}, |
| {3, 10, 11, 12, 14}, |
| {3, 10, 11, 12, 15}, |
| {3, 10, 11, 13, 14}, |
| {3, 10, 11, 13, 15}, |
| {3, 10, 12, 13, 14}, |
| {3, 10, 12, 13, 15}, |
| {3, 10, 12, 14, 15}, |
| {3, 10, 13, 14, 15}, |
| {3, 11, 12, 13, 14}, |

TABLE 8

| |
|---|
| {3, 11, 12, 13, 15}, |
| {3, 11, 12, 14, 15}, |
| {3, 11, 13, 14, 15}, |
| {4, 5, 6, 8, 12}, |
| {4, 5, 6, 8, 13}, |
| {4, 5, 6, 8, 14}, |
| {4, 5, 6, 8, 15}, |
| {4, 5, 6, 9, 12}, |
| {4, 5, 6, 9, 13}, |
| {4, 5, 6, 9, 14}, |
| {4, 5, 6, 9, 15}, |
| {4, 5, 6, 10, 12}, |
| {4, 5, 6, 10, 13}, |
| {4, 5, 6, 10, 14}, |
| {4, 5, 6, 10, 15}, |
| {4, 5, 6, 11, 12}, |
| {4, 5, 6, 11, 13}, |
| {4, 5, 6, 11, 14}, |
| {4, 5, 6, 11, 15}, |
| {4, 5, 7, 8, 12}, |
| {4, 5, 7, 8, 13}, |
| {4, 5, 7, 8, 14}, |
| {4, 5, 7, 8, 15}, |
| {4, 5, 7, 9, 12}, |
| {4, 5, 7, 9, 13}, |
| {4, 5, 7, 9, 14}, |
| {4, 5, 7, 9, 15}, |
| {4, 5, 7, 10, 12}, |
| {4, 5, 7, 10, 13}, |
| {4, 5, 7, 10, 14}, |
| {4, 5, 7, 10, 15}, |
| {4, 5, 7, 11, 12}, |
| {4, 5, 7, 11, 13}, |
| {4, 5, 7, 11, 14}, |
| {4, 5, 7, 11, 15}, |
| {4, 5, 8, 10, 12}, |
| {4, 5, 8, 10, 13}, |
| {4, 5, 8, 10, 14}, |
| {4, 5, 8, 10, 15}, |
| {4, 5, 8, 11, 12}, |
| {4, 5, 8, 11, 13}, |
| {4, 5, 8, 11, 14}, |
| {4, 5, 8, 11, 15}, |
| {4, 5, 8, 12, 14}, |
| {4, 5, 8, 12, 15}, |
| {4, 5, 8, 13, 14}, |
| {4, 5, 8, 13, 15}, |
| {4, 5, 9, 10, 12}, |
| {4, 5, 9, 10, 13}, |
| {4, 5, 9, 10, 14}, |
| {4, 5, 9, 10, 15}, |
| {4, 5, 9, 11, 12}, |
| {4, 5, 9, 11, 13}, |
| {4, 5, 9, 11, 14}, |
| {4, 5, 9, 11, 15}, |
| {4, 5, 9, 12, 14}, |
| {4, 5, 9, 12, 15}, |
| {4, 5, 9, 13, 14}, |
| {4, 5, 9, 13, 15}, |
| {4, 5, 10, 12, 14}, |
| {4, 5, 10, 12, 15}, |
| {4, 5, 10, 13, 14}, |
| {4, 5, 10, 13, 15}, |
| {4, 5, 11, 12, 14}, |
| {4, 5, 11, 12, 15}, |
| {4, 5, 11, 13, 14}, |
| {4, 5, 11, 13, 15}, |
| {4, 6, 7, 8, 12}, |
| {4, 6, 7, 8, 13}, |
| {4, 6, 7, 8, 14}, |
| {4, 6, 7, 8, 15}, |
| {4, 6, 7, 9, 12}, |
| {4, 6, 7, 9, 13}, |
| {4, 6, 7, 9, 14}, |
| {4, 6, 7, 9, 15}, |
| {4, 6, 7, 10, 12}, |
| {4, 6, 7, 10, 13}, |
| {4, 6, 7, 10, 14}, |
| {4, 6, 7, 10, 15}, |

TABLE 8-continued

| |
|---|
| {4, 6, 7, 11, 12}, |
| {4, 6, 7, 11, 13}, |
| {4, 6, 7, 11, 14}, |
| {4, 6, 7, 11, 15}, |
| {4, 6, 8, 9, 12}, |
| {4, 6, 8, 9, 13}, |
| {4, 6, 8, 9, 14}, |
| {4, 6, 8, 9, 15}, |
| {4, 6, 8, 11, 12}, |
| {4, 6, 8, 11, 13}, |
| {4, 6, 8, 11, 14}, |
| {4, 6, 8, 11, 15}, |
| {4, 6, 8, 12, 13}, |
| {4, 6, 8, 12, 15}, |
| {4, 6, 8, 13, 14}, |
| {4, 6, 8, 14, 15}, |
| {4, 6, 9, 10, 12}, |
| {4, 6, 9, 10, 13}, |
| {4, 6, 9, 10, 14}, |
| {4, 6, 9, 10, 15}, |
| {4, 6, 9, 12, 13}, |
| {4, 6, 9, 12, 15}, |
| {4, 6, 9, 13, 14}, |
| {4, 6, 9, 14, 15}, |
| {4, 6, 10, 11, 12}, |
| {4, 6, 10, 11, 13}, |
| {4, 6, 10, 11, 14}, |
| {4, 6, 10, 11, 15}, |
| {4, 6, 10, 12, 13}, |
| {4, 6, 10, 12, 15}, |
| {4, 6, 10, 13, 14}, |
| {4, 6, 10, 14, 15}, |
| {4, 6, 11, 12, 13}, |
| {4, 6, 11, 12, 15}, |
| {4, 6, 11, 13, 14}, |
| {4, 6, 11, 14, 15}, |
| {4, 7, 8, 9, 12}, |
| {4, 7, 8, 9, 13}, |
| {4, 7, 8, 9, 14}, |
| {4, 7, 8, 9, 15}, |
| {4, 7, 8, 10, 12}, |
| {4, 7, 8, 10, 13}, |
| {4, 7, 8, 10, 14}, |
| {4, 7, 8, 10, 15}, |
| {4, 7, 8, 12, 13}, |
| {4, 7, 8, 12, 14}, |
| {4, 7, 8, 13, 15}, |
| {4, 7, 8, 14, 15}, |
| {4, 7, 9, 11, 12}, |
| {4, 7, 9, 11, 13}, |
| {4, 7, 9, 11, 14}, |
| {4, 7, 9, 11, 15}, |
| {4, 7, 9, 12, 13}, |
| {4, 7, 9, 12, 14}, |
| {4, 7, 9, 13, 15}, |
| {4, 7, 9, 14, 15}, |
| {4, 7, 10, 11, 12}, |
| {4, 7, 10, 11, 13}, |
| {4, 7, 10, 11, 14}, |
| {4, 7, 10, 11, 15}, |
| {4, 7, 10, 12, 13}, |
| {4, 7, 10, 12, 14}, |
| {4, 7, 10, 13, 15}, |
| {4, 7, 10, 14, 15}, |
| {4, 7, 11, 12, 13}, |
| {4, 7, 11, 12, 14}, |
| {4, 7, 11, 13, 15}, |
| {4, 7, 11, 14, 15}, |
| {4, 8, 9, 10, 12}, |
| {4, 8, 9, 10, 13}, |
| {4, 8, 9, 10, 14}, |
| {4, 8, 9, 10, 15}, |
| {4, 8, 9, 11, 12}, |
| {4, 8, 9, 11, 13}, |
| {4, 8, 9, 11, 14}, |
| {4, 8, 9, 11, 15}, |
| {4, 8, 9, 12, 14}, |
| {4, 8, 9, 12, 15}, |
| {4, 8, 9, 13, 14}, |

TABLE 8-continued

| |
|---|
| {4, 8, 9, 13, 15}, |
| {4, 8, 10, 11, 12}, |
| {4, 8, 10, 11, 13}, |
| {4, 8, 10, 11, 14}, |
| {4, 8, 10, 11, 15}, |
| {4, 8, 10, 12, 13}, |
| {4, 8, 10, 12, 15}, |
| {4, 8, 10, 13, 14}, |
| {4, 8, 10, 14, 15}, |
| {4, 8, 11, 12, 13}, |
| {4, 8, 11, 12, 14}, |
| {4, 8, 11, 13, 15}, |
| {4, 8, 11, 14, 15}, |
| {4, 8, 12, 13, 14}, |
| {4, 8, 12, 13, 15}, |
| {4, 8, 12, 14, 15}, |
| {4, 8, 13, 14, 15}, |
| {4, 9, 10, 11, 12}, |
| {4, 9, 10, 11, 13}, |
| {4, 9, 10, 11, 14}, |
| {4, 9, 10, 11, 15}, |
| {4, 9, 10, 12, 13}, |
| {4, 9, 10, 12, 14}, |
| {4, 9, 10, 13, 15}, |
| {4, 9, 10, 14, 15}, |
| {4, 9, 11, 12, 13}, |
| {4, 9, 11, 12, 15}, |
| {4, 9, 11, 13, 14}, |
| {4, 9, 11, 14, 15}, |
| {4, 9, 12, 13, 14}, |
| {4, 9, 12, 13, 15}, |
| {4, 9, 12, 14, 15}, |
| {4, 9, 13, 14, 15}, |
| {4, 10, 11, 12, 14}, |
| {4, 10, 11, 12, 15}, |
| {4, 10, 11, 13, 14}, |
| {4, 10, 11, 13, 15}, |
| {4, 10, 12, 13, 14}, |
| {4, 10, 12, 13, 15}, |
| {4, 10, 12, 14, 15}, |
| {4, 10, 13, 14, 15}, |
| {4, 11, 12, 13, 14}, |
| {4, 11, 12, 13, 15}, |
| {4, 11, 12, 14, 15}, |
| {4, 11, 13, 14, 15}, |
| {5, 6, 7, 8, 12}, |
| {5, 6, 7, 8, 13}, |
| {5, 6, 7, 8, 14}, |
| {5, 6, 7, 8, 15}, |
| {5, 6, 7, 9, 12}, |
| {5, 6, 7, 9, 13}, |
| {5, 6, 7, 9, 14}, |
| {5, 6, 7, 9, 15}, |
| {5, 6, 7, 10, 12}, |
| {5, 6, 7, 10, 13}, |
| {5, 6, 7, 10, 14}, |
| {5, 6, 7, 10, 15}, |
| {5, 6, 7, 11, 12}, |
| {5, 6, 7, 11, 13}, |
| {5, 6, 7, 11, 14}, |
| {5, 6, 7, 11, 15}, |
| {5, 6, 8, 9, 12}, |
| {5, 6, 8, 9, 13}, |
| {5, 6, 8, 9, 14}, |
| {5, 6, 8, 9, 15}, |
| {5, 6, 8, 10, 12}, |
| {5, 6, 8, 10, 13}, |
| {5, 6, 8, 10, 14}, |
| {5, 6, 8, 10, 15}, |
| {5, 6, 8, 12, 13}, |
| {5, 6, 8, 12, 14}, |
| {5, 6, 8, 13, 15}, |
| {5, 6, 8, 14, 15}, |
| {5, 6, 9, 11, 12}, |
| {5, 6, 9, 11, 13}, |
| {5, 6, 9, 11, 14}, |
| {5, 6, 9, 11, 15}, |
| {5, 6, 9, 12, 13}, |
| {5, 6, 9, 12, 14}, |

TABLE 8-continued

| |
|---|
| {5, 6, 9, 13, 15}, |
| {5, 6, 9, 14, 15}, |
| {5, 6, 10, 11, 12}, |
| {5, 6, 10, 11, 13}, |
| {5, 6, 10, 11, 14}, |
| {5, 6, 10, 11, 15}, |
| {5, 6, 10, 12, 13}, |
| {5, 6, 10, 12, 14}, |
| {5, 6, 10, 13, 15}, |
| {5, 6, 10, 14, 15}, |
| {5, 6, 11, 12, 13}, |
| {5, 6, 11, 12, 14}, |
| {5, 6, 11, 13, 15}, |
| {5, 6, 11, 14, 15}, |
| {5, 7, 8, 9, 12}, |
| {5, 7, 8, 9, 13}, |
| {5, 7, 8, 9, 14}, |
| {5, 7, 8, 9, 15}, |
| {5, 7, 8, 11, 12}, |
| {5, 7, 8, 11, 13}, |
| {5, 7, 8, 11, 14}, |
| {5, 7, 8, 11, 15}, |
| {5, 7, 8, 12, 13}, |
| {5, 7, 8, 12, 15}, |
| {5, 7, 8, 13, 14}, |
| {5, 7, 8, 14, 15}, |
| {5, 7, 9, 10, 12}, |
| {5, 7, 9, 10, 13}, |
| {5, 7, 9, 10, 14}, |
| {5, 7, 9, 10, 15}, |
| {5, 7, 9, 12, 13}, |
| {5, 7, 9, 12, 15}, |
| {5, 7, 9, 13, 14}, |
| {5, 7, 9, 14, 15}, |
| {5, 7, 10, 11, 12}, |
| {5, 7, 10, 11, 13}, |
| {5, 7, 10, 11, 14}, |
| {5, 7, 10, 11, 15}, |
| {5, 7, 10, 12, 13}, |
| {5, 7, 10, 12, 15}, |
| {5, 7, 10, 13, 14}, |
| {5, 7, 10, 14, 15}, |
| {5, 7, 11, 12, 13}, |
| {5, 7, 11, 12, 15}, |
| {5, 7, 11, 13, 14}, |
| {5, 7, 11, 14, 15}, |
| {5, 8, 9, 10, 12}, |
| {5, 8, 9, 10, 13}, |
| {5, 8, 9, 10, 14}, |
| {5, 8, 9, 10, 15}, |
| {5, 8, 9, 11, 12}, |
| {5, 8, 9, 11, 13}, |
| {5, 8, 9, 11, 14}, |
| {5, 8, 9, 11, 15}, |
| {5, 8, 9, 12, 14}, |
| {5, 8, 9, 12, 15}, |
| {5, 8, 9, 13, 14}, |
| {5, 8, 9, 13, 15}, |
| {5, 8, 10, 11, 12}, |
| {5, 8, 10, 11, 13}, |
| {5, 8, 10, 11, 14}, |
| {5, 8, 10, 11, 15}, |
| {5, 8, 10, 12, 13}, |
| {5, 8, 10, 12, 15}, |
| {5, 8, 10, 13, 14}, |
| {5, 8, 10, 14, 15}, |
| {5, 8, 11, 12, 13}, |
| {5, 8, 11, 12, 14}, |
| {5, 8, 11, 13, 15}, |
| {5, 8, 11, 14, 15}, |
| {5, 8, 12, 13, 14}, |
| {5, 8, 12, 13, 15}, |
| {5, 8, 12, 14, 15}, |
| {5, 8, 13, 14, 15}, |
| {5, 9, 10, 11, 12}, |
| {5, 9, 10, 11, 13}, |
| {5, 9, 10, 11, 14}, |
| {5, 9, 10, 11, 15}, |

TABLE 9

| | | | |
|---|---|---|---|
| {5, 9, 10, 12, 13}, | {6, 7, 9, 12, 15}, | {6, 9, 10, 13, 15}, | {7, 8, 11, 14, 15}, |
| {5, 9, 10, 12, 14}, | {6, 7, 9, 13, 14}, | {6, 9, 10, 14, 15}, | {7, 8, 12, 13, 14}, |
| {5, 9, 10, 13, 15}, | {6, 7, 9, 13, 15}, | {6, 9, 11, 12, 13}, | {7, 8, 12, 13, 15}, |
| {5, 9, 10, 14, 15}, | {6, 7, 10, 12, 14}, | {6, 9, 11, 12, 15}, | {7, 8, 12, 14, 15}, |
| {5, 9, 11, 12, 13}, | {6, 7, 10, 12, 15}, | {6, 9, 11, 13, 14}, | {7, 8, 13, 14, 15}, |
| {5, 9, 11, 12, 15}, | {6, 7, 10, 13, 14}, | {6, 9, 11, 14, 15}, | {7, 9, 10, 11, 12}, |
| {5, 9, 11, 13, 14}, | {6, 7, 10, 13, 15}, | {6, 9, 12, 13, 14}, | {7, 9, 10, 11, 13}, |
| {5, 9, 11, 14, 15}, | {6, 7, 11, 12, 14}, | {6, 9, 12, 13, 15}, | {7, 9, 10, 11, 14}, |
| {5, 9, 12, 13, 14}, | {6, 7, 11, 12, 15}, | {6, 9, 12, 14, 15}, | {7, 9, 10, 11, 15}, |
| {5, 9, 12, 13, 15}, | {6, 7, 11, 13, 14}, | {6, 9, 13, 14, 15}, | {7, 9, 10, 12, 13}, |
| {5, 9, 12, 14, 15}, | {6, 7, 11, 13, 15}, | {6, 10, 11, 12, 14}, | {7, 9, 10, 12, 14}, |
| {5, 9, 13, 14, 15}, | {6, 8, 9, 10, 12}, | {6, 10, 11, 12, 15}, | {7, 9, 10, 13, 15}, |
| {5, 10, 11, 12, 14}, | {6, 8, 9, 10, 13}, | {6, 10, 11, 13, 14}, | {7, 9, 10, 14, 15}, |
| {5, 10, 11, 12, 15}, | {6, 8, 9, 10, 14}, | {6, 10, 11, 13, 15}, | {7, 9, 11, 12, 13}, |
| {5, 10, 11, 13, 14}, | {6, 8, 9, 10, 15}, | {6, 10, 12, 13, 14}, | {7, 9, 11, 12, 15}, |
| {5, 10, 11, 13, 15}, | {6, 8, 9, 11, 12}, | {6, 10, 12, 13, 15}, | {7, 9, 11, 13, 14}, |
| {5, 10, 12, 13, 14}, | {6, 8, 9, 11, 13}, | {6, 10, 12, 14, 15}, | {7, 9, 11, 14, 15}, |
| {5, 10, 12, 13, 15}, | {6, 8, 9, 11, 14}, | {6, 10, 13, 14, 15}, | {7, 9, 12, 13, 14}, |
| {5, 10, 12, 14, 15}, | {6, 8, 9, 11, 15}, | {6, 11, 12, 13, 14}, | {7, 9, 12, 13, 15}, |
| {5, 10, 13, 14, 15}, | {6, 8, 9, 12, 14}, | {6, 11, 12, 13, 15}, | {7, 9, 12, 14, 15}, |
| {5, 11, 12, 13, 14}, | {6, 8, 9, 12, 15}, | {6, 11, 12, 14, 15}, | {7, 9, 13, 14, 15}, |
| {5, 11, 12, 13, 15}, | {6, 8, 9, 13, 14}, | {6, 11, 13, 14, 15}, | {7, 10, 11, 12, 14}, |
| {5, 11, 12, 14, 15}, | {6, 8, 9, 13, 15}, | {7, 8, 9, 10, 12}, | {7, 10, 11, 12, 15}, |
| {5, 11, 13, 14, 15}, | {6, 8, 10, 11, 12}, | {7, 8, 9, 10, 13}, | {7, 10, 11, 13, 14}, |
| {6, 7, 8, 10, 12}, | {6, 8, 10, 11, 13}, | {7, 8, 9, 10, 14}, | {7, 10, 11, 13, 15}, |
| {6, 7, 8, 10, 13}, | {6, 8, 10, 11, 14}, | {7, 8, 9, 10, 15}, | {7, 10, 12, 13, 14}, |
| {6, 7, 8, 10, 14}, | {6, 8, 10, 11, 15}, | {7, 8, 9, 11, 12}, | {7, 10, 12, 13, 15}, |
| {6, 7, 8, 10, 15}, | {6, 8, 10, 12, 13}, | {7, 8, 9, 11, 13}, | {7, 10, 12, 14, 15}, |
| {6, 7, 8, 11, 12}, | {6, 8, 10, 12, 15}, | {7, 8, 9, 11, 14}, | {7, 10, 13, 14, 15}, |
| {6, 7, 8, 11, 13}, | {6, 8, 10, 13, 14}, | {7, 8, 9, 11, 15}, | {7, 11, 12, 13, 14}, |
| {6, 7, 8, 11, 14}, | {6, 8, 10, 14, 15}, | {7, 8, 9, 12, 14}, | {7, 11, 12, 13, 15}, |
| {6, 7, 8, 11, 15}, | {6, 8, 11, 12, 13}, | {7, 8, 9, 12, 15}, | {7, 11, 12, 14, 15}, |
| {6, 7, 8, 12, 14}, | {6, 8, 11, 12, 14}, | {7, 8, 9, 13, 14}, | {7, 11, 13, 14, 15} |
| {6, 7, 8, 12, 15}, | {6, 8, 11, 13, 15}, | {7, 8, 9, 13, 15}, | |
| {6, 7, 8, 13, 14}, | {6, 8, 11, 14, 15}, | {7, 8, 10, 11, 12}, | |
| {6, 7, 8, 13, 15}, | {6, 8, 12, 13, 14}, | {7, 8, 10, 11, 13}, | |
| {6, 7, 9, 10, 12}, | {6, 8, 12, 13, 15}, | {7, 8, 10, 11, 14}, | |
| {6, 7, 9, 10, 13}, | {6, 8, 12, 14, 15}, | {7, 8, 10, 11, 15}, | |
| {6, 7, 9, 10, 14}, | {6, 8, 13, 14, 15}, | {7, 8, 10, 12, 13}, | |
| {6, 7, 9, 10, 15}, | {6, 9, 10, 11, 12}, | {7, 8, 10, 12, 15}, | |
| {6, 7, 9, 11, 12}, | {6, 9, 10, 11, 13}, | {7, 8, 10, 13, 14}, | |
| {6, 7, 9, 11, 13}, | {6, 9, 10, 11, 14}, | {7, 8, 10, 14, 15}, | |
| {6, 7, 9, 11, 14}, | {6, 9, 10, 11, 15}, | {7, 8, 11, 12, 13}, | |
| {6, 7, 9, 11, 15}, | {6, 9, 10, 12, 13}, | {7, 8, 11, 12, 14}, | |
| {6, 7, 9, 12, 14}, | {6, 9, 10, 12, 14}, | {7, 8, 11, 13, 15}, | |

Meanwhile, in order to exchange 5 information bits, i.e., an input information bit stream comprised of the 5 bits, a transmitter and a receiver of the mobile communication system employing the novel coding/decoding method should previously appoint puncturing positions of the 5 coded symbols. Preferably, such puncturing positions are defined by the communication standard. Of course, it is also possible for the transmitter to previously inform the receiver of the puncturing positions.

An apparatus and method for coding and decoding an optimal (11,5) codeword according to an embodiment of the present invention will be described with reference to FIGS. 1 to 5.

FIG. 1 illustrates a structure of an apparatus for encoding an optimal (11,5) codeword according to an embodiment of the present invention. Referring to FIG. 1, an input information bit stream comprised of 5 bits, a0, a1, a2, a3 and a4, is applied to a bi-orthogonal encoder (or Reed-Muller encoder) 110 in a (11,5) encoder 100. The bi-orthogonal encoder(or Reed-Muller encoder) 110 encodes the input information bit stream of a0, a1, a2, a3 and a4 into a length=16 first order Reed-Muller codeword comprised of 16 coded symbols. Herein, one first order Reed-Muller codeword is comprised of 16 coded symbols.

The first order Reed-Muller codeword comprised of 16 coded symbols, output from the bi-orthogonal encoder 110, is provided to a puncturer 120. Upon receiving the first order Reed-Muller codeword comprised of 16 coded symbols, the puncturer 120 selects one of the 2688 puncturing patterns shown in Tables 1 to 9, proposed by the invention, and then punctures 5 coded symbols out of the 16 coded symbols in the puncturing positions corresponding to the selected puncturing pattern.

For example, if the 5 coded symbols to be punctured by the puncturer 120 have the puncturing positions of 2, 5, 8, 11 and 14, then the puncturer 120 punctures the $2^{nd}$, $5^{th}$, $8^{th}$, $11^{th}$ and $14^{th}$ symbols out of the 16 coded symbols, and outputs a length=11 coded symbol stream, i.e., a (11,5) codeword comprised of the remaining 11 coded symbols being inconsistent with the puncturing positions. As another example, if the 5 coded symbols to be punctured by the puncturer 120 have the puncturing positions of 1, 4, 7, 10 and 13, then the puncturer 120 punctures the $1^{st}$, $4^{th}$, $7^{th}$, $10^{th}$ and $13^{th}$ symbols out of the 16 coded symbols, and then outputs a length=11 coded symbol stream, i.e., a (11,5) codeword comprised of the remaining 11 coded symbols being inconsistent with the puncturing positions.

Now, a detailed structure of the bi-orthogonal encoder (Reed-Muller encoder) 110 will be described with reference to FIG. 2.

Figure 2:
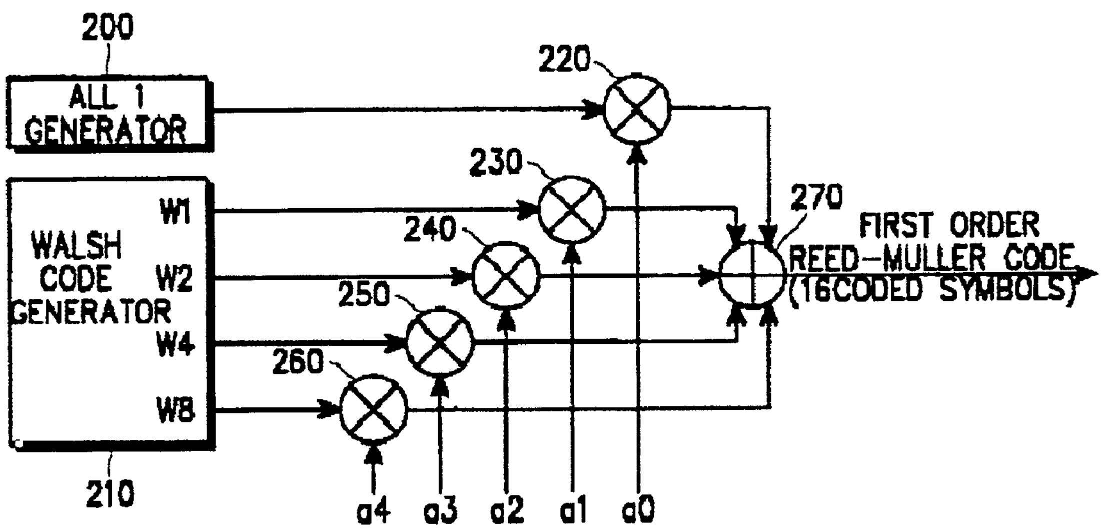
FIG. 2 is a block diagram illustrating a detailed structure of the Reed-Muller encoder shown in FIG. 1.

FIG. 2 illustrates the detailed structure of the bi-orthogonal encoder, (or Reed-Muller encoder) 110 of FIG. 1. Referring to FIG. 2, the Reed-Muller encoder includes an orthogonal codeword generator for generating orthogonal codewords each comprised of 16 coded symbols by multiplying 4 bits out of the input information bit stream comprised of 5 bits by associated base orthogonal codes W1, W2, W4 and W8; a phase-inverted codeword generator for generating a phase-inverted codeword comprised of 16 coded symbols by inverting a phase of the orthogonal codewords by multiplying the remaining one bit of the input information bit stream by an all 1's signal to create a bi-orthogonal codeword; and a summer, 270 for summing up the orthogonal codewords and the phase-inverted codeword and then outputting the first order Reed-Muller codeword. Here, the orthogonal codeword generator is comprised of a Walsh code generator 210 and multipliers 230, 240, 250 and 260, and the phase-inverted codeword generator is comprised of an all 1's generator 200 and a multiplier 220.

Referring to FIG. 2, the 5 bits, a0, a1, a2, a3 and a4, constituting the input information bit stream are applied to the multipliers 220, 230, 240, 250 and 260, respectively. At this moment, the all 1's generator 200 generates an all 1's code and the Walsh code generator 210 simultaneously generates length=16 Walsh codes W1, W2, W4 and W8. The all 1's code and the Walsh codes W1, W2, W4 and W8, simultaneously output from the all 1's generator 200 and the Walsh code generator 210, are also provided to the associated multipliers 220, 230, 240, 250 and 260, respectively. That is, the all 1's code is applied to the multiplier 220, the Walsh code W1 to the multiplier 230, the Walsh code W2 to the multiplier 240, the Walsh code W4 to the multiplier 250, and the Walsh code W8 to the multiplier 260. Here, the all 1's code is used to create a bi-orthogonal code by converting an orthogonal code to a phase-inverted orthogonal code. For the all 1's code, any code can be used, if it can be used in creating a bi-orthogonal code by converting the orthogonal code to a phase-inverted orthogonal code.

The multiplier 220 multiplies the input information bit a0 by the all 1's code in a symbol unit and outputs a phase-inverted codeword. The multiplier 230 multiplies the input information bit al by the Walsh code W1 in a symbol unit and outputs an orthogonal codeword. The multiplier 240 multiplies the input information bit a2 by the Walsh code W2 in a symbol unit and outputs an orthogonal codeword. The multiplier 250 multiplies the input information bit a3 by the Walsh code W4 in a symbol unit and outputs an orthogonal codeword. The multiplier 260 multiplies the input information bit a4 by the Walsh code W8 in a symbol unit and outputs an orthogonal codeword.

The 5 codewords, i.e., one phase-inverted codeword and four orthogonal codewords each comprised of 16 coded symbols, encoded by the multipliers 220, 230, 240, 250 and 260, are provided to a summer 270. The summer 270 sums up the 5 codewords output from the multipliers 220, 230, 240, 250 and 260 in a symbol unit, and outputs one length=16 codeword, i.e., a first order Reed-Muller codeword.

Figure 3:
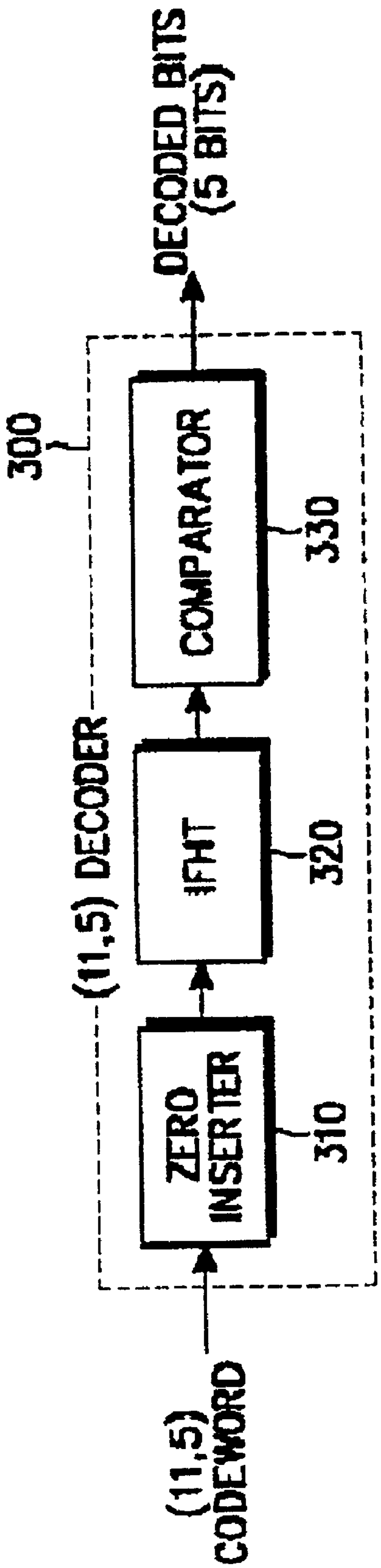
FIG. 3 is a block diagram illustrating a structure of an apparatus for decoding a (11,5) codeword according to an embodiment of the present invention.

FIG. 3 illustrates a structure of a (11,5) decoder according to an embodiment of the present invention. Referring to FIG. 3, a length=11 code symbol stream comprised of 11 coded symbols, received from the transmitter, is applied to a zero inserter 310 in a (11,5) decoder 300. The zero inserter 310 receiving the length=11 coded symbol stream inserts zero (0) bits in the puncturing positions according to the appointed puncturing pattern used by the puncturer 120 in the (11,5) encoder 100 of the transmitter, and provides its output to an inverse fast Hadamard Transform part (IFHT) 320. For example, if the puncturer 120 in the (11,5) encoder 100 has punctured the $2^{nd}$, $5^{th}$, $8^{th}$, $11^{th}$ and $14^{th}$ coded symbols, the zero inserter 310 in the (11,5) decoder 300 will insert the zero bits in the above 5 puncturing positions of the length=11 coded symbol stream, and then output a length=16 coded symbol stream comprised of 16 coded symbols. Here, the zero inserter 310 must be acquainted with the positions where the zero bits are to be inserted, i.e., the positions punctured according to the puncturing pattern used by the puncturer 120. The zero inserter 310 is provided with the position information according to determined method. The IFHT 320 compares the length=16 coded symbol stream output from the zero inserter 310 with every length=16 first order Reed-Muller codeword to calculate reliabilities there between, and outputs the calculated reliabilities for the first order Reed-Muller codewords and the input information bits corresponding to the respective first order Reed-Muller codewords. The reliabilities and the input information bits corresponding to the respective first order Reed-Muller codewords make pairs, the number of which is equal to the number of the first order Reed-Muller codewords. The pairs of the reliabilities and the input information bits, output from the IFHT 320, are provided to a comparator 330. The comparator 330 selects the highest reliability among the reliabilities provided from the IFHT 320 and then outputs the input information bits corresponding to the selected reliability as a decoded bit stream.

Figure 4:
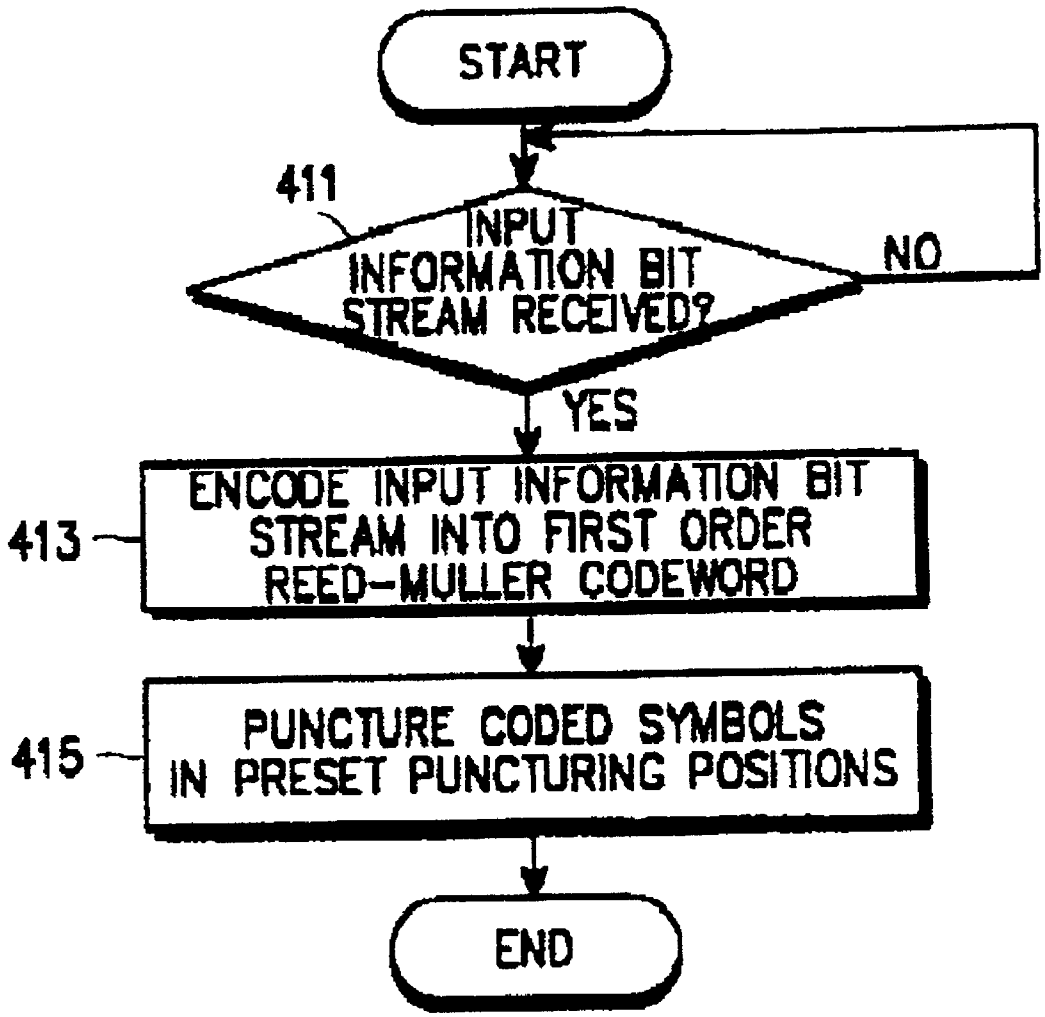
FIG. 4 is a flow chart illustrating a procedure for encoding a (11,5) codeword according to an embodiment of the present invention.

FIG. 4 illustrates a procedure for encoding a (11,5) codeword in a transmitter according to an embodiment of the present invention. Referring to FIG. 4, if an input information bit stream comprised of 5 bits is received in step 411, the transmitter creates a first order Reed-Muller codeword comprised of 16 coded symbols using the received input information bit stream in step 413. Thereafter, in step 415, the transmitter selects one of a plurality of puncturing patterns according to determined method, previously designated in the transmitter, and creates an optimal (11,5) codeword comprised of 11 coded symbols by puncturing the coded symbols corresponding to the puncturing positions specified by the selected puncturing pattern out of 16 coded symbols constituting the created first order Reed-Muller codeword. Here, the transmitter is equivalent to the apparatus for encoding an optimal (11,5) codeword, shown in FIG. 1, and its respective elements perform the operations of the steps in FIG. 4.

Figure 5:
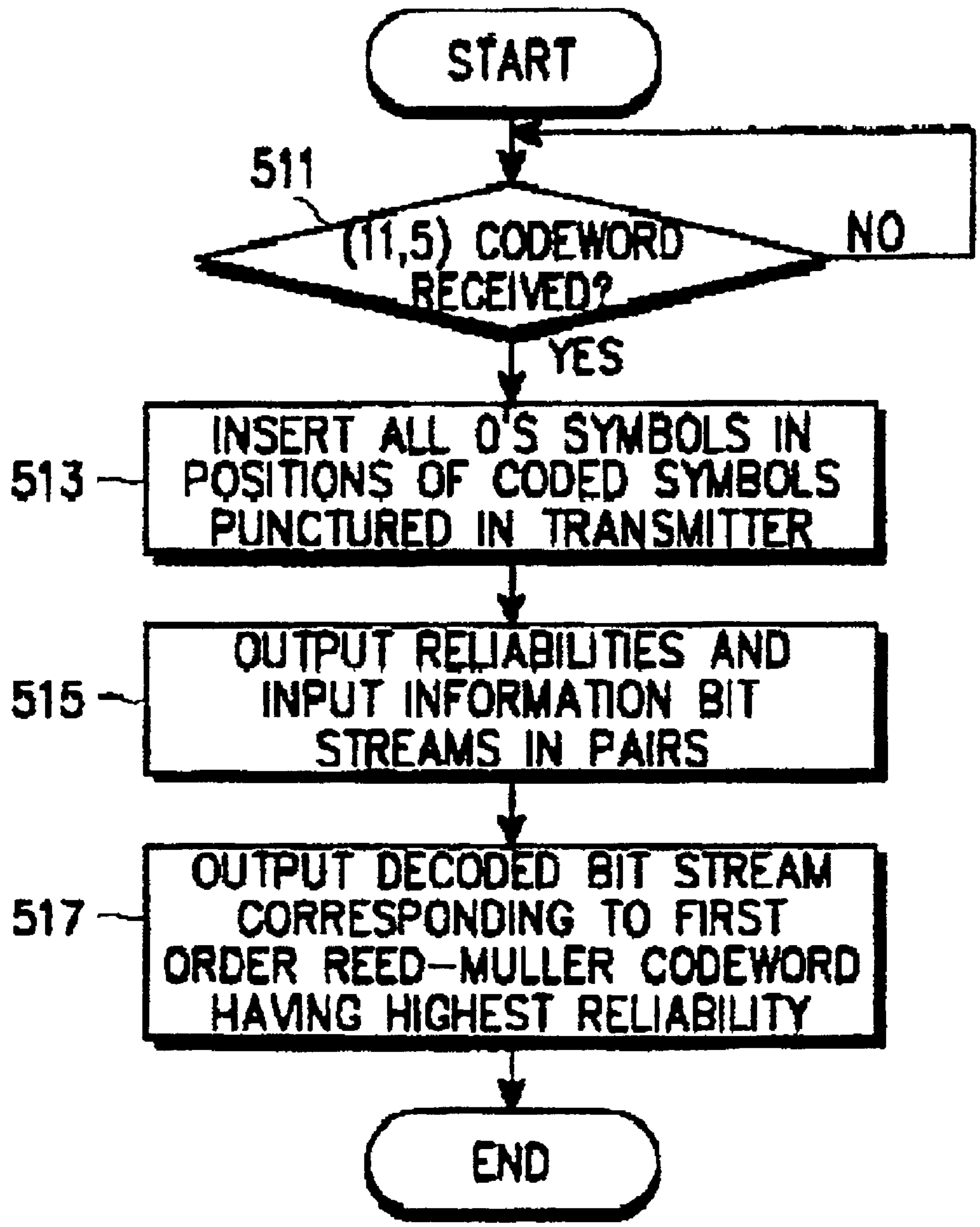
FIG. 5 is a flow chart illustrating a procedure for decoding a (11,5) codeword according to an embodiment of the present invention.

FIG. 5 illustrates a procedure for decoding a (11,5) codeword in a receiver according to an embodiment of the present invention. Referring to FIG. 5, if a (11,5) codeword comprised of 11 coded symbols is received in step 511, the receiver inserts in step 513 all 0's symbols in the received (11,5) codeword at the positions corresponding to the puncturing pattern used by the transmitter, i.e., the positions of the coded symbols punctured by the transmitter, and outputs a coded symbol stream of length 16. Subsequently, in step 515, the receiver calculates reliabilities between the coded symbol stream of length 16 and every first order Reed-Muller codeword of length 16, and outputs in pairs the calculated reliabilities and the input information bit streams corresponding to every first order Reed-Muller codeword. In step 517, the receiver outputs the input information bit stream corresponding to the first order Reed-Muller codeword having the highest reliability as a decoded bit stream. Here, the receiver of FIG. 5 is equivalent to the apparatus for decoding the (11,5) codeword, shown in FIG. 3, and its respective elements perform the operations of the steps in FIG. 5.

As apparent from the foregoing description, the novel CDMA system can obtain an optimal minimum distance by coding and decoding the error correcting codes into an optimal (11,5) codeword, thereby increasing the error correcting capability.

In addition, by determining the puncturing positions for creating the optimal (11,5) codeword on a regular interval basis, it is possible to simplify the hardware structure for coding/decoding, thereby minimizing the hardware complexity.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. An apparatus for coding an input information bit stream comprised of 5 bits into a (11,5) codeword comprised of 11 coded symbols, comprising:

a Reed-Muller encoder for encoding the input information bit stream into a first order Reed-Muller codeword comprised of 16 coded symbols; and a puncturer for predetermining a second coded symbol position or a third coded symbol position out of the 16 coded symbols constituting the first order Reed-Muller codeword, puncturing the 5 coded symbols at intervals of 3 symbols beginning at the predetermined position, and outputting an optimal (11,5) codeword.

2. The apparatus as claimed in claim 1, wherein the puncturer punctures the $1^{st}$, $4^{th}$, $7^{th}$, $10^{th}$ and $13^{th}$ coded symbols.

3. The method as claimed in claim 1, wherein the puncturer punctures the $2^{nd}$, $5^{th}$, $8^{th}$, $11^{th}$ and $14^{th}$ coded symbols.

4. The apparatus as claimed in claim 1, wherein the Reed-Muller encoder comprises:

an orthogonal codeword generator for generating orthogonal codewords each comprised of 16 coded symbols by multiplying 4 bits out of the input information bit stream comprised of 5 bits by associated base orthogonal codes W1, W2, W4 and W8;

a phase-inverted codeword generator for generating a phase-inverted codeword comprised of 16 coded symbols for creating a bi-orthogonal codeword by inverting a phase of the orthogonal codewords by multiplying a remaining one bit of the input information bit stream by an all 1's signal; and a summer for summing up the orthogonal codewords and the phase-inverted codeword and outputting the summed result as the first order Reed-Muller codeword.

5. An apparatus for coding an input information bit stream comprised of 5 bits into a (11,5) codeword comprised of 11 coded symbols, comprising:

a Reed-Muller encoder for encoding the input information bit stream into a first order Reed-Muller codeword comprised of 16 coded symbols; and a puncturer for puncturing 5 coded symbols in the positions corresponding to the predetermined one of a plurality of puncturing patterns shown in Tables 10 to 18 below, out of the 16 coded symbols constituting the first order Reed-Muller codeword, and then outputting an optimal (11,5) codeword.

TABLE 10

| |
|---|
| {0, 1, 2, 4, 8}, |
| {0, 1, 2, 4, 9}, |
| {0, 1, 2, 4, 10}, |
| {0, 1, 2, 4, 11}, |
| {0, 1, 2, 4, 12}, |
| {0, 1, 2, 4, 13}, |
| {0, 1, 2, 4, 14}, |
| {0, 1, 2, 4, 15}, |
| {0, 1, 2, 5, 8}, |
| {0, 1, 2, 5, 9}, |
| {0, 1, 2, 5, 10}, |
| {0, 1, 2, 5, 11}, |
| {0, 1, 2, 5, 12}, |
| {0, 1, 2, 5, 13}, |
| {0, 1, 2, 5, 14}, |
| {0, 1, 2, 5, 15}, |
| {0, 1, 2, 6, 8}, |
| {0, 1, 2, 6, 9}, |
| {0, 1, 2, 6, 10}, |
| {0, 1, 2, 6, 11}, |
| {0, 1, 2, 6, 12}, |
| {0, 1, 2, 6, 13}, |
| {0, 1, 2, 6, 14}, |
| {0, 1, 2, 6, 15}, |
| {0, 1, 2, 7, 8}, |
| {0, 1, 2, 7, 9}, |
| {0, 1, 2, 7, 10}, |
| {0, 1, 2, 7, 11}, |
| {0, 1, 2, 7, 12}, |
| {0, 1, 2, 7, 13}, |
| {0, 1, 2, 7, 14}, |
| {0, 1, 2, 7, 15}, |
| {0, 1, 2, 8, 12}, |
| {0, 1, 2, 8, 13}, |
| {0, 1, 2, 8, 14}, |
| {0, 1, 2, 8, 15}, |
| {0, 1, 2, 9, 12}, |
| {0, 1, 2, 9, 13}, |
| {0, 1, 2, 9, 14}, |
| {0, 1, 2, 9, 15}, |
| {0, 1, 2, 10, 12}, |
| {0, 1, 2, 10, 13}, |
| {0, 1, 2, 10, 14}, |
| {0, 1, 2, 10, 15}, |
| {0, 1, 2, 11, 12}, |
| {0, 1, 2, 11, 13}, |
| {0, 1, 2, 11, 14}, |
| {0, 1, 2, 11, 15}, |
| {0, 1, 3, 4, 8}, |
| {0, 1, 3, 4, 9}, |
| {0, 1, 3, 4, 10}, |
| {0, 1, 3, 4, 11}, |
| {0, 1, 3, 4, 12}, |
| {0, 1, 3, 4, 13}, |
| {0, 1, 3, 4, 14}, |
| {0, 1, 3, 4, 15}, |
| {0, 1, 3, 5, 8}, |
| {0, 1, 3, 5, 9}, |
| {0, 1, 3, 5, 10}, |
| {0, 1, 3, 5, 11}, |
| {0, 1, 3, 5, 12}, |
| {0, 1, 3, 5, 13}, |
| {0, 1, 3, 5, 14}, |
| {0, 1, 3, 5, 15}, |
| {0, 1, 3, 6, 8}, |
| {0, 1, 3, 6, 9}, |
| {0, 1, 3, 6, 10}, |
| {0, 1, 3, 6, 11}, |
| {0, 1, 3, 6, 12}, |
| {0, 1, 3, 6, 13}, |
| {0, 1, 3, 6, 14}, |
| {0, 1, 3, 6, 15}, |
| {0, 1, 3, 7, 8}, |
| {0, 1, 3, 7, 9}, |
| {0, 1, 3, 7, 10}, |
| {0, 1, 3, 7, 11}, |
| {0, 1, 3, 7, 12}, |
| {0, 1, 3, 7, 13}, |
| {0, 1, 3, 7, 14}, |

TABLE 10-continued

| |
|---|
| {0, 1, 3, 7, 15}, |
| {0, 1, 3, 8, 12}, |
| {0, 1, 3, 8, 13}, |
| {0, 1, 3, 8, 14}, |
| {0, 1, 3, 8, 15}, |
| {0, 1, 3, 9, 12}, |
| {0, 1, 3, 9, 13}, |
| {0, 1, 3, 9, 14}, |
| {0, 1, 3, 9, 15}, |
| {0, 1, 3, 10, 12}, |
| {0, 1, 3, 10, 13}, |
| {0, 1, 3, 10, 14}, |
| {0, 1, 3, 10, 15}, |
| {0, 1, 3, 11, 12}, |
| {0, 1, 3, 11, 13}, |
| {0, 1, 3, 11, 14}, |
| {0, 1, 3, 11, 15}, |
| {0, 1, 4, 6, 8}, |
| {0, 1, 4, 6, 9}, |
| {0, 1, 4, 6, 10}, |
| {0, 1, 4, 6, 11}, |
| {0, 1, 4, 6, 12}, |
| {0, 1, 4, 6, 13}, |
| {0, 1, 4, 6, 14}, |
| {0, 1, 4, 6, 15}, |
| {0, 1, 4, 7, 8}, |
| {0, 1, 4, 7, 9}, |
| {0, 1, 4, 7, 10}, |
| {0, 1, 4, 7, 11}, |
| {0, 1, 4, 7, 12}, |
| {0, 1, 4, 7, 13}, |
| {0, 1, 4, 7, 14}, |
| {0, 1, 4, 7, 15}, |
| {0, 1, 4, 8, 10}, |
| {0, 1, 4, 8, 11}, |
| {0, 1, 4, 8, 14}, |
| {0, 1, 4, 8, 15}, |
| {0, 1, 4, 9, 10}, |
| {0, 1, 4, 9, 11}, |
| {0, 1, 4, 9, 14}, |
| {0, 1, 4, 9, 15}, |
| {0, 1, 4, 10, 12}, |
| {0, 1, 4, 10, 13}, |
| {0, 1, 4, 11, 12}, |
| {0, 1, 4, 11, 13}, |
| {0, 1, 4, 12, 14}, |
| {0, 1, 4, 12, 15}, |
| {0, 1, 4, 13, 14}, |
| {0, 1, 4, 13, 15}, |
| {0, 1, 5, 6, 8}, |
| {0, 1, 5, 6, 9}, |
| {0, 1, 5, 6, 10}, |
| {0, 1, 5, 6, 11}, |
| {0, 1, 5, 6, 12}, |
| {0, 1, 5, 6, 13}, |
| {0, 1, 5, 6, 14}, |
| {0, 1, 5, 6, 15}, |
| {0, 1, 5, 7, 8}, |
| {0, 1, 5, 7, 9}, |
| {0, 1, 5, 7, 10}, |
| {0, 1, 5, 7, 11}, |
| {0, 1, 5, 7, 12}, |
| {0, 1, 5, 7, 13}, |
| {0, 1, 5, 7, 14}, |
| {0, 1, 5, 7, 15}, |
| {0, 1, 5, 8, 10}, |
| {0, 1, 5, 8, 11}, |
| {0, 1, 5, 8, 14}, |
| {0, 1, 5, 8, 15}, |
| {0, 1, 5, 9, 10}, |
| {0, 1, 5, 9, 11}, |
| {0, 1, 5, 9, 14}, |
| {0, 1, 5, 9, 15}, |
| {0, 1, 5, 10, 12}, |
| {0, 1, 5, 10, 13}, |
| {0, 1, 5, 11, 12}, |
| {0, 1, 5, 11, 13}, |
| {0, 1, 5, 12, 14}, |
| {0, 1, 5, 12, 15}, |

TABLE 10-continued

| |
|---|
| {0, 1, 5, 13, 14}, |
| {0, 1, 5, 13, 15}, |
| {0, 1, 6, 8, 10}, |
| {0, 1, 6, 8, 11}, |
| {0, 1, 6, 8, 12}, |
| {0, 1, 6, 8, 13}, |
| {0, 1, 6, 9, 10}, |
| {0, 1, 6, 9, 11}, |
| {0, 1, 6, 9, 12}, |
| {0, 1, 6, 9, 13}, |
| {0, 1, 6, 10, 14}, |
| {0, 1, 6, 10, 15}, |
| {0, 1, 6, 11, 14}, |
| {0, 1, 6, 11, 15}, |
| {0, 1, 6, 12, 14}, |
| {0, 1, 6, 12, 15}, |
| {0, 1, 6, 13, 14}, |
| {0, 1, 6, 13, 15}, |
| {0, 1, 7, 8, 10}, |
| {0, 1, 7, 8, 11}, |
| {0, 1, 7, 8, 12}, |
| {0, 1, 7, 8, 13}, |
| {0, 1, 7, 9, 10}, |
| {0, 1, 7, 9, 11}, |
| {0, 1, 7, 9, 12}, |
| {0, 1, 7, 9, 13}, |
| {0, 1, 7, 10, 14}, |
| {0, 1, 7, 10, 15}, |
| {0, 1, 7, 11, 14}, |
| {0, 1, 7, 11, 15}, |
| {0, 1, 7, 12, 14}, |
| {0, 1, 7, 12, 15}, |
| {0, 1, 7, 13, 14}, |
| {0, 1, 7, 13, 15}, |
| {0, 1, 8, 10, 12}, |
| {0, 1, 8, 10, 13}, |
| {0, 1, 8, 10, 14}, |
| {0, 1, 8, 10, 15}, |
| {0, 1, 8, 11, 12}, |
| {0, 1, 8, 11, 13}, |
| {0, 1, 8, 11, 14}, |
| {0, 1, 8, 11, 15}, |
| {0, 1, 8, 12, 14}, |
| {0, 1, 8, 12, 15}, |
| {0, 1, 8, 13, 14}, |
| {0, 1, 8, 13, 15}, |
| {0, 1, 9, 10, 12}, |
| {0, 1, 9, 10, 13}, |
| {0, 1, 9, 10, 14}, |
| {0, 1, 9, 10, 15}, |
| {0, 1, 9, 11, 12}, |
| {0, 1, 9, 11, 13}, |
| {0, 1, 9, 11, 14}, |
| {0, 1, 9, 11, 15}, |
| {0, 1, 9, 12, 14}, |
| {0, 1, 9, 12, 15}, |
| {0, 1, 9, 13, 14}, |
| {0, 1, 9, 13, 15}, |
| {0, 1, 10, 12, 14}, |
| {0, 1, 10, 12, 15}, |
| {0, 1, 10, 13, 14}, |
| {0, 1, 10, 13, 15}, |
| {0, 1, 11, 12, 14}, |
| {0, 1, 11, 12, 15}, |
| {0, 1, 11, 13, 14}, |
| {0, 1, 11, 13, 15}, |
| {0, 2, 3, 4, 8}, |
| {0, 2, 3, 4, 9}, |
| {0, 2, 3, 4, 10}, |
| {0, 2, 3, 4, 11}, |
| {0, 2, 3, 4, 12}, |
| {0, 2, 3, 4, 13}, |
| {0, 2, 3, 4, 14}, |
| {0, 2, 3, 4, 15}, |
| {0, 2, 3, 5, 8}, |
| {0, 2, 3, 5, 9}, |
| {0, 2, 3, 5, 10}, |
| {0, 2, 3, 5, 11}, |
| {0, 2, 3, 5, 12}, |

TABLE 10-continued

| |
|---|
| {0, 2, 3, 5, 13}, |
| {0, 2, 3, 5, 14}, |
| {0, 2, 3, 5, 15}, |
| {0, 2, 3, 6, 8}, |
| {0, 2, 3, 6, 9}, |
| {0, 2, 3, 6, 10}, |
| {0, 2, 3, 6, 11}, |
| {0, 2, 3, 6, 12}, |
| {0, 2, 3, 6, 13}, |
| {0, 2, 3, 6, 14}, |
| {0, 2, 3, 6, 15}, |
| {0, 2, 3, 7, 8}, |
| {0, 2, 3, 7, 9}, |
| {0, 2, 3, 7, 10}, |
| {0, 2, 3, 7, 11}, |
| {0, 2, 3, 7, 12}, |
| {0, 2, 3, 7, 13}, |
| {0, 2, 3, 7, 14}, |
| {0, 2, 3, 7, 15}, |
| {0, 2, 3, 8, 12}, |
| {0, 2, 3, 8, 13}, |
| {0, 2, 3, 8, 14}, |
| {0, 2, 3, 8, 15}, |
| {0, 2, 3, 9, 12}, |
| {0, 2, 3, 9, 13}, |
| {0, 2, 3, 9, 14}, |
| {0, 2, 3, 9, 15}, |
| {0, 2, 3, 10, 12}, |
| {0, 2, 3, 10, 13}, |
| {0, 2, 3, 10, 14}, |
| {0, 2, 3, 10, 15}, |
| {0, 2, 3, 11, 12}, |
| {0, 2, 3, 11, 13}, |
| {0, 2, 3, 11, 14}, |
| {0, 2, 3, 11, 15}, |
| {0, 2, 4, 5, 8}, |
| {0, 2, 4, 5, 9}, |
| {0, 2, 4, 5, 10}, |
| {0, 2, 4, 5, 11}, |
| {0, 2, 4, 5, 12}, |
| {0, 2, 4, 5, 13}, |
| {0, 2, 4, 5, 14}, |
| {0, 2, 4, 5, 15}, |
| {0, 2, 4, 7, 8}, |
| {0, 2, 4, 7, 9}, |
| {0, 2, 4, 7, 10}, |
| {0, 2, 4, 7, 11}, |
| {0, 2, 4, 7, 12}, |
| {0, 2, 4, 7, 13}, |
| {0, 2, 4, 7, 14}, |
| {0, 2, 4, 7, 15}, |
| {0, 2, 4, 8, 9}, |
| {0, 2, 4, 8, 11}, |
| {0, 2, 4, 8, 13}, |
| {0, 2, 4, 8, 15}, |
| {0, 2, 4, 9, 10}, |
| {0, 2, 4, 9, 12}, |
| {0, 2, 4, 9, 14}, |
| {0, 2, 4, 10, 11}, |
| {0, 2, 4, 10, 13}, |
| {0, 2, 4, 10, 15}, |
| {0, 2, 4, 11, 12}, |
| {0, 2, 4, 11, 14}, |
| {0, 2, 4, 12, 13}, |
| {0, 2, 4, 12, 15}, |
| {0, 2, 4, 13, 14}, |
| {0, 2, 4, 14, 13}, |
| {0, 2, 5, 6, 8}, |
| {0, 2, 5, 6, 9}, |
| {0, 2, 5, 6, 10}, |
| {0, 2, 5, 6, 11}, |
| {0, 2, 5, 6, 12}, |
| {0, 2, 5, 6, 13}, |
| {0, 2, 5, 6, 14}, |
| {0, 2, 5, 6, 15}, |
| {0, 2, 5, 8, 9}, |
| {0, 2, 5, 8, 11}, |
| {0, 2, 5, 8, 12}, |

TABLE 11

| |
|---|
| {0, 2, 5, 8, 14}, |
| {0, 2, 5, 9, 10}, |
| {0, 2, 5, 9, 13}, |
| {0, 2, 5, 9, 15}, |
| {0, 2, 5, 10, 11}, |
| {0, 2, 5, 10, 12}, |
| {0, 2, 5, 10, 14}, |
| {0, 2, 5, 11, 13}, |
| {0, 2, 5, 11, 15}, |
| {0, 2, 5, 12, 13}, |
| {0, 2, 5, 12, 15}, |
| {0, 2, 5, 13, 14}, |
| {0, 2, 5, 14, 15}, |
| {0, 2, 6, 7, 8}, |
| {0, 2, 6, 7, 9}, |
| {0, 2, 6, 7, 10}, |
| {0, 2, 6, 7, 11}, |
| {0, 2, 6, 7, 12}, |
| {0, 2, 6, 7, 13}, |
| {0, 2, 6, 7, 14}, |
| {0, 2, 6, 7, 15}, |
| {0, 2, 6, 8, 9}, |
| {0, 2, 6, 8, 11}, |
| {0, 2, 6, 8, 13}, |
| {0, 2, 6, 8, 15}, |
| {0, 2, 6, 9, 10}, |
| {0, 2, 6, 9, 12}, |
| {0, 2, 6, 9, 14}, |
| {0, 2, 6, 10, 11}, |
| {0, 2, 6, 10, 13}, |
| {0, 2, 6, 10, 15}, |
| {0, 2, 6, 11, 12}, |
| {0, 2, 6, 11, 14}, |
| {0, 2, 6, 12, 13}, |
| {0, 2, 6, 12, 15}, |
| {0, 2, 6, 13, 14}, |
| {0, 2, 6, 14, 15}, |
| {0, 2, 7, 8, 9}, |
| {0, 2, 7, 8, 11}, |
| {0, 2, 7, 8, 12}, |
| {0, 2, 7, 8, 14}, |
| {0, 2, 7, 9, 10}, |
| {0, 2, 7, 9, 13}, |
| {0, 2, 7, 9, 15}, |
| {0, 2, 7, 10, 11}, |
| {0, 2, 7, 10, 12}, |
| {0, 2, 7, 10, 14}, |
| {0, 2, 7, 11, 13}, |
| {0, 2, 7, 11, 15}, |
| {0, 2, 7, 12, 13}, |
| {0, 2, 7, 12, 15}, |
| {0, 2, 7, 13, 14}, |
| {0, 2, 7, 14, 15}, |
| {0, 2, 8, 9, 12}, |
| {0, 2, 8, 9, 13}, |
| {0, 2, 8, 9, 14}, |
| {0, 2, 8, 9, 15}, |
| {0, 2, 8, 11, 12}, |
| {0, 2, 8, 11, 13}, |
| {0, 2, 8, 11, 14}, |
| {0, 2, 8, 11, 15}, |
| {0, 2, 8, 12, 13}, |
| {0, 2, 8, 12, 15}, |
| {0, 2, 8, 13, 14}, |
| {0, 2, 8, 14, 15}, |
| {0, 2, 9, 10, 12}, |
| {0, 2, 9, 10, 13}, |
| {0, 2, 9, 10, 14}, |
| {0, 2, 9, 10, 15}, |
| {0, 2, 9, 12, 13}, |
| {0, 2, 9, 12, 15}, |
| {0, 2, 9, 13, 14}, |
| {0, 2, 9, 14, 15}, |
| {0, 2, 10, 11, 12}, |
| {0, 2, 10, 11, 13}, |
| {0, 2, 10, 11, 14}, |
| {0, 2, 10, 11, 15}, |
| {0, 2, 10, 12, 13}, |
| {0, 2, 10, 12, 15}, |

TABLE 11-continued

| |
|---|
| {0, 2, 10, 13, 14}, |
| {0, 2, 10, 14, 15}, |
| {0, 2, 11, 12, 13}, |
| {0, 2, 11, 12, 15}, |
| {0, 2, 11, 13, 14}, |
| {0, 2, 11, 14, 15}, |
| {0, 3, 4, 5, 8}, |
| {0, 3, 4, 5, 9}, |
| {0, 3, 4, 5, 10}, |
| {0, 3, 4, 5, 11}, |
| {0, 3, 4, 5, 12}, |
| {0, 3, 4, 5, 13}, |
| {0, 3, 4, 5, 14}, |
| {0, 3, 4, 5, 15}, |
| {0, 3, 4, 6, 8}, |
| {0, 3, 4, 6, 9}, |
| {0, 3, 4, 6, 10}, |
| {0, 3, 4, 6, 11}, |
| {0, 3, 4, 6, 12}, |
| {0, 3, 4, 6, 13}, |
| {0, 3, 4, 6, 14}, |
| {0, 3, 4, 6, 15}, |
| {0, 3, 4, 8, 9}, |
| {0, 3, 4, 8, 10}, |
| {0, 3, 4, 8, 13}, |
| {0, 3, 4, 8, 14}, |
| {0, 3, 4, 9, 11}, |
| {0, 3, 4, 9, 12}, |
| {0, 3, 4, 9, 15}, |
| {0, 3, 4, 10, 11}, |
| {0, 3, 4, 10, 12}, |
| {0, 3, 4, 10, 15}, |
| {0, 3, 4, 11, 13}, |
| {0, 3, 4, 11, 14}, |
| {0, 3, 4, 12, 13}, |
| {0, 3, 4, 12, 14}, |
| {0, 3, 4, 13, 15}, |
| {0, 3, 4, 14, 15}, |
| {0, 3, 5, 7, 8}, |
| {0, 3, 5, 7, 9}, |
| {0, 3, 5, 7, 10}, |
| {0, 3, 5, 7, 11}, |
| {0, 3, 5, 7, 12}, |
| {0, 3, 5, 7, 13}, |
| {0, 3, 5, 7, 14}, |
| {0, 3, 5, 7, 15}, |
| {0, 3, 5, 8, 9}, |
| {0, 3, 5, 8, 10}, |
| {0, 3, 5, 8, 12}, |
| {0, 3, 5, 8, 15}, |
| {0, 3, 5, 9, 11}, |
| {0, 3, 5, 9, 13}, |
| {0, 3, 5, 9, 14}, |
| {0, 3, 5, 10, 11}, |
| {0, 3, 5, 10, 13}, |
| {0, 3, 5, 10, 14}, |
| {0, 3, 5, 11, 12}, |
| {0, 3, 5, 11, 15}, |
| {0, 3, 5, 12, 13}, |
| {0, 3, 5, 12, 14}, |
| {0, 3, 5, 13, 15}, |
| {0, 3, 5, 14, 15}, |
| {0, 3, 6, 7, 8}, |
| {0, 3, 6, 7, 9}, |
| {0, 3, 6, 7, 10}, |
| {0, 3, 6, 7, 11}, |
| {0, 3, 6, 7, 12}, |
| {0, 3, 6, 7, 13}, |
| {0, 3, 6, 7, 14}, |
| {0, 3, 6, 7, 15}, |
| {0, 3, 6, 8, 9}, |
| {0, 3, 6, 8, 10}, |
| {0, 3, 6, 8, 12}, |
| {0, 3, 6, 8, 15}, |
| {0, 3, 6, 9, 11}, |
| {0, 3, 6, 9, 13}, |
| {0, 3, 6, 9, 14}, |
| {0, 3, 6, 10, 11}, |
| {0, 3, 6, 10, 13}, |

TABLE 11-continued

| |
|---|
| {0, 3, 6, 10, 14}, |
| {0, 3, 6, 11, 12}, |
| {0, 3, 6, 11, 15}, |
| {0, 3, 6, 12, 13}, |
| {0, 3, 6, 12, 14}, |
| {0, 3, 6, 13, 15}, |
| {0, 3, 6, 14, 15}, |
| {0, 3, 7, 8, 9}, |
| {0, 3, 7, 8, 10}, |
| {0, 3, 7, 8, 13}, |
| {0, 3, 7, 8, 14}, |
| {0, 3, 7, 9, 11}, |
| {0, 3, 7, 9, 12}, |
| {0, 3, 7, 9, 15}, |
| {0, 3, 7, 10, 11}, |
| {0, 3, 7, 10, 12}, |
| {0, 3, 7, 10, 15}, |
| {0, 3, 7, 11, 13}, |
| {0, 3, 7, 11, 14}, |
| {0, 3, 7, 12, 13}, |
| {0, 3, 7, 12, 14}, |
| {0, 3, 7, 13, 15}, |
| {0, 3, 7, 14, 15}, |
| {0, 3, 8, 9, 12}, |
| {0, 3, 8, 9, 13}, |
| {0, 3, 8, 9, 14}, |
| {0, 3, 8, 9, 15}, |
| {0, 3, 8, 10, 12}, |
| {0, 3, 8, 10, 13}, |
| {0, 3, 8, 10, 14}, |
| {0, 3, 8, 10, 15}, |
| {0, 3, 8, 12, 13}, |
| {0, 3, 8, 12, 14}, |
| {0, 3, 8, 13, 15}, |
| {0, 3, 8, 14, 15}, |
| {0, 3, 9, 11, 12}, |
| {0, 3, 9, 11, 13}, |
| {0, 3, 9, 11, 14}, |
| {0, 3, 9, 11, 15}, |
| {0, 3, 9, 12, 13}, |
| {0, 3, 9, 12, 14}, |
| {0, 3, 9, 13, 15}, |
| {0, 3, 9, 14, 15}, |
| {0, 3, 10, 11, 12}, |
| {0, 3, 10, 11, 13}, |
| {0, 3, 10, 11, 14}, |
| {0, 3, 10, 11, 15}, |
| {0, 3, 10, 12, 13}, |
| {0, 3, 10, 12, 14}, |
| {0, 3, 10, 13, 15}, |
| {0, 3, 10, 14, 15}, |
| {0, 3, 11, 12, 13}, |
| {0, 3, 11, 12, 14}, |
| {0, 3, 11, 13, 15}, |
| {0, 3, 11, 14, 15}, |
| {0, 4, 5, 6, 8}, |
| {0, 4, 5, 6, 9}, |
| {0, 4, 5, 6, 10}, |
| {0, 4, 5, 6, 11}, |
| {0, 4, 5, 6, 12}, |
| {0, 4, 5, 6, 13}, |
| {0, 4, 5, 6, 14}, |
| {0, 4, 5, 6, 15}, |
| {0, 4, 5, 7, 8}, |
| {0, 4, 5, 7, 9}, |
| {0, 4, 5, 7, 10}, |
| {0, 4, 5, 7, 11}, |
| {0, 4, 5, 7, 12}, |
| {0, 4, 5, 7, 13}, |
| {0, 4, 5, 7, 14}, |
| {0, 4, 5, 7, 15}, |
| {0, 4, 5, 8, 10}, |
| {0, 4, 5, 8, 11}, |
| {0, 4, 5, 8, 14}, |
| {0, 4, 5, 8, 15}, |
| {0, 4, 5, 9, 10}, |
| {0, 4, 5, 9, 11}, |
| {0, 4, 5, 9, 14}, |
| {0, 4, 5, 9, 15}, |

TABLE 11-continued

| |
|---|
| {0, 4, 5, 10, 12}, |
| {0, 4, 5, 10, 13}, |
| {0, 4, 5, 11, 12}, |
| {0, 4, 5, 11, 13}, |
| {0, 4, 5, 12, 14}, |
| {0, 4, 5, 12, 15}, |
| {0, 4, 5, 13, 14}, |
| {0, 4, 5, 13, 15}, |
| {0, 4, 6, 7, 8}, |
| {0, 4, 6, 7, 9}, |
| {0, 4, 6, 7, 10}, |
| {0, 4, 6, 7, 11}, |
| {0, 4, 6, 7, 12}, |
| {0, 4, 6, 7, 13}, |
| {0, 4, 6, 7, 14}, |
| {0, 4, 6, 7, 15}, |
| {0, 4, 6, 8, 9}, |
| {0, 4, 6, 8, 11}, |
| {0, 4, 6, 8, 13}, |
| {0, 4, 6, 8, 15}, |
| {0, 4, 6, 9, 10}, |
| {0, 4, 6, 9, 12}, |
| {0, 4, 6, 9, 14}, |
| {0, 4, 6, 10, 11}, |
| {0, 4, 6, 10, 13}, |
| {0, 4, 6, 10, 15}, |
| {0, 4, 6, 11, 12}, |
| {0, 4, 6, 11, 14}, |
| {0, 4, 6, 12, 13}, |
| {0, 4, 6, 12, 15}, |
| {0, 4, 6, 13, 14}, |
| {0, 4, 6, 14, 15}, |
| {0, 4, 7, 8, 9}, |
| {0, 4, 7, 8, 10}, |
| {0, 4, 7, 8, 13}, |
| {0, 4, 7, 8, 14}, |
| {0, 4, 7, 9, 11}, |
| {0, 4, 7, 9, 12}, |
| {0, 4, 7, 9, 15}, |
| {0, 4, 7, 10, 11}, |
| {0, 4, 7, 10, 12}, |
| {0, 4, 7, 10, 15}, |
| {0, 4, 7, 11, 13}, |
| {0, 4, 7, 11, 14}, |
| {0, 4, 7, 12, 13}, |
| {0, 4, 7, 12, 14}, |
| {0, 4, 7, 13, 15}, |
| {0, 4, 7, 14, 15}, |
| {0, 4, 8, 9, 10}, |
| {0, 4, 8, 9, 11}, |
| {0, 4, 8, 9, 14}, |
| {0, 4, 8, 9, 15}, |
| {0, 4, 8, 10, 111, |
| {0, 4, 8, 10, 13}, |
| {0, 4, 8, 10, 15}, |
| {0, 4, 8, 11, 13}, |
| {0, 4, 8, 11, 14}, |
| {0, 4, 8, 13, 14}, |
| {0, 4, 8, 13, 15}, |
| {0, 4, 8, 14, 15}, |
| {0, 4, 9, 10, 11}, |
| {0, 4, 9, 10, 12}, |
| {0, 4, 9, 10, 15}, |
| {0, 4, 9, 11, 12}, |
| {0, 4, 9, 11, 14}, |
| {0, 4, 9, 12, 14}, |
| {0, 4, 9, 12, 15}, |
| {0, 4, 9, 14, 15}, |
| {0, 4, 10, 11, 12}, |
| {0, 4, 10, 11, 13}, |
| {0, 4, 10, 12, 13}, |
| {0, 4, 10, 12, 15}, |
| {0, 4, 10, 13, 15}, |
| {0, 4, 11, 12, 13}, |
| {0, 4, 11, 12, 14}, |
| {0, 4, 11, 13, 14}, |
| {0, 4, 12, 13, 14}, |
| {0, 4, 12, 13, 15}, |

TABLE 12

| |
|---|
| {0, 4, 12, 14, 15}, |
| {0, 4, 13, 14, 15}, |
| {0, 5, 6, 7, 8}, |
| {0, 5, 6, 7, 9}, |
| {0, 5, 6, 7, 10}, |
| {0, 5, 6, 7, 11}, |
| {0, 5, 6, 7, 12}, |
| {0, 5, 6, 7, 13}, |
| {0, 5, 6, 7, 14}, |
| {0, 5, 6, 7, 15}, |
| {0, 5, 6, 8, 9}, |
| {0, 5, 6, 8, 10}, |
| {0, 5, 6, 8, 12}, |
| {0, 5, 6, 8, 15}, |
| {0, 5, 6, 9, 11}, |
| {0, 5, 6, 9, 13}, |
| {0, 5, 6, 9, 14}, |
| {0, 5, 6, 10, 11}, |
| {0, 5, 6, 10, 13}, |
| {0, 5, 6, 10, 14}, |
| {0, 5, 6, 11, 12}, |
| {0, 5, 6, 11, 15}, |
| {0, 5, 6, 12, 13}, |
| {0, 5, 6, 12, 14}, |
| {0, 5, 6, 13, 15}, |
| {0, 5, 6, 14, 15}, |
| {0, 5, 7, 8, 9}, |
| {0, 5, 7, 8, 11}, |
| {0, 5, 7, 8, 12}, |
| {0, 5, 7, 8, 14}, |
| {0, 5, 7, 9, 10}, |
| {0, 5, 7, 9, 13}, |
| {0, 5, 7, 9, 15}, |
| {0, 5, 7, 10, 11}, |
| {0, 5, 7, 10, 12}, |
| {0, 5, 7, 10, 14}, |
| {0, 5, 7, 11, 13}, |
| {0, 5, 7, 11, 15}, |
| {0, 5, 7, 12, 13}, |
| {0, 5, 7, 12, 15}, |
| {0, 5, 7, 13, 14}, |
| {0, 5, 7, 14, 15}, |
| {0, 5, 8, 9, 10}, |
| {0, 5, 8, 9, 11}, |
| {0, 5, 8, 9, 14}, |
| {0, 5, 8, 9, 15}, |
| {0, 5, 8, 10, 11}, |
| {0, 5, 8, 10, 12}, |
| {0, 5, 8, 10, 14}, |
| {0, 5, 8, 11, 12}, |
| {0, 5, 8, 11, 15}, |
| {0, 5, 8, 12, 14}, |
| {0, 5, 8, 12, 15}, |
| {0, 5, 8, 14, 15}, |
| {0, 5, 9, 10, 11}, |
| {0, 5, 9, 10, 13}, |
| {0, 5, 9, 10, 14}, |
| {0, 5, 9, 11, 13}, |
| {0, 5, 9, 11, 15}, |
| {0, 5, 9, 13, 14}, |
| {0, 5, 9, 13, 15}, |
| {0, 5, 9, 14, 15}, |
| {0, 5, 10, 11, 12}, |
| {0, 5, 10, 11, 13}, |
| {0, 5, 10, 12, 13}, |
| {0, 5, 10, 12, 14}, |
| {0, 5, 10, 13, 14}, |
| {0, 5, 11, 12, 13}, |
| {0, 5, 11, 12, 15}, |
| {0, 5, 11, 13, 15}, |
| {0, 5, 12, 13, 14}, |
| {0, 5, 12, 13, 15}, |
| {0, 5, 12, 14, 15}, |
| {0, 5, 13, 14, 15}, |
| {0, 6, 7, 8, 10}, |
| {0, 6, 7, 8, 11}, |
| {0, 6, 7, 8, 12}, |
| {0, 6, 7, 8, 13}, |
| {0, 6, 7, 9, 10}, |

TABLE 12-continued

| |
|---|
| {0, 6, 7, 9, 11}, |
| {0, 6, 7, 9, 12}, |
| {0, 6, 7, 9, 13}, |
| {0, 6, 7, 10, 14}, |
| {0, 6, 7, 10, 15}, |
| {0, 6, 7, 11, 14}, |
| {0, 6, 7, 11, 15}, |
| {0, 6, 7, 12, 14}, |
| {0, 6, 7, 12, 15}, |
| {0, 6, 7, 13, 14}, |
| {0, 6, 7, 13, 15}, |
| {0, 6, 8, 9, 10}, |
| {0, 6, 8, 9, 11}, |
| {0, 6, 8, 9, 12}, |
| {0, 6, 8, 9, 13}, |
| {0, 6, 8, 10, 11}, |
| {0, 6, 8, 10, 13}, |
| {0, 6, 8, 10, 15}, |
| {0, 6, 8, 11, 12}, |
| {0, 6, 8, 11, 15}, |
| {0, 6, 8, 12, 13}, |
| {0, 6, 8, 12, 15}, |
| {0, 6, 8, 13, 15}, |
| {0, 6, 9, 10, 11}, |
| {0, 6, 9, 10, 13}, |
| {0, 6, 9, 10, 14}, |
| {0, 6, 9, 11, 12}, |
| {0, 6, 9, 11, 14}, |
| {0, 6, 9, 12, 13}, |
| {0, 6, 9, 12, 14}, |
| {0, 6, 9, 13, 14}, |
| {0, 6, 10, 11, 14}, |
| {0, 6, 10, 11, 15}, |
| {0, 6, 10, 13, 14}, |
| {0, 6, 10, 13, 15}, |
| {0, 6, 10, 14, 15}, |
| {0, 6, 11, 12, 14}, |
| {0, 6, 11, 12, 15}, |
| {0, 6, 11, 14, 15}, |
| {0, 6, 12, 13, 14}, |
| {0, 6, 12, 13, 15}, |
| {0, 6, 12, 14, 15}, |
| {0, 6, 13, 14, 15}, |
| {0, 7, 8, 9, 10}, |
| {0, 7, 8, 9, 11}, |
| {0, 7, 8, 9, 12}, |
| {0, 7, 8, 9, 13}, |
| {0, 7, 8, 10, 11}, |
| {0, 7, 8, 10, 12}, |
| {0, 7, 8, 10, 14}, |
| {0, 7, 8, 11, 13}, |
| {0, 7, 8, 11, 14}, |
| {0, 7, 8, 12, 13}, |
| {0, 7, 8, 12, 14}, |
| {0, 7, 8, 13, 14}, |
| {0, 7, 9, 10, 11}, |
| {0, 7, 9, 10, 12}, |
| {0, 7, 9, 10, 15}, |
| {0, 7, 9, 11, 13}, |
| {0, 7, 9, 11, 15}, |
| {0, 7, 9, 12, 13}, |
| {0, 7, 9, 12, 15}, |
| {0, 7, 9, 13, 15}, |
| {0, 7, 10, 11, 14}, |
| {0, 7, 10, 11, 15}, |
| {0, 7, 10, 12, 14}, |
| {0, 7, 10, 12, 15}, |
| {0, 7, 10, 14, 15}, |
| {0, 7, 11, 13, 14}, |
| {0, 7, 11, 13, 15}, |
| {0, 7, 11, 14, 15}, |
| {0, 7, 12, 13, 14}, |
| {0, 7, 12, 13, 15}, |
| {0, 7, 12, 14, 15}, |
| {0, 7, 13, 14, 15}, |
| {0, 8, 9, 10, 12}, |
| {0, 8, 9, 10, 13}, |
| {0, 8, 9, 10, 14}, |
| {0, 8, 9, 10, 15}, |

TABLE 12-continued

| |
|---|
| {0, 8, 9, 11, 12}, |
| {0, 8, 9, 11, 13}, |
| {0, 8, 9, 11, 14}, |
| {0, 8, 9, 11, 15}, |
| {0, 8, 9, 12, 14}, |
| {0, 8, 9, 12, 15}, |
| {0, 8, 9, 13, 14}, |
| {0, 8, 9, 13, 15}, |
| {0, 8, 10, 11, 12}, |
| {0, 8, 10, 11, 13}, |
| {0, 8, 10, 11, 14}, |
| {0, 8, 10, 11, 15}, |
| {0, 8, 10, 12, 13}, |
| {0, 8, 10, 12, 15}, |
| {0, 8, 10, 13, 14}, |
| {0, 8, 10, 14, 15}, |
| {0, 8, 11, 12, 13}, |
| {0, 8, 11, 12, 14}, |
| {0, 8, 11, 13, 15}, |
| {0, 8, 11, 14, 15}, |
| {0, 8, 12, 13, 14}, |
| {0, 8, 12, 13, 15}, |
| {0, 8, 12, 14, 15}, |
| {0, 8, 13, 14, 15}, |
| {0, 9, 10, 11, 12}, |
| {0, 9, 10, 11, 13}, |
| {0, 9, 10, 11, 14}, |
| {0, 9, 10, 11, 15}, |
| {0, 9, 10, 12, 13}, |
| {0, 9, 10, 12, 14}, |
| {0, 9, 10, 13, 15}, |
| {0, 9, 10, 14, 15}, |
| {0, 9, 11, 12, 13}, |
| {0, 9, 11, 12, 15}, |
| {0, 9, 11, 13, 14}, |
| {0, 9, 11, 14, 15}, |
| {0, 9, 12, 13, 14}, |
| {0, 9, 12, 13, 15}, |
| {0, 9, 12, 14, 15}, |
| {0, 9, 13, 14, 15}, |
| {0, 10, 11, 12, 14}, |
| {0, 10, 11, 12, 15}, |
| {0, 10, 11, 13, 14}, |
| {0, 10, 11, 13, 15}, |
| {0, 10, 12, 13, 14}, |
| {0, 10, 12, 13, 15}, |
| {0, 10, 12, 14, 15}, |
| {0, 10, 13, 14, 15}, |
| {0, 11, 12, 13, 14}, |
| {0, 11, 12, 13, 15}, |
| {0, 11, 12, 14, 15}, |
| {0, 11, 13, 14, 15}, |
| {1, 2, 3, 4, 8}, |
| {1, 2, 3, 4, 9}, |
| {1, 2, 3, 4, 10}, |
| {1, 2, 3, 4, 11}, |
| {1, 2, 3, 4, 12}, |
| {1, 2, 3, 4, 13}, |
| {1, 2, 3, 4, 14}, |
| {1, 2, 3, 4, 15}, |
| {1, 2, 3, 5, 8}, |
| {1, 2, 3, 5, 9}, |
| {1, 2, 3, 5, 10}, |
| {1, 2, 3, 5, 11}, |
| {1, 2, 3, 5, 12}, |
| {1, 2, 3, 5, 13}, |
| {1, 2, 3, 5, 14}, |
| {1, 2, 3, 5, 15}, |
| {1, 2, 3, 6, 8}, |
| {1, 2, 3, 6, 9}, |
| {1, 2, 3, 6, 10}, |
| {1, 2, 3, 6, 11}, |
| {1, 2, 3, 6, 12}, |
| {1, 2, 3, 6, 13}, |
| {1, 2, 3, 6, 14}, |
| {1, 2, 3, 6, 15}, |
| {1, 2, 3, 7, 8}, |
| {1, 2, 3, 7, 9}, |
| {1, 2, 3, 7, 10}, |

TABLE 12-continued

| |
|---|
| {1, 2, 3, 7, 11}, |
| {1, 2, 3, 7, 12}, |
| {1, 2, 3, 7, 13}, |
| {1, 2, 3, 7, 14}, |
| {1, 2, 3, 7, 15}, |
| {1, 2, 3, 8, 12}, |
| {1, 2, 3, 8, 13}, |
| {1, 2, 3, 8, 14}, |
| {1, 2, 3, 8, 15}, |
| {1, 2, 3, 9, 12}, |
| {1, 2, 3, 9, 13}, |
| {1, 2, 3, 9, 14}, |
| {1, 2, 3, 9, 15}, |
| {1, 2, 3, 10, 12}, |
| {1, 2, 3, 10, 13}, |
| {1, 2, 3, 10, 14}, |
| {1, 2, 3, 10, 15}, |
| {1, 2, 3, 11, 12}, |
| {1, 2, 3, 11, 13}, |
| {1, 2, 3, 11, 14}, |
| {1, 2, 3, 11, 15}, |
| {1, 2, 4, 5, 8}, |
| {1, 2, 4, 5, 9}, |
| {1, 2, 4, 5, 10}, |
| {1, 2, 4, 5, 11}, |
| {1, 2, 4, 5, 12}, |
| {1, 2, 4, 5, 13}, |
| {1, 2, 4, 5, 14}, |
| {1, 2, 4, 5, 15}, |
| {1, 2, 4, 6, 8}, |
| {1, 2, 4, 6, 9}, |
| {1, 2, 4, 6, 10}, |
| {1, 2, 4, 6, 11}, |
| {1, 2, 4, 6, 12}, |
| {1, 2, 4, 6, 13}, |
| {1, 2, 4, 6, 14}, |
| {1, 2, 4, 6, 15}, |
| {1, 2, 4, 8, 9}, |
| {1, 2, 4, 8, 10}, |
| {1, 2, 4, 8, 12}, |
| {1, 2, 4, 8, 15}, |
| {1, 2, 4, 9, 11}, |
| {1, 2, 4, 9, 13}, |
| {1, 2, 4, 9, 14}, |
| {1, 2, 4, 10, 11}, |
| {1, 2, 4, 10, 13}, |
| {1, 2, 4, 10, 14}, |
| {1, 2, 4, 11, 12}, |
| {1, 2, 4, 11, 15}, |
| {1, 2, 4, 12, 13}, |
| {1, 2, 4, 12, 14}, |
| {1, 2, 4, 13, 15}, |
| {1, 2, 4, 14, 15}, |
| {1, 2, 5, 7, 8}, |
| {1, 2, 5, 7, 9}, |
| {1, 2, 5, 7, 10}, |
| {1, 2, 5, 7, 11}, |
| {1, 2, 5, 7, 12}, |
| {1, 2, 5, 7, 13}, |
| {1, 2, 5, 7, 14}, |
| {1, 2, 5, 7, 15}, |
| {1, 2, 5, 8, 9}, |
| {1, 2, 5, 8, 10}, |
| {1, 2, 5, 8, 13}, |
| {1, 2, 5, 8, 14}, |
| {1, 2, 5, 9, 11}, |
| {1, 2, 5, 9, 12}, |
| {1, 2, 5, 9, 15}, |
| {1, 2, 5, 10, 11}, |
| {1, 2, 5, 10, 12}, |
| {1, 2, 5, 10, 15}, |
| {1, 2, 5, 11, 13}, |
| {1, 2, 5, 11, 14}, |
| {1, 2, 5, 12, 13}, |
| {1, 2, 5, 12, 14}, |
| {1, 2, 5, 13, 15}, |
| {1, 2, 5, 14, 15}, |
| {1, 2, 6, 7, 8}, |

TABLE 13

| |
|---|
| {1, 2, 6, 7, 9}, |
| {1, 2, 6, 7, 10}, |
| {1, 2, 6, 7, 11}, |
| {1, 2, 6, 7, 12}, |
| {1, 2, 6, 7, 13}, |
| {1, 2, 6, 7, 14}, |
| {1, 2, 6, 7, 15}, |
| {1, 2, 6, 8, 9}, |
| {1, 2, 6, 8, 10}, |
| {1, 2, 6, 8, 13}, |
| {1, 2, 6, 8, 14}, |
| {1, 2, 6, 9, 11}, |
| {1, 2, 6, 9, 12}, |
| {1, 2, 6, 9, 15}, |
| {1, 2, 6, 10, 11}, |
| {1, 2, 6, 10, 12}, |
| {1, 2, 6, 10, 15}, |
| {1, 2, 6, 11, 13}, |
| {1, 2, 6, 11, 14}, |
| {1, 2, 6, 12, 13}, |
| {1, 2, 6, 12, 14}, |
| {1, 2, 6, 13, 15}, |
| {1, 2, 6, 14, 15}, |
| {1, 2, 7, 8, 9}, |
| {1, 2, 7, 8, 10}, |
| {1, 2, 7, 8, 12}, |
| {1, 2, 7, 8, 15}, |
| {1, 2, 7, 9, 11}, |
| {1, 2, 7, 9, 13}, |
| {1, 2, 7, 9, 14}, |
| {1, 2, 7, 10, 11}, |
| {1, 2, 7, 10, 13}, |
| {1, 2, 7, 10, 14}, |
| {1, 2, 7, 11, 12}, |
| {1, 2, 7, 11, 15}, |
| {1, 2, 7, 12, 13}, |
| {1, 2, 7, 12, 14}, |
| {1, 2, 7, 13, 15}, |
| {1, 2, 7, 14, 15}, |
| {1, 2, 8, 9, 12}, |
| {1, 2, 8, 9, 13}, |
| {1, 2, 8, 9, 14}, |
| {1, 2, 8, 9, 15}, |
| {1, 2, 8, 10, 12}, |
| {1, 2, 8, 10, 13}, |
| {1, 2, 8, 10, 14}, |
| {1, 2, 8, 10, 15}, |
| {1, 2, 8, 12, 13}, |
| {1, 2, 8, 12, 14}, |
| {1, 2, 8, 13, 15}, |
| {1, 2, 8, 14, 15}, |
| {1, 2, 9, 11, 12}, |
| {1, 2, 9, 11, 13}, |
| {1, 2, 9, 11, 14}, |
| {1, 2, 9, 11, 15}, |
| {1, 2, 9, 12, 13}, |
| {1, 2, 9, 12, 14}, |
| {1, 2, 9, 13, 15}, |
| {1, 2, 9, 14, 15}, |
| {1, 2, 10, 11, 12}, |
| {1, 2, 10, 11, 13}, |
| {1, 2, 10, 11, 14}, |
| {1, 2, 10, 11, 15}, |
| {1, 2, 10, 12, 13}, |
| {1, 2, 10, 12, 14}, |
| {1, 2, 10, 13, 15}, |
| {1, 2, 10, 14, 15}, |
| {1, 2, 11, 12, 13}, |
| {1, 2, 11, 12, 14}, |
| {1, 2, 11, 13, 15}, |
| {1, 2, 11, 14, 15}, |
| {1, 3, 4, 5, 8}, |
| {1, 3, 4, 5, 9}, |
| {1, 3, 4, 5, 10}, |
| {1, 3, 4, 5, 11}, |
| {1, 3, 4, 5, 12}, |
| {1, 3, 4, 5, 13}, |
| {1, 3, 4, 5, 14}, |
| {1, 3, 4, 5, 15}, |

TABLE 13-continued

| |
|---|
| {1, 3, 4, 7, 8}, |
| {1, 3, 4, 7, 9}, |
| {1, 3, 4, 7, 10}, |
| {1, 3, 4, 7, 11}, |
| {1, 3, 4, 7, 12}, |
| {1, 3, 4, 7, 13}, |
| {1, 3, 4, 7, 14}, |
| {1, 3, 4, 7, 15}, |
| {1, 3, 4, 8, 9}, |
| {1, 3, 4, 8, 11}, |
| {1, 3, 4, 8, 12}, |
| {1, 3, 4, 8, 14}, |
| {1, 3, 4, 9, 10}, |
| {1, 3, 4, 9, 13}, |
| {1, 3, 4, 9, 15}, |
| {1, 3, 4, 10, 11}, |
| {1, 3, 4, 10, 12}, |
| {1, 3, 4, 10, 14}, |
| {1, 3, 4, 11, 13}, |
| {1, 3, 4, 11, 15}, |
| {1, 3, 4, 12, 13}, |
| {1, 3, 4, 12, 15}, |
| {1, 3, 4, 13, 14}, |
| {1, 3, 4, 14, 15}, |
| {1, 3, 5, 6, 8}, |
| {1, 3, 5, 6, 9}, |
| {1, 3, 5, 6, 10}, |
| {1, 3, 5, 6, 11}, |
| {1, 3, 5, 6, 12}, |
| {1, 3, 5, 6, 13}, |
| {1, 3, 5, 6, 14}, |
| {1, 3, 5, 6, 15}, |
| {1, 3, 5, 8, 9}, |
| {1, 3, 5, 8, 11}, |
| {1, 3, 5, 8, 13}, |
| {1, 3, 5, 8, 15}, |
| {1, 3, 5, 9, 10}, |
| {1, 3, 5, 9, 12}, |
| {1, 3, 5, 9, 14}, |
| {1, 3, 5, 10, 11}, |
| {1, 3, 5, 10, 13}, |
| {1, 3, 5, 10, 15}, |
| {1, 3, 5, 11, 12}, |
| {1, 3, 5, 11, 14}, |
| {1, 3, 5, 12, 13}, |
| {1, 3, 5, 12, 15}, |
| {1, 3, 5, 13, 14}, |
| {1, 3, 5, 14, 15}, |
| {1, 3, 6, 7, 8}, |
| {1, 3, 6, 7, 9}, |
| {1, 3, 6, 7, 10}, |
| {1, 3, 6, 7, 11}, |
| {1, 3, 6, 7, 12}, |
| {1, 3, 6, 7, 13}, |
| {1, 3, 6, 7, 14}, |
| {1, 3, 6, 7, 15}, |
| {1, 3, 6, 8, 9}, |
| {1, 3, 6, 8, 11}, |
| {1, 3, 6, 8, 12}, |
| {1, 3, 6, 8, 14}, |
| {1, 3, 6, 9, 10}, |
| {1, 3, 6, 9, 13}, |
| {1, 3, 6, 9, 15}, |
| {1, 3, 6, 10, 11}, |
| {1, 3, 6, 10, 12}, |
| {1, 3, 6, 10, 14}, |
| {1, 3, 6, 11, 13}, |
| {1, 3, 6, 11, 15}, |
| {1, 3, 6, 12, 13}, |
| {1, 3, 6, 12, 15}, |
| {1, 3, 6, 13, 14}, |
| {1, 3, 6, 14, 15}, |
| {1, 3, 7, 8, 9}, |
| {1, 3, 7, 8, 11}, |
| {1, 3, 7, 8, 13}, |
| {1, 3, 7, 8, 15}, |
| {1, 3, 7, 9, 10}, |
| {1, 3, 7, 9, 12}, |
| {1, 3, 7, 9, 14}, |

TABLE 13-continued

| |
|---|
| {1, 3, 7, 10, 11}, |
| {1, 3, 7, 10, 13}, |
| {1, 3, 7, 10, 15}, |
| {1, 3, 7, 11, 12}, |
| {1, 3, 7, 11, 14}, |
| {1, 3, 7, 12, 13}, |
| {1, 3, 7, 12, 15}, |
| {1, 3, 7, 13, 14}, |
| {1, 3, 7, 14, 15}, |
| {1, 3, 8, 9, 12}, |
| {1, 3, 8, 9, 13}, |
| {1, 3, 8, 9, 14}, |
| {1, 3, 8, 9, 15}, |
| {1, 3, 8, 11, 12}, |
| {1, 3, 8, 11, 13}, |
| {1, 3, 8, 11, 14}, |
| {1, 3, 8, 11, 15}, |
| {1, 3, 8, 12, 13}, |
| {1, 3, 8, 12, 15}, |
| {1, 3, 8, 13, 14}, |
| {1, 3, 8, 14, 15}, |
| {1, 3, 9, 10, 12}, |
| {1, 3, 9, 10, 13}, |
| {1, 3, 9, 10, 14}, |
| {1, 3, 9, 10, 15}, |
| {1, 3, 9, 12, 13}, |
| {1, 3, 9, 12, 15}, |
| {1, 3, 9, 13, 14}, |
| {1, 3, 9, 14, 15}, |
| {1, 3, 10, 11, 12}, |
| {1, 3, 10, 11, 13}, |
| {1, 3, 10, 11, 14}, |
| {1, 3, 10, 11, 15}, |
| {1, 3, 10, 12, 13}, |
| {1, 3, 10, 12, 15}, |
| {1, 3, 10, 13, 14}, |
| {1, 3, 10, 14, 15}, |
| {1, 3, 11, 12, 13}, |
| {1, 3, 11, 12, 15}, |
| {1, 3, 11, 13, 14}, |
| {1, 3, 11, 14, 15}, |
| {1, 4, 5, 6, 8}, |
| {1, 4, 5, 6, 9}, |
| {1, 4, 5, 6, 10}, |
| {1, 4, 5, 6, 11}, |
| {1, 4, 5, 6, 12}, |
| {1, 4, 5, 6, 13}, |
| {1, 4, 5, 6, 14}, |
| {1, 4, 5, 6, 15}, |
| {1, 4, 5, 7, 8}, |
| {1, 4, 5, 7, 9}, |
| {1, 4, 5, 7, 10}, |
| {1, 4, 5, 7, 11}, |
| {1, 4, 5, 7, 12}, |
| {1, 4, 5, 7, 13}, |
| {1, 4, 5, 7, 14}, |
| {1, 4, 5, 7, 15}, |
| {1, 4, 5, 8, 10}, |
| {1, 4, 5, 8, 11}, |
| {1, 4, 5, 8, 14}, |
| {1, 4, 5, 8, 15}, |
| {1, 4, 5, 9, 10}, |
| {1, 4, 5, 9, 11}, |
| {1, 4, 5, 9, 14}, |
| {1, 4, 5, 9, 15}, |
| {1, 4, 5, 10, 12}, |
| {1, 4, 5, 10, 13}, |
| {1, 4, 5, 11, 12}, |
| {1, 4, 5, 11, 13}, |
| {1, 4, 5, 12, 14}, |
| {1, 4, 5, 12, 15}, |
| {1, 4, 5, 13, 14}, |
| {1, 4, 5, 13, 15}, |
| {1, 4, 6, 7, 8}, |
| {1, 4, 6, 7, 9}, |
| {1, 4, 6, 7, 10}, |
| {1, 4, 6, 7, 11}, |
| {1, 4, 6, 7, 12}, |
| {1, 4, 6, 7, 13}, |

TABLE 13-continued

| |
|---|
| {1, 4, 6, 7, 14}, |
| {1, 4, 6, 7, 15}, |
| {1, 4, 6, 8, 9}, |
| {1, 4, 6, 8, 11}, |
| {1, 4, 6, 8, 12}, |
| {1, 4, 6, 8, 14}, |
| {1, 4, 6, 9, 10}, |
| {1, 4, 6, 9, 13}, |
| {1, 4, 6, 9, 15}, |
| {1, 4, 6, 10, 11}, |
| {1, 4, 6, 10, 12}, |
| {1, 4, 6, 10, 14}, |
| {1, 4, 6, 11, 13}, |
| {1, 4, 6, 11, 15}, |
| {1, 4, 6, 12, 13}, |
| {1, 4, 6, 12, 15}, |
| {1, 4, 6, 13, 14}, |
| {1, 4, 6, 14, 15}, |
| {1, 4, 7, 8, 9}, |
| {1, 4, 7, 8, 10}, |
| {1, 4, 7, 8, 12}, |
| {1, 4, 7, 8, 15}, |
| {1, 4, 7, 9, 11}, |
| {1, 4, 7, 9, 13}, |
| {1, 4, 7, 9, 14}, |
| {1, 4, 7, 10, 11}, |
| {1, 4, 7, 10, 13}, |
| {1, 4, 7, 10, 14}, |
| {1, 4, 7, 11, 12}, |
| {1, 4, 7, 11, 15}, |
| {1, 4, 7, 12, 13}, |
| {1, 4, 7, 12, 14}, |
| {1, 4, 7, 13, 15}, |
| {1, 4, 7, 14, 15}, |
| {1, 4, 8, 9, 10}, |
| {1, 4, 8, 9, 11}, |
| {1, 4, 8, 9, 14}, |
| {1, 4, 8, 9, 15}, |
| {1, 4, 8, 10, 11}, |
| {1, 4, 8, 10, 12}, |
| {1, 4, 8, 10, 14}, |
| {1, 4, 8, 11, 12}, |
| {1, 4, 8, 11, 15}, |
| {1, 4, 8, 12, 14}, |
| {1, 4, 8, 12, 15}, |
| {1, 4, 8, 14, 15}, |
| {1, 4, 9, 10, 11}, |
| {1, 4, 9, 10, 13}, |
| {1, 4, 9, 10, 14}, |
| {1, 4, 9, 11, 13}, |
| {1, 4, 9, 11, 15}, |
| {1, 4, 9, 13, 14}, |
| {1, 4, 9, 13, 15}, |
| {1, 4, 9, 14, 15}, |
| {1, 4, 10, 11, 12}, |
| {1, 4, 10, 11, 13}, |
| {1, 4, 10, 12, 13}, |
| {1, 4, 10, 12, 14}, |
| {1, 4, 10, 13, 14}, |
| {1, 4, 11, 12, 13}, |
| {1, 4, 11, 12, 15}, |
| {1, 4, 11, 13, 15}, |
| {1, 4, 12, 13, 14}, |
| {1, 4, 12, 13, 15}, |
| {1, 4, 12, 14, 15}, |
| {1, 4, 13, 14, 15}, |
| {1, 5, 6, 7, 8}, |
| {1, 5, 6, 7, 9}, |
| {1, 5, 6, 7, 10}, |
| {1, 5, 6, 7, 11}, |
| {1, 5, 6, 7, 12}, |
| {1, 5, 6, 7, 13}, |
| {1, 5, 6, 7, 14}, |
| {1, 5, 6, 7, 15}, |
| {1, 5, 6, 8, 9}, |
| {1, 5, 6, 8, 10}, |
| {1, 5, 6, 8, 13}, |
| {1, 5, 6, 8, 14}, |

TABLE 14

| |
|---|
| {1, 5, 6, 9, 11}, |
| {1, 5, 6, 9, 12}, |
| {1, 5, 6, 9, 15}, |
| {1, 5, 6, 10, 11}, |
| {1, 5, 6, 10, 12}, |
| {1, 5, 6, 10, 15}, |
| {1, 5, 6, 11, 13}, |
| {1, 5, 6, 11, 14}, |
| {1, 5, 6, 12, 13}, |
| {1, 5, 6, 12, 14}, |
| {1, 5, 6, 13, 15}, |
| {1, 5, 6, 14, 15}, |
| {1, 5, 7, 8, 9}, |
| {1, 5, 7, 8, 11}, |
| {1, 5, 7, 8, 13}, |
| {1, 5, 7, 8, 15}, |
| {1, 5, 7, 9, 10}, |
| {1, 5, 7, 9, 12}, |
| {1, 5, 7, 9, 14}, |
| {1, 5, 7, 10, 11}, |
| {1, 5, 7, 10, 13}, |
| {1, 5, 7, 10, 15}, |
| {1, 5, 7, 11, 12}, |
| {1, 5, 7, 11, 14}, |
| {1, 5, 7, 12, 13}, |
| {1, 5, 7, 12, 15}, |
| {1, 5, 7, 13, 14}, |
| {1, 5, 7, 14, 15}, |
| {1, 5, 8, 9, 10}, |
| {1, 5, 8, 9, 11}, |
| {1, 5, 8, 9, 14}, |
| {1, 5, 8, 9, 15}, |
| {1, 5, 8, 10, 11}, |
| {1, 5, 8, 10, 13}, |
| {1, 5, 8, 10, 15}, |
| {1, 5, 8, 11, 13}, |
| {1, 5, 8, 11, 14}, |
| {1, 5, 8, 13, 14}, |
| {1, 5, 8, 13, 15}, |
| {1, 5, 8, 14, 15}, |
| {1, 5, 9, 10, 11}, |
| {1, 5, 9, 10, 12}, |
| {1, 5, 9, 10, 15}, |
| {1, 5, 9, 11, 12}, |
| {1, 5, 9, 11, 14}, |
| {1, 5, 9, 12, 14}, |
| {1, 5, 9, 12, 15}, |
| {1, 5, 9, 14, 15}, |
| {1, 5, 10, 11, 12}, |
| {1, 5, 10, 11, 13}, |
| {1, 5, 10, 12, 13}, |
| {1, 5, 10, 12, 15}, |
| {1, 5, 10, 13, 15}, |
| {1, 5, 11, 12, 13}, |
| {1, 5, 11, 12, 14}, |
| {1, 5, 11, 13, 14}, |
| {1, 5, 12, 13, 14}, |
| {1, 5, 12, 13, 15}, |
| {1, 5, 12, 14, 15}, |
| {1, 5, 13, 14, 15}, |
| {1, 6, 7, 8, 10}, |
| {1, 6, 7, 8, 11}, |
| {1, 6, 7, 8, 12}, |
| {1, 6, 7, 8, 13}, |
| {1, 6, 7, 9, 10}, |
| {1, 6, 7, 9, 11}, |
| {1, 6, 7, 9, 12}, |
| {1, 6, 7, 9, 13}, |
| {1, 6, 7, 10, 14}, |
| {1, 6, 7, 10, 15}, |
| {1, 6, 7, 11, 14}, |
| {1, 6, 7, 11, 15}, |
| {1, 6, 7, 12, 14}, |
| {1, 6, 7, 12, 15}, |
| {1, 6, 7, 13, 14}, |
| {1, 6, 7, 13, 15}, |
| {1, 6, 8, 9, 10}, |
| {1, 6, 8, 9, 11}, |
| {1, 6, 8, 9, 12}, |

TABLE 14-continued

| |
|---|
| {1, 6, 8, 9, 13}, |
| {1, 6, 8, 10, 11}, |
| {1, 6, 8, 10, 12}, |
| {1, 6, 8, 10, 14}, |
| {1, 6, 8, 11, 13}, |
| {1, 6, 8, 11, 14}, |
| {1, 6, 8, 12, 13}, |
| {1, 6, 8, 12, 14}, |
| {1, 6, 8, 13, 14}, |
| {1, 6, 9, 10, 11}, |
| {1, 6, 9, 10, 12}, |
| {1, 6, 9, 10, 15}, |
| {1, 6, 9, 11, 13}, |
| {1, 6, 9, 11, 15}, |
| {1, 6, 9, 12, 13}, |
| {1, 6, 9, 12, 15}, |
| {1, 6, 9, 13, 15}, |
| {1, 6, 10, 11, 14}, |
| {1, 6, 10, 11, 15}, |
| {1, 6, 10, 12, 14}, |
| {1, 6, 10, 12, 15}, |
| {1, 6, 10, 14, 15}, |
| {1, 6, 11, 13, 14}, |
| {1, 6, 11, 13, 15}, |
| {1, 6, 11, 14, 15}, |
| {1, 6, 12, 13, 14}, |
| {1, 6, 12, 13, 15}, |
| {1, 6, 12, 14, 15}, |
| {1, 6, 13, 14, 15}, |
| {1, 7, 8, 9, 10}, |
| {1, 7, 8, 9, 11}, |
| {1, 7, 8, 9, 12}, |
| {1, 7, 8, 9, 13}, |
| {1, 7, 8, 10, 11}, |
| {1, 7, 8, 10, 13}, |
| {1, 7, 8, 10, 15}, |
| {1, 7, 8, 11, 12}, |
| {1, 7, 8, 11, 15}, |
| {1, 7, 8, 12, 13}, |
| {1, 7, 8, 12, 15}, |
| {1, 7, 8, 13, 15}, |
| {1, 7, 9, 10, 11}, |
| {1, 7, 9, 10, 13}, |
| {1, 7, 9, 10, 14}, |
| {1, 7, 9, 11, 12}, |
| {1, 7, 9, 11, 14}, |
| {1, 7, 9, 12, 13}, |
| {1, 7, 9, 12, 14}, |
| {1, 7, 9, 13, 14}, |
| {1, 7, 10, 11, 14}, |
| {1, 7, 10, 11, 15}, |
| {1, 7, 10, 13, 14}, |
| {1, 7, 10, 13, 15}, |
| {1, 7, 10, 14, 15}, |
| {1, 7, 11, 12, 14}, |
| {1, 7, 11, 12, 15}, |
| {1, 7, 11, 14, 15}, |
| {1, 7, 12, 13, 14}, |
| {1, 7, 12, 13, 15}, |
| {1, 7, 12, 14, 15}, |
| {1, 7, 13, 14, 15}, |
| {1, 8, 9, 10, 12}, |
| {1, 8, 9, 10, 13}, |
| {1, 8, 9, 10, 14}, |
| {1, 8, 9, 10, 15}, |
| {1, 8, 9, 11, 12}, |
| {1, 8, 9, 11, 13}, |
| {1, 8, 9, 11, 14}, |
| {1, 8, 9, 11, 15}, |
| {1, 8, 9, 12, 14}, |
| {1, 8, 9, 12, 15}, |
| {1, 8, 9, 13, 14}, |
| {1, 8, 9, 13, 15}, |
| {1, 8, 10, 11, 12}, |
| {1, 8, 10, 11, 13}, |
| {1, 8, 10, 11, 14}, |
| {1, 8, 10, 11, 15}, |
| {1, 8, 10, 12, 13}, |
| {1, 8, 10, 12, 15}, |

TABLE 14-continued

| |
|---|
| {1, 8, 10, 13, 14}, |
| {1, 8, 10, 14, 15}, |
| {1, 8, 11, 12, 13}, |
| {1, 8, 11, 12, 14}, |
| {1, 8, 11, 13, 15}, |
| {1, 8, 11, 14, 15}, |
| {1, 8, 12, 13, 14}, |
| {1, 8, 12, 13, 15}, |
| {1, 8, 12, 14, 15}, |
| {1, 8, 13, 14, 15}, |
| {1, 9, 10, 11, 12}, |
| {1, 9, 10, 11, 13}, |
| {1, 9, 10, 11, 14}, |
| {1, 9, 10, 11, 15}, |
| {1, 9, 10, 12, 13}, |
| {1, 9, 10, 12, 14}, |
| {1, 9, 10, 13, 15}, |
| {1, 9, 10, 14, 15}, |
| {1, 9, 11, 12, 13}, |
| {1, 9, 11, 12, 15}, |
| {1, 9, 11, 13, 14}, |
| {1, 9, 11, 14, 15}, |
| {1, 9, 12, 13, 14}, |
| {1, 9, 12, 13, 15}, |
| {1, 9, 12, 14, 15}, |
| {1, 9, 13, 14, 15}, |
| {1, 10, 11, 12, 14}, |
| {1, 10, 11, 12, 15}, |
| {1, 10, 11, 13, 14}, |
| {1, 10, 11, 13, 15}, |
| {1, 10, 12, 13, 14}, |
| {1, 10, 12, 13, 15}, |
| {1, 10, 12, 14, 15}, |
| {1, 10, 13, 14, 15}, |
| {1, 11, 12, 13, 14}, |
| {1, 11, 12, 13, 15}, |
| {1, 11, 12, 14, 15}, |
| {1, 11, 13, 14, 15}, |
| {2, 3, 4, 6, 8}, |
| {2, 3, 4, 6, 9}, |
| {2, 3, 4, 6, 10}, |
| {2, 3, 4, 6, 11}, |
| {2, 3, 4, 6, 12}, |
| {2, 3, 4, 6, 13}, |
| {2, 3, 4, 6, 14}, |
| {2, 3, 4, 6, 15}, |
| {2, 3, 4, 7, 8}, |
| {2, 3, 4, 7, 9}, |
| {2, 3, 4, 7, 10}, |
| {2, 3, 4, 7, 11}, |
| {2, 3, 4, 7, 12}, |
| {2, 3, 4, 7, 13}, |
| {2, 3, 4, 7, 14}, |
| {2, 3, 4, 7, 15}, |
| {2, 3, 4, 8, 10}, |
| {2, 3, 4, 8, 11}, |
| {2, 3, 4, 8, 12}, |
| {2, 3, 4, 8, 13}, |
| {2, 3, 4, 9, 10}, |
| {2, 3, 4, 9, 11}, |
| {2, 3, 4, 9, 12}, |
| {2, 3, 4, 9, 13}, |
| {2, 3, 4, 10, 14}, |
| {2, 3, 4, 10, 15}, |
| {2, 3, 4, 11, 14}, |
| {2, 3, 4, 11, 15}, |
| {2, 3, 4, 12, 14}, |
| {2, 3, 4, 12, 15}, |
| {2, 3, 4, 13, 14}, |
| {2, 3, 4, 13, 15}, |
| {2, 3, 5, 6, 8}, |
| {2, 3, 5, 6, 9}, |
| {2, 3, 5, 6, 10}, |
| {2, 3, 5, 6, 11}, |
| {2, 3, 5, 6, 12}, |
| {2, 3, 5, 6, 13}, |
| {2, 3, 5, 6, 14}, |
| {2, 3, 5, 6, 15}, |
| {2, 3, 5, 7, 8}, |

TABLE 14-continued

| |
|---|
| {2, 3, 5, 7, 9}, |
| {2, 3, 5, 7, 10}, |
| {2, 3, 5, 7, 11}, |
| {2, 3, 5, 7, 12}, |
| {2, 3, 5, 7, 13}, |
| {2, 3, 5, 7, 14}, |
| {2, 3, 5, 7, 15}, |
| {2, 3, 5, 8, 10}, |
| {2, 3, 5, 8, 11}, |
| {2, 3, 5, 8, 12}, |
| {2, 3, 5, 8, 13}, |
| {2, 3, 5, 9, 10}, |
| {2, 3, 5, 9, 11}, |
| {2, 3, 5, 9, 12}, |
| {2, 3, 5, 9, 13}, |
| {2, 3, 5, 10, 14}, |
| {2, 3, 5, 10, 15}, |
| {2, 3, 5, 11, 14}, |
| {2, 3, 5, 11, 15}, |
| {2, 3, 5, 12, 14}, |
| {2, 3, 5, 12, 15}, |
| {2, 3, 5, 13, 14}, |
| {2, 3, 5, 13, 15}, |
| {2, 3, 6, 8, 10}, |
| {2, 3, 6, 8, 11}, |
| {2, 3, 6, 8, 14}, |
| {2, 3, 6, 8, 15}, |
| {2, 3, 6, 9, 10}, |
| {2, 3, 6, 9, 11}, |
| {2, 3, 6, 9, 14}, |
| {2, 3, 6, 9, 15}, |
| {2, 3, 6, 10, 12}, |
| {2, 3, 6, 10, 13}, |
| {2, 3, 6, 11, 12}, |
| {2, 3, 6, 11, 13}, |
| {2, 3, 6, 12, 14}, |
| {2, 3, 6, 12, 15}, |
| {2, 3, 6, 13, 14}, |
| {2, 3, 6, 13, 15}, |
| {2, 3, 7, 8, 10}, |
| {2, 3, 7, 8, 11}, |
| {2, 3, 7, 8, 14}, |
| {2, 3, 7, 8, 15}, |
| {2, 3, 7, 9, 10}, |
| {2, 3, 7, 9, 11}, |
| {2, 3, 7, 9, 14}, |
| {2, 3, 7, 9, 15}, |
| {2, 3, 7, 10, 12}, |
| {2, 3, 7, 10, 13}, |
| {2, 3, 7, 11, 12}, |
| {2, 3, 7, 11, 13}, |
| {2, 3, 7, 12, 14}, |
| {2, 3, 7, 12, 15}, |
| {2, 3, 7, 13, 14}, |
| {2, 3, 7, 13, 15}, |
| {2, 3, 8, 10, 12}, |
| {2, 3, 8, 10, 13}, |
| {2, 3, 8, 10, 14}, |
| {2, 3, 8, 10, 15}, |
| {2, 3, 8, 11, 12}, |
| {2, 3, 8, 11, 13}, |
| {2, 3, 8, 11, 14}, |
| {2, 3, 8, 11, 15}, |
| {2, 3, 8, 12, 14}, |
| {2, 3, 8, 12, 15}, |
| {2, 3, 8, 13, 14}, |
| {2, 3, 8, 13, 15}, |
| {2, 3, 9, 10, 12}, |
| {2, 3, 9, 10, 13}, |
| {2, 3, 9, 10, 14}, |
| {2, 3, 9, 10, 15}, |
| {2, 3, 9, 11, 12}, |
| {2, 3, 9, 11, 13}, |
| {2, 3, 9, 11, 14}, |
| {2, 3, 9, 11, 15}, |
| {2, 3, 9, 12, 14}, |
| {2, 3, 9, 12, 15}, |
| {2, 3, 9, 13, 14}, |

TABLE 15

| |
|---|
| {2, 3, 9, 13, 15}, |
| {2, 3, 10, 12, 14}, |
| {2, 3, 10, 12, 15}, |
| {2, 3, 10, 13, 14}, |
| {2, 3, 10, 13, 15}, |
| {2, 3, 11, 12, 14}, |
| {2, 3, 11, 12, 15}, |
| {2, 3, 11, 13, 14}, |
| {2, 3, 11, 13, 15}, |
| {2, 4, 5, 6, 8}, |
| {2, 4, 5, 6, 9}, |
| {2, 4, 5, 6, 10}, |
| {2, 4, 5, 6, 11}, |
| {2, 4, 5, 6, 12}, |
| {2, 4, 5, 6, 13}, |
| {2, 4, 5, 6, 14}, |
| {2, 4, 5, 6, 15}, |
| {2, 4, 5, 7, 8}, |
| {2, 4, 5, 7, 9}, |
| {2, 4, 5, 7, 10}, |
| {2, 4, 5, 7, 11}, |
| {2, 4, 5, 7, 12}, |
| {2, 4, 5, 7, 13}, |
| {2, 4, 5, 7, 14}, |
| {2, 4, 5, 7, 15}, |
| {2, 4, 5, 8, 10}, |
| {2, 4, 5, 8, 11}, |
| {2, 4, 5, 8, 12}, |
| {2, 4, 5, 8, 13}, |
| {2, 4, 5, 9, 10}, |
| {2, 4, 5, 9, 11}, |
| {2, 4, 5, 9, 12}, |
| {2, 4, 5, 9, 13}, |
| {2, 4, 5, 10, 14}, |
| {2, 4, 5, 10, 15}, |
| {2, 4, 5, 11, 14}, |
| {2, 4, 5, 11, 15}, |
| {2, 4, 5, 12, 14}, |
| {2, 4, 5, 12, 15}, |
| {2, 4, 5, 13, 14}, |
| {2, 4, 5, 13, 15}, |
| {2, 4, 6, 7, 8}, |
| {2, 4, 6, 7, 9}, |
| {2, 4, 6, 7, 10}, |
| {2, 4, 6, 7, 11}, |
| {2, 4, 6, 7, 12}, |
| {2, 4, 6, 7, 13}, |
| {2, 4, 6, 7, 14}, |
| {2, 4, 6, 7, 15}, |
| {2, 4, 6, 8, 9}, |
| {2, 4, 6, 8, 11}, |
| {2, 4, 6, 8, 13}, |
| {2, 4, 6, 8, 15}, |
| {2, 4, 6, 9, 10}, |
| {2, 4, 6, 9, 12}, |
| {2, 4, 6, 9, 14}, |
| {2, 4, 6, 10, 11}, |
| {2, 4, 6, 10, 13}, |
| {2, 4, 6, 10, 15}, |
| {2, 4, 6, 11, 12}, |
| {2, 4, 6, 11, 14}, |
| {2, 4, 6, 12, 13}, |
| {2, 4, 6, 12, 15}, |
| {2, 4, 6, 13, 14}, |
| {2, 4, 6, 14, 15}, |
| {2, 4, 7, 8, 9}, |
| {2, 4, 7, 8, 10}, |
| {2, 4, 7, 8, 12}, |
| {2, 4, 7, 8, 15}, |
| {2, 4, 7, 9, 11}, |
| {2, 4, 7, 9, 13}, |
| {2, 4, 7, 9, 14}, |
| {2, 4, 7, 10, 11}, |
| {2, 4, 7, 10, 13}, |
| {2, 4, 7, 10, 14}, |
| {2, 4, 7, 11, 12}, |
| {2, 4, 7, 11, 15}, |
| {2, 4, 7, 12, 13}, |
| {2, 4, 7, 12, 14}, |

TABLE 15-continued

| |
|---|
| {2, 4, 7, 13, 15}, |
| {2, 4, 7, 14, 15}, |
| {2, 4, 8, 9, 10}, |
| {2, 4, 8, 9, 11}, |
| {2, 4, 8, 9, 12}, |
| {2, 4, 8, 9, 13}, |
| {2, 4, 8, 10, 11}, |
| {2, 4, 8, 10, 13}, |
| {2, 4, 8, 10, 15}, |
| {2, 4, 8, 11, 12}, |
| {2, 4, 8, 11, 15}, |
| {2, 4, 8, 12, 13}, |
| {2, 4, 8, 12, 15}, |
| {2, 4, 8, 13, 15}, |
| {2, 4, 9, 10, 11}, |
| {2, 4, 9, 10, 13}, |
| {2, 4, 9, 10, 14}, |
| {2, 4, 9, 11, 12}, |
| {2, 4, 9, 11, 14}, |
| {2, 4, 9, 12, 13}, |
| {2, 4, 9, 12, 14}, |
| {2, 4, 9, 13, 14}, |
| {2, 4, 10, 11, 14}, |
| {2, 4, 10, 11, 15}, |
| {2, 4, 10, 13, 14}, |
| {2, 4, 10, 13, 15}, |
| {2, 4, 10, 14, 15}, |
| {2, 4, 11, 12, 14}, |
| {2, 4, 11, 12, 15}, |
| {2, 4, 11, 14, 15}, |
| {2, 4, 12, 13, 14}, |
| {2, 4, 12, 13, 15}, |
| {2, 4, 12, 14, 15}, |
| {2, 4, 13, 14, 15}, |
| {2, 5, 6, 7, 8}, |
| {2, 5, 6, 7, 9}, |
| {2, 5, 6, 7, 10}, |
| {2, 5, 6, 7, 11}, |
| {2, 5, 6, 7, 12}, |
| {2, 5, 6, 7, 13}, |
| {2, 5, 6, 7, 14}, |
| {2, 5, 6, 7, 15}, |
| {2, 5, 6, 8, 9}, |
| {2, 5, 6, 8, 10}, |
| {2, 5, 6, 8, 13}, |
| {2, 5, 6, 8, 14}, |
| {2, 5, 6, 9, 11}, |
| {2, 5, 6, 9, 12}, |
| {2, 5, 6, 9, 15}, |
| {2, 5, 6, 10, 11}, |
| {2, 5, 6, 10, 12}, |
| {2, 5, 6, 10, 15}, |
| {2, 5, 6, 11, 13}, |
| {2, 5, 6, 11, 14}, |
| {2, 5, 6, 12, 13}, |
| {2, 5, 6, 12, 14}, |
| {2, 5, 6, 13, 15}, |
| {2, 5, 6, 14, 15}, |
| {2, 5, 7, 8, 9}, |
| {2, 5, 7, 8, 11}, |
| {2, 5, 7, 8, 12}, |
| {2, 5, 7, 8, 14}, |
| {2, 5, 7, 9, 10}, |
| {2, 5, 7, 9, 13}, |
| {2, 5, 7, 9, 15}, |
| {2, 5, 7, 10, 11}, |
| {2, 5, 7, 10, 12}, |
| {2, 5, 7, 10, 14}, |
| {2, 5, 7, 11, 13}, |
| {2, 5, 7, 11, 15}, |
| {2, 5, 7, 12, 13}, |
| {2, 5, 7, 12, 15}, |
| {2, 5, 7, 13, 14}, |
| {2, 5, 7, 14, 15}, |
| {2, 5, 8, 9, 10}, |
| {2, 5, 8, 9, 11}, |
| {2, 5, 8, 9, 12}, |
| {2, 5, 8, 9, 13}, |
| {2, 5, 8, 10, 11}, |

TABLE 15-continued

| |
|---|
| {2, 5, 8, 10, 12}, |
| {2, 5, 8, 10, 14}, |
| {2, 5, 8, 11, 13}, |
| {2, 5, 8, 11, 14}, |
| {2, 5, 8, 12, 13}, |
| {2, 5, 8, 12, 14}, |
| {2, 5, 8, 13, 14}, |
| {2, 5, 9, 10, 11}, |
| {2, 5, 9, 10, 12}, |
| {2, 5, 9, 10, 15}, |
| {2, 5, 9, 11, 13}, |
| {2, 5, 9, 11, 15}, |
| {2, 5, 9, 12, 13}, |
| {2, 5, 9, 12, 15}, |
| {2, 5, 9, 13, 15}, |
| {2, 5, 10, 11, 14}, |
| {2, 5, 10, 11, 15}, |
| {2, 5, 10, 12, 14}, |
| {2, 5, 10, 12, 15}, |
| {2, 5, 10, 14, 15}, |
| {2, 5, 11, 13, 14}, |
| {2, 5, 11, 13, 15}, |
| {2, 5, 11, 14, 15}, |
| {2, 5, 12, 13, 14}, |
| {2, 5, 12, 13, 15}, |
| {2, 5, 12, 14, 15}, |
| {2, 5, 13, 14, 15}, |
| {2, 6, 7, 8, 10}, |
| {2, 6, 7, 8, 11}, |
| {2, 6, 7, 8, 14}, |
| {2, 6, 7, 8, 15}, |
| {2, 6, 7, 9, 10}, |
| {2, 6, 7, 9, 11}, |
| {2, 6, 7, 9, 14}, |
| {2, 6, 7, 9, 15}, |
| {2, 6, 7, 10, 12}, |
| {2, 6, 7, 10, 13}, |
| {2, 6, 7, 11, 12}, |
| {2, 6, 7, 11, 13}, |
| {2, 6, 7, 12, 14}, |
| {2, 6, 7, 12, 15}, |
| {2, 6, 7, 13, 14}, |
| {2, 6, 7, 13, 15}, |
| {2, 6, 8, 9, 10}, |
| {2, 6, 8, 9, 11}, |
| {2, 6, 8, 9, 14}, |
| {2, 6, 8, 9, 15}, |
| {2, 6, 8, 10, 11}, |
| {2, 6, 8, 10, 13}, |
| {2, 6, 8, 10, 15}, |
| {2, 6, 8, 11, 13}, |
| {2, 6, 8, 11, 14}, |
| {2, 6, 8, 13, 14}, |
| {2, 6, 8, 13, 15}, |
| {2, 6, 8, 14, 15}, |
| {2, 6, 9, 10, 11}, |
| {2, 6, 9, 10, 12}, |
| {2, 6, 9, 10, 15}, |
| {2, 6, 9, 11, 12}, |
| {2, 6, 9, 11, 14}, |
| {2, 6, 9, 12, 14}, |
| {2, 6, 9, 12, 15}, |
| {2, 6, 9, 14, 15}, |
| {2, 6, 10, 11, 12}, |
| {2, 6, 10, 11, 13}, |
| {2, 6, 10, 12, 13}, |
| {2, 6, 10, 12, 15}, |
| {2, 6, 10, 13, 15}, |
| {2, 6, 11, 12, 13}, |
| {2, 6, 11, 12, 14}, |
| {2, 6, 11, 13, 14}, |
| {2, 6, 12, 13, 15}, |
| {2, 6, 12, 14, 15}, |
| {2, 6, 13, 14, 15}, |
| {2, 7, 8, 9, 10}, |
| {2, 7, 8, 9, 11}, |
| {2, 7, 8, 9, 14}, |
| {2, 7, 8, 9, 15}, |
| {2, 7, 8, 10, 11}, |

TABLE 15-continued

| |
|---|
| {2, 7, 8, 10, 12}, |
| {2, 7, 8, 10, 14}, |
| {2, 7, 8, 11, 12}, |
| {2, 7, 8, 11, 15}, |
| {2, 7, 8, 12, 14}, |
| {2, 7, 8, 12, 15}, |
| {2, 7, 8, 14, 15}, |
| {2, 7, 9, 10, 11}, |
| {2, 7, 9, 10, 13}, |
| {2, 7, 9, 10, 14}, |
| {2, 7, 9, 11, 13}, |
| {2, 7, 9, 11, 15}, |
| {2, 7, 9, 13, 14}, |
| {2, 7, 9, 13, 15}, |
| {2, 7, 9, 14, 15}, |
| {2, 7, 10, 11, 12}, |
| {2, 7, 10, 11, 13}, |
| {2, 7, 10, 12, 13}, |
| {2, 7, 10, 12, 14}, |
| {2, 7, 10, 13, 14}, |
| {2, 7, 11, 12, 13}, |
| {2, 7, 11, 12, 15}, |
| {2, 7, 11, 13, 15}, |
| {2, 7, 12, 13, 14}, |
| {2, 7, 12, 13, 15}, |
| {2, 7, 12, 14, 15}, |
| {2, 7, 13, 14, 15}, |
| {2, 8, 9, 10, 12}, |
| {2, 8, 9, 10, 13}, |
| {2, 8, 9, 10, 14}, |
| {2, 8, 9, 10, 15}, |
| {2, 8, 9, 11, 12}, |
| {2, 8, 9, 11, 13}, |
| {2, 8, 9, 11, 14}, |
| {2, 8, 9, 11, 15}, |
| {2, 8, 9, 12, 14}, |
| {2, 8, 9, 12, 15}, |
| {2, 8, 9, 13, 14}, |
| {2, 8, 9, 13, 15}, |
| {2, 8, 10, 11, 12}, |
| {2, 8, 10, 11, 13}, |
| {2, 8, 10, 11, 14}, |
| {2, 8, 10, 11, 15}, |
| {2, 8, 10, 12, 13}, |
| {2, 8, 10, 12, 15}, |
| {2, 8, 10, 13, 14}, |
| {2, 8, 10, 14, 15}, |
| {2, 8, 11, 12, 13}, |
| {2, 8, 11, 12, 14}, |
| {2, 8, 11, 13, 15}, |
| {2, 8, 11, 14, 15}, |
| {2, 8, 12, 13, 14}, |
| {2, 8, 12, 13, 15}, |
| {2, 8, 12, 14, 15}, |
| {2, 8, 13, 14, 15}, |
| {2, 9, 10, 11, 12}, |
| {2, 9, 10, 11, 13}, |
| {2, 9, 10, 11, 14}, |
| {2, 9, 10, 11, 15}, |
| {2, 9, 10, 12, 13}, |
| {2, 9, 10, 12, 14}, |
| {2, 9, 10, 13, 15}, |
| {2, 9, 10, 14, 15}, |
| {2, 9, 11, 12, 13}, |
| {2, 9, 11, 12, 15}, |
| {2, 9, 11, 13, 14}, |
| {2, 9, 11, 14, 15}, |
| {2, 9, 12, 13, 14}, |
| {2, 9, 12, 13, 15}, |
| {2, 9, 12, 14, 15}, |
| {2, 9, 13, 14, 15}, |
| {2, 10, 11, 12, 14}, |
| {2, 10, 11, 12, 15}, |
| {2, 10, 11, 13, 14}, |
| {2, 10, 11, 13, 15}, |
| {2, 10, 12, 13, 14}, |
| {2, 10, 12, 13, 15}, |

TABLE 16

| |
|---|
| {2, 10, 12, 14, 15}, |
| {2, 10, 13, 14, 15}, |
| {2, 11, 12, 13, 14}, |
| {2, 11, 12, 13, 15}, |
| {2, 11, 12, 14, 15}, |
| {2, 11, 13, 14, 15}, |
| {3, 4, 5, 6, 8}, |
| {3, 4, 5, 6, 9}, |
| {3, 4, 5, 6, 10}, |
| {3, 4, 5, 6, 11}, |
| {3, 4, 5, 6, 12}, |
| {3, 4, 5, 6, 13}, |
| {3, 4, 5, 6, 14}, |
| {3, 4, 5, 6, 15}, |
| {3, 4, 5, 7, 8}, |
| {3, 4, 5, 7, 9}, |
| {3, 4, 5, 7, 10}, |
| {3, 4, 5, 7, 11}, |
| {3, 4, 5, 7, 12}, |
| {3, 4, 5, 7, 13}, |
| {3, 4, 5, 7, 14}, |
| {3, 4, 5, 7, 15}, |
| {3, 4, 5, 8, 10}, |
| {3, 4, 5, 8, 11}, |
| {3, 4, 5, 8, 12}, |
| {3, 4, 5, 8, 13}, |
| {3, 4, 5, 9, 10}, |
| {3, 4, 5, 9, 11}, |
| {3, 4, 5, 9, 12}, |
| {3, 4, 5, 9, 13}, |
| {3, 4, 5, 10, 14}, |
| {3, 4, 5, 10, 15}, |
| {3, 4, 5, 11, 14}, |
| {3, 4, 5, 11, 15}, |
| {3, 4, 5, 12, 14}, |
| {3, 4, 5, 12, 15}, |
| {3, 4, 5, 13, 14}, |
| {3, 4, 5, 13, 15}, |
| {3, 4, 6, 7, 8}, |
| {3, 4, 6, 7, 9}, |
| {3, 4, 6, 7, 10}, |
| {3, 4, 6, 7, 11}, |
| {3, 4, 6, 7, 12}, |
| {3, 4, 6, 7, 13}, |
| {3, 4, 6, 7, 14}, |
| {3, 4, 6, 7, 15}, |
| {3, 4, 6, 8, 9}, |
| {3, 4, 6, 8, 11}, |
| {3, 4, 6, 8, 12}, |
| {3, 4, 6, 8, 14}, |
| {3, 4, 6, 9, 10}, |
| {3, 4, 6, 9, 13}, |
| {3, 4, 6, 9, 15}, |
| {3, 4, 6, 10, 11}, |
| {3, 4, 6, 10, 12}, |
| {3, 4, 6, 10, 14}, |
| {3, 4, 6, 11, 13}, |
| {3, 4, 6, 11, 15}, |
| {3, 4, 6, 12, 13}, |
| {3, 4, 6, 12, 15}, |
| {3, 4, 6, 13, 14}, |
| {3, 4, 6, 14, 15}, |
| {3, 4, 7, 8, 9}, |
| {3, 4, 7, 8, 10}, |
| {3, 4, 7, 8, 13}, |
| {3, 4, 7, 8, 14}, |
| {3, 4, 7, 9, 11}, |
| {3, 4, 7, 9, 12}, |
| {3, 4, 7, 9, 15}, |
| {3, 4, 7, 10, 11}, |
| {3, 4, 7, 10, 12}, |
| {3, 4, 7, 10, 15}, |
| {3, 4, 7, 11, 13}, |
| {3, 4, 7, 11, 14}, |
| {3, 4, 7, 12, 13}, |
| {3, 4, 7, 12, 14}, |
| {3, 4, 7, 13, 15}, |
| {3, 4, 7, 14, 15}, |
| {3, 4, 8, 9, 10}, |

TABLE 16-continued

| |
|---|
| {3, 4, 8, 9, 11}, |
| {3, 4, 8, 9, 12}, |
| {3, 4, 8, 9, 13}, |
| {3, 4, 8, 10, 11}, |
| {3, 4, 8, 10, 12}, |
| {3, 4, 8, 10, 14}, |
| {3, 4, 8, 11, 13}, |
| {3, 4, 8, 11, 14}, |
| {3, 4, 8, 12, 13}, |
| {3, 4, 8, 12, 14}, |
| {3, 4, 8, 13, 14}, |
| {3, 4, 9, 10, 11}, |
| {3, 4, 9, 10, 12}, |
| {3, 4, 9, 10, 15}, |
| {3, 4, 9, 11, 13}, |
| {3, 4, 9, 11, 15}, |
| {3, 4, 9, 12, 13}, |
| {3, 4, 9, 12, 15}, |
| {3, 4, 9, 13, 15}, |
| {3, 4, 10, 11, 14}, |
| {3, 4, 10, 11, 15}, |
| {3, 4, 10, 12, 14}, |
| {3, 4, 10, 12, 15}, |
| {3, 4, 10, 14, 15}, |
| {3, 4, 11, 13, 14}, |
| {3, 4, 11, 13, 15}, |
| {3, 4, 11, 14, 15}, |
| {3, 4, 12, 13, 14}, |
| {3, 4, 12, 13, 15}, |
| {3, 4, 12, 14, 15}, |
| {3, 4, 13, 14, 15}, |
| {3, 5, 6, 7, 8}, |
| {3, 5, 6, 7, 9}, |
| {3, 5, 6, 7, 10}, |
| {3, 5, 6, 7, 11}, |
| {3, 5, 6, 7, 12}, |
| {3, 5, 6, 7, 13}, |
| {3, 5, 6, 7, 14}, |
| {3, 5, 6, 7, 15}, |
| {3, 5, 6, 8, 9}, |
| {3, 5, 6, 8, 10}, |
| {3, 5, 6, 8, 12}, |
| {3, 5, 6, 8, 15}, |
| {3, 5, 6, 9, 11}, |
| {3, 5, 6, 9, 13}, |
| {3, 5, 6, 9, 14}, |
| {3, 5, 6, 10, 11}, |
| {3, 5, 6, 10, 13}, |
| {3, 5, 6, 10, 14}, |
| {3, 5, 6, 11, 12}, |
| {3, 5, 6, 11, 15}, |
| {3, 5, 6, 12, 13}, |
| {3, 5, 6, 12, 14}, |
| {3, 5, 6, 13, 15}, |
| {3, 5, 6, 14, 15}, |
| {3, 5, 7, 8, 9}, |
| {3, 5, 7, 8, 11}, |
| {3, 5, 7, 8, 13}, |
| {3, 5, 7, 8, 15}, |
| {3, 5, 7, 9, 10}, |
| {3, 5, 7, 9, 12}, |
| {3, 5, 7, 9, 14}, |
| {3, 5, 7, 10, 11}, |
| {3, 5, 7, 10, 13}, |
| {3, 5, 7, 10, 15}, |
| {3, 5, 7, 11, 12}, |
| {3, 5, 7, 11, 14}, |
| {3, 5, 7, 12, 13}, |
| {3, 5, 7, 12, 15}, |
| {3, 5, 7, 13, 14}, |
| {3, 5, 7, 14, 15}, |
| {3, 5, 8, 9, 10}, |
| {3, 5, 8, 9, 11}, |
| {3, 5, 8, 9, 12}, |
| {3, 5, 8, 9, 13}, |
| {3, 5, 8, 10, 11}, |
| {3, 5, 8, 10, 13}, |
| {3, 5, 8, 10, 15}, |
| {3, 5, 8, 11, 12}, |

TABLE 16-continued

| |
|---|
| {3, 5, 8, 11, 15}, |
| {3, 5, 8, 12, 13}, |
| {3, 5, 8, 12, 15}, |
| {3, 5, 8, 13, 15}, |
| {3, 5, 9, 10, 11}, |
| {3, 5, 9, 10, 13}, |
| {3, 5, 9, 10, 14}, |
| {3, 5, 9, 11, 12}, |
| {3, 5, 9, 11, 14}, |
| {3, 5, 9, 12, 13}, |
| {3, 5, 9, 12, 14}, |
| {3, 5, 9, 13, 14}, |
| {3, 5, 10, 11, 14}, |
| {3, 5, 10, 11, 15}, |
| {3, 5, 10, 13, 14}, |
| {3, 5, 10, 13, 15}, |
| {3, 5, 10, 14, 15}, |
| {3, 5, 11, 12, 14}, |
| {3, 5, 11, 12, 15}, |
| {3, 5, 11, 14, 15}, |
| {3, 5, 12, 13, 14}, |
| {3, 5, 12, 13, 15}, |
| {3, 5, 12, 14, 15}, |
| {3, 5, 13, 14, 15}, |
| {3, 6, 7, 8, 10}, |
| {3, 6, 7, 8, 11}, |
| {3, 6, 7, 8, 14}, |
| {3, 6, 7, 8, 15}, |
| {3, 6, 7, 9, 10}, |
| {3, 6, 7, 9, 11}, |
| {3, 6, 7, 9, 14}, |
| {3, 6, 7, 9, 15}, |
| {3, 6, 7, 10, 12}, |
| {3, 6, 7, 10, 13}, |
| {3, 6, 7, 11, 12}, |
| {3, 6, 7, 11, 13}, |
| {3, 6, 7, 12, 14}, |
| {3, 6, 7, 12, 15}, |
| {3, 6, 7, 13, 14}, |
| {3, 6, 7, 13, 15}, |
| {3, 6, 8, 9, 10}, |
| {3, 6, 8, 9, 11}, |
| {3, 6, 8, 9, 14}, |
| {3, 6, 8, 9, 15}, |
| {3, 6, 8, 10, 11}, |
| {3, 6, 8, 10, 12}, |
| {3, 6, 8, 10, 14}, |
| {3, 6, 8, 11, 12}, |
| {3, 6, 8, 11, 15}, |
| {3, 6, 8, 12, 14}, |
| {3, 6, 8, 12, 15}, |
| {3, 6, 8, 14, 15}, |
| {3, 6, 9, 10, 11}, |
| {3, 6, 9, 10, 13}, |
| {3, 6, 9, 10, 14}, |
| {3, 6, 9, 11, 13}, |
| {3, 6, 9, 11, 15}, |
| {3, 6, 9, 13, 14}, |
| {3, 6, 9, 13, 15}, |
| {3, 6, 9, 14, 15}, |
| {3, 6, 10, 11, 12}, |
| {3, 6, 10, 11, 13}, |
| {3, 6, 10, 12, 13}, |
| {3, 6, 10, 12, 14}, |
| {3, 6, 10, 13, 14}, |
| {3, 6, 11, 12, 13}, |
| {3, 6, 11, 12, 15}, |
| {3, 6, 11, 13, 15}, |
| {3, 6, 12, 13, 14}, |
| {3, 6, 12, 13, 15}, |
| {3, 6, 12, 14, 15}, |
| {3, 6, 13, 14, 15}, |
| {3, 7, 8, 9, 10}, |
| {3, 7, 8, 9, 11}, |
| {3, 7, 8, 9, 14}, |
| {3, 7, 8, 9, 15}, |
| {3, 7, 8, 10, 11}, |
| {3, 7, 8, 10, 13}, |
| {3, 7, 8, 10, 15}, |

TABLE 16-continued

| |
|---|
| {3, 7, 8, 11, 13}, |
| {3, 7, 8, 11, 14}, |
| {3, 7, 8, 13, 14}, |
| {3, 7, 8, 13, 15}, |
| {3, 7, 8, 14, 15}, |
| {3, 7, 9, 10, 11}, |
| {3, 7, 9, 10, 12}, |
| {3, 7, 9, 10, 15}, |
| {3, 7, 9, 11, 12}, |
| {3, 7, 9, 11, 14}, |
| {3, 7, 9, 12, 14}, |
| {3, 7, 9, 12, 15}, |
| {3, 7, 9, 14, 15}, |
| {3, 7, 10, 11, 12}, |
| {3, 7, 10, 11, 13}, |
| {3, 7, 10, 12, 13}, |
| {3, 7, 10, 12, 15}, |
| {3, 7, 10, 13, 15}, |
| {3, 7, 11, 12, 13}, |
| {3, 7, 11, 12, 14}, |
| {3, 7, 11, 13, 14}, |
| {3, 7, 12, 13, 14}, |
| {3, 7, 12, 13, 15}, |
| {3, 7, 12, 14, 15}, |
| {3, 7, 13, 14, 15}, |
| {3, 8, 9, 10, 12}, |
| {3, 8, 9, 10, 13}, |
| {3, 8, 9, 10, 14}, |
| {3, 8, 9, 10, 15}, |
| {3, 8, 9, 11, 12}, |
| {3, 8, 9, 11, 13}, |
| {3, 8, 9, 11, 14}, |
| {3, 8, 9, 11, 15}, |
| {3, 8, 9, 12, 14}, |
| {3, 8, 9, 12, 15}, |
| {3, 8, 9, 13, 14}, |
| {3, 8, 9, 13, 15}, |
| {3, 8, 10, 11, 12}, |
| {3, 8, 10, 11, 13}, |
| {3, 8, 10, 11, 14}, |
| {3, 8, 10, 11, 15}, |
| {3, 8, 10, 12, 13}, |
| {3, 8, 10, 12, 15}, |
| {3, 8, 10, 13, 14}, |
| {3, 8, 10, 14, 15}, |
| {3, 8, 11, 12, 13}, |
| {3, 8, 11, 12, 14}, |
| {3, 8, 11, 13, 15}, |
| {3, 8, 11, 14, 15}, |
| {3, 8, 12, 13, 14}, |
| {3, 8, 12, 13, 15}, |
| {3, 8, 12, 14, 15}, |
| {3, 8, 13, 14, 15}, |
| {3, 9, 10, 11, 12}, |
| {3, 9, 10, 11, 13}, |
| {3, 9, 10, 11, 14}, |
| {3, 9, 10, 11, 15}, |
| {3, 9, 10, 12, 13}, |
| {3, 9, 10, 12, 14}, |
| {3, 9, 10, 13, 15}, |
| {3, 9, 10, 14, 15}, |
| {3, 9, 11, 12, 13}, |
| {3, 9, 11, 12, 15}, |
| {3, 9, 11, 13, 14}, |
| {3, 9, 11, 14, 15}, |
| {3, 9, 12, 13, 14}, |
| {3, 9, 12, 13, 15}, |
| {3, 9, 12, 14, 15}, |
| {3, 9, 13, 14, 15}, |
| {3, 10, 11, 12, 14}, |
| {3, 10, 11, 12, 15}, |
| {3, 10, 11, 13, 14}, |
| {3, 10, 11, 13, 15}, |
| {3, 10, 12, 13, 14}, |
| {3, 10, 12, 13, 15}, |
| {3, 10, 12, 14, 15}, |
| {3, 10, 13, 14, 15}, |
| {3, 11, 12, 13, 14}, |

TABLE 17

| |
|---|
| {3, 11, 12, 13, 15}, |
| {3, 11, 12, 14, 15}, |
| {3, 11, 13, 14, 15}, |
| {4, 5, 6, 8, 12}, |
| {4, 5, 6, 8, 13}, |
| {4, 5, 6, 8, 14}, |
| {4, 5, 6, 8, 15}, |
| {4, 5, 6, 9, 12}, |
| {4, 5, 6, 9, 13}, |
| {4, 5, 6, 9, 14}, |
| {4, 5, 6, 9, 15}, |
| {4, 5, 6, 10, 12}, |
| {4, 5, 6, 10, 13}, |
| {4, 5, 6, 10, 14}, |
| {4, 5, 6, 10, 15}, |
| {4, 5, 6, 11, 12}, |
| {4, 5, 6, 11, 13}, |
| {4, 5, 6, 11, 14}, |
| {4, 5, 6, 11, 15}, |
| {4, 5, 7, 8, 12}, |
| {4, 5, 7, 8, 13}, |
| {4, 5, 7, 8, 14}, |
| {4, 5, 7, 8, 15}, |
| {4, 5, 7, 9, 12}, |
| {4, 5, 7, 9, 13}, |
| {4, 5, 7, 9, 14}, |
| {4, 5, 7, 9, 15}, |
| {4, 5, 7, 10, 12}, |
| {4, 5, 7, 10, 13}, |
| {4, 5, 7, 10, 14}, |
| {4, 5, 7, 10, 15}, |
| {4, 5, 7, 11, 12}, |
| {4, 5, 7, 11, 13}, |
| {4, 5, 7, 11, 14}, |
| {4, 5, 7, 11, 15}, |
| {4, 5, 8, 10, 12}, |
| {4, 5, 8, 10, 13}, |
| {4, 5, 8, 10, 14}, |
| {4, 5, 8, 10, 15}, |
| {4, 5, 8, 11, 12}, |
| {4, 5, 8, 11, 13}, |
| {4, 5, 8, 11, 14}, |
| {4, 5, 8, 11, 15}, |
| {4, 5, 8, 12, 14}, |
| {4, 5, 8, 12, 15}, |
| {4, 5, 8, 13, 14}, |
| {4, 5, 8, 13, 15}, |
| {4, 5, 9, 10, 12}, |
| {4, 5, 9, 10, 13}, |
| {4, 5, 9, 10, 14}, |
| {4, 5, 9, 10, 15}, |
| {4, 5, 9, 11, 12}, |
| {4, 5, 9, 11, 13}, |
| {4, 5, 9, 11, 14}, |
| {4, 5, 9, 11, 15}, |
| {4, 5, 9, 12, 14}, |
| {4, 5, 9, 12, 15}, |
| {4, 5, 9, 13, 14}, |
| {4, 5, 9, 13, 15}, |
| {4, 5, 10, 12, 14}, |
| {4, 5, 10, 12, 15}, |
| {4, 5, 10, 13, 14}, |
| {4, 5, 10, 13, 15}, |
| {4, 5, 11, 12, 14}, |
| {4, 5, 11, 12, 15}, |
| {4, 5, 11, 13, 14}, |
| {4, 5, 11, 13, 15}, |
| {4, 6, 7, 8, 12}, |
| {4, 6, 7, 8, 13}, |
| {4, 6, 7, 8, 14}, |
| {4, 6, 7, 8, 15}, |
| {4, 6, 7, 9, 12}, |
| {4, 6, 7, 9, 13}, |
| {4, 6, 7, 9, 14}, |
| {4, 6, 7, 9, 15}, |
| {4, 6, 7, 10, 12}, |
| {4, 6, 7, 10, 13}, |
| {4, 6, 7, 10, 14}, |
| {4, 6, 7, 10, 15}, |

TABLE 17-continued

| |
|---|
| {4, 6, 7, 11, 12}, |
| {4, 6, 7, 11, 13}, |
| {4, 6, 7, 11, 14}, |
| {4, 6, 7, 11, 15}, |
| {4, 6, 8, 9, 12}, |
| {4, 6, 8, 9, 13}, |
| {4, 6, 8, 9, 14}, |
| {4, 6, 8, 9, 15}, |
| {4, 6, 8, 11, 12}, |
| {4, 6, 8, 11, 13}, |
| {4, 6, 8, 11, 14}, |
| {4, 6, 8, 11, 15}, |
| {4, 6, 8, 12, 13}, |
| {4, 6, 8, 12, 15}, |
| {4, 6, 8, 13, 14}, |
| {4, 6, 8, 14, 15}, |
| {4, 6, 9, 10, 12}, |
| {4, 6, 9, 10, 13}, |
| {4, 6, 9, 10, 14}, |
| {4, 6, 9, 10, 15}, |
| {4, 6, 9, 12, 13}, |
| {4, 6, 9, 12, 15}, |
| {4, 6, 9, 13, 14}, |
| {4, 6, 9, 14, 15}, |
| {4, 6, 10, 11, 12}, |
| {4, 6, 10, 11, 13}, |
| {4, 6, 10, 11, 14}, |
| {4, 6, 10, 11, 15}, |
| {4, 6, 10, 12, 13}, |
| {4, 6, 10, 12, 15}, |
| {4, 6, 10, 13, 14}, |
| {4, 6, 10, 14, 15}, |
| {4, 6, 11, 12, 13}, |
| {4, 6, 11, 12, 15}, |
| {4, 6, 11, 13, 14}, |
| {4, 6, 11, 14, 15}, |
| {4, 7, 8, 9, 12}, |
| {4, 7, 8, 9, 13}, |
| {4, 7, 8, 9, 14}, |
| {4, 7, 8, 9, 15}, |
| {4, 7, 8, 10, 12}, |
| {4, 7, 8, 10, 13}, |
| {4, 7, 8, 10, 14}, |
| {4, 7, 8, 10, 15}, |
| {4, 7, 8, 12, 13}, |
| {4, 7, 8, 12, 14}, |
| {4, 7, 8, 13, 15}, |
| {4, 7, 8, 14, 15}, |
| {4, 7, 9, 11, 12}, |
| {4, 7, 9, 11, 13}, |
| {4, 7, 9, 11, 14}, |
| {4, 7, 9, 11, 15}, |
| {4, 7, 9, 12, 13}, |
| {4, 7, 9, 12, 14}, |
| {4, 7, 9, 13, 15}, |
| {4, 7, 9, 14, 15}, |
| {4, 7, 10, 11, 12}, |
| {4, 7, 10, 11, 13}, |
| {4, 7, 10, 11, 14}, |
| {4, 7, 10, 11, 15}, |
| {4, 7, 10, 12, 13}, |
| {4, 7, 10, 12, 14}, |
| {4, 7, 10, 13, 15}, |
| {4, 7, 10, 14, 15}, |
| {4, 7, 11, 12, 13}, |
| {4, 7, 11, 12, 14}, |
| {4, 7, 11, 13, 15}, |
| {4, 7, 11, 14, 15}, |
| {4, 8, 9, 10, 12}, |
| {4, 8, 9, 10, 13}, |
| {4, 8, 9, 10, 14}, |
| {4, 8, 9, 10, 15}, |
| {4, 8, 9, 11, 12}, |
| {4, 8, 9, 11, 13}, |
| {4, 8, 9, 11, 14}, |
| {4, 8, 9, 11, 15}, |
| {4, 8, 9, 12, 14}, |
| {4, 8, 9, 12, 15}, |
| {4, 8, 9, 13, 14}, |

TABLE 17-continued

| |
|---|
| {4, 8, 9, 13, 15}, |
| {4, 8, 10, 11, 12}, |
| {4, 8, 10, 11, 13}, |
| {4, 8, 10, 11, 14}, |
| {4, 8, 10, 11, 15}, |
| {4, 8, 10, 12, 13}, |
| {4, 8, 10, 12, 15}, |
| {4, 8, 10, 13, 14}, |
| {4, 8, 10, 14, 15}, |
| {4, 8, 11, 12, 13}, |
| {4, 8, 11, 12, 14}, |
| {4, 8, 11, 13, 15}, |
| {4, 8, 11, 14, 15}, |
| {4, 8, 12, 13, 14}, |
| {4, 8, 12, 13, 15}, |
| {4, 8, 12, 14, 15}, |
| {4, 8, 13, 14, 15}, |
| {4, 9, 10, 11, 12}, |
| {4, 9, 10, 11, 13}, |
| {4, 9, 10, 11, 14}, |
| {4, 9, 10, 11, 15}, |
| {4, 9, 10, 12, 13}, |
| {4, 9, 10, 12, 14}, |
| {4, 9, 10, 13, 15}, |
| {4, 9, 10, 14, 15}, |
| {4, 9, 11, 12, 13}, |
| {4, 9, 11, 12, 15}, |
| {4, 9, 11, 13, 14}, |
| {4, 9, 11, 14, 15}, |
| {4, 9, 12, 13, 14}, |
| {4, 9, 12, 13, 15}, |
| {4, 9, 12, 14, 15}, |
| {4, 9, 13, 14, 15}, |
| {4, 10, 11, 12, 14}, |
| {4, 10, 11, 12, 15}, |
| {4, 10, 11, 13, 14}, |
| {4, 10, 11, 13, 15}, |
| {4, 10, 12, 13, 14}, |
| {4, 10, 12, 13, 15}, |
| {4, 10, 12, 14, 15}, |
| {4, 10, 13, 14, 15}, |
| {4, 11, 12, 13, 14}, |
| {4, 11, 12, 13, 15}, |
| {4, 11, 12, 14, 15}, |
| {4, 11, 13, 14, 15}, |
| {5, 6, 7, 8, 12}, |
| {5, 6, 7, 8, 13}, |
| {5, 6, 7, 8, 14}, |
| {5, 6, 7, 8, 15}, |
| {5, 6, 7, 9, 12}, |
| {5, 6, 7, 9, 13}, |
| {5, 6, 7, 9, 14}, |
| {5, 6, 7, 9, 15}, |
| {5, 6, 7, 10, 12}, |
| {5, 6, 7, 10, 13}, |
| {5, 6, 7, 10, 14}, |
| {5, 6, 7, 10, 15}, |
| {5, 6, 7, 11, 12}, |
| {5, 6, 7, 11, 13}, |
| {5, 6, 7, 11, 14}, |
| {5, 6, 7, 11, 15}, |
| {5, 6, 8, 9, 12}, |
| {5, 6, 8, 9, 13}, |
| {5, 6, 8, 9, 14}, |
| {5, 6, 8, 9, 15}, |
| {5, 6, 8, 10, 12}, |
| {5, 6, 8, 10, 13}, |
| {5, 6, 8, 10, 14}, |
| {5, 6, 8, 10, 15}, |
| {5, 6, 8, 12, 13}, |
| {5, 6, 8, 12, 14}, |
| {5, 6, 8, 13, 15}, |
| {5, 6, 8, 14, 15}, |
| {5, 6, 9, 11, 12}, |
| {5, 6, 9, 11, 13}, |
| {5, 6, 9, 11, 14}, |
| {5, 6, 9, 11, 15}, |
| {5, 6, 9, 12, 13}, |
| {5, 6, 9, 12, 14}, |

TABLE 17-continued

| |
|---|
| {5, 6, 9, 13, 15}, |
| {5, 6, 9, 14, 15}, |
| {5, 6, 10, 11, 12}, |
| {5, 6, 10, 11, 13}, |
| {5, 6, 10, 11, 14}, |
| {5, 6, 10, 11, 15}, |
| {5, 6, 10, 12, 13}, |
| {5, 6, 10, 12, 14}, |
| {5, 6, 10, 13, 15}, |
| {5, 6, 10, 14, 15}, |
| {5, 6, 11, 12, 13}, |
| {5, 6, 11, 12, 14}, |
| {5, 6, 11, 13, 15}, |
| {5, 6, 11, 14, 15}, |
| {5, 7, 8, 9, 12}, |
| {5, 7, 8, 9, 13}, |
| {5, 7, 8, 9, 14}, |
| {5, 7, 8, 9, 15}, |
| {5, 7, 8, 11, 12}, |
| {5, 7, 8, 11, 13}, |
| {5, 7, 8, 11, 14}, |
| {5, 7, 8, 11, 15}, |
| {5, 7, 8, 12, 13}, |
| {5, 7, 8, 12, 15}, |
| {5, 7, 8, 13, 14}, |
| {5, 7, 8, 14, 15}, |
| {5, 7, 9, 10, 12}, |
| {5, 7, 9, 10, 13}, |
| {5, 7, 9, 10, 14}, |
| {5, 7, 9, 10, 15}, |
| {5, 7, 9, 12, 13}, |
| {5, 7, 9, 12, 15}, |
| {5, 7, 9, 13, 14}, |
| {5, 7, 9, 14, 15}, |
| {5, 7, 10, 11, 12}, |
| {5, 7, 10, 11, 13}, |
| {5, 7, 10, 11, 14}, |
| {5, 7, 10, 11, 15}, |
| {5, 7, 10, 12, 13}, |
| {5, 7, 10, 12, 15}, |
| {5, 7, 10, 13, 14}, |
| {5, 7, 10, 14, 15}, |
| {5, 7, 11, 12, 13}, |
| {5, 7, 11, 12, 15}, |
| {5, 7, 11, 13, 14}, |
| {5, 7, 11, 14, 15}, |
| {5, 8, 9, 10, 12}, |

TABLE 17-continued

| |
|---|
| {5, 8, 9, 10, 13}, |
| {5, 8, 9, 10, 14}, |
| {5, 8, 9, 10, 15}, |
| {5, 8, 9, 11, 12}, |
| {5, 8, 9, 11, 13}, |
| {5, 8, 9, 11, 14}, |
| {5, 8, 9, 11, 15}, |
| {5, 8, 9, 12, 14}, |
| {5, 8, 9, 12, 15}, |
| {5, 8, 9, 13, 14}, |
| {5, 8, 9, 13, 15}, |
| {5, 8, 10, 11, 12}, |
| {5, 8, 10, 11, 13}, |
| {5, 8, 10, 11, 14}, |
| {5, 8, 10, 11, 15}, |
| {5, 8, 10, 12, 13}, |
| {5, 8, 10, 12, 15}, |
| {5, 8, 10, 13, 14}, |
| {5, 8, 10, 14, 15}, |
| {5, 8, 11, 12, 13}, |
| {5, 8, 11, 12, 14}, |
| {5, 8, 11, 13, 15}, |
| {5, 8, 11, 14, 15}, |
| {5, 8, 12, 13, 14}, |
| {5, 8, 12, 13, 15}, |
| {5, 8, 12, 14, 15}, |
| {5, 8, 13, 14, 15}, |
| {5, 9, 10, 11, 12}, |
| {5, 9, 10, 11, 13}, |
| {5, 9, 10, 11, 14}, |
| {5, 9, 10, 11, 15}, |

TABLE 18

| | | | |
|---|---|---|---|
| {5, 9, 10, 12, 13}, | {6, 7, 9, 12, 15}, | {6, 9, 10, 13, 15}, | {7, 8, 11, 14, 15}, |
| {5, 9, 10, 12, 14}, | {6, 7, 9, 13, 14}, | {6, 9, 10, 14, 15}, | {7, 8, 12, 13, 14}, |
| {5, 9, 10, 13, 15}, | {6, 7, 9, 13, 15}, | {6, 9, 11, 12, 13}, | {7, 8, 12, 13, 15}, |
| {5, 9, 10, 14, 15}, | {6, 7, 10, 12, 14}, | {6, 9, 11, 12, 15}, | {7, 8, 12, 14, 15}, |
| {5, 9, 11, 12, 13}, | {6, 7, 10, 12, 15}, | {6, 9, 11, 13, 14}, | {7, 8, 13, 14, 15}, |
| {5, 9, 11, 12, 15}, | {6, 7, 10, 13, 14}, | {6, 9, 11, 14, 15}, | {7, 9, 10, 11, 12}, |
| {5, 9, 11, 13, 14}, | {6, 7, 10, 13, 15}, | {6, 9, 12, 13, 14}, | {7, 9, 10, 11, 13}, |
| {5, 9, 11, 14, 15}, | {6, 7, 11, 12, 14}, | {6, 9, 12, 13, 15}, | {7, 9, 10, 11, 14}, |
| {5, 9, 12, 13, 14}, | {6, 7, 11, 12, 15}, | {6, 9, 12, 14, 15}, | {7, 9, 10, 11, 15}, |
| {5, 9, 12, 13, 15}, | {6, 7, 11, 13, 14}, | {6, 9, 13, 14, 15}, | {7, 9, 10, 12, 13}, |
| {5, 9, 12, 14, 15}, | {6, 7, 11, 13, 15}, | {6, 10, 11, 12, 14}, | {7, 9, 10, 12, 14}, |
| {5, 9, 13, 14, 15}, | {6, 8, 9, 10, 12}, | {6, 10, 11, 12, 15}, | {7, 9, 10, 13, 15}, |
| {5, 10, 11, 12, 14}, | {6, 8, 9, 10, 13}, | {6, 10, 11, 13, 14}, | {7, 9, 10, 14, 15}, |
| {5, 10, 11, 12, 15}, | {6, 8, 9, 10, 14}, | {6, 10, 11, 13, 15}, | {7, 9, 11, 12, 13}, |
| {5, 10, 11, 13, 14}, | {6, 8, 9, 10, 15}, | {6, 10, 12, 13, 14}, | {7, 9, 11, 12, 15}, |
| {5, 10, 11, 13, 15}, | {6, 8, 9, 11, 12}, | {6, 10, 12, 13, 15}, | {7, 9, 11, 13, 14}, |
| {5, 10, 12, 13, 14}, | {6, 8, 9, 11, 13}, | {6, 10, 12, 14, 15}, | {7, 9, 11, 14, 15}, |
| {5, 10, 12, 13, 15}, | {6, 8, 9, 11, 14}, | {6, 10, 13, 14, 15}, | {7, 9, 12, 13, 14}, |
| {5, 10, 12, 14, 15}, | {6, 8, 9, 11, 15}, | {6, 11, 12, 13, 14}, | {7, 9, 12, 13, 15}, |
| {5, 10, 13, 14, 15}, | {6, 8, 9, 12, 14}, | {6, 11, 12, 13, 15}, | {7, 9, 12, 14, 15}, |
| {5, 11, 12, 13, 14}, | {6, 8, 9, 12, 15}, | {6, 11, 12, 14, 15}, | {7, 9, 13, 14, 15}, |
| {5, 11, 12, 13, 15}, | {6, 8, 9, 13, 14}, | {6, 11, 13, 14, 15}, | {7, 10, 11, 12, 14}, |
| {5, 11, 12, 14, 15}, | {6, 8, 9, 13, 15}, | {7, 8, 9, 10, 12}, | {7, 10, 11, 12, 15}, |
| {5, 11, 13, 14, 15}, | {6, 8, 10, 11, 12}, | {7, 8, 9, 10, 13}, | {7, 10, 11, 13, 14}, |
| {6, 7, 8, 10, 12}, | {6, 8, 10, 11, 13}, | {7, 8, 9, 10, 14}, | {7, 10, 11, 13, 15}, |
| {6, 7, 8, 10, 13}, | {6, 8, 10, 11, 14}, | {7, 8, 9, 10, 15}, | {7, 10, 12, 13, 14}, |

TABLE 18-continued

| | | | |
|---|---|---|---|
| {6, 7, 8, 10, 14}, | {6, 8, 10, 11, 15}, | {7, 8, 9, 11, 12}, | {7, 10, 12, 13, 15}, |
| {6, 7, 8, 10, 15}, | {6, 8, 10, 12, 13}, | {7, 8, 9, 11, 13}, | {7, 10, 12, 14, 15}, |
| {6, 7, 8, 11, 12}, | {6, 8, 10, 12, 15}, | {7, 8, 9, 11, 14}, | {7, 10, 13, 14, 15}, |
| {6, 7, 8, 11, 13}, | {6, 8, 10, 13, 14}, | {7, 8, 9, 11, 15}, | {7, 11, 12, 13, 14}, |
| {6, 7, 8, 11, 14}, | {6, 8, 10, 14, 15}, | {7, 8, 9, 12, 14}, | {7, 11, 12, 13, 15}, |
| {6, 7, 8, 11, 15}, | {6, 8, 11, 12, 13}, | {7, 8, 9, 12, 15}, | {7, 11, 12, 14, 15}, |
| {6, 7, 8, 12, 14}, | {6, 8, 11, 12, 14}, | {7, 8, 9, 13, 14}, | {7, 11, 13, 14, 15} |
| {6, 7, 8, 12, 15}, | {6, 8, 11, 13, 15}, | {7, 8, 9, 13, 15}, | |
| {6, 7, 8, 13, 14}, | {6, 8, 11, 14, 15}, | {7, 8, 10, 11, 12}, | |
| {6, 7, 8, 13, 15}, | {6, 8, 12, 13, 14}, | {7, 8, 10, 11, 13}, | |
| {6, 7, 9, 10, 12}, | {6, 8, 12, 13, 15}, | {7, 8, 10, 11, 14}, | |
| {6, 7, 9, 10, 13}, | {6, 8, 12, 14, 15}, | {7, 8, 10, 11, 15}, | |
| {6, 7, 9, 10, 14}, | {6, 8, 13, 14, 15}, | {7, 8, 10, 12, 13}, | |
| {6, 7, 9, 10, 15}, | {6, 9, 10, 11, 12}, | {7, 8, 10, 12, 15}, | |
| {6, 7, 9, 11, 12}, | {6, 9, 10, 11, 13}, | {7, 8, 10, 13, 14}, | |
| {6, 7, 9, 11, 13}, | {6, 9, 10, 11, 14}, | {7, 8, 10, 14, 15}, | |
| {6, 7, 9, 11, 14}, | {6, 9, 10, 11, 15}, | {7, 8, 11, 12, 13}, | |
| {6, 7, 9, 11, 15}, | {6, 9, 10, 12, 13}, | {7, 8, 11, 12, 14}, | |
| {6, 7, 9, 12, 14}, | {6, 9, 10, 12, 14}, | {7, 8, 11, 13, 15}, | |

6. The apparatus as claimed in claim 5, wherein the Reed-Muller encoder comprises:

an orthogonal codeword generator for generating orthogonal codewords each comprised of 16 coded symbols by multiplying 4 bits out of the input information bit stream comprised of 5 bits by associated base orthogonal codes W1, W2, W4 and W8;

a phase-inverted codeword generator for generating a phase-inverted codeword comprised of 16 coded symbols for creating a bi-orthogonal codeword by inverting a phase of the orthogonal codewords by multiplying a remaining one bit of the input information bit stream by an all 1's signal; and a summer for summing up the orthogonal codewords and the phase-inverted codeword and outputting the summed result as the first order Reed-Muller codeword.

7. An apparatus for decoding an optimal (11,5) codeword transmitted from a transmitter which encodes an input information bit stream comprised of 5 bits into a first order Reed-Muller codeword comprised of 16 coded symbols, predetermines a second coded symbol position or a third coded symbol position out of 16 coded symbols constituting the first order Reed-Muller codeword, and punctures the coded symbols at intervals of 3 symbols beginning at the predetermined position, comprising:

a zero inserter for receiving the (11,5) codeword and inserting all zero as a coded symbols in the puncturing positions of the coded symbols punctured in the transmitter to create the received (11,5) codeword;

an inverse fast Hadamard transform part for calculating reliabilities by comparing the 16 coded symbols obtained by inserting the all zero as a coded symbols in the puncturing positions with every first order Reed-Muller codeword comprised of 16 coded symbols, and outputting in pairs the calculated reliabilities and the input information bit streams each comprised of 5 bits corresponding to said every first order Reed-Muller codeword; and a comparator for outputting as a decoded bit stream the input information bit stream corresponding to the first order Reed-Muller codeword having a highest reliability.

8. The apparatus as claimed in claim 7, wherein the puncturer punctures the $1^{st}$, $4^{th}$, $7^{th}$, $1^{th}$ and $13^{th}$ coded symbols.

9. The apparatus as claimed in claim 7, wherein the puncturer punctures the $2^{nd}$, $5^{th}$, $8^{th}$, $11^{th}$ and $14^{th}$ coded symbols.

10. An apparatus for decoding an optimal (11,5) codeword transmitted from a transmitter which encodes an input information bit stream comprised of 5 bits into a first order Reed-Muller codeword comprised of 16 coded symbols, and punctures the coded symbols in the positions corresponding to the predetermined one of a plurality of puncturing patterns shown in Tables 19 to 27 below, out of 16 coded symbols constituting the first order Reed-Muller codeword, comprising:

a zero inserter for receiving the (11,5) codeword and inserting all zero coded symbols in the puncturing positions of the coded symbols punctured in the transmitter to create the received (11,5) codeword;

an inverse fast Hadamard transform part for calculating reliabilities by comparing the 16 coded symbols obtained by inserting the all zero coded symbols in the puncturing positions with every first order Reed-Muller codeword comprised of 16 coded symbols, and outputting in pairs the calculated reliabilities and the input information bit streams each comprised of 5 bits corresponding to said every first order Reed-Muller codeword; and a comparator for outputting as a decoded bit stream the input information bit stream corresponding to the first order Reed-Muller codeword having a highest reliability.

TABLE 19

| |
|---|
| {0, 1, 2, 4, 8}, |
| {0, 1, 2, 4, 9}, |
| {0, 1, 2, 4, 10}, |
| {0, 1, 2, 4, 11}, |
| {0, 1, 2, 4, 12}, |
| {0, 1, 2, 4, 13}, |
| {0, 1, 2, 4, 14}, |
| {0, 1, 2, 4, 15}, |
| {0, 1, 2, 5, 8}, |
| {0, 1, 2, 5, 9}, |
| {0, 1, 2, 5, 10}, |
| {0, 1, 2, 5, 11}, |
| {0, 1, 2, 5, 12}, |
| {0, 1, 2, 5, 13}, |
| {0, 1, 2, 5, 14}, |
| {0, 1, 2, 5, 15}, |

TABLE 19-continued

| |
|---|
| {0, 1, 2, 6, 8}, |
| {0, 1, 2, 6, 9}, |
| {0, 1, 2, 6, 10}, |
| {0, 1, 2, 6, 11}, |
| {0, 1, 2, 6, 12}, |
| {0, 1, 2, 6, 13}, |
| {0, 1, 2, 6, 14}, |
| {0, 1, 2, 6, 15}, |
| {0, 1, 2, 7, 8}, |
| {0, 1, 2, 7, 9}, |
| {0, 1, 2, 7, 10}, |
| {0, 1, 2, 7, 11}, |
| {0, 1, 2, 7, 12}, |
| {0, 1, 2, 7, 13}, |
| {0, 1, 2, 7, 14}, |
| {0, 1, 2, 7, 15}, |
| {0, 1, 2, 8, 12}, |
| {0, 1, 2, 8, 13}, |
| {0, 1, 2, 8, 14}, |
| {0, 1, 2, 8, 15}, |
| {0, 1, 2, 9, 12}, |
| {0, 1, 2, 9, 13}, |
| {0, 1, 2, 9, 14}, |
| {0, 1, 2, 9, 15}, |
| {0, 1, 2, 10, 12}, |
| {0, 1, 2, 10, 13}, |
| {0, 1, 2, 10, 14}, |
| {0, 1, 2, 10, 15}, |
| {0, 1, 2, 11, 12}, |
| {0, 1, 2, 11, 13}, |
| {0, 1, 2, 11, 14}, |
| {0, 1, 2, 11, 15}, |
| {0, 1, 3, 4, 8}, |
| {0, 1, 3, 4, 9}, |
| {0, 1, 3, 4, 10}, |
| {0, 1, 3, 4, 11}, |
| {0, 1, 3, 4, 12}, |
| {0, 1, 3, 4, 13}, |
| {0, 1, 3, 4, 14}, |
| {0, 1, 3, 4, 15}, |
| {0, 1, 3, 5, 8}, |
| {0, 1, 3, 5, 9}, |
| {0, 1, 3, 5, 10}, |
| {0, 1, 3, 5, 11}, |
| {0, 1, 3, 5, 12}, |
| {0, 1, 3, 5, 13}, |
| {0, 1, 3, 5, 14}, |
| {0, 1, 3, 5, 15}, |
| {0, 1, 3, 6, 8}, |
| {0, 1, 3, 6, 9}, |
| {0, 1, 3, 6, 10}, |
| {0, 1, 3, 6, 11}, |
| {0, 1, 3, 6, 12}, |
| {0, 1, 3, 6, 13}, |
| {0, 1, 3, 6, 14}, |
| {0, 1, 3, 6, 15}, |
| {0, 1, 3, 7, 8}, |
| {0, 1, 3, 7, 9}, |
| {0, 1, 3, 7, 10}, |
| {0, 1, 3, 7, 11}, |
| {0, 1, 3, 7, 12}, |
| {0, 1, 3, 7, 13}, |
| {0, 1, 3, 7, 14}, |
| {0, 1, 3, 7, 15}, |
| {0, 1, 3, 8, 12}, |
| {0, 1, 3, 8, 13}, |
| {0, 1, 3, 8, 14}, |
| {0, 1, 3, 8, 15}, |
| {0, 1, 3, 9, 12}, |
| {0, 1, 3, 9, 13}, |
| {0, 1, 3, 9, 14}, |
| {0, 1, 3, 9, 15}, |
| {0, 1, 3, 10, 12}, |
| {0, 1, 3, 10, 13}, |
| {0, 1, 3, 10, 14}, |
| {0, 1, 3, 10, 15}, |
| {0, 1, 3, 11, 12}, |
| {0, 1, 3, 11, 13}, |
| {0, 1, 3, 11, 14}, |

TABLE 19-continued

| |
|---|
| {0, 1, 3, 11, 15}, |
| {0, 1, 4, 6, 8}, |
| {0, 1, 4, 6, 9}, |
| {0, 1, 4, 6, 10}, |
| {0, 1, 4, 6, 11}, |
| {0, 1, 4, 6, 12}, |
| {0, 1, 4, 6, 13}, |
| {0, 1, 4, 6, 14}, |
| {0, 1, 4, 6, 15}, |
| {0, 1, 4, 7, 8}, |
| {0, 1, 4, 7, 9}, |
| {0, 1, 4, 7, 10}, |
| {0, 1, 4, 7, 11}, |
| {0, 1, 4, 7, 12}, |
| {0, 1, 4, 7, 13}, |
| {0, 1, 4, 7, 14}, |
| {0, 1, 4, 7, 15}, |
| {0, 1, 4, 8, 10}, |
| {0, 1, 4, 8, 11}, |
| {0, 1, 4, 8, 14}, |
| {0, 1, 4, 8, 15}, |
| {0, 1, 4, 9, 10}, |
| {0, 1, 4, 9, 11}, |
| {0, 1, 4, 9, 14}, |
| {0, 1, 4, 9, 15}, |
| {0, 1, 4, 10, 12}, |
| {0, 1, 4, 10, 13}, |
| {0, 1, 4, 11, 12}, |
| {0, 1, 4, 11, 13}, |
| {0, 1, 4, 12, 14}, |
| {0, 1, 4, 12, 15}, |
| {0, 1, 4, 13, 14}, |
| {0, 1, 4, 13, 15}, |
| {0, 1, 5, 6, 8}, |
| {0, 1, 5, 6, 9}, |
| {0, 1, 5, 6, 10}, |
| {0, 1, 5, 6, 11}, |
| {0, 1, 5, 6, 12}, |
| {0, 1, 5, 6, 13}, |
| {0, 1, 5, 6, 14}, |
| {0, 1, 5, 6, 15}, |
| {0, 1, 5, 7, 8}, |
| {0, 1, 5, 7, 9}, |
| {0, 1, 5, 7, 10}, |
| {0, 1, 5, 7, 11}, |
| {0, 1, 5, 7, 12}, |
| {0, 1, 5, 7, 13}, |
| {0, 1, 5, 7, 14}, |
| {0, 1, 5, 7, 15}, |
| {0, 1, 5, 8, 10}, |
| {0, 1, 5, 8, 11}, |
| {0, 1, 5, 8, 14}, |
| {0, 1, 5, 8, 15}, |
| {0, 1, 5, 9, 10}, |
| {0, 1, 5, 9, 11}, |
| {0, 1, 5, 9, 14}, |
| {0, 1, 5, 9, 15}, |
| {0, 1, 5, 10, 12}, |
| {0, 1, 5, 10, 13}, |
| {0, 1, 5, 11, 12}, |
| {0, 1, 5, 11, 13}, |
| {0, 1, 5, 12, 14}, |
| {0, 1, 5, 12, 15}, |
| {0, 1, 5, 13, 14}, |
| {0, 1, 5, 13, 15}, |
| {0, 1, 6, 8, 10}, |
| {0, 1, 6, 8, 11}, |
| {0, 1, 6, 8, 12}, |
| {0, 1, 6, 8, 13}, |
| {0, 1, 6, 9, 10}, |
| {0, 1, 6, 9, 11}, |
| {0, 1, 6, 9, 12}, |
| {0, 1, 6, 9, 13}, |
| {0, 1, 6, 10, 14}, |
| {0, 1, 6, 10, 15}, |
| {0, 1, 6, 11, 14}, |
| {0, 1, 6, 11, 15}, |
| {0, 1, 6, 12, 14}, |
| {0, 1, 6, 12, 15}, |

TABLE 19-continued

| |
|---|
| {0, 1, 6, 13, 14}, |
| {0, 1, 6, 13, 15}, |
| {0, 1, 7, 8, 10}, |
| {0, 1, 7, 8, 11}, |
| {0, 1, 7, 8, 12}, |
| {0, 1, 7, 8, 13}, |
| {0, 1, 7, 9, 10}, |
| {0, 1, 7, 9, 11}, |
| {0, 1, 7, 9, 12}, |
| {0, 1, 7, 9, 13}, |
| {0, 1, 7, 10, 14}, |
| {0, 1, 7, 10, 15}, |
| {0, 1, 7, 11, 14}, |
| {0, 1, 7, 11, 15}, |
| {0, 1, 7, 12, 14}, |
| {0, 1, 7, 12, 15}, |
| {0, 1, 7, 13, 14}, |
| {0, 1, 7, 13, 15}, |
| {0, 1, 8, 10, 12}, |
| {0, 1, 8, 10, 13}, |
| {0, 1, 8, 10, 14}, |
| {0, 1, 8, 10, 15}, |
| {0, 1, 8, 11, 12}, |
| {0, 1, 8, 11, 13}, |
| {0, 1, 8, 11, 14}, |
| {0, 1, 8, 11, 15}, |
| {0, 1, 8, 12, 14}, |
| {0, 1, 8, 12, 15}, |
| {0, 1, 8, 13, 14}, |
| {0, 1, 8, 13, 15}, |
| {0, 1, 9, 10, 12}, |
| {0, 1, 9, 10, 13}, |
| {0, 1, 9, 10, 14}, |
| {0, 1, 9, 10, 15}, |
| {0, 1, 9, 11, 12}, |
| {0, 1, 9, 11, 13}, |
| {0, 1, 9, 11, 14}, |
| {0, 1, 9, 11, 15}, |
| {0, 1, 9, 12, 14}, |
| {0, 1, 9, 12, 15}, |
| {0, 1, 9, 13, 14}, |
| {0, 1, 9, 13, 15}, |
| {0, 1, 10, 12, 14}, |
| {0, 1, 10, 12, 15}, |
| {0, 1, 10, 13, 14}, |
| {0, 1, 10, 13, 15}, |
| {0, 1, 11, 12, 14}, |
| {0, 1, 11, 12, 15}, |
| {0, 1, 11, 13, 14}, |
| {0, 1, 11, 13, 15}, |
| {0, 2, 3, 4, 8}, |
| {0, 2, 3, 4, 9}, |
| {0, 2, 3, 4, 10}, |
| {0, 2, 3, 4, 11}, |
| {0, 2, 3, 4, 12}, |
| {0, 2, 3, 4, 13}, |
| {0, 2, 3, 4, 14}, |
| {0, 2, 3, 4, 15}, |
| {0, 2, 3, 5, 8}, |
| {0, 2, 3, 5, 9}, |
| {0, 2, 3, 5, 10}, |
| {0, 2, 3, 5, 11}, |
| {0, 2, 3, 5, 12}, |
| {0, 2, 3, 5, 13}, |
| {0, 2, 3, 5, 14}, |
| {0, 2, 3, 5, 15}, |
| {0, 2, 3, 6, 8}, |
| {0, 2, 3, 6, 9}, |
| {0, 2, 3, 6, 10}, |
| {0, 2, 3, 6, 11}, |
| {0, 2, 3, 6, 12}, |
| {0, 2, 3, 6, 13}, |
| {0, 2, 3, 6, 14}, |
| {0, 2, 3, 6, 15}, |
| {0, 2, 3, 7, 8}, |
| {0, 2, 3, 7, 9}, |
| {0, 2, 3, 7, 10}, |
| {0, 2, 3, 7, 11}, |
| {0, 2, 3, 7, 12}, |

TABLE 19-continued

| |
|---|
| {0, 2, 3, 7, 13}, |
| {0, 2, 3, 7, 14}, |
| {0, 2, 3, 7, 15}, |
| {0, 2, 3, 8, 12}, |
| {0, 2, 3, 8, 13}, |
| {0, 2, 3, 8, 14}, |
| {0, 2, 3, 8, 15}, |
| {0, 2, 3, 9, 12}, |
| {0, 2, 3, 9, 13}, |
| {0, 2, 3, 9, 14}, |
| {0, 2, 3, 9, 15}, |
| {0, 2, 3, 10, 12}, |
| {0, 2, 3, 10, 13}, |
| {0, 2, 3, 10, 14}, |
| {0, 2, 3, 10, 15}, |
| {0, 2, 3, 11, 12}, |
| {0, 2, 3, 11, 13}, |
| {0, 2, 3, 11, 14}, |
| {0, 2, 3, 11, 15}, |
| {0, 2, 4, 5, 8}, |
| {0, 2, 4, 5, 9}, |
| {0, 2, 4, 5, 10}, |
| {0, 2, 4, 5, 11}, |
| {0, 2, 4, 5, 12}, |
| {0, 2, 4, 5, 13}, |
| {0, 2, 4, 5, 14}, |
| {0, 2, 4, 5, 15}, |
| {0, 2, 4, 7, 8}, |
| {0, 2, 4, 7, 9}, |
| {0, 2, 4, 7, 10}, |
| {0, 2, 4, 7, 11}, |
| {0, 2, 4, 7, 12}, |
| {0, 2, 4, 7, 13}, |
| {0, 2, 4, 7, 14}, |
| {0, 2, 4, 7, 15}, |
| {0, 2, 4, 8, 9}, |
| {0, 2, 4, 8, 11}, |
| {0, 2, 4, 8, 13}, |
| {0, 2, 4, 8, 15}, |
| {0, 2, 4, 9, 10}, |
| {0, 2, 4, 9, 12}, |
| {0, 2, 4, 9, 14}, |
| {0, 2, 4, 10, 11}, |
| {0, 2, 4, 10, 13}, |
| {0, 2, 4, 10, 15}, |
| {0, 2, 4, 11, 12}, |
| {0, 2, 4, 11, 14}, |
| {0, 2, 4, 12, 13}, |
| {0, 2, 4, 12, 15}, |
| {0, 2, 4, 13, 14}, |
| {0, 2, 4, 14, 15}, |
| {0, 2, 5, 6, 8}, |
| {0, 2, 5, 6, 9}, |
| {0, 2, 5, 6, 10}, |
| {0, 2, 5, 6, 11}, |
| {0, 2, 5, 6, 12}, |
| {0, 2, 5, 6, 13}, |
| {0, 2, 5, 6, 14}, |
| {0, 2, 5, 6, 15}, |
| {0, 2, 5, 8, 9}, |
| {0, 2, 5, 8, 11}, |
| {0, 2, 5, 8, 12}, |

TABLE 20

| |
|---|
| {0, 2, 5, 8, 14}, |
| {0, 2, 5, 9, 10}, |
| {0, 2, 5, 9, 13}, |
| {0, 2, 5, 9, 15}, |
| {0, 2, 5, 10, 11}, |
| {0, 2, 5, 10, 12}, |
| {0, 2, 5, 10, 14}, |
| {0, 2, 5, 11, 13}, |
| {0, 2, 5, 11, 15}, |
| {0, 2, 5, 12, 13}, |
| {0, 2, 5, 12, 15}, |

TABLE 20-continued

| |
|---|
| {0, 2, 5, 13, 14}, |
| {0, 2, 5, 14, 15}, |
| {0, 2, 6, 7, 8}, |
| {0, 2, 6, 7, 9}, |
| {0, 2, 6, 7, 10}, |
| {0, 2, 6, 7, 11}, |
| {0, 2, 6, 7, 12}, |
| {0, 2, 6, 7, 13}, |
| {0, 2, 6, 7, 14}, |
| {0, 2, 6, 7, 15}, |
| {0, 2, 6, 8, 9}, |
| {0, 2, 6, 8, 11}, |
| {0, 2, 6, 8, 13}, |
| {0, 2, 6, 9, 10}, |
| {0, 2, 6, 9, 12}, |
| {0, 2, 6, 9, 14}, |
| {0, 2, 6, 10, 11}, |
| {0, 2, 6, 10, 13}, |
| {0, 2, 6, 10, 15}, |
| {0, 2, 6, 11, 12}, |
| {0, 2, 6, 11, 14}, |
| {0, 2, 6, 12, 13}, |
| {0, 2, 6, 12, 15}, |
| {0, 2, 6, 13, 14}, |
| {0, 2, 6, 14, 15}, |
| {0, 2, 7, 8, 9}, |
| {0, 2, 7, 8, 11}, |
| {0, 2, 7, 8, 12}, |
| {0, 2, 7, 8, 14}, |
| {0, 2, 7, 9, 10}, |
| {0, 2, 7, 9, 13}, |
| {0, 2, 7, 9, 15}, |
| {0, 2, 7, 10, 11}, |
| {0, 2, 7, 10, 12}, |
| {0, 2, 7, 10, 14}, |
| {0, 2, 7, 11, 13}, |
| {0, 2, 7, 12, 13}, |
| {0, 2, 7, 12, 15}, |
| {0, 2, 7, 13, 14}, |
| {0, 2, 7, 14, 15}, |
| {0, 2, 8, 9, 12}, |
| {0, 2, 8, 9, 13}, |
| {0, 2, 8, 9, 14}, |
| {0, 2, 8, 9, 15}, |
| {0, 2, 8, 11, 12}, |
| {0, 2, 8, 11, 13}, |
| {0, 2, 8, 11, 14}, |
| {0, 2, 8, 11, 15}, |
| {0, 2, 8, 12, 13}, |
| {0, 2, 8, 12, 15}, |
| {0, 2, 8, 13, 14}, |
| {0, 2, 8, 14, 15}, |
| {0, 2, 9, 10, 12}, |
| {0, 2, 9, 10, 13}, |
| {0, 2, 9, 10, 14}, |
| {0, 2, 9, 10, 15}, |
| {0, 2, 9, 12, 13}, |
| {0, 2, 9, 12, 15}, |
| {0, 2, 9, 13, 14}, |
| {0, 2, 9, 14, 15}, |
| {0, 2, 10, 11, 12}, |
| {0, 2, 10, 11, 13}, |
| {0, 2, 10, 11, 14}, |
| {0, 2, 10, 11, 15}, |
| {0, 2, 10, 12, 13}, |
| {0, 2, 10, 12, 15}, |
| {0, 2, 10, 13, 14}, |
| {0, 2, 10, 14, 15}, |
| {0, 2, 11, 12, 13}, |
| {0, 2, 11, 12, 15}, |
| {0, 2, 11, 13, 14}, |
| {0, 2, 11, 14, 15}, |
| {0, 3, 4, 5, 8}, |
| {0, 3, 4, 5, 9}, |
| {0, 3, 4, 5, 10}, |
| {0, 3, 4, 5, 11}, |
| {0, 3, 4, 5, 12}, |
| {0, 3, 4, 5, 13}, |
| {0, 3, 4, 5, 14}, |

TABLE 20-continued

| |
|---|
| {0, 3, 4, 5, 15}, |
| {0, 3, 4, 6, 8}, |
| {0, 3, 4, 6, 9}, |
| {0, 3, 4, 6, 10}, |
| {0, 3, 4, 6, 11}, |
| {0, 3, 4, 6, 12}, |
| {0, 3, 4, 6, 13}, |
| {0, 3, 4, 6, 14}, |
| {0, 3, 4, 6, 15}, |
| {0, 3, 4, 8, 9}, |
| {0, 3, 4, 8, 10}, |
| {0, 3, 4, 8, 13}, |
| {0, 3, 4, 8, 14}, |
| {0, 3, 4, 9, 11}, |
| {0, 3, 4, 9, 12}, |
| {0, 3, 4, 9, 15}, |
| {0, 3, 4, 10, 11}, |
| {0, 3, 4, 10, 12}, |
| {0, 3, 4, 10, 15}, |
| {0, 3, 4, 11, 13}, |
| {0, 3, 4, 11, 14}, |
| {0, 3, 4, 12, 13}, |
| {0, 3, 4, 12, 14}, |
| {0, 3, 4, 13, 15}, |
| {0, 3, 4, 14, 15}, |
| {0, 3, 5, 7, 8}, |
| {0, 3, 5, 7, 9}, |
| {0, 3, 5, 7, 10}, |
| {0, 3, 5, 7, 11}, |
| {0, 3, 5, 7, 12}, |
| {0, 3, 5, 7, 13}, |
| {0, 3, 5, 7, 14}, |
| {0, 3, 5, 7, 15}, |
| {0, 3, 5, 8, 9}, |
| {0, 3, 5, 8, 10}, |
| {0, 3, 5, 8, 12}, |
| {0, 3, 5, 8, 15}, |
| {0, 3, 5, 9, 11}, |
| {0, 3, 5, 9, 13}, |
| {0, 3, 5, 9, 14}, |
| {0, 3, 5, 10, 11}, |
| {0, 3, 5, 10, 13}, |
| {0, 3, 5, 10, 14}, |
| {0, 3, 5, 11, 12}, |
| {0, 3, 5, 11, 15}, |
| {0, 3, 5, 12, 13}, |
| {0, 3, 5, 12, 14}, |
| {0, 3, 5, 13, 15}, |
| {0, 3, 5, 14, 15}, |
| {0, 3, 6, 7, 8}, |
| {0, 3, 6, 7, 9}, |
| {0, 3, 6, 7, 10}, |
| {0, 3, 6, 7, 11}, |
| {0, 3, 6, 7, 12}, |
| {0, 3, 6, 7, 13}, |
| {0, 3, 6, 7, 14}, |
| {0, 3, 6, 7, 15}, |
| {0, 3, 6, 8, 9}, |
| {0, 3, 6, 8, 10}, |
| {0, 3, 6, 8, 12}, |
| {0, 3, 6, 8, 15}, |
| {0, 3, 6, 9, 11}, |
| {0, 3, 6, 9, 13}, |
| {0, 3, 6, 9, 14}, |
| {0, 3, 6, 10, 11}, |
| {0, 3, 6, 10, 13}, |
| {0, 3, 6, 10, 14}, |
| {0, 3, 6, 11, 12}, |
| {0, 3, 6, 11, 15}, |
| {0, 3, 6, 12, 13}, |
| {0, 3, 6, 12, 14}, |
| {0, 3, 6, 13, 15}, |
| {0, 3, 6, 14, 15}, |
| {0, 3, 7, 8, 9}, |
| {0, 3, 7, 8, 10}, |
| {0, 3, 7, 8, 13}, |
| {0, 3, 7, 8, 14}, |
| {0, 3, 7, 9, 11}, |
| {0, 3, 7, 9, 12}, |

TABLE 20-continued

| |
|---|
| {0, 3, 7, 9, 15}, |
| {0, 3, 7, 10, 11}, |
| {0, 3, 7, 10, 12}, |
| {0, 3, 7, 10, 15}, |
| {0, 3, 7, 11, 13}, |
| {0, 3, 7, 11, 14}, |
| {0, 3, 7, 12, 13}, |
| {0, 3, 7, 12, 14}, |
| {0, 3, 7, 13, 15}, |
| {0, 3, 7, 14, 15}, |
| {0, 3, 8, 9, 12}, |
| {0, 3, 8, 9, 13}, |
| {0, 3, 8, 9, 14}, |
| {0, 3, 8, 9, 15}, |
| {0, 3, 8, 10, 12}, |
| {0, 3, 8, 10, 13}, |
| {0, 3, 8, 10, 14}, |
| {0, 3, 8, 10, 15}, |
| {0, 3, 8, 12, 13}, |
| {0, 3, 8, 12, 14}, |
| {0, 3, 8, 13, 15}, |
| {0, 3, 8, 14, 15}, |
| {0, 3, 9, 11, 12}, |
| {0, 3, 9, 11, 13}, |
| {0, 3, 9, 11, 14}, |
| {0, 3, 9, 11, 15}, |
| {0, 3, 9, 12, 13}, |
| {0, 3, 9, 12, 14}, |
| {0, 3, 9, 13, 15}, |
| {0, 3, 9, 14, 15}, |
| {0, 3, 10, 11, 12}, |
| {0, 3, 10, 11, 13}, |
| {0, 3, 10, 11, 14}, |
| {0, 3, 10, 11, 15}, |
| {0, 3, 10, 12, 13}, |
| {0, 3, 10, 12, 14}, |
| {0, 3, 10, 13, 15}, |
| {0, 3, 10, 14, 15}, |
| {0, 3, 11, 12, 13}, |
| {0, 3, 11, 12, 14}, |
| {0, 3, 11, 13, 15}, |
| {0, 3, 11, 14, 15}, |
| {0, 4, 5, 6, 8}, |
| {0, 4, 5, 6, 9}, |
| {0, 4, 5, 6, 10}, |
| {0, 4, 5, 6, 11}, |
| {0, 4, 5, 6, 12}, |
| {0, 4, 5, 6, 13}, |
| {0, 4, 5, 6, 14}, |
| {0, 4, 5, 6, 15}, |
| {0, 4, 5, 7, 8}, |
| {0, 4, 5, 7, 9}, |
| {0, 4, 5, 7, 10}, |
| {0, 4, 5, 7, 11}, |
| {0, 4, 5, 7, 12}, |
| {0, 4, 5, 7, 13}, |
| {0, 4, 5, 7, 14}, |
| {0, 4, 5, 7, 15}, |
| {0, 4, 5, 8, 10}, |
| {0, 4, 5, 8, 11}, |
| {0, 4, 5, 8, 14}, |
| {0, 4, 5, 8, 15}, |
| {0, 4, 5, 9, 10}, |
| {0, 4, 5, 9, 11}, |
| {0, 4, 5, 9, 14}, |
| {0, 4, 5, 9, 15}, |
| {0, 4, 5, 10, 12}, |
| {0, 4, 5, 10, 13}, |
| {0, 4, 5, 11, 12}, |
| {0, 4, 5, 11, 13}, |
| {0, 4, 5, 12, 14}, |
| {0, 4, 5, 12, 15}, |
| {0, 4, 5, 13, 14}, |
| {0, 4, 5, 13, 15}, |
| {0, 4, 6, 7, 8}, |
| {0, 4, 6, 7, 9}, |
| {0, 4, 6, 7, 10}, |
| {0, 4, 6, 7, 11}, |
| {0, 4, 6, 7, 12}, |

TABLE 20-continued

| |
|---|
| {0, 4, 6, 7, 13}, |
| {0, 4, 6, 7, 14}, |
| {0, 4, 6, 7, 15}, |
| {0, 4, 6, 8, 9}, |
| {0, 4, 6, 8, 11}, |
| {0, 4, 6, 8, 13}, |
| {0, 5, 6, 8, 15}, |
| {0, 4, 6, 9, 10}, |
| {0, 4, 6, 9, 12}, |
| {0, 4, 6, 9, 14}, |
| {0, 4, 6, 10, 11}, |
| {0, 4, 6, 10, 13}, |
| {0, 4, 6, 10, 15}, |
| {0, 4, 6, 11, 12}, |
| {0, 4, 6, 11, 14}, |
| {0, 4, 6, 12, 13}, |
| {0, 4, 6, 12, 15}, |
| {0, 4, 6, 13, 14}, |
| {0, 4, 6, 14, 15}, |
| {0, 4, 7, 8, 9}, |
| {0, 4, 7, 8, 10}, |
| {0, 4, 7, 8, 13}, |
| {0, 4, 7, 8, 14}, |
| {0, 4, 7, 9, 11}, |
| {0, 4, 7, 9, 12}, |
| {0, 4, 7, 9, 15}, |
| {0, 4, 7, 10, 11}, |
| {0, 4, 7, 10, 12}, |
| {0, 4, 7, 10, 15}, |
| {0, 4, 7, 11, 13}, |
| {0, 4, 7, 11, 14}, |
| {0, 4, 7, 12, 13}, |
| {0, 4, 7, 12, 14}, |
| {0, 4, 7, 13, 15}, |
| {0, 4, 7, 14, 15}, |
| {0, 4, 8, 9, 10}, |
| {0, 4, 8, 9, 11}, |
| {0, 4, 8, 9, 14}, |
| {0, 4, 8, 9, 15}, |
| {0, 4, 8, 10, 11}, |
| {0, 4, 8, 10, 13}, |
| {0, 4, 8, 10, 15}, |
| {0, 4, 8, 11, 13}, |
| {0, 4, 8, 11, 14}, |
| {0, 4, 8, 13, 14}, |
| {0, 4, 8, 13, 15}, |
| {0, 4, 8, 14, 15}, |
| {0, 4, 9, 10, 11}, |
| {0, 4, 9, 10, 12}, |
| {0, 4, 9, 10, 15}, |
| {0, 4, 9, 11, 12}, |
| {0, 4, 9, 11, 14}, |
| {0, 4, 9, 12, 14}, |
| {0, 4, 9, 12, 15}, |
| {0, 4, 9, 14, 15}, |
| {0, 4, 10, 11, 12}, |
| {0, 4, 10, 11, 13}, |
| {0, 4, 10, 12, 13}, |
| {0, 4, 10, 12, 15}, |
| {0, 4, 10, 13, 15}, |
| {0, 4, 11, 12, 13}, |
| {0, 4, 11, 12, 14}, |
| {0, 4, 11, 13, 14}, |
| {0, 4, 12, 13, 14}, |
| {0, 4, 12, 13, 15}, |

TABLE 21

| |
|---|
| {0, 4, 12, 14, 15}, |
| {0, 4, 13, 14, 15}, |
| {0, 5, 6, 7, 8}, |
| {0, 5, 6, 7, 9}, |
| {0, 5, 6, 7, 10}, |
| {0, 5, 6, 7, 11}, |
| {0, 5, 6, 7, 12}, |
| {0, 5, 6, 7, 13}, |

TABLE 21-continued

| |
|---|
| {0, 5, 6, 7, 14}, |
| {0, 5, 6, 7, 15}, |
| {0, 5, 6, 8, 9}, |
| {0, 5, 6, 8, 10}, |
| {0, 5, 6, 8, 12}, |
| {0, 5, 6, 8, 15}, |
| {0, 5, 6, 9, 11}, |
| {0, 5, 6, 9, 13}, |
| {0, 5, 6, 9, 14}, |
| {0, 5, 6, 10, 11}, |
| {0, 5, 6, 10, 13}, |
| {0, 5, 6, 10, 14}, |
| {0, 5, 6, 11, 12}, |
| {0, 5, 6, 11, 15}, |
| {0, 5, 6, 12, 13}, |
| {0, 5, 6, 12, 14}, |
| {0, 5, 6, 13, 15}, |
| {0, 5, 6, 14, 15}, |
| {0, 5, 7, 8, 9}, |
| {0, 5, 7, 8, 11}, |
| {0, 5, 7, 8, 12}, |
| {0, 5, 7, 8, 14}, |
| {0, 5, 7, 9, 10}, |
| {0, 5, 7, 9, 13}, |
| {0, 5, 7, 9, 15}, |
| {0, 5, 7, 10, 11}, |
| {0, 5, 7, 10, 12}, |
| {0, 5, 7, 10, 14}, |
| {0, 5, 7, 11, 13}, |
| {0, 5, 7, 11, 15}, |
| {0, 5, 7, 12, 13}, |
| {0, 5, 7, 12, 15}, |
| {0, 5, 7, 13, 14}, |
| {0, 5, 7, 14, 15}, |
| {0, 5, 8, 9, 10}, |
| {0, 5, 8, 9, 11}, |
| {0, 5, 8, 9, 14}, |
| {0, 5, 8, 9, 15}, |
| {0, 5, 8, 10, 11}, |
| {0, 5, 8, 10, 12}, |
| {0, 5, 8, 10, 14}, |
| {0, 5, 8, 11, 12}, |
| {0, 5, 8, 11, 15}, |
| {0, 5, 8, 12, 14}, |
| {0, 5, 8, 12, 15}, |
| {0, 5, 8, 14, 15}, |
| {0, 5, 9, 10, 11}, |
| {0, 5, 9, 10, 13}, |
| {0, 5, 9, 10, 14}, |
| {0, 5, 9, 11, 13}, |
| {0, 5, 9, 11, 15}, |
| {0, 5, 9, 13, 14}, |
| {0, 5, 9, 13, 15}, |
| {0, 5, 9, 14, 15}, |
| {0, 5, 10, 11, 12}, |
| {0, 5, 10, 11, 13}, |
| {0, 5, 10, 12, 13}, |
| {0, 5, 10, 12, 14}, |
| {0, 5, 10, 13, 14}, |
| {0, 5, 11, 12, 13}, |
| {0, 5, 11, 12, 15}, |
| {0, 5, 11, 13, 15}, |
| {0, 5, 12, 13, 14}, |
| {0, 5, 12, 13, 15}, |
| {0, 5, 12, 14, 15}, |
| {0, 5, 13, 14, 15}, |
| {0, 6, 7, 8, 10}, |
| {0, 6, 7, 8, 11}, |
| {0, 6, 7, 8, 12}, |
| {0, 6, 7, 8, 13}, |
| {0, 6, 7, 9, 10}, |
| {0, 6, 7, 9, 11}, |
| {0, 6, 7, 9, 12}, |
| {0, 6, 7, 9, 13}, |
| {0, 6, 7, 10, 14}, |
| {0, 6, 7, 10, 15}, |
| {0, 6, 7, 11, 14}, |
| {0, 6, 7, 11, 15}, |
| {0, 6, 7, 12, 14}, |

TABLE 21-continued

| |
|---|
| {0, 6, 7, 12, 15}, |
| {0, 6, 7, 13, 14}, |
| {0, 6, 7, 13, 15}, |
| {0, 6, 8, 9, 10}, |
| {0, 6, 8, 9, 11}, |
| {0, 6, 8, 9, 12}, |
| {0, 6, 8, 9, 13}, |
| {0, 6, 8, 10, 11}, |
| {0, 6, 8, 10, 13}, |
| {0, 6, 8, 10, 15}, |
| {0, 6, 8, 11, 12}, |
| {0, 6, 8, 11, 15}, |
| {0, 6, 8, 12, 13}, |
| {0, 6, 8, 12, 15}, |
| {0, 6, 8, 13, 15}, |
| {0, 6, 9, 10, 11}, |
| {0, 6, 9, 10, 13}, |
| {0, 6, 9, 10, 14}, |
| {0, 6, 9, 11, 12}, |
| {0, 6, 9, 11, 14}, |
| {0, 6, 9, 12, 13}, |
| {0, 6, 9, 12, 14}, |
| {0, 6, 9, 13, 14}, |
| {0, 6, 10, 11, 14}, |
| {0, 6, 10, 11, 15}, |
| {0, 6, 10, 13, 14}, |
| {0, 6, 10, 13, 15}, |
| {0, 6, 10, 14, 15}, |
| {0, 6, 11, 12, 14}, |
| {0, 6, 11, 12, 15}, |
| {0, 6, 11, 14, 15}, |
| {0, 6, 12, 13, 14}, |
| {0, 6, 12, 13, 15}, |
| {0, 6, 12, 14, 15}, |
| {0, 6, 13, 14, 15}, |
| {0, 7, 8, 9, 10}, |
| {0, 7, 8, 9, 11}, |
| {0, 7, 8, 9, 12}, |
| {0, 7, 8, 9, 13}, |
| {0, 7, 8, 10, 11}, |
| {0, 7, 8, 10, 12}, |
| {0, 7, 8, 10, 14}, |
| {0, 7, 8, 11, 13}, |
| {0, 7, 8, 11, 14}, |
| {0, 7, 8, 12, 13}, |
| {0, 7, 8, 12, 14}, |
| {0, 7, 8, 13, 14}, |
| {0, 7, 9, 10, 11}, |
| {0, 7, 9, 10, 12}, |
| {0, 7, 9, 10, 15}, |
| {0, 7, 9, 11, 13}, |
| {0, 7, 9, 11, 15}, |
| {0, 7, 9, 12, 13}, |
| {0, 7, 9, 12, 15}, |
| {0, 7, 9, 13, 15}, |
| {0, 7, 10, 11, 14}, |
| {0, 7, 10, 11, 15}, |
| {0, 7, 10, 12, 14}, |
| {0, 7, 10, 12, 15}, |
| {0, 7, 10, 14, 15}, |
| {0, 7, 11, 13, 14}, |
| {0, 7, 11, 13, 15}, |
| {0, 7, 11, 14, 15}, |
| {0, 7, 12, 13, 14}, |
| {0, 7, 12, 13, 15}, |
| {0, 7, 12, 14, 15}, |
| {0, 7, 13, 14, 15}, |
| {0, 8, 9, 10, 12}, |
| {0, 8, 9, 10, 13}, |
| {0, 8, 9, 10, 14}, |
| {0, 8, 9, 10, 15}, |
| {0, 8, 9, 11, 12}, |
| {0, 8, 9, 11, 13}, |
| {0, 8, 9, 11, 14}, |
| {0, 8, 9, 11, 15}, |
| {0, 8, 9, 12, 14}, |
| {0, 8, 9, 12, 15}, |
| {0, 8, 9, 13, 14}, |
| {0, 8, 9, 13, 15}, |

TABLE 21-continued

| |
|---|
| {0, 8, 10, 11, 12}, |
| {0, 8, 10, 11, 13}, |
| {0, 8, 10, 11, 14}, |
| {0, 8, 10, 11, 15}, |
| {0, 8, 10, 12, 13}, |
| {0, 8, 10, 12, 15}, |
| {0, 8, 10, 13, 14}, |
| {0, 8, 10, 14, 15}, |
| {0, 8, 11, 12, 13}, |
| {0, 8, 11, 12, 14}, |
| {0, 8, 11, 13, 15}, |
| {0, 8, 11, 14, 15}, |
| {0, 8, 12, 13, 14}, |
| {0, 8, 12, 13, 15}, |
| {0, 8, 12, 14, 15}, |
| {0, 8, 13, 14, 15}, |
| {0, 9, 10, 11, 12}, |
| {0, 9, 10, 11, 13}, |
| {0, 9, 10, 11, 14}, |
| {0, 9, 10, 11, 15}, |
| {0, 9, 10, 12, 13}, |
| {0, 9, 10, 12, 14}, |
| {0, 9, 10, 13, 15}, |
| {0, 9, 10, 14, 15}, |
| {0, 9, 11, 12, 13}, |
| {0, 9, 11, 12, 15}, |
| {0, 9, 11, 13, 14}, |
| {0, 9, 11, 14, 15}, |
| {0, 9, 12, 13, 14}, |
| {0, 9, 12, 13, 15}, |
| {0, 9, 12, 14, 15}, |
| {0, 9, 13, 14, 15}, |
| {0, 10, 11, 12, 14}, |
| {0, 10, 11, 12, 15}, |
| {0, 10, 11, 13, 14}, |
| {0, 10, 11, 13, 15}, |
| {0, 10, 12, 13, 14}, |
| {0, 10, 12, 13, 15}, |
| {0, 10, 12, 14, 15}, |
| {0, 10, 13, 14, 15}, |
| {0, 11, 12, 13, 14}, |
| {0, 11, 12, 13, 15}, |
| {0, 11, 12, 14, 15}, |
| {0, 11, 13, 14, 15}, |
| {1, 2, 3, 4, 8}, |
| {1, 2, 3, 4, 9}, |
| {1, 2, 3, 4, 10}, |
| {1, 2, 3, 4, 11}, |
| {1, 2, 3, 4, 12}, |
| {1, 2, 3, 4, 13}, |
| {1, 2, 3, 4, 14}, |
| {1, 2, 3, 4, 15}, |
| {1, 2, 3, 5, 8}, |
| {1, 2, 3, 5, 9}, |
| {1, 2, 3, 5, 10}, |
| {1, 2, 3, 5, 11}, |
| {1, 2, 3, 5, 12}, |
| {1, 2, 3, 5, 13}, |
| {1, 2, 3, 5, 14}, |
| {1, 2, 3, 5, 15}, |
| {1, 2, 3, 6, 8}, |
| {1, 2, 3, 6, 9}, |
| {1, 2, 3, 6, 10}, |
| {1, 2, 3, 6, 11}, |
| {1, 2, 3, 6, 12}, |
| {1, 2, 3, 6, 13}, |
| {1, 2, 3, 6, 14}, |
| {1, 2, 3, 6, 15}, |
| {1, 2, 3, 7, 8}, |
| {1, 2, 3, 7, 9}, |
| {1, 2, 3, 7, 10}, |
| {1, 2, 3, 7, 11}, |
| {1, 2, 3, 7, 12}, |
| {1, 2, 3, 7, 13}, |
| {1, 2, 3, 7, 14}, |
| {1, 2, 3, 7, 15}, |
| {1, 2, 3, 8, 12}, |
| {1, 2, 3, 8, 13}, |
| {1, 2, 3, 8, 14}, |

TABLE 21-continued

| |
|---|
| {1, 2, 3, 8, 15}, |
| {1, 2, 3, 9, 12}, |
| {1, 2, 3, 9, 13}, |
| {1, 2, 3, 9, 14}, |
| {1, 2, 3, 9, 15}, |
| {1, 2, 3, 10, 12}, |
| {1, 2, 3, 10, 13}, |
| {1, 2, 3, 10, 14}, |
| {1, 2, 3, 10, 15}, |
| {1, 2, 3, 11, 12}, |
| {1, 2, 3, 11, 13}, |
| {1, 2, 3, 11, 14}, |
| {1, 2, 3, 11, 15}, |
| {1, 2, 4, 5, 8}, |
| {1, 2, 4, 5, 9}, |
| {1, 2, 4, 5, 10}, |
| {1, 2, 4, 5, 11}, |
| {1, 2, 4, 5, 12}, |
| {1, 2, 4, 5, 13}, |
| {1, 2, 4, 5, 14}, |
| {1, 2, 4, 5, 15}, |
| {1, 2, 4, 6, 8}, |
| {1, 2, 4, 6, 9}, |
| {1, 2, 4, 6, 10}, |
| {1, 2, 4, 6, 11}, |
| {1, 2, 4, 6, 12}, |
| {1, 2, 4, 6, 13}, |
| {1, 2, 4, 6, 14}, |
| {1, 2, 4, 6, 15}, |
| {1, 2, 4, 8, 9}, |
| {1, 2, 4, 8, 10}, |
| {1, 2, 4, 8, 12}, |
| {1, 2, 4, 8, 15}, |
| {1, 2, 4, 9, 11}, |
| {1, 2, 4, 9, 13}, |
| {1, 2, 4, 9, 14}, |
| {1, 2, 4, 10, 11}, |
| {1, 2, 4, 10, 13}, |
| {1, 2, 4, 10, 14}, |
| {1, 2, 4, 11, 12}, |
| {1, 2, 4, 11, 15}, |
| {1, 2, 4, 12, 13}, |
| {1, 2, 4, 12, 14}, |
| {1, 2, 4, 13, 15}, |
| {1, 2, 4, 14, 15}, |
| {1, 2, 5, 7, 8}, |
| {1, 2, 5, 7, 9}, |
| {1, 2, 5, 7, 10}, |
| {1, 2, 5, 7, 11}, |
| {1, 2, 5, 7, 12}, |
| {1, 2, 5, 7, 13}, |
| {1, 2, 5, 7, 14}, |
| {1, 2, 5, 7, 15}, |
| {1, 2, 5, 8, 9}, |
| {1, 2, 5, 8, 10}, |
| {1, 2, 5, 8, 13}, |
| {1, 2, 5, 8, 14}, |
| {1, 2, 5, 9, 11}, |
| {1, 2, 5, 9, 12}, |
| {1, 2, 5, 9, 15}, |
| {1, 2, 5, 10, 11}, |
| {1, 2, 5, 10, 12}, |
| {1, 2, 5, 10, 15}, |
| {1, 2, 5, 11, 13}, |
| {1, 2, 5, 11, 14}, |
| {1, 2, 5, 12, 13}, |
| {1, 2, 5, 12, 14}, |
| {1, 2, 5, 13, 15}, |
| {1, 2, 5, 14, 15}, |
| {1, 2, 6, 7, 8}, |

TABLE 22

| |
|---|
| {1, 2, 6, 7, 9}, |
| {1, 2, 6, 7, 10}, |
| {1, 2, 6, 7, 11}, |

TABLE 22-continued

| |
|---|
| {1, 2, 6, 7, 12}, |
| {1, 2, 6, 7, 13}, |
| {1, 2, 6, 7, 14}, |
| {1, 2, 6, 7, 15}, |
| {1, 2, 6, 8, 9}, |
| {1, 2, 6, 8, 10}, |
| {1, 2, 6, 8, 13}, |
| {1, 2, 6, 8, 14}, |
| {1, 2, 6, 9, 11}, |
| {1, 2, 6, 9, 12}, |
| {1, 2, 6, 9, 15}, |
| {1, 2, 6, 10, 11}, |
| {1, 2, 6, 10, 12}, |
| {1, 2, 6, 10, 15}, |
| {1, 2, 6, 11, 13}, |
| {1, 2, 6, 11, 14}, |
| {1, 2, 6, 12, 13}, |
| {1, 2, 6, 12, 14}, |
| {1, 2, 6, 13, 15}, |
| {1, 2, 6, 14, 15}, |
| {1, 2, 7, 8, 9}, |
| {1, 2, 7, 8, 10}, |
| {1, 2, 7, 8, 12}, |
| {1, 2, 7, 8, 15}, |
| {1, 2, 7, 9, 11}, |
| {1, 2, 7, 9, 13}, |
| {1, 2, 7, 9, 14}, |
| {1, 2, 7, 10, 11}, |
| {1, 2, 7, 10, 13}, |
| {1, 2, 7, 10, 14}, |
| {1, 2, 7, 11, 12}, |
| {1, 2, 7, 11, 15}, |
| {1, 2, 7, 12, 13}, |
| {1, 2, 7, 12, 14}, |
| {1, 2, 7, 13, 15}, |
| {1, 2, 7, 14, 15}, |
| {1, 2, 8, 9, 12}, |
| {1, 2, 8, 9, 13}, |
| {1, 2, 8, 9, 14}, |
| {1, 2, 8, 9, 15}, |
| {1, 2, 8, 10, 12}, |
| {1, 2, 8, 10, 13}, |
| {1, 2, 8, 10, 14}, |
| {1, 2, 8, 10, 15}, |
| {1, 2, 8, 12, 13}, |
| {1, 2, 8, 12, 14}, |
| {1, 2, 8, 13, 15}, |
| {1, 2, 8, 14, 15}, |
| {1, 2, 9, 11, 12}, |
| {1, 2, 9, 11, 13}, |
| {1, 2, 9, 11, 14}, |
| {1, 2, 9, 11, 15}, |
| {1, 2, 9, 12, 13}, |
| {1, 2, 9, 12, 14}, |
| {1, 2, 9, 13, 15}, |
| {1, 2, 9, 14, 15}, |
| {1, 2, 10, 11, 12}, |
| {1, 2, 10, 11, 13}, |
| {1, 2, 10, 11, 14}, |
| {1, 2, 10, 11, 15}, |
| {1, 2, 10, 12, 13}, |
| {1, 2, 10, 12, 14}, |
| {1, 2, 10, 13, 15}, |
| {1, 2, 10, 14, 15}, |
| {1, 2, 11, 12, 13}, |
| {1, 2, 11, 12, 14}, |
| {1, 2, 11, 13, 15}, |
| {1, 2, 11, 14, 15}, |
| {1, 3, 4, 5, 8}, |
| {1, 3, 4, 5, 9}, |
| {1, 3, 4, 5, 10}, |
| {1, 3, 4, 5, 11}, |
| {1, 3, 4, 5, 12}, |
| {1, 3, 4, 5, 13}, |
| {1, 3, 4, 5, 14}, |
| {1, 3, 4, 5, 15}, |
| {1, 3, 4, 7, 8}, |
| {1, 3, 4, 7, 9}, |
| {1, 3, 4, 7, 10}, |

TABLE 22-continued

| |
|---|
| {1, 3, 4, 7, 11}, |
| {1, 3, 4, 7, 12}, |
| {1, 3, 4, 7, 13}, |
| {1, 3, 4, 7, 14}, |
| {1, 3, 4, 7, 15}, |
| {1, 3, 4, 8, 9}, |
| {1, 3, 4, 8, 11}, |
| {1, 3, 4, 8, 12}, |
| {1, 3, 4, 8, 14}, |
| {1, 3, 4, 9, 10}, |
| {1, 3, 4, 9, 13}, |
| {1, 3, 4, 9, 15}, |
| {1, 3, 4, 10, 11}, |
| {1, 3, 4, 10, 12}, |
| {1, 3, 4, 10, 14}, |
| {1, 3, 4, 11, 13}, |
| {1, 3, 4, 11, 15}, |
| {1, 3, 4, 12, 13}, |
| {1, 3, 4, 12, 15}, |
| {1, 3, 4, 13, 14}, |
| {1, 3, 4, 14, 15}, |
| {1, 3, 5, 6, 8}, |
| {1, 3, 5, 6, 9}, |
| {1, 3, 5, 6, 10}, |
| {1, 3, 5, 6, 11}, |
| {1, 3, 5, 6, 12}, |
| {1, 3, 5, 6, 13}, |
| {1, 3, 5, 6, 14}, |
| {1, 3, 5, 6, 15}, |
| {1, 3, 5, 8, 9}, |
| {1, 3, 5, 8, 11}, |
| {1, 3, 5, 8, 13}, |
| {1, 3, 5, 8, 15}, |
| {1, 3, 5, 9, 10}, |
| {1, 3, 5, 9, 12}, |
| {1, 3, 5, 9, 14}, |
| {1, 3, 5, 10, 11}, |
| {1, 3, 5, 10, 13}, |
| {1, 3, 5, 10, 15}, |
| {1, 3, 5, 11, 12}, |
| {1, 3, 5, 11, 14}, |
| {1, 3, 5, 12, 13}, |
| {1, 3, 5, 12, 15}, |
| {1, 3, 5, 13, 14}, |
| {1, 3, 5, 14, 15}, |
| {1, 3, 6, 7, 8}, |
| {1, 3, 6, 7, 9}, |
| {1, 3, 6, 7, 10}, |
| {1, 3, 6, 7, 11}, |
| {1, 3, 6, 7, 12}, |
| {1, 3, 6, 7, 13}, |
| {1, 3, 6, 7, 14}, |
| {1, 3, 6, 7, 15}, |
| {1, 3, 6, 8, 9}, |
| {1, 3, 6, 8, 11}, |
| {1, 3, 6, 8, 12}, |
| {1, 3, 6, 8, 14}, |
| {1, 3, 6, 9, 10}, |
| {1, 3, 6, 9, 13}, |
| {1, 3, 6, 9, 15}, |
| {1, 3, 6, 10, 11}, |
| {1, 3, 6, 10, 12}, |
| {1, 3, 6, 10, 14}, |
| {1, 3, 6, 11, 13}, |
| {1, 3, 6, 11, 15}, |
| {1, 3, 6, 12, 13}, |
| {1, 3, 6, 12, 15}, |
| {1, 3, 6, 13, 14}, |
| {1, 3, 6, 14, 15}, |
| {1, 3, 7, 8, 9}, |
| {1, 3, 7, 8, 11}, |
| {1, 3, 7, 8, 13}, |
| {1, 3, 7, 8, 15}, |
| {1, 3, 7, 9, 10}, |
| {1, 3, 7, 9, 12}, |
| {1, 3, 7, 9, 14}, |
| {1, 3, 7, 10, 11}, |
| {1, 3, 7, 10, 13}, |
| {1, 3, 7, 10, 15}, |

TABLE 22-continued

| |
|---|
| {1, 3, 7, 11, 12}, |
| {1, 3, 7, 11, 14}, |
| {1, 3, 7, 12, 13}, |
| {1, 3, 7, 12, 15}, |
| {1, 3, 7, 13, 14}, |
| {1, 3, 7, 14, 15}, |
| {1, 3, 8, 9, 12}, |
| {1, 3, 8, 9, 13}, |
| {1, 3, 8, 9, 14}, |
| {1, 3, 8, 9, 15}, |
| {1, 3, 8, 11, 12}, |
| {1, 3, 8, 11, 13}, |
| {1, 3, 8, 11, 14}, |
| {1, 3, 8, 11, 15}, |
| {1, 3, 8, 12, 13}, |
| {1, 3, 8, 12, 15}, |
| {1, 3, 8, 13, 14}, |
| {1, 3, 8, 14, 15}, |
| {1, 3, 9, 10, 12}, |
| {1, 3, 9, 10, 13}, |
| {1, 3, 9, 10, 14}, |
| {1, 3, 9, 10, 15}, |
| {1, 3, 9, 12, 13}, |
| {1, 3, 9, 12, 15}, |
| {1, 3, 9, 13, 14}, |
| {1, 3, 9, 14, 15}, |
| {1, 3, 10, 11, 12}, |
| {1, 3, 10, 11, 13}, |
| {1, 3, 10, 11, 14}, |
| {1, 3, 10, 11, 15}, |
| {1, 3, 10, 12, 13}, |
| {1, 3, 10, 12, 15}, |
| {1, 3, 10, 13, 14}, |
| {1, 3, 10, 14, 15}, |
| {1, 3, 11, 12, 13}, |
| {1, 3, 11, 12, 15}, |
| {1, 3, 11, 13, 14}, |
| {1, 3, 11, 14, 15}, |
| {1, 4, 5, 6, 8}, |
| {1, 4, 5, 6, 9}, |
| {1, 4, 5, 6, 10}, |
| {1, 4, 5, 6, 11}, |
| {1, 4, 5, 6, 12}, |
| {1, 4, 5, 6, 13}, |
| {1, 4, 5, 6, 14}, |
| {1, 4, 5, 6, 15}, |
| {1, 4, 5, 7, 8}, |
| {1, 4, 5, 7, 9}, |
| {1, 4, 5, 7, 10}, |
| {1, 4, 5, 7, 11}, |
| {1, 4, 5, 7, 12}, |
| {1, 4, 5, 7, 13}, |
| {1, 4, 5, 7, 14}, |
| {1, 4, 5, 7, 15}, |
| {1, 4, 5, 8, 10}, |
| {1, 4, 5, 8, 11}, |
| {1, 4, 5, 8, 14}, |
| {1, 4, 5, 8, 15}, |
| {1, 4, 5, 9, 10}, |
| {1, 4, 5, 9, 11}, |
| {1, 4, 5, 9, 14}, |
| {1, 4, 5, 9, 15}, |
| {1, 4, 5, 10, 12}, |
| {1, 4, 5, 10, 13}, |
| {1, 4, 5, 11, 12}, |
| {1, 4, 5, 11, 13}, |
| {1, 4, 5, 12, 14}, |
| {1, 4, 5, 12, 15}, |
| {1, 4, 5, 13, 14}, |
| {1, 4, 5, 13, 15}, |
| {1, 4, 6, 7, 8}, |
| {1, 4, 6, 7, 9}, |
| {1, 4, 6, 7, 10}, |
| {1, 4, 6, 7, 11}, |
| {1, 4, 6, 7, 12}, |
| {1, 4, 6, 7, 13}, |
| {1, 4, 6, 7, 14}, |
| {1, 4, 6, 7, 15}, |
| {1, 4, 6, 8, 9}, |

TABLE 22-continued

| |
|---|
| {1, 4, 6, 8, 11}, |
| {1, 4, 6, 8, 12}, |
| {1, 4, 6, 8, 14}, |
| {1, 4, 6, 9, 10}, |
| {1, 4, 6, 9, 13}, |
| {1, 4, 6, 9, 15}, |
| {1, 4, 6, 10, 11}, |
| {1, 4, 6, 10, 12}, |
| {1, 4, 6, 10, 14}, |
| {1, 4, 6, 11, 13}, |
| {1, 4, 6, 11, 15}, |
| {1, 4, 6, 12, 13}, |
| {1, 4, 6, 12, 15}, |
| {1, 4, 6, 13, 14}, |
| {1, 4, 6, 14, 15}, |
| {1, 4, 7, 8, 9}, |
| {1, 4, 7, 8, 10}, |
| {1, 4, 7, 8, 12}, |
| {1, 4, 7, 8, 15}, |
| {1, 4, 7, 9, 11}, |
| {1, 4, 7, 9, 13}, |
| {1, 4, 7, 9, 14}, |
| {1, 4, 7, 10, 11}, |
| {1, 4, 7, 10, 13}, |
| {1, 4, 7, 10, 14}, |
| {1, 4, 7, 11, 12}, |
| {1, 4, 7, 11, 15}, |
| {1, 4, 7, 12, 13}, |
| {1, 4, 7, 12, 14}, |
| {1, 4, 7, 13, 15}, |
| {1, 4, 7, 14, 15}, |
| {1, 4, 8, 9, 10}, |
| {1, 4, 8, 9, 11}, |
| {1, 4, 8, 9, 14}, |
| {1, 4, 8, 9, 15}, |
| {1, 4, 8, 10, 11}, |
| {1, 4, 8, 10, 12}, |
| {1, 4, 8, 10, 14}, |
| {1, 4, 8, 11, 12}, |
| {1, 4, 8, 11, 15}, |
| {1, 4, 8, 12, 14}, |
| {1, 4, 8, 12, 15}, |
| {1, 4, 8, 14, 15}, |
| {1, 4, 9, 10, 11}, |
| {1, 4, 9, 10, 13}, |
| {1, 4, 9, 10, 14}, |
| {1, 4, 9, 11, 13}, |
| {1, 4, 9, 11, 15}, |
| {1, 4, 9, 13, 14}, |
| {1, 4, 9, 13, 15}, |
| {1, 4, 9, 14, 15}, |
| {1, 4, 10, 11, 12}, |
| {1, 4, 10, 11, 13}, |
| {1, 4, 10, 12, 13}, |
| {1, 4, 10, 12, 14}, |
| {1, 4, 10, 13, 14}, |
| {1, 4, 11, 12, 13}, |
| {1, 4, 11, 12, 15}, |
| {1, 4, 11, 13, 15}, |
| {1, 4, 12, 13, 14}, |
| {1, 4, 12, 13, 15}, |
| {1, 4, 12, 14, 15}, |
| {1, 4, 13, 14, 15}, |
| {1, 5, 6, 7, 8}, |
| {1, 5, 6, 7, 9}, |
| {1, 5, 6, 7, 10}, |
| {1, 5, 6, 7, 11}, |
| {1, 5, 6, 7, 12}, |
| {1, 5, 6, 7, 13}, |
| {1, 5, 6, 7, 14}, |
| {1, 5, 6, 7, 15}, |
| {1, 5, 6, 8, 9}, |
| {1, 5, 6, 8, 10}, |
| {1, 5, 6, 8, 13}, |
| {1, 5, 6, 8, 14}, |

TABLE 23

| |
|---|
| {1, 5, 6, 9, 11}, |
| {1, 5, 6, 9, 12}, |
| {1, 5, 6, 9, 15}, |
| {1, 5, 6, 10, 11}, |
| {1, 5, 6, 10, 12}, |
| {1, 5, 6, 10, 15}, |
| {1, 5, 6, 11, 13}, |
| {1, 5, 6, 11, 14}, |
| {1, 5, 6, 12, 13}, |
| {1, 5, 6, 12, 14}, |
| {1, 5, 6, 13, 15}, |
| {1, 5, 6, 14, 15}, |
| {1, 5, 7, 8, 9}, |
| {1, 5, 7, 8, 11}, |
| {1, 5, 7, 8, 13}, |
| {1, 5, 7, 8, 15}, |
| {1, 5, 7, 9, 10}, |
| {1, 5, 7, 9, 12}, |
| {1, 5, 7, 9, 14}, |
| {1, 5, 7, 10, 11}, |
| {1, 5, 7, 10, 13}, |
| {1, 5, 7, 10, 15}, |
| {1, 5, 7, 11, 12}, |
| {1, 5, 7, 11, 14}, |
| {1, 5, 7, 12, 13}, |
| {1, 5, 7, 12, 15}, |
| {1, 5, 7, 13, 14}, |
| {1, 5, 7, 14, 15}, |
| {1, 5, 8, 9, 10}, |
| {1, 5, 8, 9, 11}, |
| {1, 5, 8, 9, 14}, |
| {1, 5, 8, 9, 15}, |
| {1, 5, 8, 10, 11}, |
| {1, 5, 8, 10, 13}, |
| {1, 5, 8, 10, 15}, |
| {1, 5, 8, 11, 13}, |
| {1, 5, 8, 11, 14}, |
| {1, 5, 8, 13, 14}, |
| {1, 5, 8, 13, 15}, |
| {1, 5, 8, 14, 15}, |
| {1, 5, 9, 10, 11}, |
| {1, 5, 9, 10, 12}, |
| {1, 5, 9, 10, 15}, |
| {1, 5, 9, 11, 12}, |
| {1, 5, 9, 11, 14}, |
| {1, 5, 9, 12, 14}, |
| {1, 5, 9, 12, 15}, |
| {1, 5, 9, 14, 15}, |
| {1, 5, 10, 11, 12}, |
| {1, 5, 10, 11, 13}, |
| {1, 5, 10, 12, 13}, |
| {1, 5, 10, 12, 15}, |
| {1, 5, 10, 13, 15}, |
| {1, 5, 11, 12, 13}, |
| {1, 5, 11, 12, 14}, |
| {1, 5, 11, 13, 14}, |
| {1, 5, 12, 13, 14}, |
| {1, 5, 12, 13, 15}, |
| {1, 5, 12, 14, 15}, |
| {1, 5, 13, 14, 15}, |
| {1, 6, 7, 8, 10}, |
| {1, 6, 7, 8, 11}, |
| {1, 6, 7, 8, 12}, |
| {1, 6, 7, 8, 13}, |
| {1, 6, 7, 9, 10}, |
| {1, 6, 7, 9, 11}, |
| {1, 6, 7, 9, 12}, |
| {1, 6, 7, 9, 13}, |
| {1, 6, 7, 10, 14}, |
| {1, 6, 7, 10, 15}, |
| {1, 6, 7, 11, 14}, |
| {1, 6, 7, 11, 15}, |
| {1, 6, 7, 12, 14}, |
| {1, 6, 7, 12, 15}, |
| {1, 6, 7, 13, 14}, |
| {1, 6, 7, 13, 15}, |
| {1, 6, 8, 9, 10}, |
| {1, 6, 8, 9, 11}, |
| {1, 6, 8, 9, 12}, |

TABLE 23-continued

| |
|---|
| {1, 6, 8, 9, 13}, |
| {1, 6, 8, 10, 11}, |
| {1, 6, 8, 10, 12}, |
| {1, 6, 8, 10, 14}, |
| {1, 6, 8, 11, 13}, |
| {1, 6, 8, 11, 14}, |
| {1, 6, 8, 12, 13}, |
| {1, 6, 8, 12, 14}, |
| {1, 6, 8, 13, 14}, |
| {1, 6, 9, 10, 11}, |
| {1, 6, 9, 10, 12}, |
| {1, 6, 9, 10, 15}, |
| {1, 6, 9, 11, 13}, |
| {1, 6, 9, 11, 15}, |
| {1, 6, 9, 12, 13}, |
| {1, 6, 9, 12, 15}, |
| {1, 6, 9, 13, 15}, |
| {1, 6, 10, 11, 14}, |
| {1, 6, 10, 11, 15}, |
| {1, 6, 10, 12, 14}, |
| {1, 6, 10, 12, 15}, |
| {1, 6, 10, 14, 15}, |
| {1, 6, 11, 13, 14}, |
| {1, 6, 11, 13, 15}, |
| {1, 6, 11, 14, 15}, |
| {1, 6, 12, 13, 14}, |
| {1, 6, 12, 13, 15}, |
| {1, 6, 12, 14, 15}, |
| {1, 6, 13, 14, 15}, |
| {1, 7, 8, 9, 10}, |
| {1, 7, 8, 9, 11}, |
| {1, 7, 8, 9, 12}, |
| {1, 7, 8, 9, 13}, |
| {1, 7, 8, 10, 11}, |
| {1, 7, 8, 10, 13}, |
| {1, 7, 8, 10, 15}, |
| {1, 7, 8, 11, 12}, |
| {1, 7, 8, 11, 15}, |
| {1, 7, 8, 12, 13}, |
| {1, 7, 8, 12, 15}, |
| {1, 7, 8, 13, 15}, |
| {1, 7, 9, 10, 11}, |
| {1, 7, 9, 10, 13}, |
| {1, 7, 9, 10, 14}, |
| {1, 7, 9, 11, 12}, |
| {1, 7, 9, 11, 14}, |
| {1, 7, 9, 12, 13}, |
| {1, 7, 9, 12, 14}, |
| {1, 7, 9, 13, 14}, |
| {1, 7, 10, 11, 14}, |
| {1, 7, 10, 11, 15}, |
| {1, 7, 10, 13, 14}, |
| {1, 7, 10, 13, 15}, |
| {1, 7, 10, 14, 15}, |
| {1, 7, 11, 12, 14}, |
| {1, 7, 11, 12, 15}, |
| {1, 7, 11, 14, 15}, |
| {1, 7, 12, 13, 14}, |
| {1, 7, 12, 13, 15}, |
| {1, 7, 12, 14, 15}, |
| {1, 7, 13, 14, 15}, |
| {1, 8, 9, 10, 12}, |
| {1, 8, 9, 10, 13}, |
| {1, 8, 9, 10, 14}, |
| {1, 8, 9, 10, 15}, |
| {1, 8, 9, 11, 12}, |
| {1, 8, 9, 11, 13}, |
| {1, 8, 9, 11, 14}, |
| {1, 8, 9, 11, 15}, |
| {1, 8, 9, 12, 14}, |
| {1, 8, 9, 12, 15}, |
| {1, 8, 9, 13, 14}, |
| {1, 8, 9, 13, 15}, |
| {1, 8, 10, 11, 12}, |
| {1, 8, 10, 11, 13}, |
| {1, 8, 10, 11, 14}, |
| {1, 8, 10, 11, 15}, |
| {1, 8, 10, 12, 13}, |
| {1, 8, 10, 12, 15}, |

TABLE 23-continued

| |
|---|
| {1, 8, 10, 13, 14}, |
| {1, 8, 10, 14, 15}, |
| {1, 8, 11, 12, 13}, |
| {1, 8, 11, 12, 14}, |
| {1, 8, 11, 13, 15}, |
| {1, 8, 11, 14, 15}, |
| {1, 8, 12, 13, 14}, |
| {1, 8, 12, 13, 15}, |
| {1, 8, 12, 14, 15}, |
| {1, 8, 13, 14, 15}, |
| {1, 9, 10, 11, 12}, |
| {1, 9, 10, 11, 13}, |
| {1, 9, 10, 11, 14}, |
| {1, 9, 10, 11, 15}, |
| {1, 9, 10, 12, 13}, |
| {1, 9, 10, 12, 14}, |
| {1, 9, 10, 13, 15}, |
| {1, 9, 10, 14, 15}, |
| {1, 9, 11, 12, 13}, |
| {1, 9, 11, 12, 15}, |
| {1, 9, 11, 13, 14}, |
| {1, 9, 11, 14, 15}, |
| {1, 9, 12, 13, 14}, |
| {1, 9, 12, 13, 15}, |
| {1, 9, 12, 14, 15}, |
| {1, 9, 13, 14, 15}, |
| {1, 10, 11, 12, 14}, |
| {1, 10, 11, 12, 15}, |
| {1, 10, 11, 13, 14}, |
| {1, 10, 11, 13, 15}, |
| {1, 10, 12, 13, 14}, |
| {1, 10, 12, 13, 15}, |
| {1, 10, 12, 14, 15}, |
| {1, 10, 13, 14, 15}, |
| {1, 11, 12, 13, 14}, |
| {1, 11, 12, 13, 15}, |
| {1, 11, 12, 14, 15}, |
| {1, 11, 13, 14, 15}, |
| {2, 3, 4, 6, 8}, |
| {2, 3, 4, 6, 9}, |
| {2, 3, 4, 6, 10}, |
| {2, 3, 4, 6, 11}, |
| {2, 3, 4, 6, 12}, |
| {2, 3, 4, 6, 13}, |
| {2, 3, 4, 6, 14}, |
| {2, 3, 4, 6, 15}, |
| {2, 3, 4, 7, 8}, |
| {2, 3, 4, 7, 9}, |
| {2, 3, 4, 7, 10}, |
| {2, 3, 4, 7, 11}, |
| {2, 3, 4, 7, 12}, |
| {2, 3, 4, 7, 13}, |
| {2, 3, 4, 7, 14}, |
| {2, 3, 4, 7, 15}, |
| {2, 3, 4, 8, 10}, |
| {2, 3, 4, 8, 11}, |
| {2, 3, 4, 8, 12}, |
| {2, 3, 4, 8, 13}, |
| {2, 3, 4, 9, 10}, |
| {2, 3, 4, 9, 11}, |
| {2, 3, 4, 9, 12}, |
| {2, 3, 4, 9, 13}, |
| {2, 3, 4, 10, 14}, |
| {2, 3, 4, 10, 15}, |
| {2, 3, 4, 11, 14}, |
| {2, 3, 4, 11, 15}, |
| {2, 3, 4, 12, 14}, |
| {2, 3, 4, 12, 15}, |
| {2, 3, 4, 13, 14}, |
| {2, 3, 4, 13, 15}, |
| {2, 3, 5, 6, 8}, |
| {2, 3, 5, 6, 9}, |
| {2, 3, 5, 6, 10}, |
| {2, 3, 5, 6, 11}, |
| {2, 3, 5, 6, 12}, |
| {2, 3, 5, 6, 13}, |
| {2, 3, 5, 6, 14}, |
| {2, 3, 5, 6, 15}, |
| {2, 3, 5, 7, 8}, |

TABLE 23-continued

| |
|---|
| {2, 3, 5, 7, 9}, |
| {2, 3, 5, 7, 10}, |
| {2, 3, 5, 7, 11}, |
| {2, 3, 5, 7, 12}, |
| {2, 3, 5, 7, 13}, |
| {2, 3, 5, 7, 14}, |
| {2, 3, 5, 7, 15}, |
| {2, 3, 5, 8, 10}, |
| {2, 3, 5, 8, 11}, |
| {2, 3, 5, 8, 12}, |
| {2, 3, 5, 8, 13}, |
| {2, 3, 5, 9, 10}, |
| {2, 3, 5, 9, 11}, |
| {2, 3, 5, 9, 12}, |
| {2, 3, 5, 9, 13}, |
| {2, 3, 5, 10, 14}, |
| {2, 3, 5, 10, 15}, |
| {2, 3, 5, 11, 14}, |
| {2, 3, 5, 11, 15}, |
| {2, 3, 5, 12, 14}, |
| {2, 3, 5, 12, 15}, |
| {2, 3, 5, 13, 14}, |
| {2, 3, 5, 13, 15}, |
| {2, 3, 6, 8, 10}, |
| {2, 3, 6, 8, 11}, |
| {2, 3, 6, 8, 14}, |
| {2, 3, 6, 8, 15}, |
| {2, 3, 6, 9, 10}, |
| {2, 3, 6, 9, 11}, |
| {2, 3, 6, 9, 14}, |
| {2, 3, 6, 9, 15}, |
| {2, 3, 6, 10, 12}, |
| {2, 3, 6, 10, 13}, |
| {2, 3, 6, 11, 12}, |
| {2, 3, 6, 11, 13}, |
| {2, 3, 6, 12, 14}, |
| {2, 3, 6, 12, 15}, |
| {2, 3, 6, 13, 14}, |
| {2, 3, 6, 13, 15}, |
| {2, 3, 7, 8, 10}, |
| {2, 3, 7, 8, 11}, |
| {2, 3, 7, 8, 14}, |
| {2, 3, 7, 8, 15}, |
| {2, 3, 7, 9, 10}, |
| {2, 3, 7, 9, 11}, |
| {2, 3, 7, 9, 14}, |
| {2, 3, 7, 9, 15}, |
| {2, 3, 7, 10, 12}, |
| {2, 3, 7, 10, 13}, |
| {2, 3, 7, 11, 12}, |
| {2, 3, 7, 11, 13}, |
| {2, 3, 7, 12, 14}, |
| {2, 3, 7, 12, 15}, |
| {2, 3, 7, 13, 14}, |
| {2, 3, 7, 13, 15}, |
| {2, 3, 8, 10, 12}, |
| {2, 3, 8, 10, 13}, |
| {2, 3, 8, 10, 14}, |
| {2, 3, 8, 10, 15}, |
| {2, 3, 8, 11, 12}, |
| {2, 3, 8, 11, 13}, |
| {2, 3, 8, 11, 14}, |
| {2, 3, 8, 11, 15}, |
| {2, 3, 8, 12, 14}, |
| {2, 3, 8, 12, 15}, |
| {2, 3, 8, 13, 14}, |
| {2, 3, 8, 13, 15}, |
| {2, 3, 9, 10, 12}, |
| {2, 3, 9, 10, 13}, |
| {2, 3, 9, 10, 14}, |
| {2, 3, 9, 10, 15}, |
| {2, 3, 9, 11, 12}, |
| {2, 3, 9, 11, 13}, |
| {2, 3, 9, 11, 14}, |
| {2, 3, 9, 11, 15}, |
| {2, 3, 9, 12, 14}, |
| {2, 3, 9, 12, 15}, |
| {2, 3, 9, 13, 14}, |

TABLE 24

| |
|---|
| {2, 3, 9, 13, 15}, |
| {2, 3, 10, 12, 14}, |
| {2, 3, 10, 12, 15}, |
| {2, 3, 10, 13, 14}, |
| {2, 3, 10, 13, 15}, |
| {2, 3, 11, 12, 14}, |
| {2, 3, 11, 12, 15}, |
| {2, 3, 11, 13, 14}, |
| {2, 3, 11, 13, 15}, |
| {2, 4, 5, 6, 8}, |
| {2, 4, 5, 6, 9}, |
| {2, 4, 5, 6, 10}, |
| {2, 4, 5, 6, 11}, |
| {2, 4, 5, 6, 12}, |
| {2, 4, 5, 6, 13}, |
| {2, 4, 5, 6, 14}, |
| {2, 4, 5, 6, 15}, |
| {2, 4, 5, 7, 8}, |
| {2, 4, 5, 7, 9}, |
| {2, 4, 5, 7, 10}, |
| {2, 4, 5, 7, 11}, |
| {2, 4, 5, 7, 12}, |
| {2, 4, 5, 7, 13}, |
| {2, 4, 5, 7, 14}, |
| {2, 4, 5, 7, 15}, |
| {2, 4, 5, 8, 10}, |
| {2, 4, 5, 8, 11}, |
| {2, 4, 5, 8, 12}, |
| {2, 4, 5, 8, 13}, |
| {2, 4, 5, 9, 10}, |
| {2, 4, 5, 9, 11}, |
| {2, 4, 5, 9, 12}, |
| {2, 4, 5, 9, 13}, |
| {2, 4, 5, 10, 14}, |
| {2, 4, 5, 10, 15}, |
| {2, 4, 5, 11, 14}, |
| {2, 4, 5, 11, 15}, |
| {2, 4, 5, 12, 14}, |
| {2, 4, 5, 12, 15}, |
| {2, 4, 5, 13, 14}, |
| {2, 4, 5, 13, 15}, |
| {2, 4, 6, 7, 8}, |
| {2, 4, 6, 7, 9}, |
| {2, 4, 6, 7, 10}, |
| {2, 4, 6, 7, 11}, |
| {2, 4, 6, 7, 12}, |
| {2, 4, 6, 7, 13}, |
| {2, 4, 6, 7, 14}, |
| {2, 4, 6, 7, 15}, |
| {2, 4, 6, 8, 9}, |
| {2, 4, 6, 8, 11}, |
| {2, 4, 6, 8, 13}, |
| {2, 4, 6, 8, 15}, |
| {2, 4, 6, 9, 10}, |
| {2, 4, 6, 9, 12}, |
| {2, 4, 6, 9, 14}, |
| {2, 4, 6, 10, 11}, |
| {2, 4, 6, 10, 13}, |
| {2, 4, 6, 10, 15}, |
| {2, 4, 6, 11, 12}, |
| {2, 4, 6, 11, 14}, |
| {2, 4, 6, 12, 13}, |
| {2, 4, 6, 12, 15}, |
| {2, 4, 6, 13, 14}, |
| {2, 4, 6, 14, 15}, |
| {2, 4, 7, 8, 9}, |
| {2, 4, 7, 8, 10}, |
| {2, 4, 7, 8, 12}, |
| {2, 4, 7, 8, 15}, |
| {2, 4, 7, 9, 11}, |
| {2, 4, 7, 9, 13}, |
| {2, 4, 7, 9, 14}, |
| {2, 4, 7, 10, 11}, |
| {2, 4, 7, 10, 13}, |
| {2, 4, 7, 10, 14}, |
| {2, 4, 7, 11, 12}, |
| {2, 4, 7, 11, 15}, |
| {2, 4, 7, 12, 13}, |
| {2, 4, 7, 12, 14}, |

TABLE 24-continued

| |
|---|
| {2, 4, 7, 13, 15}, |
| {2, 4, 7, 14, 15}, |
| {2, 4, 8, 9, 10}, |
| {2, 4, 8, 9, 11}, |
| {2, 4, 8, 9, 12}, |
| {2, 4, 8, 9, 13}, |
| {2, 4, 8, 10, 11}, |
| {2, 4, 8, 10, 13}, |
| {2, 4, 8, 10, 15}, |
| {2, 4, 8, 11, 12}, |
| {2, 4, 8, 11, 15}, |
| {2, 4, 8, 12, 13}, |
| {2, 4, 8, 12, 15}, |
| {2, 4, 8, 13, 15}, |
| {2, 4, 9, 10, 11}, |
| {2, 4, 9, 10, 13}, |
| {2, 4, 9, 10, 14}, |
| {2, 4, 9, 11, 12}, |
| {2, 4, 9, 11, 14}, |
| {2, 4, 9, 12, 13}, |
| {2, 4, 9, 12, 14}, |
| {2, 4, 9, 13, 14}, |
| {2, 4, 10, 11, 14}, |
| {2, 4, 10, 11, 15}, |
| {2, 4, 10, 13, 14}, |
| {2, 4, 10, 13, 15}, |
| {2, 4, 10, 14, 15}, |
| {2, 4, 11, 12, 14}, |
| {2, 4, 11, 12, 15}, |
| {2, 4, 11, 14, 15}, |
| {2, 4, 12, 13, 14}, |
| {2, 4, 12, 13, 15}, |
| {2, 4, 12, 14, 15}, |
| {2, 4, 13, 14, 15}, |
| {2, 5, 6, 7, 8}, |
| {2, 5, 6, 7, 9}, |
| {2, 5, 6, 7, 10}, |
| {2, 5, 6, 7, 11}, |
| {2, 5, 6, 7, 12}, |
| {2, 5, 6, 7, 13}, |
| {2, 5, 6, 7, 14}, |
| {2, 5, 6, 7, 15}, |
| {2, 5, 6, 8, 9}, |
| {2, 5, 6, 8, 10}, |
| {2, 5, 6, 8, 13}, |
| {2, 5, 6, 8, 14}, |
| {2, 5, 6, 9, 11}, |
| {2, 5, 6, 9, 12}, |
| {2, 5, 6, 9, 15}, |
| {2, 5, 6, 10, 11}, |
| {2, 5, 6, 10, 12}, |
| {2, 5, 6, 10, 15}, |
| {2, 5, 6, 11, 13}, |
| {2, 5, 6, 11, 14}, |
| {2, 5, 6, 12, 13}, |
| {2, 5, 6, 12, 14}, |
| {2, 5, 6, 13, 15}, |
| {2, 5, 6, 14, 15}, |
| {2, 5, 7, 8, 9}, |
| {2, 5, 7, 8, 11}, |
| {2, 5, 7, 8, 12}, |
| {2, 5, 7, 8, 14}, |
| {2, 5, 7, 9, 10}, |
| {2, 5, 7, 9, 13}, |
| {2, 5, 7, 9, 15}, |
| {2, 5, 7, 10, 11}, |
| {2, 5, 7, 10, 12}, |
| {2, 5, 7, 10, 14}, |
| {2, 5, 7, 11, 13}, |
| {2, 5, 7, 11, 15}, |
| {2, 5, 7, 12, 13}, |
| {2, 5, 7, 12, 15}, |
| {2, 5, 7, 13, 14}, |
| {2, 5, 7, 14, 15}, |
| {2, 5, 8, 9, 10}, |
| {2, 5, 8, 9, 11}, |
| {2, 5, 8, 9, 12}, |
| {2, 5, 8, 9, 13}, |
| {2, 5, 8, 10, 11}, |

TABLE 24-continued

| |
|---|
| {2, 5, 8, 10, 12}, |
| {2, 5, 8, 10, 14}, |
| {2, 5, 8, 11, 13}, |
| {2, 5, 8, 11, 14}, |
| {2, 5, 8, 12, 13}, |
| {2, 5, 8, 12, 14}, |
| {2, 5, 8, 13, 14}, |
| {2, 5, 9, 10, 11}, |
| {2, 5, 9, 10, 12}, |
| {2, 5, 9, 10, 15}, |
| {2, 5, 9, 11, 13}, |
| {2, 5, 9, 11, 15}, |
| {2, 5, 9, 12, 13}, |
| {2, 5, 9, 12, 15}, |
| {2, 5, 9, 13, 15}, |
| {2, 5, 10, 11, 14}, |
| {2, 5, 10, 11, 15}, |
| {2, 5, 10, 12, 14}, |
| {2, 5, 10, 12, 15}, |
| {2, 5, 10, 14, 15}, |
| {2, 5, 11, 13, 14}, |
| {2, 5, 11, 13, 15}, |
| {2, 5, 11, 14, 15}, |
| {2, 5, 12, 13, 14}, |
| {2, 5, 12, 13, 15}, |
| {2, 5, 12, 14, 15}, |
| {2, 5, 13, 14, 15}, |
| {2, 6, 7, 8, 10}, |
| {2, 6, 7, 8, 11}, |
| {2, 6, 7, 8, 14}, |
| {2, 6, 7, 8, 15}, |
| {2, 6, 7, 9, 10}, |
| {2, 6, 7, 9, 11}, |
| {2, 6, 7, 9, 14}, |
| {2, 6, 7, 9, 15}, |
| {2, 6, 7, 10, 12}, |
| {2, 6, 7, 10, 13}, |
| {2, 6, 7, 11, 12}, |
| {2, 6, 7, 11, 13}, |
| {2, 6, 7, 12, 14}, |
| {2, 6, 7, 12, 15}, |
| {2, 6, 7, 13, 14}, |
| {2, 6, 7, 13, 15}, |
| {2, 6, 8, 9, 10}, |
| {2, 6, 8, 9, 11}, |
| {2, 6, 8, 9, 14}, |
| {2, 6, 8, 9, 15}, |
| {2, 6, 8, 10, 11}, |
| {2, 6, 8, 10, 13}, |
| {2, 6, 8, 10, 15}, |
| {2, 6, 8, 11, 13}, |
| {2, 6, 8, 11, 14}, |
| {2, 6, 8, 13, 14}, |
| {2, 6, 8, 13, 15}, |
| {2, 6, 8, 14, 15}, |
| {2, 6, 9, 10, 11}, |
| {2, 6, 9, 10, 12}, |
| {2, 6, 9, 10, 15}, |
| {2, 6, 9, 11, 12}, |
| {2, 6, 9, 11, 14}, |
| {2, 6, 9, 12, 14}, |
| {2, 6, 9, 12, 15}, |
| {2, 6, 9, 14, 15}, |
| {2, 6, 10, 11, 12}, |
| {2, 6, 10, 11, 13}, |
| {2, 6, 10, 12, 13}, |
| {2, 6, 10, 12, 15}, |
| {2, 6, 10, 13, 15}, |
| {2, 6, 11, 12, 13}, |
| {2, 6, 11, 12, 14}, |
| {2, 6, 11, 13, 14}, |
| {2, 6, 12, 13, 14}, |
| {2, 6, 12, 13, 15}, |
| {2, 6, 12, 14, 15}, |
| {2, 6, 13, 14, 15}, |
| {2, 7, 8, 9, 10}, |
| {2, 7, 8, 9, 11}, |
| {2, 7, 8, 9, 14}, |
| {2, 7, 8, 9, 15}, |

TABLE 24-continued

| |
|---|
| {2, 7, 8, 10, 11}, |
| {2, 7, 8, 10, 12}, |
| {2, 7, 8, 10, 14}, |
| {2, 7, 8, 11, 12}, |
| {2, 7, 8, 11, 15}, |
| {2, 7, 8, 12, 14}, |
| {2, 7, 8, 12, 15}, |
| {2, 7, 8, 14, 15}, |
| {2, 7, 9, 10, 11}, |
| {2, 7, 9, 10, 13}, |
| {2, 7, 9, 10, 14}, |
| {2, 7, 9, 11, 13}, |
| {2, 7, 9, 11, 15}, |
| {2, 7, 9, 13, 14}, |
| {2, 7, 9, 13, 15}, |
| {2, 7, 9, 14, 15}, |
| {2, 7, 10, 11, 12}, |
| {2, 7, 10, 11, 13}, |
| {2, 7, 10, 12, 13}, |
| {2, 7, 10, 12, 14}, |
| {2, 7, 10, 13, 14}, |
| {2, 7, 11, 12, 13}, |
| {2, 7, 11, 12, 15}, |
| {2, 7, 11, 13, 15}, |
| {2, 7, 12, 13, 14}, |
| {2, 7, 12, 13, 15}, |
| {2, 7, 12, 14, 15}, |
| {2, 7, 13, 14, 15}, |
| {2, 8, 9, 10, 12}, |
| {2, 8, 9, 10, 13}, |
| {2, 8, 9, 10, 14}, |
| {2, 8, 9, 10, 15}, |
| {2, 8, 9, 11, 12}, |
| {2, 8, 9, 11, 13}, |
| {2, 8, 9, 11, 14}, |
| {2, 8, 9, 11, 15}, |
| {2, 8, 9, 12, 14}, |
| {2, 8, 9, 12, 15}, |
| {2, 8, 9, 13, 14}, |
| {2, 8, 9, 13, 15}, |
| {2, 8, 10, 11, 12}, |
| {2, 8, 10, 11, 13}, |
| {2, 8, 10, 11, 14}, |
| {2, 8, 10, 11, 15}, |
| {2, 8, 10, 12, 13}, |
| {2, 8, 10, 12, 15}, |
| {2, 8, 10, 13, 14}, |
| {2, 8, 10, 14, 15}, |
| {2, 8, 11, 12, 13}, |
| {2, 8, 11, 12, 14}, |
| {2, 8, 11, 13, 15}, |
| {2, 8, 11, 14, 15}, |
| {2, 8, 12, 13, 14}, |
| {2, 8, 12, 13, 15}, |
| {2, 8, 12, 14, 15}, |
| {2, 8, 13, 14, 15}, |
| {2, 9, 10, 11, 12}, |
| {2, 9, 10, 11, 13}, |
| {2, 9, 10, 11, 14}, |
| {2, 9, 10, 11, 15}, |
| {2, 9, 10, 12, 13}, |
| {2, 9, 10, 12, 14}, |
| {2, 9, 10, 13, 15}, |
| {2, 9, 10, 14, 15}, |
| {2, 9, 11, 12, 13}, |
| {2, 9, 11, 12, 15}, |
| {2, 9, 11, 13, 14}, |
| {2, 9, 11, 14, 15}, |
| {2, 9, 12, 13, 14}, |
| {2, 9, 12, 13, 15}, |
| {2, 9, 12, 14, 15}, |
| {2, 9, 13, 14, 15}, |
| {2, 10, 11, 12, 14}, |
| {2, 10, 11, 12, 15}, |
| {2, 10, 11, 13, 14}, |
| {2, 10, 11, 13, 15}, |
| {2, 10, 12, 13, 14}, |
| {2, 10, 12, 13, 15}, |

TABLE 25

| |
|---|
| {2, 10, 12, 14, 15}, |
| {2, 10, 13, 14, 15}, |
| {2, 11, 12, 13, 14}, |
| {2, 11, 12, 13, 15}, |
| {2, 11, 12, 14, 15}, |
| {2, 11, 13, 14, 15}, |
| {3, 4, 5, 6, 8}, |
| {3, 4, 5, 6, 9}, |
| {3, 4, 5, 6, 10}, |
| {3, 4, 5, 6, 11}, |
| {3, 4, 5, 6, 12}, |
| {3, 4, 5, 6, 13}, |
| {3, 4, 5, 6, 14}, |
| {3, 4, 5, 6, 15}, |
| {3, 4, 5, 7, 8}, |
| {3, 4, 5, 7, 9}, |
| {3, 4, 5, 7, 10}, |
| {3, 4, 5, 7, 11}, |
| {3, 4, 5, 7, 12}, |
| {3, 4, 5, 7, 13}, |
| {3, 4, 5, 7, 14}, |
| {3, 4, 5, 7, 15}, |
| {3, 4, 5, 8, 10}, |
| {3, 4, 5, 8, 11}, |
| {3, 4, 5, 8, 12}, |
| {3, 4, 5, 8, 13}, |
| {3, 4, 5, 9, 10}, |
| {3, 4, 5, 9, 11}, |
| {3, 4, 5, 9, 12}, |
| {3, 4, 5, 9, 13}, |
| {3, 4, 5, 10, 14}, |
| {3, 4, 5, 10, 15}, |
| {3, 4, 5, 11, 14}, |
| {3, 4, 5, 11, 15}, |
| {3, 4, 5, 12, 14}, |
| {3, 4, 5, 12, 15}, |
| {3, 4, 5, 13, 14}, |
| {3, 4, 5, 13, 15}, |
| {3, 4, 6, 7, 8}, |
| {3, 4, 6, 7, 9}, |
| {3, 4, 6, 7, 10}, |
| {3, 4, 6, 7, 11}, |
| {3, 4, 6, 7, 12}, |
| {3, 4, 6, 7, 13}, |
| {3, 4, 6, 7, 14}, |
| {3, 4, 6, 7, 15}, |
| {3, 4, 6, 8, 9}, |
| {3, 4, 6, 8, 11}, |
| {3, 4, 6, 8, 12}, |
| {3, 4, 6, 8, 14}, |
| {3, 4, 6, 9, 10}, |
| {3, 4, 6, 9, 13}, |
| {3, 4, 6, 9, 15}, |
| {3, 4, 6, 10, 11}, |
| {3, 4, 6, 10, 12}, |
| {3, 4, 6, 10, 14}, |
| {3, 4, 6, 11, 13}, |
| {3, 4, 6, 11, 15}, |
| {3, 4, 6, 12, 13}, |
| {3, 4, 6, 12, 15}, |
| {3, 4, 6, 13, 14}, |
| {3, 4, 6, 14, 15}, |
| {3, 4, 7, 8, 9}, |
| {3, 4, 7, 8, 10}, |
| {3, 4, 7, 8, 13}, |
| {3, 4, 7, 8, 14}, |
| {3, 4, 7, 9, 11}, |
| {3, 4, 7, 9, 12}, |
| {3, 4, 7, 9, 15}, |
| {3, 4, 7, 10, 11}, |
| {3, 4, 7, 10, 12}, |
| {3, 4, 7, 10, 15}, |
| {3, 4, 7, 11, 13}, |
| {3, 4, 7, 11, 14}, |
| {3, 4, 7, 12, 13}, |
| {3, 4, 7, 12, 14}, |
| {3, 4, 7, 13, 15}, |
| {3, 4, 7, 14, 15}, |
| {3, 4, 8, 9, 10}, |

TABLE 25-continued

| |
|---|
| {3, 4, 8, 9, 11}, |
| {3, 4, 8, 9, 12}, |
| {3, 4, 8, 9, 13}, |
| {3, 4, 8, 10, 11}, |
| {3, 4, 8, 10, 12}, |
| {3, 4, 8, 10, 14}, |
| {3, 4, 8, 11, 13}, |
| {3, 4, 8, 11, 14}, |
| {3, 4, 8, 12, 13}, |
| {3, 4, 8, 12, 14}, |
| {3, 4, 8, 13, 14}, |
| {3, 4, 9, 10, 11}, |
| {3, 4, 9, 10, 12}, |
| {3, 4, 9, 10, 15}, |
| {3, 4, 9, 11, 13}, |
| {3, 4, 9, 11, 15}, |
| {3, 4, 9, 12, 13}, |
| {3, 4, 9, 12, 15}, |
| {3, 4, 9, 13, 15}, |
| {3, 4, 10, 11, 14}, |
| {3, 4, 10, 11, 15}, |
| {3, 4, 10, 12, 14}, |
| {3, 4, 10, 12, 15}, |
| {3, 4, 10, 14, 15}, |
| {3, 4, 11, 13, 14}, |
| {3, 4, 11, 13, 15}, |
| {3, 4, 11, 14, 15}, |
| {3, 4, 12, 13, 14}, |
| {3, 4, 12, 13, 15}, |
| {3, 4, 12, 14, 15}, |
| {3, 4, 13, 14, 15}, |
| {3, 5, 6, 7, 8}, |
| {3, 5, 6, 7, 9}, |
| {3, 5, 6, 7, 10}, |
| {3, 5, 6, 7, 11}, |
| {3, 5, 6, 7, 12}, |
| {3, 5, 6, 7, 13}, |
| {3, 5, 6, 7, 14}, |
| {3, 5, 6, 7, 15}, |
| {3, 5, 6, 8, 9}, |
| {3, 5, 6, 8, 10}, |
| {3, 5, 6, 8, 12}, |
| {3, 5, 6, 8, 15}, |
| {3, 5, 6, 9, 11}, |
| {3, 5, 6, 9, 13}, |
| {3, 5, 6, 9, 14}, |
| {3, 5, 6, 10, 11}, |
| {3, 5, 6, 10, 13}, |
| {3, 5, 6, 10, 14}, |
| {3, 5, 6, 11, 12}, |
| {3, 5, 6, 11, 15}, |
| {3, 5, 6, 12, 13}, |
| {3, 5, 6, 12, 14}, |
| {3, 5, 6, 13, 15}, |
| {3, 5, 6, 14, 15}, |
| {3, 5, 7, 8, 9}, |
| {3, 5, 7, 8, 11}, |
| {3, 5, 7, 8, 13}, |
| {3, 5, 7, 8, 15}, |
| {3, 5, 7, 9, 10}, |
| {3, 5, 7, 9, 12}, |
| {3, 5, 7, 9, 14}, |
| {3, 5, 7, 10, 11}, |
| {3, 5, 7, 10, 13}, |
| {3, 5, 7, 10, 15}, |
| {3, 5, 7, 11, 12}, |
| {3, 5, 7, 11, 14}, |
| {3, 5, 7, 12, 13}, |
| {3, 5, 7, 12, 15}, |
| {3, 5, 7, 13, 14}, |
| {3, 5, 7, 14, 15}, |
| {3, 5, 8, 9, 10}, |
| {3, 5, 8, 9, 11}, |
| {3, 5, 8, 9, 12}, |
| {3, 5, 8, 9, 13}, |
| {3, 5, 8, 10, 11}, |
| {3, 5, 8, 10, 13}, |
| {3, 5, 8, 10, 15}, |
| {3, 5, 8, 11, 12}, |

TABLE 25-continued

| |
|---|
| {3, 5, 8, 11, 15}, |
| {3, 5, 8, 12, 13}, |
| {3, 5, 8, 12, 15}, |
| {3, 5, 8, 13, 15}, |
| {3, 5, 9, 10, 11}, |
| {3, 5, 9, 10, 13}, |
| {3, 5, 9, 10, 14}, |
| {3, 5, 9, 11, 12}, |
| {3, 5, 9, 11, 14}, |
| {3, 5, 9, 12, 13}, |
| {3, 5, 9, 12, 14}, |
| {3, 5, 9, 13, 14}, |
| {3, 5, 10, 11, 14}, |
| {3, 5, 10, 11, 15}, |
| {3, 5, 10, 13, 14}, |
| {3, 5, 10, 13, 15}, |
| {3, 5, 10, 14, 15}, |
| {3, 5, 11, 12, 14}, |
| {3, 5, 11, 12, 15}, |
| {3, 5, 11, 14, 15}, |
| {3, 5, 12, 13, 14}, |
| {3, 5, 12, 13, 15}, |
| {3, 5, 12, 14, 15}, |
| {3, 5, 13, 14, 15}, |
| {3, 6, 7, 8, 10}, |
| {3, 6, 7, 8, 11}, |
| {3, 6, 7, 8, 14}, |
| {3, 6, 7, 8, 15}, |
| {3, 6, 7, 9, 10}, |
| {3, 6, 7, 9, 11}, |
| {3, 6, 7, 9, 14}, |
| {3, 6, 7, 9, 15}, |
| {3, 6, 7, 10, 12}, |
| {3, 6, 7, 10, 13}, |
| {3, 6, 7, 11, 12}, |
| {3, 6, 7, 11, 13}, |
| {3, 6, 7, 12, 14}, |
| {3, 6, 7, 12, 15}, |
| {3, 6, 7, 13, 14}, |
| {3, 6, 7, 13, 15}, |
| {3, 6, 8, 9, 10}, |
| {3, 6, 8, 9, 11}, |
| {3, 6, 8, 9, 14}, |
| {3, 6, 8, 9, 15}, |
| {3, 6, 8, 10, 11}, |
| {3, 6, 8, 10, 12}, |
| {3, 6, 8, 10, 14}, |
| {3, 6, 8, 11, 12}, |
| {3, 6, 8, 11, 15}, |
| {3, 6, 8, 12, 14}, |
| {3, 6, 8, 12, 15}, |
| {3, 6, 8, 14, 15}, |
| {3, 6, 9, 10, 11}, |
| {3, 6, 9, 10, 13}, |
| {3, 6, 9, 10, 14}, |
| {3, 6, 9, 11, 13}, |
| {3, 6, 9, 11, 15}, |
| {3, 6, 9, 13, 14}, |
| {3, 6, 9, 13, 15}, |
| {3, 6, 9, 14, 15}, |
| {3, 6, 10, 11, 12}, |
| {3, 6, 10, 11, 13}, |
| {3, 6, 10, 12, 13}, |
| {3, 6, 10, 12, 14}, |
| {3, 6, 10, 13, 14}, |
| {3, 6, 11, 12, 13}, |
| {3, 6, 11, 12, 15}, |
| {3, 6, 11, 13, 15}, |
| {3, 6, 12, 13, 14}, |
| {3, 6, 12, 13, 15}, |
| {3, 6, 12, 14, 15}, |
| {3, 6, 13, 14, 15}, |
| {3, 7, 8, 9, 10}, |
| {3, 7, 8, 9, 11}, |
| {3, 7, 8, 9, 14}, |
| {3, 7, 8, 9, 15}, |
| {3, 7, 8, 10, 11}, |
| {3, 7, 8, 10, 13}, |
| {3, 7, 8, 10, 15}, |

TABLE 25-continued

| |
|---|
| {3, 7, 8, 11, 13}, |
| {3, 7, 8, 11, 14}, |
| {3, 7, 8, 13, 14}, |
| {3, 7, 8, 13, 15}, |
| {3, 7, 8, 14, 15}, |
| {3, 7, 9, 10, 11}, |
| {3, 7, 9, 10, 12}, |
| {3, 7, 9, 10, 15}, |
| {3, 7, 9, 11, 12}, |
| {3, 7, 9, 11, 14}, |
| {3, 7, 9, 12, 14}, |
| {3, 7, 9, 12, 15}, |
| {3, 7, 9, 14, 15}, |
| {3, 7, 10, 11, 12}, |
| {3, 7, 10, 11, 13}, |
| {3, 7, 10, 12, 13}, |
| {3, 7, 10, 12, 15}, |
| {3, 7, 10, 13, 15}, |
| {3, 7, 11, 12, 13}, |
| {3, 7, 11, 12, 14}, |
| {3, 7, 11, 13, 14}, |
| {3, 7, 12, 13, 14}, |
| {3, 7, 12, 13, 15}, |
| {3, 7, 12, 14, 15}, |
| {3, 7, 13, 14, 15}, |
| {3, 8, 9, 10, 12}, |
| {3, 8, 9, 10, 13}, |
| {3, 8, 9, 10, 14}, |
| {3, 8, 9, 10, 15}, |
| {3, 8, 9, 11, 12}, |
| {3, 8, 9, 11, 13}, |
| {3, 8, 9, 11, 14}, |
| {3, 8, 9, 11, 15}, |
| {3, 8, 9, 12, 14}, |
| {3, 8, 9, 12, 15}, |
| {3, 8, 9, 13, 14}, |
| {3, 8, 9, 13, 15}, |
| {3, 8, 10, 11, 12}, |
| {3, 8, 10, 11, 13}, |
| {3, 8, 10, 11, 14}, |
| {3, 8, 10, 11, 15}, |
| {3, 8, 10, 12, 13}, |
| {3, 8, 10, 12, 15}, |
| {3, 8, 10, 13, 14}, |
| {3, 8, 10, 14, 15}, |
| {3, 8, 11, 12, 13}, |
| {3, 8, 11, 12, 14}, |
| {3, 8, 11, 13, 15}, |
| {3, 8, 11, 14, 15}, |
| {3, 8, 12, 13, 14}, |
| {3, 8, 12, 13, 15}, |
| {3, 8, 12, 14, 15}, |
| {3, 8, 13, 14, 15}, |
| {3, 9, 10, 11, 12}, |
| {3, 9, 10, 11, 13}, |
| {3, 9, 10, 11, 14}, |
| {3, 9, 10, 11, 15}, |
| {3, 9, 10, 12, 13}, |
| {3, 9, 10, 12, 14}, |
| {3, 9, 10, 13, 15}, |
| {3, 9, 10, 14, 15}, |
| {3, 9, 11, 12, 13}, |
| {3, 9, 11, 12, 15}, |
| {3, 9, 11, 13, 14}, |
| {3, 9, 11, 14, 15}, |
| {3, 9, 12, 13, 14}, |
| {3, 9, 12, 13, 15}, |
| {3, 9, 12, 14, 15}, |
| {3, 9, 13, 14, 15}, |
| {3, 10, 11, 12, 14}, |
| {3, 10, 11, 12, 15}, |
| {3, 10, 11, 13, 14}, |
| {3, 10, 11, 13, 15}, |
| {3, 10, 12, 13, 14}, |
| {3, 10, 12, 13, 15}, |
| {3, 10, 12, 14, 15}, |
| {3, 10, 13, 14, 15}, |
| {3, 11, 12, 13, 14}, |

TABLE 26

| |
|---|
| {3, 11, 12, 13, 15}, |
| {3, 11, 12, 14, 15}, |
| {3, 11, 13, 14, 15}, |
| {4, 5, 6, 8, 12}, |
| {4, 5, 6, 8, 13}, |
| {4, 5, 6, 8, 14}, |
| {4, 5, 6, 8, 15}, |
| {4, 5, 6, 9, 12}, |
| {4, 5, 6, 9, 13}, |
| {4, 5, 6, 9, 14}, |
| {4, 5, 6, 9, 15}, |
| {4, 5, 6, 10, 12}, |
| {4, 5, 6, 10, 13}, |
| {4, 5, 6, 10, 14}, |
| {4, 5, 6, 10, 15}, |
| {4, 5, 6, 11, 12}, |
| {4, 5, 6, 11, 13}, |
| {4, 5, 6, 11, 14}, |
| {4, 5, 6, 11, 15}, |
| {4, 5, 7, 8, 12}, |
| {4, 5, 7, 8, 13}, |
| {4, 5, 7, 8, 14}, |
| {4, 5, 7, 8, 15}, |
| {4, 5, 7, 9, 12}, |
| {4, 5, 7, 9, 13}, |
| {4, 5, 7, 9, 14}, |
| {4, 5, 7, 9, 15}, |
| {4, 5, 7, 10, 12}, |
| {4, 5, 7, 10, 13}, |
| {4, 5, 7, 10, 14}, |
| {4, 5, 7, 10, 15}, |
| {4, 5, 7, 11, 12}, |
| {4, 5, 7, 11, 13}, |
| {4, 5, 7, 11, 14}, |
| {4, 5, 7, 11, 15}, |
| {4, 5, 8, 10, 12}, |
| {4, 5, 8, 10, 13}, |
| {4, 5, 8, 10, 14}, |
| {4, 5, 8, 10, 15}, |
| {4, 5, 8, 11, 12}, |
| {4, 5, 8, 11, 13}, |
| {4, 5, 8, 11, 14}, |
| {4, 5, 8, 11, 15}, |
| {4, 5, 8, 12, 14}, |
| {4, 5, 8, 12, 15}, |
| {4, 5, 8, 13, 14}, |
| {4, 5, 8, 13, 15}, |
| {4, 5, 9, 10, 12}, |
| {4, 5, 9, 10, 13}, |
| {4, 5, 9, 10, 14}, |
| {4, 5, 9, 10, 15}, |
| {4, 5, 9, 11, 12}, |
| {4, 5, 9, 11, 13}, |
| {4, 5, 9, 11, 14}, |
| {4, 5, 9, 11, 15}, |
| {4, 5, 9, 12, 14}, |
| {4, 5, 9, 12, 15}, |
| {4, 5, 9, 13, 14}, |
| {4, 5, 9, 13, 15}, |
| {4, 5, 10, 12, 14}, |
| {4, 5, 10, 12, 15}, |
| {4, 5, 10, 13, 14}, |
| {4, 5, 10, 13, 15}, |
| {4, 5, 11, 12, 14}, |
| {4, 5, 11, 12, 15}, |
| {4, 5, 11, 13, 14}, |
| {4, 5, 11, 13, 15}, |
| {4, 6, 7, 8, 12}, |
| {4, 6, 7, 8, 13}, |
| {4, 6, 7, 8, 14}, |
| {4, 6, 7, 8, 15}, |
| {4, 6, 7, 9, 12}, |
| {4, 6, 7, 9, 13}, |
| {4, 6, 7, 9, 14}, |
| {4, 6, 7, 9, 15}, |
| {4, 6, 7, 10, 12}, |
| {4, 6, 7, 10, 13}, |
| {4, 6, 7, 10, 14}, |
| {4, 6, 7, 10, 15}, |

TABLE 26-continued

| |
|---|
| {4, 6, 7, 11, 12}, |
| {4, 6, 7, 11, 13}, |
| {4, 6, 7, 11, 14}, |
| {4, 6, 7, 11, 15}, |
| {4, 6, 8, 9, 12}, |
| {4, 6, 8, 9, 13}, |
| {4, 6, 8, 9, 14}, |
| {4, 6, 8, 9, 15}, |
| {4, 6, 8, 11, 12}, |
| {4, 6, 8, 11, 13}, |
| {4, 6, 8, 11, 14}, |
| {4, 6, 8, 11, 15}, |
| {4, 6, 8, 12, 13}, |
| {4, 6, 8, 12, 15}, |
| {4, 6, 8, 13, 14}, |
| {4, 6, 8, 14, 15}, |
| {4, 6, 9, 10, 12}, |
| {4, 6, 9, 10, 13}, |
| {4, 6, 9, 10, 14}, |
| {4, 6, 9, 10, 15}, |
| {4, 6, 9, 12, 13}, |
| {4, 6, 9, 12, 15}, |
| {4, 6, 9, 13, 14}, |
| {4, 6, 9, 14, 15}, |
| {4, 6, 10, 11, 12}, |
| {4, 6, 10, 11, 13}, |
| {4, 6, 10, 11, 14}, |
| {4, 6, 10, 11, 15}, |
| {4, 6, 10, 12, 13}, |
| {4, 6, 10, 12, 15}, |
| {4, 6, 10, 13, 14}, |
| {4, 6, 10, 14, 15}, |
| {4, 6, 11, 12, 13}, |
| {4, 6, 11, 12, 15}, |
| {4, 6, 11, 13, 14}, |
| {4, 6, 11, 14, 15}, |
| {4, 7, 8, 9, 12}, |
| {4, 7, 8, 9, 13}, |
| {4, 7, 8, 9, 14}, |
| {4, 7, 8, 9, 15}, |
| {4, 7, 8, 10, 12}, |
| {4, 7, 8, 10, 13}, |
| {4, 7, 8, 10, 14}, |
| {4, 7, 8, 10, 15}, |
| {4, 7, 8, 12, 13}, |
| {4, 7, 8, 12, 14}, |
| {4, 7, 8, 13, 15}, |
| {4, 7, 8, 14, 15}, |
| {4, 7, 9, 11, 12}, |
| {4, 7, 9, 11, 13}, |
| {4, 7, 9, 11, 14}, |
| {4, 7, 9, 11, 15}, |
| {4, 7, 9, 12, 13}, |
| {4, 7, 9, 12, 14}, |
| {4, 7, 9, 13, 15}, |
| {4, 7, 9, 14, 15}, |
| {4, 7, 10, 11, 12}, |
| {4, 7, 10, 11, 13}, |
| {4, 7, 10, 11, 14}, |
| {4, 7, 10, 11, 15}, |
| {4, 7, 10, 12, 13}, |
| {4, 7, 10, 12, 14}, |
| {4, 7, 10, 13, 15}, |
| {4, 7, 10, 14, 15}, |
| {4, 7, 11, 12, 13}, |
| {4, 7, 11, 12, 14}, |
| {4, 7, 11, 13, 15}, |
| {4, 7, 11, 14, 15}, |
| {4, 8, 9, 10, 12}, |
| {4, 8, 9, 10, 13}, |
| {4, 8, 9, 10, 14}, |
| {4, 8, 9, 10, 15}, |
| {4, 8, 9, 11, 12}, |
| {4, 8, 9, 11, 13}, |
| {4, 8, 9, 11, 14}, |
| {4, 8, 9, 11, 15}, |
| {4, 8, 9, 12, 14}, |
| {4, 8, 9, 12, 15}, |
| {4, 8, 9, 13, 14}, |

TABLE 26-continued

| |
|---|
| {4, 8, 9, 13, 15}, |
| {4, 8, 10, 11, 12}, |
| {4, 8, 10, 11, 13}, |
| {4, 8, 10, 11, 14}, |
| {4, 8, 10, 11, 15}, |
| {4, 8, 10, 12, 13}, |
| {4, 8, 10, 12, 15}, |
| {4, 8, 10, 13, 14}, |
| {4, 8, 10, 14, 15}, |
| {4, 8, 11, 12, 13}, |
| {4, 8, 11, 12, 14}, |
| {4, 8, 11, 13, 15}, |
| {4, 8, 11, 14, 15}, |
| {4, 8, 12, 13, 14}, |
| {4, 8, 12, 13, 15}, |
| {4, 8, 12, 14, 15}, |
| {4, 8, 13, 14, 15}, |
| {4, 9, 10, 11, 12}, |
| {4, 9, 10, 11, 13}, |
| {4, 9, 10, 11, 14}, |
| {4, 9, 10, 11, 15}, |
| {4, 9, 10, 12, 13}, |
| {4, 9, 10, 12, 14}, |
| {4, 9, 10, 13, 15}, |
| {4, 9, 10, 14, 15}, |
| {4, 9, 11, 12, 13}, |
| {4, 9, 11, 12, 15}, |
| {4, 9, 11, 13, 14}, |
| {4, 9, 11, 14, 15}, |
| {4, 9, 12, 13, 14}, |
| {4, 9, 12, 13, 15}, |
| {4, 9, 12, 14, 15}, |
| {4, 9, 13, 14, 15}, |
| {4, 10, 11, 12, 14}, |
| {4, 10, 11, 12, 15}, |
| {4, 10, 11, 13, 14}, |
| {4, 10, 11, 13, 15}, |
| {4, 10, 12, 13, 14}, |
| {4, 10, 12, 13, 15}, |
| {4, 10, 12, 14, 15}, |
| {4, 10, 13, 14, 15}, |
| {4, 11, 12, 13, 14}, |
| {4, 11, 12, 13, 15}, |
| {4, 11, 12, 14, 15}, |
| {4, 11, 13, 14, 15}, |
| {5, 6, 7, 8, 12}, |
| {5, 6, 7, 8, 13}, |
| {5, 6, 7, 8, 14}, |
| {5, 6, 7, 8, 15}, |
| {5, 6, 7, 9, 12}, |
| {5, 6, 7, 9, 13}, |
| {5, 6, 7, 9, 14}, |
| {5, 6, 7, 9, 15}, |
| {5, 6, 7, 10, 12}, |
| {5, 6, 7, 10, 13}, |
| {5, 6, 7, 10, 14}, |
| {5, 6, 7, 10, 15}, |
| {5, 6, 7, 11, 12}, |
| {5, 6, 7, 11, 13}, |
| {5, 6, 7, 11, 14}, |
| {5, 6, 7, 11, 15}, |
| {5, 6, 8, 9, 12}, |
| {5, 6, 8, 9, 13}, |
| {5, 6, 8, 9, 14}, |
| {5, 6, 8, 9, 15}, |
| {5, 6, 8, 10, 12}, |
| {5, 6, 8, 10, 13}, |
| {5, 6, 8, 10, 14}, |
| {5, 6, 8, 10, 15}, |
| {5, 6, 8, 12, 13}, |
| {5, 6, 8, 12, 14}, |
| {5, 6, 8, 13, 15}, |
| {5, 6, 8, 14, 15}, |
| {5, 6, 9, 11, 12}, |
| {5, 6, 9, 11, 13}, |
| {5, 6, 9, 11, 14}, |
| {5, 6, 9, 11, 15}, |
| {5, 6, 9, 12, 13}, |
| {5, 6, 9, 12, 14}, |

TABLE 26-continued

| |
|---|
| {5, 6, 9, 13, 15}, |
| {5, 6, 9, 14, 15}, |
| {5, 6, 10, 11, 12}, |
| {5, 6, 10, 11, 13}, |
| {5, 6, 10, 11, 14}, |
| {5, 6, 10, 11, 15}, |
| {5, 6, 10, 12, 13}, |
| {5, 6, 10, 12, 14}, |
| {5, 6, 10, 13, 15}, |
| {5, 6, 10, 14, 15}, |
| {5, 6, 11, 12, 13}, |
| {5, 6, 11, 12, 14}, |
| {5, 6, 11, 13, 15}, |
| {5, 6, 11, 14, 15}, |
| {5, 7, 8, 9, 12}, |
| {5, 7, 8, 9, 13}, |
| {5, 7, 8, 9, 14}, |
| {5, 7, 8, 9, 15}, |
| {5, 7, 8, 11, 12}, |
| {5, 7, 8, 11, 13}, |
| {5, 7, 8, 11, 14}, |
| {5, 7, 8, 11, 15}, |
| {5, 7, 8, 12, 13}, |
| {5, 7, 8, 12, 15}, |
| {5, 7, 8, 13, 14}, |
| {5, 7, 8, 14, 15}, |
| {5, 7, 9, 10, 12}, |
| {5, 7, 9, 10, 13}, |
| {5, 7, 9, 10, 14}, |
| {5, 7, 9, 10, 15}, |
| {5, 7, 9, 12, 13}, |
| {5, 7, 9, 12, 15}, |
| {5, 7, 9, 13, 14}, |
| {5, 7, 9, 14, 15}, |
| {5, 7, 10, 11, 12}, |
| {5, 7, 10, 11, 13}, |
| {5, 7, 10, 11, 14}, |
| {5, 7, 10, 11, 15}, |
| {5, 7, 10, 12, 13}, |
| {5, 7, 10, 12, 15}, |
| {5, 7, 10, 13, 14}, |
| {5, 7, 10, 14, 15}, |
| {5, 7, 11, 12, 13}, |
| {5, 7, 11, 12, 15}, |
| {5, 7, 11, 13, 14}, |
| {5, 7, 11, 14, 15}, |
| {5, 8, 9, 10, 12}, |
| {5, 8, 9, 10, 13}, |
| {5, 8, 9, 10, 14}, |
| {5, 8, 9, 10, 15}, |
| {5, 8, 9, 11, 12}, |
| {5, 8, 9, 11, 13}, |
| {5, 8, 9, 11, 14}, |
| {5, 8, 9, 11, 15}, |
| {5, 8, 9, 12, 14}, |
| {5, 8, 9, 12, 15}, |
| {5, 8, 9, 13, 14}, |
| {5, 8, 9, 13, 15}, |
| {5, 8, 10, 11, 12}, |
| {5, 8, 10, 11, 13}, |
| {5, 8, 10, 11, 14}, |
| {5, 8, 10, 11, 15}, |
| {5, 8, 10, 12, 13}, |
| {5, 8, 10, 12, 15}, |
| {5, 8, 10, 13, 14}, |
| {5, 8, 10, 14, 15}, |
| {5, 8, 11, 12, 13}, |
| {5, 8, 11, 12, 14}, |
| {5, 8, 11, 13, 15}, |
| {5, 8, 11, 14, 15}, |
| {5, 8, 12, 13, 14}, |
| {5, 8, 12, 13, 15}, |
| {5, 8, 12, 14, 15}, |
| {5, 8, 13, 14, 15}, |
| {5, 9, 10, 11, 12}, |
| {5, 9, 10, 11, 13}, |
| {5, 9, 10, 11, 14}, |
| {5, 9, 10, 11, 15}, |

TABLE 27

| | | | |
|---|---|---|---|
| {5, 9, 10, 12, 13}, | {6, 7, 9, 12, 15}, | {6, 9, 10, 13, 15}, | {7, 8, 11, 14, 15}, |
| {5, 9, 10, 12, 14}, | {6, 7, 9, 13, 14}, | {6, 9, 10, 14, 15}, | {7, 8, 12, 13, 14}, |
| {5, 9, 10, 13, 15}, | {6, 7, 9, 13, 15}, | {6, 9, 11, 12, 13}, | {7, 8, 12, 13, 15}, |
| {5, 9, 10, 14, 15}, | {6, 7, 10, 12, 14}, | {6, 9, 11, 12, 15}, | {7, 8, 12, 14, 15}, |
| {5, 9, 11, 12, 13}, | {6, 7, 10, 12, 15}, | {6, 9, 11, 13, 14}, | {7, 8, 13, 14, 15}, |
| {5, 9, 11, 12, 15}, | {6, 7, 10, 13, 14}, | {6, 9, 11, 14, 15}, | {7, 9, 10, 11, 12}, |
| {5, 9, 11, 13, 14}, | {6, 7, 10, 13, 15}, | {6, 9, 12, 13, 14}, | {7, 9, 10, 11, 13}, |
| {5, 9, 11, 14, 15}, | {6, 7, 11, 12, 14}, | {6, 9, 12, 13, 15}, | {7, 9, 10, 11, 14}, |
| {5, 9, 12, 13, 14}, | {6, 7, 11, 12, 15}, | {6, 9, 12, 14, 15}, | {7, 9, 10, 11, 15}, |
| {5, 9, 12, 13, 15}, | {6, 7, 11, 13, 14}, | {6, 9, 13, 14, 15}, | {7, 9, 10, 12, 13}, |
| {5, 9, 12, 14, 15}, | {6, 7, 11, 13, 15}, | {6, 10, 11, 12, 14}, | {7, 9, 10, 12, 14}, |
| {5, 9, 13, 14, 15}, | {6, 8, 9, 10, 12}, | {6, 10, 11, 12, 15}, | {7, 9, 10, 13, 15}, |
| {5, 10, 11, 12, 14}, | {6, 8, 9, 10, 13}, | {6, 10, 11, 13, 14}, | {7, 9, 10, 14, 15}, |
| {5, 10, 11, 12, 15}, | {6, 8, 9, 10, 14}, | {6, 10, 11, 13, 15}, | {7, 9, 11, 12, 13}, |
| {5, 10, 11, 13, 14}, | {6, 8, 9, 10, 15}, | {6, 10, 12, 13, 14}, | {7, 9, 11, 12, 15}, |
| {5, 10, 11, 13, 15}, | {6, 8, 9, 11, 12}, | {6, 10, 12, 13, 15}, | {7, 9, 11, 13, 14}, |
| {5, 10, 12, 13, 14}, | {6, 8, 9, 11, 13}, | {6, 10, 12, 14, 15}, | {7, 9, 11, 14, 15}, |
| {5, 10, 12, 13, 15}, | {6, 8, 9, 11, 14}, | {6, 10, 13, 14, 15}, | {7, 9, 12, 13, 14}, |
| {5, 10, 12, 14, 15}, | {6, 8, 9, 11, 15}, | {6, 11, 12, 13, 14}, | {7, 9, 12, 13, 15}, |
| {5, 10, 13, 14, 15}, | {6, 8, 9, 12, 14}, | {6, 11, 12, 13, 15}, | {7, 9, 12, 14, 15}, |
| {5, 11, 12, 13, 14}, | {6, 8, 9, 12, 15}, | {6, 11, 12, 14, 15}, | {7, 9, 13, 14, 15}, |
| {5, 11, 12, 13, 15}, | {6, 8, 9, 13, 14}, | {6, 11, 13, 14, 15}, | {7, 10, 11, 12, 14}, |
| {5, 11, 12, 14, 15}, | {6, 8, 9, 13, 15}, | {7, 8, 9, 10, 12}, | {7, 10, 11, 12, 15}, |
| {5, 11, 13, 14, 15}, | {6, 8, 10, 11, 12}, | {7, 8, 9, 10, 13}, | {7, 10, 11, 13, 14}, |
| {6, 7, 8, 10, 12}, | {6, 8, 10, 11, 13}, | {7, 8, 9, 10, 14}, | {7, 10, 11, 13, 15}, |
| {6, 7, 8, 10, 13}, | {6, 8, 10, 11, 14}, | {7, 8, 9, 10, 15}, | {7, 10, 12, 13, 14}, |
| {6, 7, 8, 10, 14}, | {6, 8, 10, 11, 15}, | {7, 8, 9, 11, 12}, | {7, 10, 12, 13, 15}, |
| {6, 7, 8, 10, 15}, | {6, 8, 10, 12, 13}, | {7, 8, 9, 11, 13}, | {7, 10, 12, 14, 15}, |
| {6, 7, 8, 11, 12}, | {6, 8, 10, 12, 15}, | {7, 8, 9, 11, 14}, | {7, 10, 13, 14, 15}, |
| {6, 7, 8, 11, 13}, | {6, 8, 10, 13, 14}, | {7, 8, 9, 11, 15}, | {7, 11, 12, 13, 14}, |
| {6, 7, 8, 11, 14}, | {6, 8, 10, 14, 15}, | {7, 8, 9, 12, 14}, | {7, 11, 12, 13, 15}, |
| {6, 7, 8, 11, 15}, | {6, 8, 11, 12, 13}, | {7, 8, 9, 12, 15}, | {7, 11, 12, 14, 15}, |
| {6, 7, 8, 12, 14}, | {6, 8, 11, 12, 14}, | {7, 8, 9, 13, 14}, | {7, 11, 13, 14, 15} |
| {6, 7, 8, 12, 15}, | {6, 8, 11, 13, 15}, | {7, 8, 9, 13, 15}, | |
| {6, 7, 8, 13, 14}, | {6, 8, 11, 14, 15}, | {7, 8, 10, 11, 12}, | |
| {6, 7, 8, 13, 15}, | {6, 8, 12, 13, 14}, | {7, 8, 10, 11, 13}, | |
| {6, 7, 9, 10, 12}, | {6, 8, 12, 13, 15}, | {7, 8, 10, 11, 14}, | |
| {6, 7, 9, 10, 13}, | {6, 8, 12, 14, 15}, | {7, 8, 10, 11, 15}, | |
| {6, 7, 9, 10, 14}, | {6, 8, 13, 14, 15}, | {7, 8, 10, 12, 13}, | |
| {6, 7, 9, 10, 15}, | {6, 9, 10, 11, 12}, | {7, 8, 10, 12, 15}, | |
| {6, 7, 9, 11, 12}, | {6, 9, 10, 11, 13}, | {7, 8, 10, 13, 14}, | |
| {6, 7, 9, 11, 13}, | {6, 9, 10, 11, 14}, | {7, 8, 10, 14, 15}, | |
| {6, 7, 9, 11, 14}, | {6, 9, 10, 11, 15}, | {7, 8, 11, 12, 13}, | |
| {6, 7, 9, 11, 15}, | {6, 9, 10, 12, 13}, | {7, 8, 11, 12, 14}, | |
| {6, 7, 9, 12, 14}, | {6, 9, 10, 12, 14}, | {7, 8, 11, 13, 15}, | |

11. A method for coding an input information bit stream comprised of 5 bits into a (11,5) codeword comprised of 11 coded symbols, comprising the steps of:

(a) encoding the input information bit stream into a first order Reed-Muller codeword comprised of 16 coded symbols; and (b) predetermining a second coded symbol position or a third coded symbol position out of the 16 coded symbols constituting the first order Reed-Muller codeword, puncturing coded symbols at intervals of 3 symbols beginning at the predetermined position, and then outputting an optimal (11,5) codeword.

12. The method as claimed in claim 11, wherein the $1^{st}$, $4^{th}$, $7^{th}$, $10^{th}$ and $13^{th}$ coded symbols are punctured in the step (b).

13. The method as claimed in claim 11, wherein the $2^{nd}$, $5^{th}$, $8^{th}$, $11^{th}$ and $14^{th}$ coded symbols are punctured in the step (b).

14. The method as claimed in claim 11, wherein the step of creating the first order Reed-Muller codeword comprises the steps of:

generating orthogonal codewords each comprised of 16 coded symbols by multiplying 4 bits out of the input information bit stream comprised of 5 bits by associated base orthogonal codes W1, W2, W4 and W8;

generating a phase-inverted codeword comprised of 16 coded symbols for creating a bi-orthogonal codeword by inverting a phase of the orthogonal codewords by multiplying a remaining one bit of the input information bit stream by an all 1's signal; and summing up the orthogonal codewords and the phase-inverted codeword and outputting the summed result as the first order Reed-Muller codeword.

15. A method for coding an input information bit stream comprised of 5 bits into a (11,5) codeword comprised of 11 coded symbols, comprising the steps of:

encoding the input information bit stream into a first order Reed-Muller codeword comprised of 16 coded symbols; and puncturing coded symbols in the positions corresponding to the predetermined one of a plurality of puncturing patterns shown in Tables 28 to 36 below, out of the 16 coded symbols constituting the first order Reed-Muller codeword, and then outputting an optimal (11,5) codeword.

TABLE 28

| |
|---|
| {0, 1, 2, 4, 8}, |
| {0, 1, 2, 4, 9}, |
| {0, 1, 2, 4, 10}, |
| {0, 1, 2, 4, 11}, |

TABLE 28-continued

| |
|---|
| {0, 1, 2, 4, 12}, |
| {0, 1, 2, 4, 13}, |
| {0, 1, 2, 4, 14}, |
| {0, 1, 2, 4, 15}, |
| {0, 1, 2, 5, 8}, |
| {0, 1, 2, 5, 9}, |
| {0, 1, 2, 5, 10}, |
| {0, 1, 2, 5, 11}, |
| {0, 1, 2, 5, 12}, |
| {0, 1, 2, 5, 13}, |
| {0, 1, 2, 5, 14}, |
| {0, 1, 2, 5, 15}, |
| {0, 1, 2, 6, 8}, |
| {0, 1, 2, 6, 9}, |
| {0, 1, 2, 6, 10}, |
| {0, 1, 2, 6, 11}, |
| {0, 1, 2, 6, 12}, |
| {0, 1, 2, 6, 13}, |
| {0, 1, 2, 6, 14}, |
| {0, 1, 2, 6, 15}, |
| {0, 1, 2, 7, 8}, |
| {0, 1, 2, 7, 9}, |
| {0, 1, 2, 7, 10}, |
| {0, 1, 2, 7, 11}, |
| {0, 1, 2, 7, 12}, |
| {0, 1, 2, 7, 13}, |
| {0, 1, 2, 7, 14}, |
| {0, 1, 2, 7, 15}, |
| {0, 1, 2, 8, 12}, |
| {0, 1, 2, 8, 13}, |
| {0, 1, 2, 8, 14}, |
| {0, 1, 2, 8, 15}, |
| {0, 1, 2, 9, 12}, |
| {0, 1, 2, 9, 13}, |
| {0, 1, 2, 9, 14}, |
| {0, 1, 2, 9, 15}, |
| {0, 1, 2, 10, 12}, |
| {0, 1, 2, 10, 13}, |
| {0, 1, 2, 10, 14}, |
| {0, 1, 2, 10, 15}, |
| {0, 1, 2, 11, 12}, |
| {0, 1, 2, 11, 13}, |
| {0, 1, 2, 11, 14}, |
| {0, 1, 2, 11, 15}, |
| {0, 1, 3, 4, 8}, |
| {0, 1, 3, 4, 9}, |
| {0, 1, 3, 4, 10}, |
| {0, 1, 3, 4, 11}, |
| {0, 1, 3, 4, 12}, |
| {0, 1, 3, 4, 13}, |
| {0, 1, 3, 4, 14}, |
| {0, 1, 3, 4, 15}, |
| {0, 1, 3, 5, 8}, |
| {0, 1, 3, 5, 9}, |
| {0, 1, 3, 5, 10}, |
| {0, 1, 3, 5, 11}, |
| {0, 1, 3, 5, 12}, |
| {0, 1, 3, 5, 13}, |
| {0, 1, 3, 5, 14}, |
| {0, 1, 3, 5, 15}, |
| {0, 1, 3, 6, 8}, |
| {0, 1, 3, 6, 9}, |
| {0, 1, 3, 6, 10}, |
| {0, 1, 3, 6, 11}, |
| {0, 1, 3, 6, 12}, |
| {0, 1, 3, 6, 13}, |
| {0, 1, 3, 6, 14}, |
| {0, 1, 3, 6, 15}, |
| {0, 1, 3, 7, 8}, |
| {0, 1, 3, 7, 9}, |
| {0, 1, 3, 7, 10}, |
| {0, 1, 3, 7, 11}, |
| {0, 1, 3, 7, 12}, |
| {0, 1, 3, 7, 13}, |
| {0, 1, 3, 7, 14}, |
| {0, 1, 3, 7, 15}, |
| {0, 1, 3, 8, 12}, |
| {0, 1, 3, 8, 13}, |
| {0, 1, 3, 8, 14}, |

TABLE 28-continued

| |
|---|
| {0, 1, 3, 8, 15}, |
| {0, 1, 3, 9, 12}, |
| {0, 1, 3, 9, 13}, |
| {0, 1, 3, 9, 14}, |
| {0, 1, 3, 9, 15}, |
| {0, 1, 3, 10, 12}, |
| {0, 1, 3, 10, 13}, |
| {0, 1, 3, 10, 14}, |
| {0, 1, 3, 10, 15}, |
| {0, 1, 3, 11, 12}, |
| {0, 1, 3, 11, 13}, |
| {0, 1, 3, 11, 14}, |
| {0, 1, 3, 11, 15}, |
| {0, 1, 4, 6, 8}, |
| {0, 1, 4, 6, 9}, |
| {0, 1, 4, 6, 10}, |
| {0, 1, 4, 6, 11}, |
| {0, 1, 4, 6, 12}, |
| {0, 1, 4, 6, 13}, |
| {0, 1, 4, 6, 14}, |
| {0, 1, 4, 6, 15}, |
| {0, 1, 4, 7, 8}, |
| {0, 1, 4, 7, 9}, |
| {0, 1, 4, 7, 10}, |
| {0, 1, 4, 7, 11}, |
| {0, 1, 4, 7, 12}, |
| {0, 1, 4, 7, 13}, |
| {0, 1, 4, 7, 14}, |
| {0, 1, 4, 7, 15}, |
| {0, 1, 4, 8, 10}, |
| {0, 1, 4, 8, 11}, |
| {0, 1, 4, 8, 14}, |
| {0, 1, 4, 8, 15}, |
| {0, 1, 4, 9, 10}, |
| {0, 1, 4, 9, 11}, |
| {0, 1, 4, 9, 14}, |
| {0, 1, 4, 9, 15}, |
| {0, 1, 4, 10, 12}, |
| {0, 1, 4, 10, 13}, |
| {0, 1, 4, 11, 12}, |
| {0, 1, 4, 11, 13}, |
| {0, 1, 4, 12, 14}, |
| {0, 1, 4, 12, 15}, |
| {0, 1, 4, 13, 14}, |
| {0, 1, 4, 13, 15}, |
| {0, 1, 5, 6, 8}, |
| {0, 1, 5, 6, 9}, |
| {0, 1, 5, 6, 10}, |
| {0, 1, 5, 6, 11}, |
| {0, 1, 5, 6, 12}, |
| {0, 1, 5, 6, 13}, |
| {0, 1, 5, 6, 14}, |
| {0, 1, 5, 6, 15}, |
| {0, 1, 5, 7, 8}, |
| {0, 1, 5, 7, 9}, |
| {0, 1, 5, 7, 10}, |
| {0, 1, 5, 7, 11}, |
| {0, 1, 5, 7, 12}, |
| {0, 1, 5, 7, 13}, |
| {0, 1, 5, 7, 14}, |
| {0, 1, 5, 7, 15}, |
| {0, 1, 5, 8, 10}, |
| {0, 1, 5, 8, 11}, |
| {0, 1, 5, 8, 14}, |
| {0, 1, 5, 8, 15}, |
| {0, 1, 5, 9, 10}, |
| {0, 1, 5, 9, 11}, |
| {0, 1, 5, 9, 14}, |
| {0, 1, 5, 9, 15}, |
| {0, 1, 5, 10, 12}, |
| {0, 1, 5, 10, 13}, |
| {0, 1, 5, 11, 12}, |
| {0, 1, 5, 11, 13}, |
| {0, 1, 5, 12, 14}, |
| {0, 1, 5, 12, 15}, |
| {0, 1, 5, 13, 14}, |
| {0, 1, 5, 13, 15}, |
| {0, 1, 6, 8, 10}, |
| {0, 1, 6, 8, 11}, |

TABLE 28-continued

| |
|---|
| {0, 1, 6, 8, 12}, |
| {0, 1, 6, 8, 13}, |
| {0, 1, 6, 9, 10}, |
| {0, 1, 6, 9, 11}, |
| {0, 1, 6, 9, 12}, |
| {0, 1, 6, 9, 13}, |
| {0, 1, 6, 10, 14}, |
| {0, 1, 6, 10, 15}, |
| {0, 1, 6, 11, 14}, |
| {0, 1, 6, 11, 15}, |
| {0, 1, 6, 12, 14}, |
| {0, 1, 6, 12, 15}, |
| {0, 1, 6, 13, 14}, |
| {0, 1, 6, 13, 15}, |
| {0, 1, 7, 8, 10}, |
| {0, 1, 7, 8, 11}, |
| {0, 1, 7, 8, 12}, |
| {0, 1, 7, 8, 13}, |
| {0, 1, 7, 9, 10}, |
| {0, 1, 7, 9, 11}, |
| {0, 1, 7, 9, 12}, |
| {0, 1, 7, 9, 13}, |
| {0, 1, 7, 10, 14}, |
| {0, 1, 7, 10, 15}, |
| {0, 1, 7, 11, 14}, |
| {0, 1, 7, 11, 15}, |
| {0, 1, 7, 12, 14}, |
| {0, 1, 7, 12, 15}, |
| {0, 1, 7, 13, 14}, |
| {0, 1, 7, 13, 15}, |
| {0, 1, 8, 10, 12}, |
| {0, 1, 8, 10, 13}, |
| {0, 1, 8, 10, 14}, |
| {0, 1, 8, 10, 15}, |
| {0, 1, 8, 11, 12}, |
| {0, 1, 8, 11, 13}, |
| {0, 1, 8, 11, 14}, |
| {0, 1, 8, 11, 15}, |
| {0, 1, 8, 12, 14}, |
| {0, 1, 8, 12, 15}, |
| {0, 1, 8, 13, 14}, |
| {0, 1, 8, 13, 15}, |
| {0, 1, 9, 10, 12}, |
| {0, 1, 9, 10, 13}, |
| {0, 1, 9, 10, 14}, |
| {0, 1, 9, 10, 15}, |
| {0, 1, 9, 11, 12}, |
| {0, 1, 9, 11, 13}, |
| {0, 1, 9, 11, 14}, |
| {0, 1, 9, 11, 15}, |
| {0, 1, 9, 12, 14}, |
| {0, 1, 9, 12, 15}, |
| {0, 1, 9, 13, 14}, |
| {0, 1, 9, 13, 15}, |
| {0, 1, 10, 12, 14}, |
| {0, 1, 10, 12, 15}, |
| {0, 1, 10, 13, 14}, |
| {0, 1, 10, 13, 15}, |
| {0, 1, 11, 12, 14}, |
| {0, 1, 11, 12, 15}, |
| {0, 1, 11, 13, 14}, |
| {0, 1, 11, 13, 15}, |
| {0, 2, 3, 4, 8}, |
| {0, 2, 3, 4, 9}, |
| {0, 2, 3, 4, 10}, |
| {0, 2, 3, 4, 11}, |
| {0, 2, 3, 4, 12}, |
| {0, 2, 3, 4, 13}, |
| {0, 2, 3, 4, 14}, |
| {0, 2, 3, 4, 15}, |
| {0, 2, 3, 5, 8}, |
| {0, 2, 3, 5, 9}, |
| {0, 2, 3, 5, 10}, |
| {0, 2, 3, 5, 11}, |
| {0, 2, 3, 5, 12}, |
| {0, 2, 3, 5, 13}, |
| {0, 2, 3, 5, 14}, |
| {0, 2, 3, 5, 15}, |
| {0, 2, 3, 6, 8}, |

TABLE 28-continued

| |
|---|
| {0, 2, 3, 6, 9}, |
| {0, 2, 3, 6, 10}, |
| {0, 2, 3, 6, 11}, |
| {0, 2, 3, 6, 12}, |
| {0, 2, 3, 6, 13}, |
| {0, 2, 3, 6, 14}, |
| {0, 2, 3, 6, 15}, |
| {0, 2, 3, 7, 8}, |
| {0, 2, 3, 7, 9}, |
| {0, 2, 3, 7, 10}, |
| {0, 2, 3, 7, 11}, |
| {0, 2, 3, 7, 12}, |
| {0, 2, 3, 7, 13}, |
| {0, 2, 3, 7, 14}, |
| {0, 2, 3, 7, 15}, |
| {0, 2, 3, 8, 12}, |
| {0, 2, 3, 8, 13}, |
| {0, 2, 3, 8, 14}, |
| {0, 2, 3, 8, 15}, |
| {0, 2, 3, 9, 12}, |
| {0, 2, 3, 9, 13}, |
| {0, 2, 3, 9, 14}, |
| {0, 2, 3, 9, 15}, |
| {0, 2, 3, 10, 12}, |
| {0, 2, 3, 10, 13}, |
| {0, 2, 3, 10, 14}, |
| {0, 2, 3, 10, 15}, |
| {0, 2, 3, 11, 12}, |
| {0, 2, 3, 11, 13}, |
| {0, 2, 3, 11, 14}, |
| {0, 2, 3, 11, 15}, |
| {0, 2, 4, 5, 8}, |
| {0, 2, 4, 5, 9}, |
| {0, 2, 4, 5, 10}, |
| {0, 2, 4, 5, 11}, |
| {0, 2, 4, 5, 12}, |
| {0, 2, 4, 5, 13}, |
| {0, 2, 4, 5, 14}, |
| {0, 2, 4, 5, 15}, |
| {0, 2, 4, 7, 8}, |
| {0, 2, 4, 7, 9}, |
| {0, 2, 4, 7, 10}, |
| {0, 2, 4, 7, 11}, |
| {0, 2, 4, 7, 12}, |
| {0, 2, 4, 7, 13}, |
| {0, 2, 4, 7, 14}, |
| {0, 2, 4, 7, 15}, |
| {0, 2, 4, 8, 9}, |
| {0, 2, 4, 8, 11}, |
| {0, 2, 4, 8, 13}, |
| {0, 2, 4, 8, 15}, |
| {0, 2, 4, 9, 10}, |
| {0, 2, 4, 9, 12}, |
| {0, 2, 4, 9, 14}, |
| {0, 2, 4, 10, 11}, |
| {0, 2, 4, 10, 13}, |
| {0, 2, 4, 10, 15}, |
| {0, 2, 4, 11, 12}, |
| {0, 2, 4, 11, 14}, |
| {0, 2, 4, 12, 13}, |
| {0, 2, 4, 12, 15}, |
| {0, 2, 4, 13, 14}, |
| {0, 2, 4, 14, 15}, |
| {0, 2, 5, 6, 8}, |
| {0, 2, 5, 6, 9}, |
| {0, 2, 5, 6, 10}, |
| {0, 2, 5, 6, 11}, |
| {0, 2, 5, 6, 12}, |
| {0, 2, 5, 6, 13}, |
| {0, 2, 5, 6, 14}, |
| {0, 2, 5, 6, 15}, |
| {0, 2, 5, 8, 9}, |
| {0, 2, 5, 8, 11}, |
| {0, 2, 5, 8, 12}, |

TABLE 29

| |
|---|
| {0, 2, 5, 8, 14}, |
| {0, 2, 5, 9, 10}, |
| {0, 2, 5, 9, 13}, |
| {0, 2, 5, 9, 15}, |
| {0, 2, 5, 10, 11}, |
| {0, 2, 5, 10, 12}, |
| {0, 2, 5, 10, 14}, |
| {0, 2, 5, 11, 13}, |
| {0, 2, 5, 11, 15}, |
| {0, 2, 5, 12, 13}, |
| {0, 2, 5, 12, 15}, |
| {0, 2, 5, 13, 14}, |
| {0, 2, 5, 14, 15}, |
| {0, 2, 6, 7, 8}, |
| {0, 2, 6, 7, 9}, |
| {0, 2, 6, 7, 10}, |
| {0, 2, 6, 7, 11}, |
| {0, 2, 6, 7, 12}, |
| {0, 2, 6, 7, 13}, |
| {0, 2, 6, 7, 14}, |
| {0, 2, 6, 7, 15}, |
| {0, 2, 6, 8, 9}, |
| {0, 2, 6, 8, 11}, |
| {0, 2, 6, 8, 13}, |
| {0, 2, 6, 8, 15}, |
| {0, 2, 6, 9, 10}, |
| {0, 2, 6, 9, 12}, |
| {0, 2, 6, 9, 14}, |
| {0, 2, 6, 10, 11}, |
| {0, 2, 6, 10, 13}, |
| {0, 2, 6, 10, 15}, |
| {0, 2, 6, 11, 12}, |
| {0, 2, 6, 11, 14}, |
| {0, 2, 6, 12, 13}, |
| {0, 2, 6, 12, 15}, |
| {0, 2, 6, 13, 14}, |
| {0, 2, 6, 14, 15}, |
| {0, 2, 7, 8, 9}, |
| {0, 2, 7, 8, 11}, |
| {0, 2, 7, 8, 12}, |
| {0, 2, 7, 8, 14}, |
| {0, 2, 7, 9, 10}, |
| {0, 2, 7, 9, 13}, |
| {0, 2, 7, 9, 15}, |
| {0, 2, 7, 10, 11}, |
| {0, 2, 7, 10, 12}, |
| {0, 2, 7, 10, 14}, |
| {0, 2, 7, 11, 13}, |
| {0, 2, 7, 11, 15}, |
| {0, 2, 7, 12, 13}, |
| {0, 2, 7, 12, 15}, |
| {0, 2, 7, 13, 14}, |
| {0, 2, 7, 14, 15}, |
| {0, 2, 8, 9, 12}, |
| {0, 2, 8, 9, 13}, |
| {0, 2, 8, 9, 14}, |
| {0, 2, 8, 9, 15}, |
| {0, 2, 8, 11, 12}, |
| {0, 2, 8, 11, 13}, |
| {0, 2, 8, 11, 14}, |
| {0, 2, 8, 11, 15}, |
| {0, 2, 8, 12, 13}, |
| {0, 2, 8, 12, 15}, |
| {0, 2, 8, 13, 14}, |
| {0, 2, 8, 14, 15}, |
| {0, 2, 9, 10, 12}, |
| {0, 2, 9, 10, 13}, |
| {0, 2, 9, 10, 14}, |
| {0, 2, 9, 10, 15}, |
| {0, 2, 9, 12, 13}, |
| {0, 2, 9, 12, 15}, |
| {0, 2, 9, 13, 14}, |
| {0, 2, 9, 14, 15}, |
| {0, 2, 10, 11, 12}, |
| {0, 2, 10, 11, 13}, |
| {0, 2, 10, 11, 14}, |
| {0, 2, 10, 11, 15}, |
| {0, 2, 10, 12, 13}, |
| {0, 2, 10, 12, 15}, |

TABLE 29-continued

| |
|---|
| {0, 2, 10, 13, 14}, |
| {0, 2, 10, 14, 15}, |
| {0, 2, 11, 12, 13}, |
| {0, 2, 11, 12, 15}, |
| {0, 2, 11, 13, 14}, |
| {0, 2, 11, 14, 15}, |
| {0, 3, 4, 5, 8}, |
| {0, 3, 4, 5, 9}, |
| {0, 3, 4, 5, 10}, |
| {0, 3, 4, 5, 11}, |
| {0, 3, 4, 5, 12}, |
| {0, 3, 4, 5, 13}, |
| {0, 3, 4, 5, 14}, |
| {0, 3, 4, 5, 15}, |
| {0, 3, 4, 6, 8}, |
| {0, 3, 4, 6, 9}, |
| {0, 3, 4, 6, 10}, |
| {0, 3, 4, 6, 11}, |
| {0, 3, 4, 6, 12}, |
| {0, 3, 4, 6, 13}, |
| {0, 3, 4, 6, 14}, |
| {0, 3, 4, 6, 15}, |
| {0, 3, 4, 8, 9}, |
| {0, 3, 4, 8, 10}, |
| {0, 3, 4, 8, 13}, |
| {0, 3, 4, 8, 14}, |
| {0, 3, 4, 9, 11}, |
| {0, 3, 4, 9, 12}, |
| {0, 3, 4, 9, 15}, |
| {0, 3, 4, 10, 11}, |
| {0, 3, 4, 10, 12}, |
| {0, 3, 4, 10, 15}, |
| {0, 3, 4, 11, 13}, |
| {0, 3, 4, 11, 14}, |
| {0, 3, 4, 12, 13}, |
| {0, 3, 4, 12, 14}, |
| {0, 3, 4, 13, 15}, |
| {0, 3, 4, 14, 15}, |
| {0, 3, 5, 7, 8}, |
| {0, 3, 5, 7, 9}, |
| {0, 3, 5, 7, 10}, |
| {0, 3, 5, 7, 11}, |
| {0, 3, 5, 7, 12}, |
| {0, 3, 5, 7, 13}, |
| {0, 3, 5, 7, 14}, |
| {0, 3, 5, 7, 15}, |
| {0, 3, 5, 8, 9}, |
| {0, 3, 5, 8, 10}, |
| {0, 3, 5, 8, 12}, |
| {0, 3, 5, 8, 15}, |
| {0, 3, 5, 9, 11}, |
| {0, 3, 5, 9, 13}, |
| {0, 3, 5, 9, 14}, |
| {0, 3, 5, 10, 11}, |
| {0, 3, 5, 10, 13}, |
| {0, 3, 5, 10, 14}, |
| {0, 3, 5, 11, 12}, |
| {0, 3, 5, 11, 15}, |
| {0, 3, 5, 12, 13}, |
| {0, 3, 5, 12, 14}, |
| {0, 3, 5, 13, 15}, |
| {0, 3, 5, 14, 15}, |
| {0, 3, 6, 7, 8}, |
| {0, 3, 6, 7, 9}, |
| {0, 3, 6, 7, 10}, |
| {0, 3, 6, 7, 11}, |
| {0, 3, 6, 7, 12}, |
| {0, 3, 6, 7, 13}, |
| {0, 3, 6, 7, 14}, |
| {0, 3, 6, 7, 15}, |
| {0, 3, 6, 8, 9}, |
| {0, 3, 6, 8, 10}, |
| {0, 3, 6, 8, 12}, |
| {0, 3, 6, 8, 15}, |
| {0, 3, 6, 9, 11}, |
| {0, 3, 6, 9, 13}, |
| {0, 3, 6, 9, 14}, |
| {0, 3, 6, 10, 11}, |
| {0, 3, 6, 10, 13}, |

TABLE 29-continued

| |
|---|
| {0, 3, 6, 10, 14}, |
| {0, 3, 6, 11, 12}, |
| {0, 3, 6, 11, 15}, |
| {0, 3, 6, 12, 13}, |
| {0, 3, 6, 12, 14}, |
| {0, 3, 6, 13, 15}, |
| {0, 3, 6, 14, 15}, |
| {0, 3, 7, 8, 9}, |
| {0, 3, 7, 8, 10}, |
| {0, 3, 7, 8, 13}, |
| {0, 3, 7, 8, 14}, |
| {0, 3, 7, 9, 11}, |
| {0, 3, 7, 9, 12}, |
| {0, 3, 7, 9, 15}, |
| {0, 3, 7, 10, 11}, |
| {0, 3, 7, 10, 12}, |
| {0, 3, 7, 10, 15}, |
| {0, 3, 7, 11, 13}, |
| {0, 3, 7, 11, 14}, |
| {0, 3, 7, 12, 13}, |
| {0, 3, 7, 12, 14}, |
| {0, 3, 7, 13, 15}, |
| {0, 3, 7, 14, 15}, |
| {0, 3, 8, 9, 12}, |
| {0, 3, 8, 9, 13}, |
| {0, 3, 8, 9, 14}, |
| {0, 3, 8, 9, 15}, |
| {0, 3, 8, 10, 12}, |
| {0, 3, 8, 10, 13}, |
| {0, 3, 8, 10, 14}, |
| {0, 3, 8, 10, 15}, |
| {0, 3, 8, 12, 13}, |
| {0, 3, 8, 12, 14}, |
| {0, 3, 8, 13, 15}, |
| {0, 3, 8, 14, 15}, |
| {0, 3, 9, 11, 12}, |
| {0, 3, 9, 11, 13}, |
| {0, 3, 9, 11, 14}, |
| {0, 3, 9, 11, 15}, |
| {0, 3, 9, 12, 13}, |
| {0, 3, 9, 12, 14}, |
| {0, 3, 9, 13, 15}, |
| {0, 3, 9, 14, 15}, |
| {0, 3, 10, 11, 12}, |
| {0, 3, 10, 11, 13}, |
| {0, 3, 10, 11, 14}, |
| {0, 3, 10, 11, 15}, |
| {0, 3, 10, 12, 13}, |
| {0, 3, 10, 12, 14}, |
| {0, 3, 10, 13, 15}, |
| {0, 3, 10, 14, 15}, |
| {0, 3, 11, 12, 13}, |
| {0, 3, 11, 12, 14}, |
| {0, 3, 11, 13, 15}, |
| {0, 3, 11, 14, 15}, |
| {0, 4, 5, 6, 8}, |
| {0, 4, 5, 6, 9}, |
| {0, 4, 5, 6, 10}, |
| {0, 4, 5, 6, 11}, |
| {0, 4, 5, 6, 12}, |
| {0, 4, 5, 6, 13}, |
| {0, 4, 5, 6, 14}, |
| {0, 4, 5, 6, 15}, |
| {0, 4, 5, 7, 8}, |
| {0, 4, 5, 7, 9}, |
| {0, 4, 5, 7, 10}, |
| {0, 4, 5, 7, 11}, |
| {0, 4, 5, 7, 12}, |
| {0, 4, 5, 7, 13}, |
| {0, 4, 5, 7, 14}, |
| {0, 4, 5, 7, 15}, |
| {0, 4, 5, 8, 10}, |
| {0, 4, 5, 8, 11}, |
| {0, 4, 5, 8, 14}, |
| {0, 4, 5, 8, 15}, |
| {0, 4, 5, 9, 10}, |
| {0, 4, 5, 9, 11}, |
| {0, 4, 5, 9, 14}, |
| {0, 4, 5, 9, 15}, |

TABLE 29-continued

| |
|---|
| {0, 4, 5, 10, 12}, |
| {0, 4, 5, 10, 13}, |
| {0, 4, 5, 11, 12}, |
| {0, 4, 5, 11, 13}, |
| {0, 4, 5, 12, 14}, |
| {0, 4, 5, 12, 15}, |
| {0, 4, 5, 13, 14}, |
| {0, 4, 5, 13, 15}, |
| {0, 4, 6, 7, 8}, |
| {0, 4, 6, 7, 9}, |
| {0, 4, 6, 7, 10}, |
| {0, 4, 6, 7, 11}, |
| {0, 4, 6, 7, 12}, |
| {0, 4, 6, 7, 13}, |
| {0, 4, 6, 7, 14}, |
| {0, 4, 6, 7, 15}, |
| {0, 4, 6, 8, 9}, |
| {0, 4, 6, 8, 11}, |
| {0, 4, 6, 8, 13}, |
| {0, 4, 6, 8, 15}, |
| {0, 4, 6, 9, 10}, |
| {0, 4, 6, 9, 12}, |
| {0, 4, 6, 9, 14}, |
| {0, 4, 6, 10, 11}, |
| {0, 4, 6, 10, 13}, |
| {0, 4, 6, 10, 15}, |
| {0, 4, 6, 11, 12}, |
| {0, 4, 6, 11, 14}, |
| {0, 4, 6, 12, 13}, |
| {0, 4, 6, 12, 15}, |
| {0, 4, 6, 13, 141, |
| {0, 4, 6, 14, 15}, |
| {0, 4, 7, 8, 9}, |
| {0, 4, 7, 8, 10}, |
| {0, 4, 7, 8, 13}, |
| {0, 4, 7, 8, 14}, |
| {0, 4, 7, 9, 11}, |
| {0, 4, 7, 9, 12}, |
| {0, 4, 7, 9, 15}, |
| {0, 4, 7, 10, 11}, |
| {0, 4, 7, 10, 12}, |
| {0, 4, 7, 10, 15}, |
| {0, 4, 7, 11, 13}, |
| {0, 4, 7, 11, 14}, |
| {0, 4, 7, 12, 13}, |
| {0, 4, 7, 12, 14}, |
| {0, 4, 7, 13, 15}, |
| {0, 4, 7, 14, 15}, |
| {0, 4, 8, 9, 10}, |
| {0, 4, 8, 9, 11}, |
| {0, 4, 8, 9, 14}, |
| {0, 4, 8, 9, 15}, |
| {0, 4, 8, 10, 11}, |
| {0, 4, 8, 10, 13}, |
| {0, 4, 8, 10, 15}, |
| {0, 4, 8, 11, 13}, |
| {0, 4, 8, 11, 14}, |
| {0, 4, 8, 13, 14}, |
| {0, 4, 8, 13, 15}, |
| {0, 4, 8, 14, 15}, |
| {0, 4, 9, 10, 11}, |
| {0, 4, 9, 10, 12}, |
| {0, 4, 9, 10, 15}, |
| {0, 4, 9, 11, 12}, |
| {0, 4, 9, 11, 14}, |
| {0, 4, 9, 12, 14}, |
| {0, 4, 9, 12, 15}, |
| {0, 4, 9, 14, 15}, |
| {0, 4, 10, 11, 12}, |
| {0, 4, 10, 11, 13}, |
| {0, 4, 10, 12, 13}, |
| {0, 4, 10, 12, 15}, |
| {0, 4, 10, 13, 15}, |
| {0, 4, 11, 12, 13}, |
| {0, 4, 11, 12, 14}, |
| {0, 4, 11, 13, 14}, |
| {0, 4, 12, 13, 14}, |
| {0, 4, 12, 13, 15}, |

TABLE 30

| |
|---|
| {0, 4, 12, 14, 15}, |
| {0, 4, 13, 14, 15}, |
| {0, 5, 6, 7, 8}, |
| {0, 5, 6, 7, 9}, |
| {0, 5, 6, 7, 10}, |
| {0, 5, 6, 7, 11}, |
| {0, 5, 6, 7, 12}, |
| {0, 5, 6, 7, 13}, |
| {0, 5, 6, 7, 14}, |
| {0, 5, 6, 7, 15}, |
| {0, 5, 6, 8, 9}, |
| {0, 5, 6, 8, 10}, |
| {0, 5, 6, 8, 12}, |
| {0, 5, 6, 8, 15}, |
| {0, 5, 6, 9, 11}, |
| {0, 5, 6, 9, 13}, |
| {0, 5, 6, 9, 14}, |
| {0, 5, 6, 10, 11}, |
| {0, 5, 6, 10, 13}, |
| {0, 5, 6, 10, 14}, |
| {0, 5, 6, 11, 12}, |
| {0, 5, 6, 11, 15}, |
| {0, 5, 6, 12, 13}, |
| {0, 5, 6, 12, 14}, |
| {0, 5, 6, 13, 15}, |
| {0, 5, 6, 14, 15}, |
| {0, 5, 7, 8, 9}, |
| {0, 5, 7, 8, 11}, |
| {0, 5, 7, 8, 12}, |
| {0, 5, 7, 8, 14}, |
| {0, 5, 7, 9, 10}, |
| {0, 5, 7, 9, 13}, |
| {0, 5, 7, 9, 15}, |
| {0, 5, 7, 10, 11}, |
| {0, 5, 7, 10, 12}, |
| {0, 5, 7, 10, 14}, |
| {0, 5, 7, 11, 13}, |
| {0, 5, 7, 11, 15}, |
| {0, 5, 7, 12, 13}, |
| {0, 5, 7, 12, 15}, |
| {0, 5, 7, 13, 14}, |
| {0, 5, 7, 14, 15}, |
| {0, 5, 8, 9, 10}, |
| {0, 5, 8, 9, 11}, |
| {0, 5, 8, 9, 14}, |
| {0, 5, 8, 9, 15}, |
| {0, 5, 8, 10, 11}, |
| {0, 5, 8, 10, 12}, |
| {0, 5, 8, 10, 14}, |
| {0, 5, 8, 11, 12}, |
| {0, 5, 8, 11, 15}, |
| {0, 5, 8, 12, 14}, |
| {0, 5, 8, 12, 15}, |
| {0, 5, 8, 14, 15}, |
| {0, 5, 9, 10, 11}, |
| {0, 5, 9, 10, 13}, |
| {0, 5, 9, 10, 14}, |
| {0, 5, 9, 11, 13}, |
| {0, 5, 9, 11, 15}, |
| {0, 5, 9, 13, 14}, |
| {0, 5, 9, 13, 15}, |
| {0, 5, 9, 14, 15}, |
| {0, 5, 10, 11, 12}, |
| {0, 5, 10, 11, 13}, |
| {0, 5, 10, 12, 13}, |
| {0, 5, 10, 12, 14}, |
| {0, 5, 10, 13, 14}, |
| {0, 5, 11, 12, 13}, |
| {0, 5, 11, 12, 15}, |
| {0, 5, 11, 13, 15}, |
| {0, 5, 12, 13, 14}, |
| {0, 5, 12, 13, 15}, |
| {0, 5, 12, 14, 15}, |
| {0, 5, 13, 14, 15}, |
| {0, 6, 7, 8, 10}, |
| {0, 6, 7, 8, 11}, |
| {0, 6, 7, 8, 12}, |
| {0, 6, 7, 8, 13}, |
| {0, 6, 7, 9, 10}, |

TABLE 30-continued

| |
|---|
| {0, 6, 7, 9, 11}, |
| {0, 6, 7, 9, 12}, |
| {0, 6, 7, 9, 13}, |
| {0, 6, 7, 10, 14}, |
| {0, 6, 7, 10, 15}, |
| {0, 6, 7, 11, 14}, |
| {0, 6, 7, 11, 15}, |
| {0, 6, 7, 12, 14}, |
| {0, 6, 7, 12, 15}, |
| {0, 6, 7, 13, 14}, |
| {0, 6, 7, 13, 15}, |
| {0, 6, 8, 9, 10}, |
| {0, 6, 8, 9, 11}, |
| {0, 6, 8, 9, 12}, |
| {0, 6, 8, 9, 13}, |
| {0, 6, 8, 10, 11}, |
| {0, 6, 8, 10, 13}, |
| {0, 6, 8, 10, 15}, |
| {0, 6, 8, 11, 12}, |
| {0, 6, 8, 11, 15}, |
| {0, 6, 8, 12, 13}, |
| {0, 6, 8, 12, 15}, |
| {0, 6, 8, 13, 15}, |
| {0, 6, 9, 10, 11}, |
| {0, 6, 9, 10, 13}, |
| {0, 6, 9, 10, 14}, |
| {0, 6, 9, 11, 12}, |
| {0, 6, 9, 11, 14}, |
| {0, 6, 9, 12, 13}, |
| {0, 6, 9, 12, 14}, |
| {0, 6, 9, 13, 14}, |
| {0, 6, 10, 11, 14}, |
| {0, 6, 10, 11, 15}, |
| {0, 6, 10, 13, 14}, |
| {0, 6, 10, 13, 15}, |
| {0, 6, 10, 14, 15}, |
| {0, 6, 11, 12, 14}, |
| {0, 6, 11, 12, 15}, |
| {0, 6, 11, 14, 15}, |
| {0, 6, 12, 13, 14}, |
| {0, 6, 12, 13, 15}, |
| {0, 6, 12, 14, 15}, |
| {0, 6, 13, 14, 15}, |
| {0, 7, 8, 9, 10}, |
| {0, 7, 8, 9, 11}, |
| {0, 7, 8, 9, 12}, |
| {0, 7, 8, 9, 13}, |
| {0, 7, 8, 10, 11}, |
| {0, 7, 8, 10, 12}, |
| {0, 7, 8, 10, 14}, |
| {0, 7, 8, 11, 13}, |
| {0, 7, 8, 11, 14}, |
| {0, 7, 8, 12, 13}, |
| {0, 7, 8, 12, 14}, |
| {0, 7, 8, 13, 14}, |
| {0, 7, 9, 10, 11}, |
| {0, 7, 9, 10, 12}, |
| {0, 7, 9, 10, 15}, |
| {0, 7, 9, 11, 13}, |
| {0, 7, 9, 11, 15}, |
| {0, 7, 9, 12, 13}, |
| {0, 7, 9, 12, 15}, |
| {0, 7, 9, 13, 15}, |
| {0, 7, 10, 11, 14}, |
| {0, 7, 10, 11, 15}, |
| {0, 7, 10, 12, 14}, |
| {0, 7, 10, 12, 15}, |
| {0, 7, 10, 14, 15}, |
| {0, 7, 11, 13, 14}, |
| {0, 7, 11, 13, 15}, |
| {0, 7, 11, 14, 15}, |
| {0, 7, 12, 13, 14}, |
| {0, 7, 12, 13, 15}, |
| {0, 7, 12, 14, 15}, |
| {0, 7, 13, 14, 15}, |
| {0, 8, 9, 10, 12}, |
| {0, 8, 9, 10, 13}, |
| {0, 8, 9, 10, 14}, |
| {0, 8, 9, 10, 15}, |

TABLE 30-continued

| |
|---|
| {0, 8, 9, 11, 12}, |
| {0, 8, 9, 11, 13}, |
| {0, 8, 9, 11, 14}, |
| {0, 8, 9, 11, 15}, |
| {0, 8, 9, 12, 14}, |
| {0, 8, 9, 12, 15}, |
| {0, 8, 9, 13, 14}, |
| {0, 8, 9, 13, 15}, |
| {0, 8, 10, 11, 12}, |
| {0, 8, 10, 11, 13}, |
| {0, 8, 10, 11, 14}, |
| {0, 8, 10, 11, 15}, |
| {0, 8, 10, 12, 13}, |
| {0, 8, 10, 12, 15}, |
| {0, 8, 10, 13, 14}, |
| {0, 8, 10, 14, 15}, |
| {0, 8, 11, 12, 13}, |
| {0, 8, 11, 12, 14}, |
| {0, 8, 11, 13, 15}, |
| {0, 8, 11, 14, 15}, |
| {0, 8, 12, 13, 14}, |
| {0, 8, 12, 13, 15}, |
| {0, 8, 12, 14, 15}, |
| {0, 8, 13, 14, 15}, |
| {0, 9, 10, 11, 12}, |
| {0, 9, 10, 11, 13}, |
| {0, 9, 10, 11, 14}, |
| {0, 9, 10, 11, 15}, |
| {0, 9, 10, 12, 13}, |
| {0, 9, 10, 12, 14}, |
| {0, 9, 10, 13, 15}, |
| {0, 9, 10, 14, 15}, |
| {0, 9, 11, 12, 13}, |
| {0, 9, 11, 12, 15}, |
| {0, 9, 11, 13, 14}, |
| {0, 9, 11, 14, 15}, |
| {0, 9, 12, 13, 14}, |
| {0, 9, 12, 13, 15}, |
| {0, 9, 12, 14, 15}, |
| {0, 9, 13, 14, 15}, |
| {0, 10, 11, 12, 14}, |
| {0, 10, 11, 12, 15}, |
| {0, 10, 11, 13, 14}, |
| {0, 10, 11, 13, 15}, |
| {0, 10, 12, 13, 14}, |
| {0, 10, 12, 13, 15}, |
| {0, 10, 12, 14, 15}, |
| {0, 10, 13, 14, 15}, |
| {0, 11, 12, 13, 14}, |
| {0, 11, 12, 13, 15}, |
| {0, 11, 12, 14, 15}, |
| {0, 11, 13, 14, 15}, |
| {1, 2, 3, 4, 8}, |
| {1, 2, 3, 4, 9}, |
| {1, 2, 3, 4, 10}, |
| {1, 2, 3, 4, 11}, |
| {1, 2, 3, 4, 12}, |
| {1, 2, 3, 4, 13}, |
| {1, 2, 3, 4, 14}, |
| {1, 2, 3, 4, 15}, |
| {1, 2, 3, 5, 8}, |
| {1, 2, 3, 5, 9}, |
| {1, 2, 3, 5, 10}, |
| {1, 2, 3, 5, 11}, |
| {1, 2, 3, 5, 12}, |
| {1, 2, 3, 5, 13}, |
| {1, 2, 3, 5, 14}, |
| {1, 2, 3, 5, 15}, |
| {1, 2, 3, 6, 8}, |
| {1, 2, 3, 6, 9}, |
| {1, 2, 3, 6, 10}, |
| {1, 2, 3, 6, 11}, |
| {1, 2, 3, 6, 12}, |
| {1, 2, 3, 6, 13}, |
| {1, 2, 3, 6, 14}, |
| {1, 2, 3, 6, 15}, |
| {1, 2, 3, 7, 8}, |
| {1, 2, 3, 7, 9}, |
| {1, 2, 3, 7, 10}, |

TABLE 30-continued

| |
|---|
| {1, 2, 3, 7, 11}, |
| {1, 2, 3, 7, 12}, |
| {1, 2, 3, 7, 13}, |
| {1, 2, 3, 7, 14}, |
| {1, 2, 3, 7, 15}, |
| {1, 2, 3, 8, 12}, |
| {1, 2, 3, 8, 13}, |
| {1, 2, 3, 8, 14}, |
| {1, 2, 3, 8, 15}, |
| {1, 2, 3, 9, 12}, |
| {1, 2, 3, 9, 13}, |
| {1, 2, 3, 9, 14}, |
| {1, 2, 3, 9, 15}, |
| {1, 2, 3, 10, 12}, |
| {1, 2, 3, 10, 13}, |
| {1, 2, 3, 10, 14}, |
| {1, 2, 3, 10, 15}, |
| {1, 2, 3, 11, 12}, |
| {1, 2, 3, 11, 13}, |
| {1, 2, 3, 11, 14}, |
| {1, 2, 3, 11, 15}, |
| {1, 2, 4, 5, 8}, |
| {1, 2, 4, 5, 9}, |
| {1, 2, 4, 5, 10}, |
| {1, 2, 4, 5, 11}, |
| {1, 2, 4, 5, 12}, |
| {1, 2, 4, 5, 13}, |
| {1, 2, 4, 5, 14}, |
| {1, 2, 4, 5, 15}, |
| {1, 2, 4, 6, 8}, |
| {1, 2, 4, 6, 9}, |
| {1, 2, 4, 6, 10}, |
| {1, 2, 4, 6, 11}, |
| {1, 2, 4, 6, 12}, |
| {1, 2, 4, 6, 13}, |
| {1, 2, 4, 6, 14}, |
| {1, 2, 4, 6, 15}, |
| {1, 2, 4, 8, 9}, |
| {1, 2, 4, 8, 10}, |
| {1, 2, 4, 8, 12}, |
| {1, 2, 4, 8, 15}, |
| {1, 2, 4, 9, 11}, |
| {1, 2, 4, 9, 13}, |
| {1, 2, 4, 9, 14}, |
| {1, 2, 4, 10, 11}, |
| {1, 2, 4, 10, 13}, |
| {1, 2, 4, 10, 14}, |
| {1, 2, 4, 11, 12}, |
| {1, 2, 4, 11, 15}, |
| {1, 2, 4, 12, 13}, |
| {1, 2, 4, 12, 14}, |
| {1, 2, 4, 13, 15}, |
| {1, 2, 4, 14, 15}, |
| {1, 2, 5, 7, 8}, |
| {1, 2, 5, 7, 9}, |
| {1, 2, 5, 7, 10}, |
| {1, 2, 5, 7, 11}, |
| {1, 2, 5, 7, 12}, |
| {1, 2, 5, 7, 13}, |
| {1, 2, 5, 7, 14}, |
| {1, 2, 5, 7, 15}, |
| {1, 2, 5, 8, 9}, |
| {1, 2, 5, 8, 10}, |
| {1, 2, 5, 8, 13}, |
| {1, 2, 5, 8, 14}, |
| {1, 2, 5, 9, 11}, |
| {1, 2, 5, 9, 12}, |
| {1, 2, 5, 9, 15}, |
| {1, 2, 5, 10, 11}, |
| {1, 2, 5, 10, 12}, |
| {1, 2, 5, 10, 15}, |
| {1, 2, 5, 11, 13}, |
| {1, 2, 5, 11, 14}, |
| {1, 2, 5, 12, 13}, |
| {1, 2, 5, 12, 14}, |
| {1, 2, 5, 13, 15}, |
| {1, 2, 5, 14, 15}, |
| {1, 2, 6, 7, 8}, |

TABLE 31

| |
|---|
| {1, 2, 6, 7, 9}, |
| {1, 2, 6, 7, 10}, |
| {1, 2, 6, 7, 11}, |
| {1, 2, 6, 7, 12}, |
| {1, 2, 6, 7, 13}, |
| {1, 2, 6, 7, 14}, |
| {1, 2, 6, 7, 15}, |
| {1, 2, 6, 8, 9}, |
| {1, 2, 6, 8, 10}, |
| {1, 2, 6, 8, 13}, |
| {1, 2, 6, 8, 14}, |
| {1, 2, 6, 9, 11}, |
| {1, 2, 6, 9, 12}, |
| {1, 2, 6, 9, 15}, |
| {1, 2, 6, 10, 11}, |
| {1, 2, 6, 10, 12}, |
| {1, 2, 6, 10, 15}, |
| {1, 2, 6, 11, 13}, |
| {1, 2, 6, 11, 14}, |
| {1, 2, 6, 12, 13}, |
| {1, 2, 6, 12, 14}, |
| {1, 2, 6, 13, 15}, |
| {1, 2, 6, 14, 15}, |
| {1, 2, 7, 8, 9}, |
| {1, 2, 7, 8, 10}, |
| {1, 2, 7, 8, 12}, |
| {1, 2, 7, 8, 15}, |
| {1, 2, 7, 9, 11}, |
| {1, 2, 7, 9, 13}, |
| {1, 2, 7, 9, 14}, |
| {1, 2, 7, 10, 11}, |
| {1, 2, 7, 10, 13}, |
| {1, 2, 7, 10, 14}, |
| {1, 2, 7, 11, 12}, |
| {1, 2, 7, 11, 15}, |
| {1, 2, 7, 12, 13}, |
| {1, 2, 7, 12, 14}, |
| {1, 2, 7, 13, 15}, |
| {1, 2, 7, 14, 15}, |
| {1, 2, 8, 9, 12}, |
| {1, 2, 8, 9, 13}, |
| {1, 2, 8, 9, 14}, |
| {1, 2, 8, 9, 15}, |
| {1, 2, 8, 10, 12}, |
| {1, 2, 8, 10, 13}, |
| {1, 2, 8, 10, 14}, |
| {1, 2, 8, 10, 15}, |
| {1, 2, 8, 12, 13}, |
| {1, 2, 8, 12, 14}, |
| {1, 2, 8, 13, 15}, |
| {1, 2, 8, 14, 15}, |
| {1, 2, 9, 11, 12}, |
| {1, 2, 9, 11, 13}, |
| {1, 2, 9, 11, 14}, |
| {1, 2, 9, 11, 15}, |
| {1, 2, 9, 12, 13}, |
| {1, 2, 9, 12, 14}, |
| {1, 2, 9, 13, 15}, |
| {1, 2, 9, 14, 15}, |
| {1, 2, 10, 11, 12}, |
| {1, 2, 10, 11, 13}, |
| {1, 2, 10, 11, 14}, |
| {1, 2, 10, 11, 15}, |
| {1, 2, 10, 12, 13}, |
| {1, 2, 10, 12, 14}, |
| {1, 2, 10, 13, 15}, |
| {1, 2, 10, 14, 15}, |
| {1, 2, 11, 12, 13}, |
| {1, 2, 11, 12, 14}, |
| {1, 2, 11, 13, 15}, |
| {1, 2, 11, 14, 15}, |
| {1, 3, 4, 5, 8}, |
| {1, 3, 4, 5, 9}, |
| {1, 3, 4, 5, 10}, |
| {1, 3, 4, 5, 11}, |
| {1, 3, 4, 5, 12}, |
| {1, 3, 4, 5, 13}, |
| {1, 3, 4, 5, 14}, |
| {1, 3, 4, 5, 15}, |

TABLE 31-continued

| |
|---|
| {1, 3, 4, 7, 8}, |
| {1, 3, 4, 7, 9}, |
| {1, 3, 4, 7, 10}, |
| {1, 3, 4, 7, 11}, |
| {1, 3, 4, 7, 12}, |
| {1, 3, 4, 7, 13}, |
| {1, 3, 4, 7, 14}, |
| {1, 3, 4, 7, 15}, |
| {1, 3, 4, 8, 9}, |
| {1, 3, 4, 8, 11}, |
| {1, 3, 4, 8, 12}, |
| {1, 3, 4, 8, 14}, |
| {1, 3, 4, 9, 10}, |
| {1, 3, 4, 9, 13}, |
| {1, 3, 4, 9, 15}, |
| {1, 3, 4, 10, 11}, |
| {1, 3, 4, 10, 12}, |
| {1, 3, 4, 10, 14}, |
| {1, 3, 4, 11, 13}, |
| {1, 3, 4, 11, 15}, |
| {1, 3, 4, 12, 13}, |
| {1, 3, 4, 12, 15}, |
| {1, 3, 4, 13, 14}, |
| {1, 3, 4, 14, 15}, |
| {1, 3, 5, 6, 8}, |
| {1, 3, 5, 6, 9}, |
| {1, 3, 5, 6, 10}, |
| {1, 3, 5, 6, 11}, |
| {1, 3, 5, 6, 12}, |
| {1, 3, 5, 6, 13}, |
| {1, 3, 5, 6, 14}, |
| {1, 3, 5, 6, 15}, |
| {1, 3, 5, 8, 9}, |
| {1, 3, 5, 8, 11}, |
| {1, 3, 5, 8, 13}, |
| {1, 3, 5, 8, 15}, |
| {1, 3, 5, 9, 10}, |
| {1, 3, 5, 9, 12}, |
| {1, 3, 5, 9, 14}, |
| {1, 3, 5, 10, 11}, |
| {1, 3, 5, 10, 13}, |
| {1, 3, 5, 10, 15}, |
| {1, 3, 5, 11, 12}, |
| {1, 3, 5, 11, 14}, |
| {1, 3, 5, 12, 13}, |
| {1, 3, 5, 12, 15}, |
| {1, 3, 5, 13, 14}, |
| {1, 3, 5, 14, 15}, |
| {1, 3, 6, 7, 8}, |
| {1, 3, 6, 7, 9}, |
| {1, 3, 6, 7, 10}, |
| {1, 3, 6, 7, 11}, |
| {1, 3, 6, 7, 12}, |
| {1, 3, 6, 7, 13}, |
| {1, 3, 6, 7, 14}, |
| {1, 3, 6, 7, 15}, |
| {1, 3, 6, 8, 9}, |
| {1, 3, 6, 8, 11}, |
| {1, 3, 6, 8, 12}, |
| {1, 3, 6, 8, 14}, |
| {1, 3, 6, 9, 10}, |
| {1, 3, 6, 9, 13}, |
| {1, 3, 6, 9, 15}, |
| {1, 3, 6, 10, 11}, |
| {1, 3, 6, 10, 12}, |
| {1, 3, 6, 10, 14}, |
| {1, 3, 6, 11, 13}, |
| {1, 3, 6, 11, 15}, |
| {1, 3, 6, 12, 13}, |
| {1, 3, 6, 12, 15}, |
| {1, 3, 6, 13, 14}, |
| {1, 3, 6, 14, 15}, |
| {1, 3, 7, 8, 9}, |
| {1, 3, 7, 8, 11}, |
| {1, 3, 7, 8, 13}, |
| {1, 3, 7, 8, 15}, |
| {1, 3, 7, 9, 10}, |
| {1, 3, 7, 9, 12}, |
| {1, 3, 7, 9, 14}, |

TABLE 31-continued

| |
|---|
| {1, 3, 7, 10, 11}, |
| {1, 3, 7, 10, 13}, |
| {1, 3, 7, 10, 15}, |
| {1, 3, 7, 11, 12}, |
| {1, 3, 7, 11, 14}, |
| {1, 3, 7, 12, 13}, |
| {1, 3, 7, 12, 15}, |
| {1, 3, 7, 13, 14}, |
| {1, 3, 7, 14, 15}, |
| {1, 3, 8, 9, 12}, |
| {1, 3, 8, 9, 13}, |
| {1, 3, 8, 9, 14}, |
| {1, 3, 8, 9, 15}, |
| {1, 3, 8, 11, 12}, |
| {1, 3, 8, 11, 13}, |
| {1, 3, 8, 11, 14}, |
| {1, 3, 8, 11, 15}, |
| {1, 3, 8, 12, 13}, |
| {1, 3, 8, 12, 15}, |
| {1, 3, 8, 13, 14}, |
| {1, 3, 8, 14, 15}, |
| {1, 3, 9, 10, 12}, |
| {1, 3, 9, 10, 13}, |
| {1, 3, 9, 10, 14}, |
| {1, 3, 9, 10, 15}, |
| {1, 3, 9, 12, 13}, |
| {1, 3, 9, 12, 15}, |
| {1, 3, 9, 13, 14}, |
| {1, 3, 9, 14, 15}, |
| {1, 3, 10, 11, 12}, |
| {1, 3, 10, 11, 13}, |
| {1, 3, 10, 11, 14}, |
| {1, 3, 10, 11, 15}, |
| {1, 3, 10, 12, 13}, |
| {1, 3, 10, 12, 15}, |
| {1, 3, 10, 13, 14}, |
| {1, 3, 10, 14, 15}, |
| {1, 3, 11, 12, 13}, |
| {1, 3, 11, 12, 15}, |
| {1, 3, 11, 13, 14}, |
| {1, 3, 11, 14, 15}, |
| {1, 4, 5, 6, 8}, |
| {1, 4, 5, 6, 9}, |
| {1, 4, 5, 6, 10}, |
| {1, 4, 5, 6, 11}, |
| {1, 4, 5, 6, 12}, |
| {1, 4, 5, 6, 13}, |
| {1, 4, 5, 6, 14}, |
| {1, 4, 5, 6, 15}, |
| {1, 4, 5, 7, 8}, |
| {1, 4, 5, 7, 9}, |
| {1, 4, 5, 7, 10}, |
| {1, 4, 5, 7, 11}, |
| {1, 4, 5, 7, 12}, |
| {1, 4, 5, 7, 13}, |
| {1, 4, 5, 7, 14}, |
| {1, 4, 5, 7, 15}, |
| {1, 4, 5, 8, 10}, |
| {1, 4, 5, 8, 11}, |
| {1, 4, 5, 8, 14}, |
| {1, 4, 5, 8, 15}, |
| {1, 4, 5, 9, 10}, |
| {1, 4, 5, 9, 11}, |
| {1, 4, 5, 9, 14}, |
| {1, 4, 5, 9, 15}, |
| {1, 4, 5, 10, 12}, |
| {1, 4, 5, 10, 13}, |
| {1, 4, 5, 11, 12}, |
| {1, 4, 5, 11, 13}, |
| {1, 4, 5, 12, 14}, |
| {1, 4, 5, 12, 15}, |
| {1, 4, 5, 13, 14}, |
| {1, 4, 5, 13, 15}, |
| {1, 4, 6, 7, 8}, |
| {1, 4, 6, 7, 9}, |
| {1, 4, 6, 7, 10}, |
| {1, 4, 6, 7, 11}, |
| {1, 4, 6, 7, 12}, |
| {1, 4, 6, 7, 13}, |

TABLE 31-continued

| |
|---|
| {1, 4, 6, 7, 14}, |
| {1, 4, 6, 7, 15}, |
| {1, 4, 6, 8, 9}, |
| {1, 4, 6, 8, 11}, |
| {1, 4, 6, 8, 12}, |
| {1, 4, 6, 8, 14}, |
| {1, 4, 6, 9, 10}, |
| {1, 4, 6, 9, 13}, |
| {1, 4, 6, 9, 15}, |
| {1, 4, 6, 10, 11}, |
| {1, 4, 6, 10, 12}, |
| {1, 4, 6, 10, 14}, |
| {1, 4, 6, 11, 13}, |
| {1, 4, 6, 11, 15}, |
| {1, 4, 6, 12, 13}, |
| {1, 4, 6, 12, 15}, |
| {1, 4, 6, 13, 14}, |
| {1, 4, 6, 14, 15}, |
| {1, 4, 7, 8, 9}, |
| {1, 4, 7, 8, 10}, |
| {1, 4, 7, 8, 12}, |
| {1, 4, 7, 8, 15}, |
| {1, 4, 7, 9, 11}, |
| {1, 4, 7, 9, 13}, |
| {1, 4, 7, 9, 14}, |
| {1, 4, 7, 10, 11}, |
| {1, 4, 7, 10, 13}, |
| {1, 4, 7, 10, 14}, |
| {1, 4, 7, 11, 12}, |
| {1, 4, 7, 11, 15}, |
| {1, 4, 7, 12, 13}, |
| {1, 4, 7, 12, 14}, |
| {1, 4, 7, 13, 15}, |
| {1, 4, 7, 14, 15}, |
| {1, 4, 8, 9, 10}, |
| {1, 4, 8, 9, 11}, |
| {1, 4, 8, 9, 14}, |
| {1, 4, 8, 9, 15}, |
| {1, 4, 8, 10, 11}, |
| {1, 4, 8, 10, 12}, |
| {1, 4, 8, 10, 14}, |
| {1, 4, 8, 11, 12}, |
| {1, 4, 8, 11, 15}, |
| {1, 4, 8, 12, 14}, |
| {1, 4, 8, 12, 15}, |
| {1, 4, 8, 14, 15}, |
| {1, 4, 9, 10, 11}, |
| {1, 4, 9, 10, 13}, |
| {1, 4, 9, 10, 14}, |
| {1, 4, 9, 11, 13}, |
| {1, 4, 9, 11, 15}, |
| {1, 4, 9, 13, 14}, |
| {1, 4, 9, 13, 15}, |
| {1, 4, 9, 14, 15}, |
| {1, 4, 10, 11, 12}, |
| {1, 4, 10, 11, 13}, |
| {1, 4, 10, 12, 13}, |
| {1, 4, 10, 12, 14}, |
| {1, 4, 10, 13, 14}, |
| {1, 4, 11, 12, 13}, |
| {1, 4, 11, 12, 15}, |
| {1, 4, 11, 13, 15}, |
| {1, 4, 12, 13, 14}, |
| {1, 4, 12, 13, 15}, |
| {1, 4, 12, 14, 15}, |
| {1, 4, 13, 14, 15}, |
| {1, 5, 6, 7, 8}, |
| {1, 5, 6, 7, 9}, |
| {1, 5, 6, 7, 10}, |
| {1, 5, 6, 7, 11}, |
| {1, 5, 6, 7, 12}, |
| {1, 5, 6, 7, 13}, |
| {1, 5, 6, 7, 14}, |
| {1, 5, 6, 7, 15}, |
| {1, 5, 6, 8, 9}, |
| {1, 5, 6, 8, 10}, |
| {1, 5, 6, 8, 13}, |
| {1, 5, 6, 8, 14}, |

TABLE 32

| |
|---|
| {1, 5, 6, 9, 11}, |
| {1, 5, 6, 9, 12}, |
| {1, 5, 6, 9, 15}, |
| {1, 5, 6, 10 ,11}, |
| {1, 5, 6, 10, 12}, |
| {1, 5, 6, 10, 15}, |
| {1, 5, 6, 11, 13}, |
| {1, 5, 6, 11, 14}, |
| {1, 5, 6, 12, 13}, |
| {1, 5, 6, 12, 14}, |
| {1, 5, 6, 13, 15}, |
| {1, 5, 6, 14, 15}, |
| {1, 5, 7, 8, 9}, |
| {1, 5, 7, 8, 11}, |
| {1, 5, 7, 8, 13}, |
| {1, 5, 7, 8, 15}, |
| {1, 5, 7, 9, 10}, |
| {1, 5, 7, 9, 12}, |
| {1, 5, 7, 9, 14}, |
| {1, 5, 7, 10, 11}, |
| {1, 5, 7, 10, 13}, |
| {1, 5, 7, 10, 15}, |
| {1, 5, 7, 11, 12}, |
| {1, 5, 7, 11, 14}, |
| {1, 5, 7, 12, 13}, |
| {1, 5, 7, 12, 15}, |
| {1, 5, 7, 13, 14}, |
| {1, 5, 7, 14, 15}, |
| {1, 5, 8, 9, 10}, |
| {1, 5, 8, 9, 11}, |
| {1, 5, 8, 9, 14}, |
| {1, 5, 8, 9, 15}, |
| {1, 5, 8, 10, 11}, |
| {1, 5, 8, 10, 13}, |
| {1, 5, 8, 10, 15}, |
| {1, 5, 8, 11, 13}, |
| {1, 5, 8, 11, 14}, |
| {1, 5, 8, 13, 14}, |
| {1, 5, 8, 13, 15}, |
| {1, 5, 8, 14, 15}, |
| {1, 5, 9, 10, 11}, |
| {1, 5, 9, 10, 12}, |
| {1, 5, 9, 10, 15}, |
| {1, 5, 9, 11, 12}, |
| {1, 5, 9, 11, 14}, |
| {1, 5, 9, 12, 14}, |
| {1, 5, 9, 12, 15}, |
| {1, 5, 9, 14, 15}, |
| {1, 5, 10, 11, 12}, |
| {1, 5, 10, 11, 13}, |
| {1, 5, 10, 12, 13}, |
| {1, 5, 10, 12, 15}, |
| {1, 5, 10, 13, 15}, |
| {1, 5, 11, 12, 13}, |
| {1, 5, 11, 12, 14}, |
| {1, 5, 11, 13, 14}, |
| {1, 5, 12, 13, 14}, |
| {1, 5, 12, 14, 15}, |
| {1, 5, 13, 14 ,15}, |
| {1, 6, 7, 8, 10}, |
| {1, 6, 7, 8, 11}, |
| {1, 6, 7, 8, 12}, |
| {1, 6, 7, 8, 13}, |
| {1, 6, 7, 9, 10}, |
| {1, 6, 7, 9, 11}, |
| {1, 6, 7, 9, 12}, |
| {1, 6, 7, 9, 13}, |
| {1, 6, 7, 10, 14}, |
| {1, 6, 7, 10, 15}, |
| {1, 6, 7, 11, 14}, |
| {1, 6, 7, 11, 15}, |
| {1, 6, 7, 12, 14}, |
| {1, 6, 7, 12, 15}, |
| {1, 6, 7, 13, 14}, |
| {1, 6, 7, 13, 15}, |
| {1, 6, 8, 9, 10}, |
| {1, 6, 8, 9, 11}, |
| {1, 6, 8, 9, 12}, |
| {1, 6, 8, 9, 13}, |

TABLE 32-continued

| |
|---|
| {1, 6, 8, 10, 11}, |
| {1, 6, 8, 10, 12}, |
| {1, 6, 8, 10, 14}, |
| {1, 6, 8, 11, 13}, |
| {1, 6, 8, 11, 14}, |
| {1, 6, 8, 12, 13}, |
| {1, 6, 8, 12, 14}, |
| {1, 6, 8, 13, 14}, |
| {1, 6, 9, 10, 11}, |
| {1, 6, 9, 10, 12}, |
| {1, 6, 9, 10, 15}, |
| {1, 6, 9, 11, 13}, |
| {1, 6, 9, 11, 15}, |
| {1, 6, 9, 12, 13}, |
| {1, 6, 9, 12, 15}, |
| {1, 6, 9, 13, 15}, |
| {1, 6, 10, 11, 14}, |
| {1, 6, 10, 11, 15}, |
| {1, 6, 10, 12, 14}, |
| {1, 6, 10, 12, 15}, |
| {1, 6, 10, 14, 15}, |
| {1, 6, 11, 13, 14}, |
| {1, 6, 11, 13, 15}, |
| {1, 6, 11, 14, 15}, |
| {1, 6, 12, 13, 14}, |
| {1, 6, 12, 13, 15}, |
| {1, 6, 12, 14, 15}, |
| {1, 6, 13, 14, 15}, |
| {1, 7, 8, 9, 10}, |
| {1, 7, 8, 9, 11}, |
| {1, 7, 8, 9, 12}, |
| {1, 7, 8, 9, 13}, |
| {1, 7, 8, 10, 11}, |
| {1, 7, 8, 10, 13}, |
| {1, 7, 8, 10, 15}, |
| {1, 7, 8, 11, 12}, |
| {1, 7, 8, 11, 15}, |
| {1, 7, 8, 12, 13}, |
| {1, 7, 8, 12, 15}, |
| {1, 7, 8, 13, 15}, |
| {1, 7, 9, 10, 11}, |
| {1, 7, 9, 10, 13}, |
| {1, 7, 9, 10, 14}, |
| {1, 7, 9, 11, 12}, |
| {1, 7, 9, 11, 14}, |
| {1, 7, 9, 12, 13}, |
| {1, 7, 9, 12, 14}, |
| {1, 7, 9, 13, 14}, |
| {1, 7, 10, 11, 14}, |
| {1, 7, 10, 11, 15}, |
| {1, 7, 10, 13, 14}, |
| {1, 7, 10, 13, 15}, |
| {1, 7, 10, 14, 15}, |
| {1, 7, 11, 12, 14}, |
| {1, 7, 11, 12, 15}, |
| {1, 7, 11, 14, 15}, |
| {1, 7, 12, 13, 14}, |
| {1, 7, 12, 13, 15}, |
| {1, 7, 12, 14 ,15}, |
| {1, 7, 13, 14, 15}, |
| {1, 8, 9, 10, 12}, |
| {1, 8, 9, 10, 13}, |
| {1, 8, 9, 10, 14}, |
| {1, 8, 9, 10, 15}, |
| {1, 8, 9, 11, 12}, |
| {1, 8, 9, 11, 13}, |
| {1, 8, 9, 11, 14}, |
| {1, 8, 9, 11, 15}, |
| {1, 8, 9, 12, 14}, |
| {1, 8, 9, 12, 15}, |
| {1, 8, 9, 13, 14}, |
| {1, 8, 9, 13, 15}, |
| {1, 8, 10, 11, 12}, |
| {1, 8, 10, 11, 13}, |
| {1, 8, 10, 11, 14}, |
| {1, 8, 10, 11, 15}, |
| {1, 8, 10, 12, 13}, |
| {1, 8, 10, 12, 15}, |
| {1, 8, 10, 13, 14}, |

TABLE 32-continued

| |
|---|
| {1, 8, 10, 14, 15}, |
| {1, 8, 11, 12, 13}, |
| {1, 8, 11, 12, 14}, |
| {1, 8, 11, 13, 15}, |
| {1, 8, 11, 14, 15}, |
| {1, 8, 12, 13, 14}, |
| {1, 8, 12, 13, 15}, |
| {1, 8, 12, 14, 15}, |
| {1, 8, 13, 14, 15}, |
| {1, 9, 10, 11, 12}, |
| {1, 9, 10, 11, 13}, |
| {1, 9, 10, 11, 14}, |
| {1, 9, 10, 11, 15}, |
| {1, 9, 10, 12, 13}, |
| {1, 9, 10, 12, 14}, |
| {1, 9, 10, 13, 15}, |
| {1, 9, 10, 14, 15}, |
| {1, 9, 11, 12, 13}, |
| {1, 9, 11, 12, 15}, |
| {1, 9, 11, 13, 14}, |
| {1, 9, 11, 14, 15}, |
| {1, 9, 12, 13, 14}, |
| {1, 9, 12, 13, 15}, |
| {1, 9, 12, 14, 15}, |
| {1, 9, 13, 14, 15}, |
| {1, 10, 11, 12, 14}, |
| {1, 10, 11, 12, 15}, |
| {1, 10, 11, 13, 14}, |
| {1, 10, 11, 13, 15}, |
| {1, 10, 12, 13, 14}, |
| {1, 10, 12, 14, 15}, |
| {1, 10, 13, 14, 15}, |
| {1, 11, 12, 13, 14}, |
| {1, 11, 12, 13, 15}, |
| {1, 11, 12, 14, 15}, |
| {1, 11, 13, 14, 15}, |
| {2, 3, 4, 6, 8}, |
| {2, 3, 4, 6, 9}, |
| {2, 3, 4, 6, 10}, |
| {2, 3, 4, 6, 11}, |
| {2, 3, 4, 6, 12}, |
| {2, 3, 4, 6, 13}, |
| {2, 3, 4, 6, 14}, |
| {2, 3, 4, 6, 15}, |
| {2, 3, 4, 7, 8}, |
| {2, 3, 4, 7, 9}, |
| {2, 3, 4, 7, 10}, |
| {2, 3, 4, 7, 11}, |
| {2, 3, 4, 7, 12}, |
| {2, 3, 4, 7, 13}, |
| {2, 3, 4, 7, 14}, |
| {2, 3, 4, 7, 15}, |
| {2, 3, 4, 8, 10}, |
| {2, 3, 4, 8, 11}, |
| {2, 3, 4, 8, 12}, |
| {2, 3, 4, 8, 13}, |
| {2, 3, 4, 9, 10}, |
| {2, 3, 4, 9, 11}, |
| {2, 3, 4, 9, 12}, |
| {2, 3, 4, 9, 13}, |
| {2, 3, 4, 10, 14}, |
| {2, 3, 4, 10, 15}, |
| {2, 3, 4, 11, 14}, |
| {2, 3, 4, 11, 15}, |
| {2, 3, 4, 12, 14}, |
| {2, 3, 4, 12, 15}, |
| {2, 3, 4, 13, 14}, |
| {2, 3, 4, 13, 15}, |
| {2, 3, 5, 6, 8}, |
| {2, 3, 5, 6, 9}, |
| {2, 3, 5, 6, 10}, |
| {8, 3, 5, 6, 11}, |
| {2, 3, 5, 6, 12}, |
| {2, 3, 5, 6, 13}, |
| {2, 3, 5, 6, 14}, |
| {2, 3, 5, 6, 15}, |
| {2, 3, 5, 7, 8}, |
| {2, 3, 5, 7, 9}, |
| {2, 3, 5, 7, 10}, |

TABLE 32-continued

| |
|---|
| {2, 3, 5, 7, 11}, |
| {2, 3, 5, 7, 12}, |
| {2, 3, 5, 7, 13}, |
| {2, 3, 5, 7, 14}, |
| {2, 3, 5, 7, 15}, |
| {2, 3, 5, 8, 10}, |
| {2, 3, 5, 8, 11}, |
| {2, 3, 5, 8, 12}, |
| {2, 3, 5, 8, 13}, |
| {2, 3, 5, 9, 10}, |
| {2, 3, 5, 9, 11}, |
| {2, 3, 5, 9, 12}, |
| {2, 3, 5, 9, 13}, |
| {2, 3, 5, 10, 14}, |
| {2, 3, 5, 10, 15}, |
| {2, 3, 5, 11, 14}, |
| {2, 3, 5, 11, 15}, |
| {2, 3, 5, 12, 14}, |
| {2, 3, 5, 12, 15}, |
| {2, 3, 5, 13, 14}, |
| {2, 3, 5, 13, 15}, |
| {2, 3, 6, 8, 10}, |
| {2, 3, 6, 8, 11}, |
| {2, 3, 6, 8, 14}, |
| {2, 3, 6, 8, 15}, |
| {2, 3, 6, 9, 10}, |
| {2, 3, 6, 9, 11}, |
| {2, 3, 6, 9, 14}, |
| {2, 3, 6, 9, 15}, |
| {2, 3, 6, 10, 12}, |
| {2, 3, 6, 10, 13}, |
| {2, 3, 6, 11, 12}, |
| {2, 3, 6, 11, 13}, |
| {2, 3, 6, 12, 14}, |
| {2, 3, 6, 12, 15}, |
| {2, 3, 6, 13, 14}, |
| {2, 3, 6, 13, 15}, |
| {2, 3, 7, 8, 10}, |
| {2, 3, 7, 8, 11}, |
| {2, 3, 7, 8, 14}, |
| {2, 3, 7, 8, 15}, |
| {2, 3, 7, 9, 10}, |
| {2, 3, 7, 9, 11}, |
| {2, 3, 7, 9, 14}, |
| {2, 3, 7, 9, 15}, |
| {2, 3, 7, 10, 12}, |
| {2, 3, 7, 10, 13}, |
| {2, 3, 7, 11, 12}, |
| {2, 3, 7, 11, 13}, |
| {2, 3, 7, 12, 14}, |
| {2, 3, 7, 12, 15}, |
| {2, 3, 7, 13, 14}, |
| {2, 3, 7, 13, 15}, |
| {2, 3, 8, 10, 12}, |
| {2, 3, 8, 10, 13}, |
| {2, 3, 8, 10, 14}, |
| {2, 3, 8, 10, 15}, |
| {2, 3, 8, 11, 12}, |
| {2, 3, 8, 11, 13}, |
| {2, 3, 8, 11, 14}, |
| {2, 3, 8, 11, 15}, |
| {2, 3, 8, 12, 14}, |
| {2, 3, 8, 12, 15}, |
| {2, 3, 8, 13, 14}, |
| {2, 3, 8, 13, 15}, |
| {2, 3, 9, 10, 12}, |
| {2, 3, 9, 10, 13}, |
| {2, 3, 9, 10, 14}, |
| {2, 3, 9, 10, 15}, |
| {2, 3, 9, 11, 12}, |
| {2, 3, 9, 11, 13}, |
| {2, 3, 9, 11, 14}, |
| {2, 3, 9, 11, 15}, |
| {2, 3, 9, 12, 14}, |
| {2, 3, 9, 12, 15}, |
| {2, 3, 9, 13, 14}, |

TABLE 33

| |
|---|
| {2, 3, 9, 13, 15}, |
| {2, 3, 10, 12, 14}, |
| {2, 3, 10, 12, 15}, |
| {2, 3, 10, 13, 14}, |
| {2, 3, 10, 13, 15}, |
| {2, 3, 11, 12, 14}, |
| {2, 3, 11, 12, 15}, |
| {2, 3, 11, 13, 14}, |
| {2, 3, 11, 13, 15}, |
| {2, 4, 5, 6, 8}, |
| {2, 4, 5, 6, 9}, |
| {2, 4, 5, 6, 10}, |
| {2, 4, 5, 6, 11}, |
| {2, 4, 5, 6, 12}, |
| {2, 4, 5, 6, 13}, |
| {2, 4, 5, 6, 14}, |
| {2, 4, 5, 6, 15}, |
| {2, 4, 5, 7, 8}, |
| {2, 4, 5, 7, 9}, |
| {2, 4, 5, 7, 10}, |
| {2, 4, 5, 7, 11}, |
| {2, 4, 5, 7, 12}, |
| {2, 4, 5, 7, 13}, |
| {2, 4, 5, 7, 14}, |
| {2, 4, 5, 7, 15}, |
| {2, 4, 5, 8, 10}, |
| {2, 4, 5, 8, 11}, |
| {2, 4, 5, 8, 12}, |
| {2, 4, 5, 8, 13}, |
| {2, 4, 5, 9, 10}, |
| {2, 4, 5, 9, 11}, |
| {2, 4, 5, 9, 12}, |
| {2, 4, 5, 9, 13}, |
| {2, 4, 5, 10, 14}, |
| {2, 4, 5, 10, 15}, |
| {2, 4, 5, 11, 14}, |
| {2, 4, 5, 11, 15}, |
| {2, 4, 5, 12, 14}, |
| {2, 4, 5, 12, 15}, |
| {2, 4, 5, 13, 14}, |
| {2, 4, 5, 13, 15}, |
| {2, 4, 6, 7, 8}, |
| {2, 4, 6, 7, 9}, |
| {2, 4, 6, 7, 10}, |
| {2, 4, 6, 7, 11}, |
| {2, 4, 6, 7, 12}, |
| {2, 4, 6, 7, 13}, |
| {2, 4, 6, 7, 14}, |
| {2, 4, 6, 7, 15}, |
| {2, 4, 6, 8, 9}, |
| {2, 4, 6, 8, 11}, |
| {2, 4, 6, 8, 13}, |
| {2, 4, 6, 8, 15}, |
| {2, 4, 6, 9, 10}, |
| {2, 4, 6, 9, 12}, |
| {2, 4, 6, 9, 14}, |
| {2, 4, 6, 10, 11}, |
| {2, 4, 6, 10, 13}, |
| {2, 4, 6, 10, 15}, |
| {2, 4, 6, 11, 12}, |
| {2, 4, 6, 11, 14}, |
| {2, 4, 6, 12, 13}, |
| {2, 4, 6, 12, 15}, |
| {2, 4, 6, 13, 14}, |
| {2, 4, 6, 14, 15}, |
| {2, 4, 7, 8, 9}, |
| {2, 4, 7, 8, 10}, |
| {2, 4, 7, 8, 12}, |
| {2, 4, 7, 8, 15}, |
| {2, 4, 7, 9, 11}, |
| {2, 4, 7, 9, 13}, |
| {2, 4, 7, 9, 14}, |
| {2, 4, 7, 10, 11}, |
| {2, 4, 7, 10, 13}, |
| {2, 4, 7, 10, 14}, |
| {2, 4, 7, 11, 12}, |
| {2, 4, 7, 11, 15}, |
| {2, 4, 7, 12, 13}, |
| {2, 4, 7, 12, 14}, |

TABLE 33-continued

| |
|---|
| {2, 4, 7, 13, 15}, |
| {2, 4, 7, 14, 15}, |
| {2, 4, 8, 9, 10}, |
| {2, 4, 8, 9, 11}, |
| {2, 4, 8, 9, 12}, |
| {2, 4, 8, 9, 13}, |
| {2, 4, 8, 10, 11}, |
| {2, 4, 8, 10, 13}, |
| {2, 4, 8, 10, 15}, |
| {2, 4, 8, 11, 12}, |
| {2, 4, 8, 11, 15}, |
| {2, 4, 8, 12, 13}, |
| {2, 4, 8, 12, 15}, |
| {2, 4, 8, 13, 15}, |
| {2, 4, 9, 10, 11}, |
| {2, 4, 9, 10, 13}, |
| {2, 4, 9, 10, 14}, |
| {2, 4, 9, 11, 12}, |
| {2, 4, 9, 11, 14}, |
| {2, 4, 9, 12, 13}, |
| {2, 4, 9, 13, 14}, |
| {2, 4, 10, 11, 14}, |
| {2, 4, 10, 11, 15}, |
| {2, 4, 10, 13, 14}, |
| {2, 4, 10, 13, 15}, |
| {2, 4, 10, 14, 15}, |
| {2, 4, 11, 12, 14}, |
| {2, 4, 11, 12, 15}, |
| {2, 4, 11, 14, 15}, |
| {2, 4, 12, 13, 14}, |
| {2, 4, 12, 13, 15}, |
| {2, 4, 12, 14, 15}, |
| {2, 4, 13, 14, 15}, |
| {2, 5, 6, 7, 8}, |
| {2, 5, 6, 7, 9}, |
| {2, 5, 6, 7, 10}, |
| {2, 5, 6, 7, 11}, |
| {2, 5, 6, 7, 12}, |
| {2, 5, 6, 7, 13}, |
| {2, 5, 6, 7, 14}, |
| {2, 5, 6, 7, 15}, |
| {2, 5, 6, 8, 9}, |
| {2, 5, 6, 8, 10}, |
| {2, 5, 6, 8, 13}, |
| {2, 5, 6, 8, 14}, |
| {2, 5, 6, 9, 11}, |
| {2, 5, 6, 9, 12}, |
| {2, 5, 6, 9, 15}, |
| {2, 5, 6, 10, 11}, |
| {2, 5, 6, 10, 12}, |
| {2, 5, 6, 10, 15}, |
| {2, 5, 6, 11, 13}, |
| {2, 5, 6, 11, 14}, |
| {2, 5, 6, 12, 13}, |
| {2, 5, 6, 12, 14}, |
| {2, 5, 6, 13, 15}, |
| {2, 5, 6, 14, 15}, |
| {2, 5, 7, 8, 9}, |
| {2, 5, 7, 8, 11}, |
| {2, 5, 7, 8, 12}, |
| {2, 5, 7, 8, 14}, |
| {2, 5, 7, 9, 10}, |
| {2, 5, 7, 9, 13}, |
| {2, 5, 7, 9, 15}, |
| {2, 5, 7, 10, 11}, |
| {2, 5, 7, 10, 12}, |
| {2, 5, 7, 10, 14}, |
| {2, 5, 7, 11, 13}, |
| {2, 5, 7, 11, 15}, |
| {2, 5, 7, 12, 13}, |
| {2, 5, 7, 12, 15}, |
| {2, 5, 7, 13, 14}, |
| {2, 5, 7, 14, 15}, |
| {2, 5, 8, 9, 10}, |
| {2, 5, 8, 9, 11}, |
| {2, 5, 8, 9, 12}, |
| {2, 5, 8, 9, 13}, |
| {2, 5, 8, 10, 11}, |
| {2, 5, 8, 10, 12}, |

TABLE 33-continued

| |
|---|
| {2, 5, 8, 10, 14}, |
| {2, 5, 8, 11, 13}, |
| {2, 5, 8, 11, 14}, |
| {2, 5, 8, 12, 13}, |
| {2, 5, 8, 12, 14}, |
| {2, 5, 8, 13, 14}, |
| {2, 5, 9, 10, 11}, |
| {2, 5, 9, 10, 12}, |
| {2, 5, 9, 10, 15}, |
| {2, 5, 9, 11, 13}, |
| {2, 5, 9, 11, 15}, |
| {2, 5, 9, 12, 13}, |
| {2, 5, 9, 12, 15}, |
| {2, 5, 9, 13, 15}, |
| {2, 5, 10, 11, 14}, |
| {2, 5, 10, 11, 15}, |
| {2, 5, 10, 12, 14}, |
| {2, 5, 10, 12, 15}, |
| {2, 5, 10, 14, 15}, |
| {2, 5, 11, 13, 14}, |
| {2, 5, 11, 13, 15}, |
| {2, 5, 11, 14, 15}, |
| {2, 5, 12, 13, 14}, |
| {2, 5, 12, 13, 15}, |
| {2, 5, 12, 14, 15}, |
| {2, 5, 13, 14, 15}, |
| {2, 6, 7, 8, 10}, |
| {2, 6, 7, 8, 11}, |
| {2, 6, 7, 8, 14}, |
| {2, 6, 7, 8, 15}, |
| {2, 6, 7, 9, 10}, |
| {2, 6, 7, 9, 11}, |
| {2, 6, 7, 9, 14}, |
| {2, 6, 7, 9, 15}, |
| {2, 6, 7, 10, 12}, |
| {2, 6, 7, 10, 13}, |
| {2, 6, 7, 11, 12}, |
| {2, 6, 7, 11, 13}, |
| {2, 6, 7, 12, 14}, |
| {2, 6, 7, 12, 15}, |
| {2, 6, 7, 13, 14}, |
| {2, 6, 7, 13, 15}, |
| {2, 6, 8, 9, 10}, |
| {2, 6, 8, 9, 11}, |
| {2, 6, 8, 9, 14}, |
| {2, 6, 8, 9, 15}, |
| {2, 6, 8, 10, 11}, |
| {2, 6, 8, 10, 13}, |
| {2, 6, 8, 10, 15}, |
| {2, 6, 8, 11, 13}, |
| {2, 6, 8, 11, 14}, |
| {2, 6, 8, 13, 14}, |
| {2, 6, 8, 13, 15}, |
| {2, 6, 8, 14, 15}, |
| {2, 6, 9, 10, 11}, |
| {2, 6, 9, 10, 12}, |
| {2, 6, 9, 10, 15}, |
| {2, 6, 9, 11, 12}, |
| {2, 6, 9, 11, 14}, |
| {2, 6, 9, 12, 14}, |
| {2, 6, 9, 12, 15}, |
| {2, 6, 9, 14, 15}, |
| {2, 6, 10, 11, 12}, |
| {2, 6, 10, 11, 13}, |
| {2, 6, 10, 12 ,13}, |
| {2, 6, 10, 12 ,15}, |
| {2, 6, 10, 13 ,15}, |
| {2, 6, 11, 12 ,13}, |
| {2, 6, 11, 12 ,14}, |
| {2, 6, 11, 13 ,14}, |
| {2, 6, 12, 13 ,14}, |
| {2, 6, 12, 13 ,15}, |
| {2, 6, 12, 14 ,15}, |
| {2, 6, 13, 14 ,15}, |
| {2, 7, 8, 9, 10}, |
| {2, 7, 8, 9, 11}, |
| {2, 7, 8, 9, 14}, |
| {2, 7, 8, 9, 15}, |
| {2, 7, 8, 10, 11}, |

TABLE 33-continued

| |
|---|
| {2, 7, 8, 10, 12}, |
| {2, 7, 8, 10, 14}, |
| {2, 7, 8, 11, 12}, |
| {2, 7, 8, 11, 15}, |
| {2, 7, 8, 12, 14}, |
| {2, 7, 8, 12, 15}, |
| {2, 7, 8, 14, 15}, |
| {2, 7, 9, 10, 11}, |
| {2, 7, 9, 10, 13}, |
| {2, 7, 9, 10, 14}, |
| {2, 7, 9, 11, 13}, |
| {2, 7, 9, 11, 15}, |
| {2, 7, 9, 13, 14}, |
| {2, 7, 9, 13, 15}, |
| {2, 7, 9, 14, 15}, |
| {2, 7, 10, 11, 12}, |
| {2, 7, 10, 11, 13}, |
| {2, 7, 10, 12, 13}, |
| {2, 7, 10, 12, 14}, |
| {2, 7, 10, 13, 14}, |
| {2, 7, 11, 12, 13}, |
| {2, 7, 11, 12, 15}, |
| {2, 7, 11, 13, 15}, |
| {2, 7, 12, 13, 14}, |
| {2, 7, 12, 13, 15}, |
| {2, 7, 12, 14, 15}, |
| {2, 7, 13, 14, 15}, |
| {2, 8, 9, 10, 12}, |
| {2, 8, 9, 10, 13}, |
| {2, 8, 9, 10, 14}, |
| {2, 8, 9, 10, 15}, |
| {2, 8, 9, 11, 12}, |
| {2, 8, 9, 11, 13}, |
| {2, 8, 9, 11, 14}, |
| {2, 8, 9, 11, 15}, |
| {2, 8, 9, 12, 14}, |
| {2, 8, 9, 12, 15}, |
| {2, 8, 9, 13, 14}, |
| {2, 8, 9, 13, 15}, |
| {2, 8, 10, 11, 12}, |
| {2, 8, 10, 11, 13}, |
| {2, 8, 10, 11, 14}, |
| {2, 8, 10, 11, 15}, |
| {2, 8, 10, 12, 13}, |
| {2, 8, 10, 12, 15}, |
| {2, 8, 10, 13, 14}, |
| {2, 8, 10, 14, 15}, |
| {2, 8, 11, 12, 13}, |
| {2, 8, 11, 12, 14}, |
| {2, 8, 11, 13, 15}, |
| {2, 8, 11, 14, 15}, |
| {2, 8, 12, 13, 14}, |
| {2, 8, 12, 13, 15}, |
| {2, 8, 12, 14, 15}, |
| {2, 8, 13, 14, 15}, |
| {2, 9, 10, 11, 12}, |
| {2, 9, 10, 11, 13}, |
| {2, 9, 10, 11, 14}, |
| {2, 9, 10, 11, 15}, |
| {2, 9, 10, 12, 13}, |
| {2, 9, 10, 12, 14}, |
| {2, 9, 10, 13, 15}, |
| {2, 9, 10, 14, 15}, |
| {2, 9, 11, 12, 13}, |
| {2, 9, 11, 12, 15}, |
| {2, 9, 11, 13, 14}, |
| {2, 9, 11, 14, 15}, |
| {2, 9, 12, 13, 14}, |
| {2, 9, 12, 13, 15}, |
| {2, 9, 12, 14, 15}, |
| {2, 9, 13, 14, 15}, |
| {2, 10, 11, 12, 14}, |
| {2, 10, 11, 12, 15}, |
| {2, 10, 11, 13, 14}, |
| {2, 10, 11, 13, 15}, |
| {2, 10, 12, 13, 14}, |
| {2, 10, 12, 13, 15}, |

TABLE 34

| | | | | | | |
|---|---|---|---|---|---|---|
| {2,10,12,14,15}, | {3,4,6,7,15}, | {3,4,9,10,11}, | {3,5,7,8,11}, | {3,5,12,14,15}, | {3,6,11,13,15}, | {3,8,9,12,14}, |
| {2,10,13,14,15}, | {3,4,6,8,9}, | {3,4,9,10,12}, | {3,5,7,8,13}, | {3,5,13,14,15}, | {3,6,12,13,14}, | {3,8,9,12,15}, |
| {2,11,12,13,14}, | {3,4,6,8,11}, | {3,4,9,10,15}, | {3,5,7,8,15}, | {3,6,7,8,10}, | {3,6,12,13,15}, | {3,8,9,13,14}, |
| {2,11,12,13,15}, | {3,4,6,8,12}, | {3,4,9,11,13}, | {3,5,7,9,10}, | {3,6,7,8,11}, | {3,6,12,14,15}, | {3,8,9,13,15}, |
| {2,11,12,14,15}, | {3,4,6,8,14}, | {3,4,9,11,15}, | {3,5,7,9,12}, | {3,6,8,8,14}, | {3,6,13,14,15}, | {3,8,10,11,12}, |
| {2,11,13,14,15}, | {3,4,6,9,10}, | {3,4,9,12,13}, | {3,5,7,9,14}, | {3,6,7,8,15}, | {3,7,8,9,10}, | {3,8,10,11,13}, |
| {3,4,5,6,8}, | {3,4,6,9,13}, | {3,4,9,12,15}, | {3,5,7,10,11}, | {3,6,7,9,10}, | {3,7,8,9,11}, | {3,8,10,11,14}, |
| {3,4,5,6,9}, | {3,4,6,9,15}, | {3,4,9,13,15}, | {3,5,7,10,13}, | {3,6,7,9,11}, | {3,7,8,9,14}, | {3,8,10,11,15}, |
| {3,4,5,6,10}, | {3,4,6,10,11}, | {3,4,10,11,14}, | {3,5,7,10,15}, | {3,6,7,9,14}, | {3,7,8,9,15}, | {3,8,10,12,13}, |
| {3,4,5,6,11}, | {3,4,6,10,12}, | {3,4,10,11,15}, | {3,5,7,11,12}, | {3,6,7,9,15}, | {3,7,8,10,11}, | {3,8,10,12,15}, |
| {3,4,5,6,12}, | {3,4,6,10,14}, | {3,4,10,12,14}, | {3,5,7,11,14}, | {3,6,7,10,12}, | {3,7,8,10,13}, | {3,8,10,13,14}, |
| {3,4,5,6,13}, | {3,4,6,11,13}, | {3,4,10,12,15}, | {3,5,7,12,13}, | {3,6,7,10,13}, | {3,7,8,10,15}, | {3,8,10,14,15}, |
| {3,4,5,6,14}, | {3,4,6,11,15}, | {3,4,10,14,15}, | {3,5,7,12,15}, | {3,6,7,11,12}, | {3,7,8,11,13}, | {3,8,11,12,13}, |
| {3,4,5,6,15}, | {3,4,6,12,13}, | {3,4,11,13,14}, | {3,5,7,13,14}, | {3,6,7,11,13}, | {3,7,8,11,14}, | {3,8,11,12,14}, |
| {3,4,5,7,8}, | {3,4,6,12,15}, | {3,4,11,13,15}, | {3,5,7,14,15}, | {3,6,7,12,14}, | {3,7,8,13,14}, | {3,8,11,13,15}, |
| {3,4,5,7,9}, | {3,4,6,13,14}, | {3,4,11,14,15}, | {3,5,8,9,10}, | {3,6,7,12,15}, | {3,7,8,13,15}, | {3,8,11,14,15}, |
| {3,4,5,7,10}, | {3,4,6,14,15}, | {3,4,12,13,14}, | {3,5,8,9,11}, | {3,6,7,13,14}, | {3,7,8,14,15}, | {3,8,12,13,14}, |
| {3,4,5,7,11}, | {3,4,7,8,9}, | {3,4,12,13,15}, | {3,5,8,9,12}, | {3,6,7,13,15}, | {3,7,9,10,11}, | {3,8,12,13,15}, |
| {3,4,5,7,12}, | {3,4,7,8,10}, | {3,4,12,14,15}, | {3,5,8,9,13}, | {3,6,8,9,10}, | {3,7,9,10,12}, | {3,8,12,14,15}, |
| {3,4,5,7,13}, | {3,4,7,8,13}, | {3,4,13,14,15}, | {3,5,8,10,11}, | {3,6,8,9,11}, | {3,7,9,10,15}, | {3,8,13,14,15}, |
| {3,4,5,7,14}, | {3,4,7,8,14}, | {3,5,6,7,8}, | {3,5,8,10,13}, | {3,6,8,9,14}, | {3,7,9,11,12}, | {3,9,10,11,12}, |
| {3,4,5,7,15}, | {3,4,7,9,11}, | {3,5,6,7,9}, | {3,5,8,10,15}, | {3,6,8,9,15}, | {3,7,9,11,14}, | {3,9,10,11,13}, |
| {3,4,5,8,10}, | {3,4,7,9,12}, | {3,5,6,7,10}, | {3,5,8,11,12}, | {3,6,8,10,11}, | {3,7,9,12,14}, | {3,9,10,11,14}, |
| {3,4,5,8,11}, | {3,4,7,9,15}, | {3,5,6,7,11}, | {3,5,8,11,15}, | {3,6,8,10,12}, | {3,7,9,12,15}, | {3,9,10,11,15}, |
| {3,4,5,8,12}, | {3,4,7,10,11}, | {3,5,6,7,12}, | {3,5,8,12,13}, | {3,6,8,10,14}, | {3,7,9,14,15}, | {3,9,10,12,13}, |
| {3,4,5,8,13}, | {3,4,7,10,12}, | {3,5,6,7,13}, | {3,5,8,12,15}, | {3,6,8,11,12}, | {3,7,10,11,12}, | {3,9,10,12,14}, |
| {3,4,5,9,10}, | {3,4,7,10,15}, | {3,5,6,7,14}, | {3,5,8,13,15}, | {3,6,8,11,15}, | {3,7,10,11,13}, | {3,9,10,13,15}, |
| {3,4,5,9,11}, | {3,4,7,11,13}, | {3,5,6,7,15}, | {3,5,9,10,11}, | {3,6,8,12,14}, | {3,7,10,12,13}, | {3,9,10,14,15}, |
| {3,4,5,9,12}, | {3,4,7,11,14}, | {3,5,6,8,9}, | {3,5,9,10,13}, | {3,6,8,12,15}, | {3,7,10,12,15}, | {3,9,11,12,13}, |
| {3,4,5,9,13}, | {3,4,7,12,13}, | {3,5,6,8,10}, | {3,5,9,10,14}, | {3,6,8,14,15}, | {3,7,10,13,15}, | {3,9,11,12,15}, |
| {3,4,5,10,14}, | {3,4,7,12,14}, | {3,5,6,8,12}, | {3,5,9,11,12}, | {3,6,9,10,11}, | {3,7,11,12,13}, | {3,9,11,13,14}, |
| {3,4,5,10,15}, | {3,4,7,13,15}, | {3,5,6,8,15}, | {3,5,9,11,14}, | {3,6,9,10,13}, | {3,7,11,12,14}, | {3,9,11,14,15}, |
| {3,4,5,11,14}, | {3,4,7,14,15}, | {3,5,6,9,11}, | {3,5,9,12,13}, | {3,6,9,10,14}, | {3,7,11,13,14}, | {3,9,12,13,14}, |
| {3,4,5,11,15}, | {3,4,8,9,10}, | {3,5,6,9,13}, | {3,5,9,12,14}, | {3,6,9,11,13}, | {3,7,12,13,14}, | {3,9,12,13,15}, |
| {3,4,5,12,14}, | {3,4,8,9,11}, | {3,5,6,9,14}, | {3,5,9,13,14}, | {3,6,9,11,15}, | {3,7,12,13,15}, | {3,9,12,14,15}, |
| {3,4,5,12,15}, | {3,4,8,9,12}, | {3,5,6,10,11}, | {3,5,10,11,14}, | {3,6,9,13,14}, | {3,7,12,14,15}, | {3,9,13,14,15}, |
| {3,4,5,13,14}, | {3,4,8,9,13}, | {3,5,6,10,13}, | {3,5,10,11,15}, | {3,6,9,13,15}, | {3,7,13,14,15}, | {3,10,11,12,14}, |
| {3,4,5,13,15}, | {3,4,8,10,11}, | {3,5,6,10,14}, | {3,5,10,13,14}, | {3,6,9,14,15}, | {3,8,9,10,12}, | {3,10,11,12,15}, |
| {3,4,6,7,8}, | {3,4,8,10,12}, | {3,5,6,11,12}, | {3,5,10,13,15}, | {3,6,10,11,12}, | {3,8,9,10,13}, | {3,10,11,13,14}, |
| {3,4,6,7,9}, | {3,4,8,10,14}, | {3,5,6,11,15}, | {3,5,10,14,15}, | {3,6,10,11,13}, | {3,8,9,10,14}, | {3,10,11,13,15}, |
| {3,4,6,7,10}, | {3,4,8,11,13}, | {3,5,6,12,13}, | {3,5,11,12,14}, | {3,6,10,12,13}, | {3,8,9,10,15}, | {3,10,11,13,14}, |
| {3,4,6,7,11}, | {3,4,8,11,14}, | {3,5,6,12,14}, | {3,5,11,12,15}, | {3,6,10,12,14}, | {3,8,9,11,12}, | {3,10,12,13,15}, |
| {3,4,6,7,12}, | {3,4,8,12,13}, | {3,5,6,13,15}, | {3,5,11,14,15}, | {3,6,10,13,14}, | {3,8,9,11,13}, | {3,10,12,14,15}, |
| {3,4,6,7,13}, | {3,4,8,12,14}, | {3,5,6,14,15}, | {3,5,12,13,14}, | {3,6,11,12,13}, | {3,8,9,11,14}, | {3,10,13,14,15}, |
| {3,4,6,7,14}, | {3,4,8,13,14}, | {3,5,7,8,9}, | {3,5,12,13,15}, | {3,6,11,12,15}, | {3,8,9,11,15}, | {3,11,12,13,14}, |

TABLE 35

| | | | | | | |
|---|---|---|---|---|---|---|
| {3,11,12,13,15}, | {4,5,8,13,14}, | {4,6,8,11,15}, | {4,7,10,11,12}, | {4,9,10,12,14}, | {5,6,8,10,14}, | {5,7,9,14,15}, |
| {3,11,12,14,15}, | {4,5,8,13,15}, | {4,6,8,12,13}, | {4,7,10,11,13}, | {4,9,10,13,15}, | {5,6,8,10,15}, | {5,7,10,11,12}, |
| {3,11,13,14,15}, | {4,5,9,10,12}, | {4,6,8,12,15}, | {4,7,10,11,14}, | {4,9,10,14,15}, | {5,6,8,12,13}, | {5,7,10,11,13}, |
| {4,5,6,8,12}, | {4,5,9,10,13}, | {4,6,8,13,14}, | {4,7,10,11,15}, | {4,9,11,12,13}, | {5,6,8,12,14}, | {5,7,10,11,14}, |
| {4,5,6,8,13}, | {4,5,9,10,14}, | {4,6,8,14,15}, | {4,7,10,12,13}, | {4,9,11,12,15}, | {5,6,8,13,15}, | {5,7,10,11,15}, |
| {4,5,6,8,14}, | {4,5,9,10,15}, | {4,6,9,10,12}, | {4,7,10,12,14}, | {4,9,11,13,14}, | {5,6,8,14,15}, | {5,7,10,12,13}, |
| {4,5,6,8,15}, | {4,5,9,11,12}, | {4,6,9,10,13}, | {4,7,10,13,15}, | {4,9,11,14,15}, | {5,6,9,11,12}, | {5,7,10,12,15}, |
| {4,5,6,9,12}, | {4,5,9,11,13}, | {4,6,9,10,14}, | {4,7,10,14,15}, | {4,9,12,13,14}, | {5,6,9,11,13}, | {5,7,10,13,14}, |
| {4,5,6,9,13}, | {4,5,9,11,14}, | {4,6,9,10,15}, | {4,7,11,12,13}, | {4,9,12,13,15}, | {5,6,9,11,14}, | {5,7,10,14,15}, |
| {4,5,6,9,14}, | {4,5,9,11,15}, | {4,6,9,12,13}, | {4,7,11,12,14}, | {4,9,12,14,15}, | {5,6,9,11,15}, | {5,7,11,12,13}, |
| {4,5,6,9,15}, | {4,5,9,12,14}, | {4,6,9,12,15}, | {4,7,11,13,15}, | {4,9,13,14,15}, | {5,6,9,12,13}, | {5,7,11,12,15}, |
| {4,5,6,10,12}, | {4,5,9,12,15}, | {4,6,9,13,14}, | {4,7,11,14,15}, | {4,10,11,12,14}, | {5,6,9,12,14}, | {5,7,11,13,14} |
| {4,5,6,10,13}, | {4,5,9,13,14}, | {4,6,9,14,15}, | {4,8,9,10,12}, | {4,10,11,12,15}, | {5,6,9,13,15}, | {5,7,11,14,15}, |
| {4,5,6,10,14}, | {4,5,9,13,15}, | {4,6,10,11,12}, | {4,8,9,10,13}, | {4,10,11,13,14}, | {5,6,9,14,15}, | {5,8,9,10,12}, |
| {4,5,6,10,15}, | {4,5,10,12,14}, | {4,6,10,11,13}, | {4,8,9,10,14}, | {4,10,11,13,15}, | {5,6,10,11,12}, | {5,8,9,10,13}, |
| {4,5,6,11,12}, | {4,5,10,12,15}, | {4,6,10,11,14}, | {4,8,9,10,15}, | {4,10,12,13,14}, | {5,6,10,11,13}, | {5,8,9,10,14}, |
| {4,5,6,11,13}, | {4,5,10,13,14}, | {4,6,10,11,15}, | {4,8,9,11,12}, | {4,10,12,13,15}, | {5,6,10,11,14}, | {5,8,9,10,15}, |
| {4,5,6,11,14}, | {4,5,10,13,15}, | {4,6,10,12,13}, | {4,8,9,11,13}, | {4,10,12,14,15}, | {5,6,10,11,15}, | {5,8,9,11,12}, |
| {4,5,6,11,15}, | {4,5,11,12,14}, | {4,6,10,12,15}, | {4,8,9,11,14}, | {4,10,13,14,15}, | {5,6,10,12,13}, | {5,8,9,11,13}, |
| {4,5,7,8,12}, | {4,5,11,12,15}, | {4,6,10,13,14}, | {4,8,9,11,15}, | {4,11,12,13,14}, | {5,6,10,12,14}, | {5,8,9,11,14}, |
| {4,5,7,8,13}, | {4,5,11,13,14}, | {4,6,10,14,15}, | {4,8,9,12,14}, | {4,11,12,13,15}, | {5,6,10,13,15}, | {5,8,9,11,15}, |
| {4,5,7,8,14}, | {4,5,11,13,15}, | {4,6,11,12,13}, | {4,8,9,12,15}, | {4,11,12,14,15}, | {5,6,10,14,15}, | {5,8,9,12,14}, |
| {4,5,7,8,15}, | {4,6,7,8,12}, | {4,6,11,12,15}, | {4,8,9,13,14}, | {4,11,13,14,15}, | {5,6,11,12,13}, | {5,8,9,12,15}, |
| {4,5,7,9,12}, | {4,6,7,8,13}, | {4,6,11,13,14}, | {4,8,9,13,15}, | {5,6,7,8,12}, | {5,6,11,12,14}, | {5,8,9,13,14}, |
| {4,5,7,9,13}, | {4,6,7,8,14}, | {4,6,11,14,15}, | {4,8,10,11,12}, | {5,6,7,8,13}, | {5,6,11,13,15}, | {5,8,9,13,15}, |
| {4,5,7,9,14}, | {4,6,7,8,15}, | {4,7,8,9,12}, | {4,8,10,11,13}, | {5,6,7,8,14}, | {5,6,11,14,15}, | {5,8,10,11,12}, |
| {4,5,7,9,15}, | {4,6,7,9,12}, | {4,7,8,9,13}, | {4,8,10,11,14}, | {5,6,7,8,15}, | {5,7,8,9,12}, | {5,8,10,11,13}, |
| {4,5,7,10,12}, | {4,6,7,9,13}, | {4,7,8,9,14}, | {4,8,10,11,15}, | {5,6,7,9,12}, | {5,7,8,9,13}, | {5,8,10,11,14}, |

TABLE 35-continued

| | | | | | | |
|---|---|---|---|---|---|---|
| {4,5,7,10,13}, | {4,6,7,9,14}, | {4,7,8,9,15}, | {4,8,10,12,13}, | {5,6,7,9,13}, | {5,7,8,9,14}, | {5,8,10,11,15}, |
| {4,5,7,10,14}, | {4,6,7,9,15}, | {4,7,8,10,12}, | {4,8,10,12,15}, | {5,6,7,9,14}, | {5,7,8,9,15}, | {5,8,10,12,13}, |
| {4,5,7,10,15}, | {4,6,7,10,12}, | {4,7,8,10,13}, | {4,8,10,13,14}, | {5,6,7,9,15}, | {5,7,8,11,12}, | {5,8,10,12,15}, |
| {4,5,7,11,12}, | {4,6,7,10,13}, | {4,7,8,10,14}, | {4,8,10,14,15}, | {5,6,7,10,12}, | {5,7,8,11,13}, | {5,8,10,13,14}, |
| {4,5,7,11,13}, | {4,6,7,10,14}, | {4,7,8,10,15}, | {4,8,11,12,13}, | {5,6,7,10,13}, | {5,7,8,11,14}, | {5,8,10,14,15}, |
| {4,5,7,11,14}, | {4,6,7,10,15}, | {4,7,8,12,13}, | {4,8,11,12,14}, | {5,6,7,10,14}, | {5,7,8,11,15}, | {5,8,11,12,13}, |
| {4,5,7,11,15}, | {4,6,7,11,12}, | {4,7,8,12,14}, | {4,8,11,13,15}, | {5,6,7,10,15}, | {5,7,8,12,13}, | {5,8,11,12,14}, |
| {4,5,8,10,12}, | {4,6,7,11,13}, | {4,7,8,13,15}, | {4,8,11,14,15}, | {5,6,7,11,12}, | {5,7,8,12,15}, | {5,8,11,13,15}, |
| {4,5,8,10,13}, | {4,6,7,11,14}, | {4,7,8,14,15}, | {4,8,12,13,14}, | {5,6,7,11,13}, | {5,7,8,13,14}, | {5,8,11,14,15}, |
| {4,5,8,10,14}, | {4,6,7,11,15}, | {4,7,9,11,12}, | {4,8,12,13,15}, | {5,6,7,11,14}, | {5,7,8,14,15}, | {5,8,12,13,14}, |
| {4,5,8,10,15}, | {4,6,8,9,12}, | {4,7,9,11,13}, | {4,8,12,14,15}, | {5,6,7,11,15}, | {5,7,9,10,12}, | {5,8,12,13,15}, |
| {4,5,8,11,12}, | {4,6,8,9,13}, | {4,7,9,11,14}, | {4,8,13,14,15}, | {5,6,8,9,12}, | {5,7,9,10,13}, | {5,8,12,14,15}, |
| {4,5,8,11,13}, | {4,6,8,9,14}, | {4,7,9,11,15}, | {4,9,10,11,12}, | {5,6,8,9,13}, | {5,7,9,10,14}, | {5,8,13,14,15}, |
| {4,5,8,11,14}, | {4,6,8,9,15}, | {4,7,9,12,13}, | {4,9,10,11,13}, | {5,6,8,9,14}, | {5,7,9,10,15}, | {5,9,10,11,12}, |
| {4,5,8,11,15}, | {4,6,8,11,12}, | {4,7,9,12,14}, | {4,9,10,11,14}, | {5,6,8,9,15}, | {5,7,9,12,13}, | {5,9,10,11,13}, |
| {4,5,8,12,14}, | {4,6,8,11,13}, | {4,7,9,13,15}, | {4,9,10,11,15}, | {5,6,8,10,12}, | {5,7,9,12,15}, | {5,9,10,11,14}, |
| {4,5,8,12,15}, | {4,6,8,11,14}, | {4,7,9,14,15}, | {4,9,10,12,13}, | {5,6,8,10,13}, | {5,7,9,13,14}, | {5,9,10,11,15}, |

TABLE 36

| | | | |
|---|---|---|---|
| {5, 9, 10, 12, 13}, | {6, 7, 9, 12, 15}, | {6, 9, 10, 13, 15}, | {7, 8, 11, 14, 15}, |
| {5, 9, 10, 12, 14}, | {6, 7, 9, 13, 14}, | {6, 9, 10, 14, 15}, | {7, 8, 12, 13, 14}, |
| {5, 9, 10, 13, 15}, | {6, 7, 9, 13, 15}, | {6, 9, 11, 12, 13}, | {7, 8, 12, 13, 15}, |
| {5, 9, 10, 14, 15}, | {6, 7, 10, 12, 14}, | {6, 9, 11, 12, 15}, | {7, 8, 12, 14, 15}, |
| {5, 9, 11, 12, 13}, | {6, 7, 10, 12, 15}, | {6, 9, 11, 13, 14}, | {7, 8, 13, 14, 15}, |
| {5, 9, 11, 12, 15}, | {6, 7, 10, 13, 14}, | {6, 9, 11, 14, 15}, | {7, 9, 10, 11, 12}, |
| {5, 9, 11, 13, 14}, | {6, 7, 10, 13, 15}, | {6, 9, 12, 13, 14}, | {7, 9, 10, 11, 13}, |
| {5, 9, 11, 14, 15}, | {6, 7, 11, 12, 14}, | {6, 9, 12, 13, 15}, | {7, 9, 10, 11, 14}, |
| {5, 9, 12, 13, 14}, | {6, 7, 11, 12, 15}, | {6, 9, 12, 14, 15}, | {7, 9, 10, 11, 15}, |
| {5, 9, 12, 13, 15}, | {6, 7, 11, 13, 14}, | {6, 9, 13, 14, 15}, | {7, 9, 10, 12, 13}, |
| {5, 9, 12, 14, 15}, | {6, 7, 11, 13, 15}, | {6, 10, 11, 12, 14}, | {7, 9, 10, 12, 14}, |
| {5, 9, 13, 14, 15}, | {6, 8, 9, 10, 12}, | {6, 10, 11, 12, 15}, | {7, 9, 10, 13, 15}, |
| {5, 10, 11, 12, 14}, | {6, 8, 9, 10, 13}, | {6, 10, 11, 13, 14}, | {7, 9, 10, 14, 15}, |
| {5, 10, 11, 12, 15}, | {6, 8, 9, 10, 14}, | {6, 10, 11, 13, 15}, | {7, 9, 11, 12, 13}, |
| {5, 10, 11, 13, 14}, | {6, 8, 9, 10, 15}, | {6, 10, 12, 13, 14}, | {7, 9, 11, 12, 15}, |
| {5, 10, 11, 13, 15}, | {6, 8, 9, 11, 12}, | {6, 10, 12, 13, 15}, | {7, 9, 11, 13, 14}, |
| {5, 10, 12, 13, 14}, | {6, 8, 9, 11, 13}, | {6, 10, 12, 14, 15}, | {7, 9, 11, 14, 15}, |
| {5, 10, 12, 13, 15}, | {6, 8, 9, 11, 14}, | {6, 10, 13, 14, 15}, | {7, 9, 12, 13, 14}, |
| {5, 10, 12, 14, 15}, | {6, 8, 9, 11, 15}, | {6, 11, 12, 13, 14}, | {7, 9, 12, 13, 15}, |
| {5, 10, 13, 14, 15}, | {6, 8, 9, 12, 14}, | {6, 11, 12, 13, 15}, | {7, 9, 12, 14, 15}, |
| {5, 11, 12, 13, 14}, | {6, 8, 9, 12, 15}, | {6, 11, 12, 14, 15}, | {7, 9, 13, 14, 15}, |
| {5, 11, 12, 13, 15}, | {6, 8, 9, 13, 14}, | {6, 11, 13, 14, 15}, | {7, 10, 11, 12, 14}, |
| {5, 11, 12, 14, 15}, | {6, 8, 9, 13, 15}, | {7, 8, 9, 10, 12}, | {7, 10, 11, 12, 15}, |
| {5, 11, 13, 14, 15}, | {6, 8, 10, 11, 12}, | {7, 8, 9, 10, 13}, | {7, 10, 11, 13, 14}, |
| {6, 7, 8, 10, 12}, | {6, 8, 10, 11, 13}, | {7, 8, 9, 10, 14}, | {7, 10, 11, 13, 15}, |
| {6, 7, 8, 10, 13}, | {6, 8, 10, 11, 14}, | {7, 8, 9, 10, 15}, | {7, 10, 12, 13, 14}, |
| {6, 7, 8, 10, 14}, | {6, 8, 10, 11, 15}, | {7, 8, 9, 11, 12}, | {7, 10, 12, 13, 15}, |
| {6, 7, 8, 10, 15}, | {6, 8, 10, 12, 13}, | {7, 8, 9, 11, 13}, | {7, 10, 12, 14, 15}, |
| {6, 7, 8, 11, 12}, | {6, 8, 10, 12, 15}, | {7, 8, 9, 11, 14}, | {7, 10, 13, 14, 15}, |
| {6, 7, 8, 11, 13}, | {6, 8, 10, 13, 14}, | {7, 8, 9, 11, 15}, | {7, 11, 12, 13, 14}, |
| {6, 7, 8, 11, 14}, | {6, 8, 10, 14, 15}, | {7, 8, 9, 12, 14}, | {7, 11, 12, 13, 15}, |
| {6, 7, 8, 11, 15}, | {6, 8, 11, 12, 13}, | {7, 8, 9, 12, 15}, | {7, 11, 12, 14, 15}, |
| {6, 7, 8, 12, 14}, | {6, 8, 11, 12, 14}, | {7, 8, 9, 13, 14}, | {7, 11, 13, 14, 15} |
| {6, 7, 8, 12, 15}, | {6, 8, 11, 13, 15}, | {7, 8, 9, 13, 15}, | |
| {6, 7, 8, 13, 14}, | {6, 8, 11, 14, 15}, | {7, 8, 10, 11, 12}, | |
| {6, 7, 8, 13, 15}, | {6, 8, 12, 13, 14}, | {7, 8, 10, 11, 13}, | |
| {6, 7, 9, 10, 12}, | {6, 8, 12, 13, 15}, | {7, 8, 10, 11, 14}, | |
| {6, 7, 9, 10, 13}, | {6, 8, 12, 14, 15}, | {7, 8, 10, 11, 15}, | |
| {6, 7, 9, 10, 14}, | {6, 8, 13, 14, 15}, | {7, 8, 10, 12, 13}, | |
| {6, 7, 9, 10, 15}, | {6, 9, 10, 11, 12}, | {7, 8, 10, 12, 15}, | |
| {6, 7, 9, 11, 12}, | {6, 9, 10, 11, 13}, | {7, 8, 10, 13, 14}, | |
| {6, 7, 9, 11, 13}, | {6, 9, 10, 11, 14}, | {7, 8, 10, 14, 15}, | |
| {6, 7, 9, 11, 14}, | {6, 9, 10, 11, 15}, | {7, 8, 11, 12, 13}, | |
| {6, 7, 9, 11, 15}, | {6, 9, 10, 12, 13}, | {7, 8, 11, 12, 14}, | |
| {6, 7, 9, 12, 14}, | {6, 9, 10, 12, 14}, | {7, 8, 11, 13, 15}, | |

16. The method as claimed in claim 15, wherein the step of generating the first order Reed-Muller codeword comprises the steps of:

generating orthogonal codewords each comprised of 16 coded symbols by multiplying 4 bits out of the input information bit stream comprised of 5 bits by associated base orthogonal codes W1, W2, W4 and W8;

generating a phase-inverted codeword comprised of 16 coded symbols for creating a bi-orthogonal codeword by inverting a phase of the orthogonal codewords by multiplying a remaining one bit of the input information bit stream by an all 1's signal; and summing up the orthogonal codewords and the phase-inverted codeword and outputting the summed result as the first order Reed-Muller codeword.

17. A method for decoding an optimal (11,5) codeword transmitted from a transmitter which encodes an input information bit stream comprised of 5 bits into a first order Reed-Muller codeword comprised of 16 coded symbols, selects a second coded symbol position or a third coded symbol position out of 16 coded symbols constituting the first order Reed-Muller codeword, and punctures the coded symbols at intervals of 3 symbols beginning at the selected position, comprising the steps of.

receiving the (11,5) codeword and inserting all zero coded symbols in the puncturing positions of the coded symbols punctured in the transmitter to create the received (11,5) codeword;

calculating reliabilities by comparing the 16 coded symbols obtained by inserting the all zero coded symbols in the puncturing positions with every first order Reed-Muller codeword comprised of 16 coded symbols, and outputting in pairs the calculated reliabilities and the input information bit streams each comprised of 5 bits corresponding to said every first order Reed-Muller codeword; and outputting as a decoded bit stream the input information bit stream corresponding to the first order Reed-Muller codeword having a highest reliability.

18. The method as claimed in claim 17, wherein the $1^{st}$, $4^{th}$, $7^{th}$, $10^{th}$ and $13^{th}$ coded symbols are punctured in the transmitter.

19. The apparatus as claimed in claim 17, wherein the $2^{nd}$, $5^{th}$, $8^{th}$, $11^{th}$ and $14^{th}$ coded symbols are punctured in the transmitter.

20. A method for decoding an optimal (11,5) codeword transmitted from a transmitter which encodes an input information bit stream comprised of 5 bits into a first order Reed-Muller codeword comprised of 16 coded symbols, and punctures the coded symbols in the positions corresponding to the predetermined one of a plurality of puncturing patterns shown in Tables 37 to 45 below, out of 16 coded symbols constituting the first order Reed-Muller codeword, comprising the steps of:

receiving the (11,5) codeword and inserting all zero coded symbols in the puncturing positions of the coded symbols punctured in the transmitter to create the received (11,5) codeword;

calculating reliabilities by comparing the 16 coded symbols obtained by inserting the all zero coded symbols in the puncturing positions with every first order Reed-Muller codeword comprised of 16 coded symbols, and outputting in pairs the calculated reliabilities and the input information bit streams each comprised of 5 bits corresponding to said every first order Reed-Muller codeword; and outputting as a decoded bit stream the input information bit stream corresponding to the first order Reed-Muller codeword having a highest reliability.

TABLE 37

| | | | | | | |
|---|---|---|---|---|---|---|
| {0,1,2,4,8}, | {0,1,2,11,13}, | {0,1,3,10,14}, | {0,1,5,6,15}, | {0,1,7,9,10}, | {0,2,3,4,9}, | {0,2,3,11,14}, |
| {0,1,2,4,9}, | {0,1,2,11,14}, | {0,1,3,10,15}, | {0,1,5,7,8}, | {0,1,7,9,11}, | {0,2,3,4,10}, | {0,2,3,11,15}, |
| {0,1,2,4,10}, | {0,1,2,11,15}, | {0,1,3,11,12}, | {0,1,5,7,9}, | {0,1,7,9,12}, | {0,2,3,4,11}, | {0,2,4,5,8}, |
| {0,1,2,4,11}, | {0,1,3,4,8}, | {0,1,3,11,13}, | {0,1,5,7,10}, | {0,1,7,9,13}, | {0,2,3,4,12}, | {0,2,4,5,9}, |
| {0,1,2,4,12}, | {0,1,3,4,9}, | {0,1,3,11,14}, | {0,1,5,7,11}, | {0,1,7,10,14}, | {0,2,3,4,13}, | {0,2,4,5,10}, |
| {0,1,2,4,13}, | {0,1,3,4,10}, | {0,1,3,11,15}, | {0,1,5,7,12}, | {0,1,7,10,15}, | {0,2,3,4,14}, | {0,2,4,5,11}, |
| {0,1,2,4,14}, | {0,1,3,4,11}, | {0,1,4,6,8}, | {0,1,5,7,13}, | {0,1,7,11,14}, | {0,2,3,4,15}, | {0,2,4,5,12}, |
| {0,1,2,4,15}, | {0,1,3,4,12}, | {0,1,4,6,9}, | {0,1,5,7,14}, | {0,1,7,11,15}, | {0,2,3,5,8}, | {0,2,4,5,13}, |
| {0,1,2,5,8}, | {0,1,3,4,13}, | {0,1,4,6,10}, | {0,1,5,7,15}, | {0,1,7,12,14}, | {0,2,3,5,9}, | {0,2,4,5,14}, |
| {0,1,2,5,9}, | {0,1,3,4,14}, | {0,1,4,6,11}, | {0,1,5,8,10}, | {0,1,7,12,15}, | {0,2,3,5,10}, | {0,2,4,5,15}, |
| {0,1,2,5,10}, | {0,1,3,4,15}, | {0,1,4,6,12}, | {0,1,5,8,11}, | {0,1,7,13,14}, | {0,2,3,5,11}, | {0,2,4,7,8}, |
| {0,1,2,5,11}, | {0,1,3,5,8}, | {0,1,4,6,13}, | {0,1,5,8,14}, | {0,1,7,13,15}, | {0,2,3,5,12}, | {0,2,4,7,9}, |
| {0,1,2,5,12}, | {0,1,3,5,9}, | {0,1,4,6,14}, | {0,1,5,8,15}, | {0,1,8,10,12}, | {0,2,3,5,13}, | {0,2,4,7,10}, |
| {0,1,2,5,13}, | {0,1,3,5,10}, | {0,1,4,6,15}, | {0,1,5,9,10}, | {0,1,8,10,13}, | {0,2,3,5,14}, | {0,2,4,7,11}, |
| {0,1,2,5,14}, | {0,1,3,5,11}, | {0,1,4,7,8}, | {0,1,5,9,11}, | {0,1,8,10,14}, | {0,2,3,5,15}, | {0,2,4,7,12}, |
| {0,1,2,5,15}, | {0,1,3,5,12}, | {0,1,4,7,9}, | {0,1,5,9,14}, | {0,1,8,10,15}, | {0,2,3,6,8}, | {0,2,4,7,13}, |
| {0,1,2,6,8}, | {0,1,3,5,13}, | {0,1,4,7,10}, | {0,1,5,9,15}, | {0,1,8,11,12}, | {0,2,3,6,9}, | {0,2,4,7,14}, |
| {0,1,2,6,9}, | {0,1,3,5,14}, | {0,1,4,7,11}, | {0,1,5,10,12}, | {0,1,8,11,13}, | {0,2,3,6,10}, | {0,2,4,7,15}, |
| {0,1,2,6,10}, | {0,1,3,5,15}, | {0,1,4,7,12}, | {0,1,5,10,13}, | {0,1,8,11,14}, | {0,2,3,6,11}, | {0,2,4,8,9}, |
| {0,1,2,6,11}, | {0,1,3,6,8}, | {0,1,4,7,13}, | {0,1,5,11,12}, | {0,1,8,11,15}, | {0,2,3,6,12}, | {0,2,4,8,11}, |
| {0,1,2,6,12}, | {0,1,3,6,9}, | {0,1,4,7,14}, | {0,1,5,11,13}, | {0,1,8,12,14}, | {0,2,3,6,13}, | {0,2,4,8,13}, |
| {0,1,2,6,13}, | {0,1,3,6,10}, | {0,1,4,7,15}, | {0,1,5,12,14}, | {0,1,8,12,15}, | {0,2,3,6,14}, | {0,2,4,8,15}, |
| {0,1,2,6,14}, | {0,1,3,6,11}, | {0,1,4,8,10}, | {0,1,5,12,15}, | {0,1,8,13,14}, | {0,2,3,6,15}, | {0,2,4,9,10}, |
| {0,1,2,6,15}, | {0,1,3,6,12}, | {0,1,4,8,11}, | {0,1,5,13,14}, | {0,1,8,13,15}, | {0,2,3,7,8}, | {0,2,4,9,12}, |
| {0,1,2,7,8}, | {0,1,3,6,13}, | {0,1,4,8,14}, | {0,1,5,13,15}, | {0,1,9,10,12}, | {0,2,3,7,9}, | {0,2,4,9,14}, |
| {0,1,2,7,9}, | {0,1,3,6,14}, | {0,1,4,8,15}, | {0,1,6,8,10}, | {0,1,9,10,13}, | {0,2,3,7,10}, | {0,2,4,10,11}, |
| {0,1,2,7,10}, | {0,1,3,6,15}, | {0,1,4,9,10}, | {0,1,6,8,11}, | {0,1,9,10,14}, | {0,2,3,7,11}, | {0,2,4,10,13}, |
| {0,1,2,7,11}, | {0,1,3,7,8}, | {0,1,4,9,11}, | {0,1,6,8,12}, | {0,1,9,10,15}, | {0,2,3,7,12}, | {0,2,4,10,15}, |
| {0,1,2,7,12}, | {0,1,3,7,9}, | {0,1,4,9,14}, | {0,1,6,8,13}, | {0,1,9,11,12}, | {0,2,3,7,13}, | {0,2,4,11,12}, |
| {0,1,2,7,13}, | {0,1,3,7,10}, | {0,1,4,9,15}, | {0,1,6,9,10}, | {0,1,9,11,13}, | {0,2,3,7,14}, | {0,2,4,11,14}, |
| {0,1,2,7,14}, | {0,1,3,7,11}, | {0,1,4,10,12}, | {0,1,6,9,11}, | {0,1,9,11,14}, | {0,2,3,7,15}, | {0,2,4,12,13}, |
| {0,1,2,7,15}, | {0,1,3,7,12}, | {0,1,4,10,13}, | {0,1,6,9,12}, | {0,1,9,11,15}, | {0,2,3,8,12}, | {0,2,4,12,15}, |
| {0,1,2,8,12}, | {0,1,3,7,13}, | {0,1,4,11,12}, | {0,1,6,9,13}, | {0,1,9,12,14}, | {0,2,3,8,13}, | {0,2,4,13,14}, |
| {0,1,2,8,13}, | {0,1,3,7,14}, | {0,1,4,11,13}, | {0,1,6,10,14}, | {0,1,9,12,15}, | {0,2,3,8,14}, | {0,2,4,14,15}, |

TABLE 37-continued

| | | | | | | |
|---|---|---|---|---|---|---|
| {0,1,2,8,14}, | {0,1,3,7,15}, | {0,1,4,12,14}, | {0,1,6,10,15}, | {0,1,9,13,14}, | {0,2,3,8,15}, | {0,2,5,6,8}, |
| {0,1,2,8,15}, | {0,1,3,8,12}, | {0,1,4,12,15}, | {0,1,6,11,14}, | {0,1,9,13,15}, | {0,2,3,9,12}, | {0,2,5,6,9}, |
| {0,1,2,9,12}, | {0,1,3,8,13}, | {0,1,4,13,14}, | {0,1,6,11,15}, | {0,1,10,12,14}, | {0,2,3,9,13}, | {0,2,5,6,10}, |
| {0,1,2,9,13}, | {0,1,3,8,14}, | {0,1,4,13,15}, | {0,1,6,12,14}, | {0,1,10,12,15}, | {0,2,3,9,14}, | {0,2,5,6,11}, |
| {0,1,2,9,14}, | {0,1,3,8,15}, | {0,1,5,6,8}, | {0,1,6,12,15}, | {0,1,10,13,14}, | {0,2,3,9,15}, | {0,2,5,6,12}, |
| {0,1,2,9,15}, | {0,1,3,9,12}, | {0,1,5,6,9}, | {0,1,6,13,14}, | {0,1,10,13,15}, | {0,2,3,10,12}, | {0,2,5,6,13}, |
| {0,1,2,10,12}, | {0,1,3,9,13}, | {0,1,5,6,10}, | {0,1,6,13,15}, | {0,1,11,12,14}, | {0,2,3,10,13}, | {0,2,5,6,14}, |
| {0,1,2,10,13}, | {0,1,3,9,14}, | {0,1,5,6,11}, | {0,1,7,8,10}, | {0,1,11,12,15}, | {0,2,3,10,14}, | {0,2,5,6,15}, |
| {0,1,2,10,14}, | {0,1,3,9,15}, | {0,1,5,6,12}, | {0,1,7,8,11}, | {0,1,11,13,14}, | {0,2,3,10,15}, | {0,2,5,8,9}, |
| {0,1,2,10,15}, | {0,1,3,10,12}, | {0,1,5,6,13}, | {0,1,7,8,12}, | {0,1,11,13,15}, | {0,2,3,11,12}, | {0,2,5,8,11}, |
| {0,1,2,11,12}, | {0,1,3,10,13}, | {0,1,5,6,14}, | {0,1,7,8,13}, | {0,2,3,4,8}, | {0,2,3,11,13}, | {0,2,5,8,12}, |

TABLE 38

| | | | | | | |
|---|---|---|---|---|---|---|
| {0,2,5,8,14}, | {0,2,7,10,12}, | {0,3,4,5,13}, | {0,3,5,11,12}, | {0,3,7,14,15}, | {0,4,5,7,12}, | {0,4,7,8,10}, |
| {0,2,5,9,10}, | {0,2,7,10,14}, | {0,3,4,5,14}, | {0,3,5,11,15}, | {0,3,8,9,12}, | {0,4,5,7,13}, | {0,4,7,8,13}, |
| {0,2,5,9,13}, | {0,2,7,11,13}, | {0,3,4,5,15}, | {0,3,5,12,13}, | {0,3,8,9,13}, | {0,4,5,7,14}, | {0,4,7,8,14}, |
| {0,2,5,9,15}, | {0,2,7,11,15}, | {0,3,4,6,8}, | {0,3,5,12,14}, | {0,3,8,9,14}, | {0,4,5,7,15}, | {0,4,7,9,11}, |
| {0,2,5,10,11}, | {0,2,7,12,13}, | {0,3,4,6,9}, | {0,3,5,13,15}, | {0,3,8,9,15}, | {0,4,5,8,10}, | {0,4,7,9,12}, |
| {0,2,5,10,12}, | {0,2,7,12,15}, | {0,3,4,6,10}, | {0,3,5,14,15}, | {0,3,8,10,12}, | {0,4,5,8,11}, | {0,4,7,9,15}, |
| {0,2,5,10,14}, | {0,2,7,13,14}, | {0,3,4,6,11}, | {0,3,6,7,8}, | {0,3,8,10,13}, | {0,4,5,8,14}, | {0,4,7,10,11}, |
| {0,2,5,11,13}, | {0,2,7,14,15}, | {0,3,4,6,12}, | {0,3,6,7,9}, | {0,3,8,10,14}, | {0,4,5,8,15}, | {0,4,7,10,12}, |
| {0,2,5,11,15}, | {0,2,8,9,12}, | {0,3,4,6,13}, | {0,3,6,7,10}, | {0,3,8,10,15}, | {0,4,5,9,10}, | {0,4,7,10,15}, |
| {0,2,5,12,13}, | {0,2,8,9,13}, | {0,3,4,6,14}, | {0,3,6,7,11}, | {0,3,8,12,13}, | {0,4,5,9,11}, | {0,4,7,11,13}, |
| {0,2,5,12,15}, | {0,2,8,9,14}, | {0,3,4,6,15}, | {0,3,6,7,12}, | {0,3,8,12,14}, | {0,4,5,9,14}, | {0,4,7,11,14}, |
| {0,2,5,13,14}, | {0,2,8,9,15}, | {0,3,4,8,9}, | {0,3,6,7,13}, | {0,3,8,13,15}, | {0,4,5,9,15}, | {0,4,7,12,13}, |
| {0,2,5,14,15}, | {0,2,8,11,12}, | {0,3,4,8,10}, | {0,3,6,7,14}, | {0,3,8,14,15}, | {0,4,5,10,12}, | {0,4,7,12,14}, |
| {0,2,6,7,8}, | {0,2,8,11,13}, | {0,3,4,8,13}, | {0,3,6,7,15}, | {0,3,9,11,12}, | {0,4,5,10,13}, | {0,4,7,13,15}, |
| {0,2,6,7,9}, | {0,2,8,11,14}, | {0,3,4,8,14}, | {0,3,6,8,9}, | {0,3,9,11,13}, | {0,4,5,11,12}, | {0,4,7,14,15}, |
| {0,2,6,7,10}, | {0,2,8,11,15}, | {0,3,4,9,11}, | {0,3,6,8,10}, | {0,3,9,11,14}, | {0,4,5,11,13}, | {0,4,8,9,10}, |
| {0,2,6,7,11}, | {0,2,8,12,13}, | {0,3,4,9,12}, | {0,3,6,8,12}, | {0,3,9,11,15}, | {0,4,5,12,14}, | {0,4,8,9,11}, |
| {0,2,6,7,12}, | {0,2,8,12,15}, | {0,3,4,9,15}, | {0,3,6,8,15}, | {0,3,9,12,13}, | {0,4,5,12,15}, | {0,4,8,9,14}, |
| {0,2,6,7,13}, | {0,2,8,13,14}, | {0,3,4,10,11}, | {0,3,6,9,11}, | {0,3,9,12,14}, | {0,4,5,13,14}, | {0,4,8,9,15}, |
| {0,2,6,7,14}, | {0,2,8,14,15}, | {0,3,4,10,12}, | {0,3,6,9,13}, | {0,3,9,13,15}, | {0,4,5,13,15}, | {0,4,8,10,11}, |
| {0,2,6,7,15}, | {0,2,9,10,12}, | {0,3,4,10,15}, | {0,3,6,9,14}, | {0,3,9,14,15}, | {0,4,6,7,8}, | {0,4,8,10,13}, |
| {0,2,6,8,9}, | {0,2,9,10,13}, | {0,3,4,11,13}, | {0,3,6,10,11}, | {0,3,10,11,12}, | {0,4,6,7,9}, | {0,4,8,10,15}, |
| {0,2,6,8,11}, | {0,2,9,10,14}, | {0,3,4,11,14}, | {0,3,6,10,13}, | {0,3,10,11,13}, | {0,4,6,7,10}, | {0,4,8,11,13}, |
| {0,2,6,8,13}, | {0,2,9,10,15}, | {0,3,4,12,13}, | {0,3,6,10,14}, | {0,3,10,11,14}, | {0,4,6,7,11}, | {0,4,8,11,14}, |
| {0,2,6,8,15}, | {0,2,9,12,13}, | {0,3,4,12,14}, | {0,3,6,11,12}, | {0,3,10,11,15}, | {0,4,6,7,12}, | {0,4,8,13,14}, |
| {0,2,6,9,10}, | {0,2,9,12,15}, | {0,3,4,13,15}, | {0,3,6,11,15}, | {0,3,10,12,13}, | {0,4,6,7,13}, | {0,4,8,13,15}, |
| {0,2,6,9,12}, | {0,2,9,13,14}, | {0,3,4,14,15}, | {0,3,6,12,13}, | {0,3,10,12,14}, | {0,4,6,7,14}, | {0,4,8,14,15}, |
| {0,2,6,9,14}, | {0,2,9,14,15}, | {0,3,5,7,8}, | {0,3,6,12,14}, | {0,3,10,13,15}, | {0,4,6,7,15}, | {0,4,9,10,11}, |
| {0,2,6,10,11}, | {0,2,10,11,12}, | {0,3,5,7,9}, | {0,3,6,13,15}, | {0,3,10,14,15}, | {0,4,6,8,9}, | {0,4,9,10,12}, |
| {0,2,6,10,13}, | {0,2,10,11,13}, | {0,3,5,7,10}, | {0,3,6,14,15}, | {0,3,11,12,13}, | {0,4,6,8,11}, | {0,4,9,10,15}, |
| {0,2,6,10,15}, | {0,2,10,11,14}, | {0,3,5,7,11}, | {0,3,7,8,9}, | {0,3,11,12,14}, | {0,4,6,8,13}, | {0,4,9,11,12}, |
| {0,2,6,11,12}, | {0,2,10,11,15}, | {0,3,5,7,12}, | {0,3,7,8,10}, | {0,3,11,13,15}, | {0,4,6,8,15}, | {0,4,9,11,14}, |
| {0,2,6,11,14}, | {0,2,10,12,13}, | {0,3,5,7,13}, | {0,3,7,8,13}, | {0,3,11,14,15}, | {0,4,6,9,10}, | {0,4,9,12,14}, |
| {0,2,6,12,13}, | {0,2,10,12,15}, | {0,3,5,7,14}, | {0,3,7,8,14}, | {0,4,5,6,8}, | {0,4,6,9,12}, | {0,4,9,12,15}, |
| {0,2,6,12,15}, | {0,2,10,13,14}, | {0,3,5,7,15}, | {0,3,7,9,11}, | {0,4,5,6,9}, | {0,4,6,9,14}, | {0,4,9,14,15}, |
| {0,2,6,13,14}, | {0,2,10,14,15}, | {0,3,5,8,9}, | {0,3,7,9,12}, | {0,4,5,6,10}, | {0,4,6,10,11}, | {0,4,10,11,12}, |
| {0,2,6,14,15}, | {0,2,11,12,13}, | {0,3,5,8,10}, | {0,3,7,9,15}, | {0,4,5,6,11}, | {0,4,6,10,13}, | {0,4,10,11,13}, |
| {0,2,7,8,9}, | {0,2,11,12,15}, | {0,3,5,8,12}, | {0,3,7,10,11}, | {0,4,5,6,12}, | {0,4,6,10,15}, | {0,4,10,12,13}, |
| {0,2,7,8,11}, | {0,2,11,13,14}, | {0,3,5,8,15}, | {0,3,7,10,12}, | {0,4,5,6,13}, | {0,4,6,11,12}, | {0,4,10,12,15}, |
| {0,2,7,8,12}, | {0,2,11,14,15}, | {0,3,5,9,11}, | {0,3,7,10,15}, | {0,4,5,6,14}, | {0,4,6,11,14}, | {0,4,10,13,15}, |
| {0,2,7,8,14}, | {0,3,4,5,8}, | {0,3,5,9,13}, | {0,3,7,11,13}, | {0,4,5,6,15}, | {0,4,6,12,13}, | {0,4,11,12,13}, |
| {0,2,7,9,10}, | {0,3,4,5,9}, | {0,3,5,9,14}, | {0,3,7,11,14}, | {0,4,5,7,8}, | {0,4,6,12,15}, | {0,4,11,12,14}, |
| {0,2,7,9,13}, | {0,3,4,5,10}, | {0,3,5,10,11}, | {0,3,7,12,13}, | {0,4,5,7,9}, | {0,4,6,13,14}, | {0,4,11,13,14}, |
| {0,2,7,9,15}, | {0,3,4,5,11}, | {0,3,5,10,13}, | {0,3,7,12,14}, | {0,4,5,7,10}, | {0,4,6,14,15}, | {0,4,12,13,14}, |
| {0,2,7,10,11}, | {0,3,4,5,12}, | {0,3,5,10,14}, | {0,3,7,13,15}, | {0,4,5,7,11}, | {0,4,7,8,9}, | {0,4,12,13,15}, |

TABLE 39

| | | | | | | |
|---|---|---|---|---|---|---|
| {0,4,12,14,15}, | {0,5,8,9,15}, | {0,6,8,9,10}, | {0,7,9,10,12}, | {0,8,12,14,15}, | {1,2,3,5,15}, | {1,2,4,6,12}, |
| {0,4,13,14,15}, | {0,5,8,10,11}, | {0,6,8,9,11}, | {0,7,9,10,15}, | {0,8,13,14,15}, | {1,2,3,6,8}, | {1,2,4,6,13}, |
| {0,5,6,7,8}, | {0,5,8,10,12}, | {0,6,8,9,12}, | {0,7,9,11,13}, | {0,9,10,11,12}, | {1,2,3,6,9}, | {1,2,4,6,14}, |
| {0,5,6,7,9}, | {0,5,8,10,14}, | {0,6,8,9,13}, | {0,7,9,11,15}, | {0,9,10,11,13}, | {1,2,3,6,10}, | {1,2,4,6,15}, |
| {0,5,6,7,10}, | {0,5,8,11,12}, | {0,6,8,10,11}, | {0,7,9,12,13}, | {0,9,10,11,14}, | {1,2,3,6,11}, | {1,2,4,8,9}, |
| {0,5,6,7,11}, | {0,5,8,11,15}, | {0,6,8,10,13}, | {0,7,9,12,15}, | {0,9,10,11,15}, | {1,2,3,6,12}, | {1,2,4,8,10}, |
| {0,5,6,7,12}, | {0,5,8,12,14}, | {0,6,8,10,15}, | {0,7,9,13,15}, | {0,9,10,12,13}, | {1,2,3,6,13}, | {1,2,4,8,12}, |
| {0,5,6,7,13}, | {0,5,8,12,15}, | {0,6,8,11,12}, | {0,7,10,11,14}, | {0,9,10,12,14}, | {1,2,3,6,14}, | {1,2,4,8,15}, |
| {0,5,6,7,14}, | {0,5,8,14,15}, | {0,6,8,11,15}, | {0,7,10,11,15}, | {0,9,10,13,15}, | {1,2,3,6,15}, | {1,2,4,9,11}, |
| {0,5,6,7,15}, | {0,5,9,10,11}, | {0,6,8,12,13}, | {0,7,10,12,14}, | {0,9,10,14,15}, | {1,2,3,7,8}, | {1,2,4,9,13}, |
| {0,5,6,8,9}, | {0,5,9,10,13}, | {0,6,8,12,15}, | {0,7,10,12,15}, | {0,9,11,12,13}, | {1,2,3,7,9}, | {1,2,4,9,14}, |
| {0,5,6,8,10}, | {0,5,9,10,14}, | {0,6,8,13,15}, | {0,7,10,14,15}, | {0,9,11,12,15}, | {1,2,3,7,10}, | {1,2,4,10,11}, |

TABLE 39-continued

| | | | | | | |
|---|---|---|---|---|---|---|
| {0,5,6,8,12}, | {0,5,9,11,13}, | {0,6,9,10,11}, | {0,7,11,13,14}, | {0,9,11,13,14}, | {1,2,3,7,11}, | {1,2,4,10,13}, |
| {0,5,6,8,15}, | {0,5,9,11,15}, | {0,6,9,10,13}, | {0,7,11,13,15}, | {0,9,11,14,15}, | {1,2,3,7,12}, | {1,2,4,10,14}, |
| {0,5,6,9,11}, | {0,5,9,13,14}, | {0,6,9,10,14}, | {0,7,11,14,15}, | {0,9,12,13,14}, | {1,2,3,7,13}, | {1,2,4,11,12}, |
| {0,5,6,9,13}, | {0,5,9,13,15}, | {0,6,9,11,12}, | {0,7,12,13,14}, | {0,9,12,13,15}, | {1,2,3,7,14}, | {1,2,4,11,15}, |
| {0,5,6,9,14}, | {0,5,9,14,15}, | {0,6,9,11,14}, | {0,7,12,13,15}, | {0,9,12,14,15}, | {1,2,3,7,15}, | {1,2,4,12,13}, |
| {0,5,6,10,11}, | {0,5,10,11,12}, | {0,6,9,12,13}, | {0,7,12,14,15}, | {0,9,13,14,15}, | {1,2,3,8,12}, | {1,2,4,12,14}, |
| {0,5,6,10,13}, | {0,5,10,11,13}, | {0,6,9,12,14}, | {0,7,13,14,15}, | {0,10,11,12,14}, | {1,2,3,8,13}, | {1,2,4,13,15}, |
| {0,5,6,10,14}, | {0,5,10,12,13}, | {0,6,9,13,14}, | {0,8,9,10,12}, | {0,10,11,12,15}, | {1,2,3,8,14}, | {1,2,4,14,15}, |
| {0,5,6,11,12}, | {0,5,10,12,14}, | {0,6,10,11,14}, | {0,8,9,10,13}, | {0,10,11,13,14}, | {1,2,3,8,15}, | {1,2,5,7,8}, |
| {0,5,6,11,15}, | {0,5,10,13,14}, | {0,6,10,11,15}, | {0,8,9,10,14}, | {0,10,11,13,15}, | {1,2,3,9,12}, | {1,2,5,7,9}, |
| {0,5,6,12,13}, | {0,5,11,12,13}, | {0,6,10,13,14}, | {0,8,9,10,15}, | {0,10,12,13,14}, | {1,2,3,9,13}, | {1,2,5,7,10}, |
| {0,5,6,12,14}, | {0,5,11,12,15}, | {0,6,10,13,15}, | {0,8,9,11,12}, | {0,10,12,13,15}, | {1,2,3,9,14}, | {1,2,5,7,11}, |
| {0,5,6,13,15}, | {0,5,11,13,15}, | {0,6,10,14,15}, | {0,8,9,11,13}, | {0,10,12,14,15}, | {1,2,3,9,15}, | {1,2,5,7,12}, |
| {0,5,6,14,15}, | {0,5,12,13,14}, | {0,6,11,12,14}, | {0,8,9,11,14}, | {0,10,13,14,15}, | {1,2,3,10,12}, | {1,2,5,7,13}, |
| {0,5,7,8,9}, | {0,5,12,13,15}, | {0,6,11,12,15}, | {0,8,9,11,15}, | {0,11,12,13,14}, | {1,2,3,10,13}, | {1,2,5,7,14}, |
| {0,5,7,8,11}, | {0,5,12,14,16}, | {0,6,11,14,15}, | {0,8,9,12,14}, | {0,11,12,13,15}, | {1,2,3,10,14}, | {1,2,5,7,15}, |
| {0,5,7,8,12}, | {0,5,13,14,15}, | {0,6,12,13,14}, | {0,8,9,12,15}, | {0,11,12,14,15}, | {1,2,3,10,15}, | {1,2,5,8,9}, |
| {0,5,7,8,14}, | {0,6,7,8,10}, | {0,6,12,13,15}, | {0,8,9,13,14}, | {0,11,13,14,15}, | {1,2,3,11,12}, | {1,2,5,8,10}, |
| {0,5,7,9,10}, | {0,6,7,8,11}, | {0,6,12,14,15}, | {0,8,9,13,15}, | {1,2,3,4,8}, | {1,2,3,11,13}, | {1,2,5,8,13}, |
| {0,5,7,9,13}, | {0,6,7,8,22}, | {0,6,13,14,15}, | {0,8,10,11,12}, | {1,2,3,4,9}, | {1,2,3,11,14}, | {1,2,5,8,14}, |
| {0,5,7,9,15}, | {0,6,7,8,13}, | {0,7,8,9,10}, | {0,8,10,11,13}, | {1,2,3,4,10}, | {1,2,3,11,15}, | {1,2,5,9,11}, |
| {0,5,7,10,11}, | {0,6,7,9,10}, | {0,7,8,9,11}, | {0,8,10,11,14}, | {1,2,3,4,11}, | {1,2,4,5,8}, | {1,2,5,9,12}, |
| {0,5,7,10,12}, | {0,6,7,9,11}, | {0,7,8,9,12}, | {0,8,10,11,15}, | {1,2,3,4,12}, | {1,2,4,5,9}, | {1,2,5,9,15}, |
| {0,5,7,10,14}, | {0,6,7,9,12}, | {0,7,8,9,13}, | {0,8,10,12,13}, | {1,2,3,4,13}, | {1,2,4,5,10}, | {1,2,5,10,11}, |
| {0,5,7,11,13}, | {0,6,7,9,13}, | {0,7,8,10,11}, | {0,8,10,12,15}, | {1,2,3,4,14}, | {1,2,4,5,11}, | {1,2,5,10,12}, |
| {0,5,7,11,15}, | {0,6,7,10,14}, | {0,7,8,10,12}, | {0,8,10,13,14}, | {1,2,3,4,15}, | {1,2,4,5,12}, | {1,2,5,10,15}, |
| {0,5,7,12,13}, | {0,6,7,10,15}, | {0,7,8,10,14}, | {0,8,10,14,15}, | {1,2,3,5,8}, | {1,2,4,5,13}, | {1,2,5,11,13}, |
| {0,5,7,12,15}, | {0,6,7,11,14}, | {0,7,8,11,13}, | {0,8,11,12,13}, | {1,2,3,5,9}, | {1,2,4,5,14}, | {1,2,5,11,14}, |
| {0,5,7,13,14}, | {0,6,7,11,15}, | {0,7,8,11,14}, | {0,8,11,12,14}, | {1,2,3,5,10}, | {1,2,4,5,15}, | {1,2,5,12,13}, |
| {0,5,7,14,15}, | {0,6,7,12,14}, | {0,7,8,12,13}, | {0,8,11,13,15}, | {1,2,3,5,11}, | {1,2,4,6,8}, | {1,2,5,12,14}, |
| {0,5,8,9,10}, | {0,6,7,12,15}, | {0,7,8,12,14}, | {0,8,11,14,15}, | {1,2,3,5,12}, | {1,2,4,6,9}, | {1,2,5,13,15}, |
| {0,5,8,9,11}, | {0,6,7,13,14}, | {0,7,8,13,14}, | {0,8,12,13,14}, | {1,2,3,5,13}, | {1,2,4,6,10}, | {1,2,5,14,15}, |
| {0,5,8,9,14}, | {0,6,7,13,15}, | {0,7,9,10,11}, | {0,8,12,13,15}, | {1,2,3,5,14}, | {1,2,4,6,11}, | {1,2,6,7,8}, |

TABLE 40

| | | | | | | |
|---|---|---|---|---|---|---|
| {1,2,6,7,9}, | {1,2,8,10,14}, | {1,3,4,8,14}, | {1,3,6,8,9}, | {1,3,9,10,13}, | 11,4,5,11,12}, | {1,4,7,14,15}, |
| {1,2,6,7,10}, | {1,2,8,10,15}, | {1,3,4,9,10}, | {1,3,6,8,11}, | {1,3,9,10,14}, | {1,4,5,11,13}, | {1,4,8,9,10}, |
| {1,2,6,7,11}, | {1,2,8,12,13}, | {1,3,4,9,13}, | {1,3,6,8,12}, | {1,3,9,10,15}, | {1,4,5,12,14}, | {1,4,8,9,11}, |
| {1,2,6,7,12}, | {1,2,8,12,14}, | {1,3,4,9,15}, | {1,3,6,8,14}, | {1,3,9,12,13}, | {1,4,5,12,15}, | {1,4,8,9,14}, |
| {1,2,6,7,13}, | {1,2,8,13,15}, | {1,3,4,10,11}, | {1,3,6,9,10}, | {1,3,9,12,15}, | {1,4,5,13,14}, | {1,4,8,9,15}, |
| {1,2,6,7,14}, | {1,2,8,14,15}, | {1,3,4,10,12}, | {1,3,6,9,13}, | {1,3,9,13,14}, | {1,4,5,13,15}, | {1,4,8,10,11}, |
| {1,2,6,7,15}, | {1,2,9,11,12}, | {1,3,4,10,14}, | {1,3,6,9,15}, | {1,3,9,14,15}, | {1,4,6,7,8}, | {1,4,8,10,12}, |
| {1,2,6,8,9}, | {1,2,9,11,13}, | {1,3,4,11,13}, | {1,3,6,10,11}, | {1,3,10,11,12}, | {1,4,6,7,9}, | {1,4,8,10,14}, |
| {1,2,6,8,10}, | {1,2,9,11,14}, | {1,3,4,11,15}, | {1,3,6,10,12}, | {1,3,10,11,13}, | {1,4,6,7,10}, | {1,4,8,11,12}, |
| {1,2,6,8,13}, | {1,2,9,11,15}, | {1,3,4,12,13}, | {1,3,6,10,14}, | {1,3,10,11,14}, | {1,4,6,7,11}, | {1,4,8,11,15}, |
| {1,2,6,8,14}, | {1,2,9,12,13}, | {1,3,4,12,15}, | {1,3,6,11,13}, | {1,3,10,11,15}, | {1,4,6,7,12}, | {1,4,8,12,14}, |
| {1,2,6,9,11}, | {1,2,9,12,14}, | {1,3,4,13,14}, | {1,3,6,11,15}, | {1,3,10,12,13}, | {1,4,6,7,13}, | {1,4,8,12,15}, |
| {1,2,6,9,12}, | {1,2,9,13,15}, | {1,3,4,14,15}, | {1,3,6,12,13}, | {1,3,10,12,15}, | {1,4,6,7,14}, | {1,4,8,14,15}, |
| {1,2,6,9,15}, | {1,2,9,14,15}, | {1,3,5,6,8}, | {1,3,6,12,15}, | {1,3,10,13,14}, | {1,4,6,7,15}, | {1,4,9,10,11}, |
| {1,2,6,10,11}, | {1,2,10,11,12}, | {1,3,5,6,9}, | {1,3,6,13,24}, | {1,3,10,14,15}, | {1,4,6,8,9}, | {1,4,9,10,13}, |
| {1,2,6,10,12}, | {1,2,10,11,13}, | {1,3,5,6,10}, | {1,3,6,14,15}, | {1,3,11,12,13}, | {1,4,6,8,11}, | {1,4,9,10,14}, |
| {1,2,6,10,15}, | {1,2,10,11,14}, | {1,3,5,6,11}, | {1,3,7,8,9}, | {1,3,11,12,15}, | {1,4,6,8,12}, | {1,4,9,11,13}, |
| {1,2,6,11,13}, | {1,2,10,11,15}, | {1,3,5,6,12}, | {1,3,7,8,11}, | {1,3,11,13,14}, | {1,4,6,8,14}, | {1,4,9,11,15}, |
| {1,2,6,11,14}, | {1,2,10,12,13}, | {1,3,5,6,13}, | {1,3,7,8,13}, | {1,3,11,14,15}, | {1,4,6,9,10}, | {1,4,9,13,14}, |
| {1,2,6,12,13}, | {1,2,10,12,14}, | {1,3,5,6,14}, | {1,3,7,8,15}, | {1,4,5,6,8}, | {1,4,6,9,13}, | {1,4,9,13,15}, |
| {1,2,6,12,14}, | {1,2,10,13,15}, | {1,3,5,6,15}, | {1,3,7,9,10}, | {1,4,5,6,9}, | {1,4,6,9,15}, | {1,4,9,14,15}, |
| {1,2,6,13,15}, | {1,2,10,14,15}, | {1,3,5,8,9}, | {1,3,7,9,12}, | {1,4,5,6,10}, | {1,4,6,10,11}, | {1,4,10,11,12}, |
| {1,2,6,14,15}, | {1,2,11,12,13}, | {1,3,5,8,11}, | {1,3,7,9,14}, | {1,4,5,6,11}, | {1,4,6,10,12}, | {1,4,10,11,13}, |
| {1,2,7,8,9}, | {1,2,11,12,14}, | {1,3,5,8,13}, | {1,3,7,10,11}, | {1,4,5,6,12}, | {1,4,6,10,14}, | {1,4,10,12,13}, |
| {1,2,7,8,10}, | {1,2,11,13,15}, | {1,3,5,8,15}, | {1,3,7,10,13}, | {1,4,5,6,13}, | {1,4,6,11,13}, | {1,4,10,12,14}, |
| {1,2,7,8,22}, | {1,2,11,14,15}, | {1,3,5,9,10}, | {1,3,7,10,15}, | {1,4,5,6,14}, | {1,4,6,11,15}, | {1,4,10,13,14}, |
| {1,2,7,8,15}, | {1,3,4,5,8}, | {1,3,5,9,12}, | {1,3,7,11,12}, | {1,4,5,6,15}, | {1,4,6,12,13}, | {1,4,11,12,13}, |
| {1,2,7,9,11}, | {1,3,4,5,9}, | {1,3,5,9,14}, | {1,3,7,11,14}, | {1,4,5,7,8}, | {1,4,6,12,15}, | {1,4,11,12,15}, |
| {1,2,7,9,13}, | {1,3,4,5,10}, | {1,3,5,10,11}, | {1,3,7,12,13}, | {1,4,5,7,9}, | {1,4,6,13,14}, | {1,4,11,13,15}, |
| {1,2,7,9,14}, | {1,3,4,5,11}, | {1,3,5,10,13}, | {1,3,7,12,15}, | {1,4,5,7,10}, | {1,4,6,14,15}, | {1,4,12,13,14}, |
| {1,2,7,10,11}, | {1,3,4,5,12}, | {1,3,5,10,15}, | {1,3,7,13,14}, | {1,4,5,7,11}, | {1,4,7,8,9}, | {1,4,12,13,15}, |
| {1,2,7,10,13}, | {1,3,4,5,13}, | {1,3,5,11,12}, | {1,3,7,14,15}, | {1,4,5,7,12}, | {1,4,7,8,10}, | {1,4,12,14,15}, |
| {1,2,7,10,14}, | {1,3,4,5,14}, | {1,3,5,11,14}, | {1,3,8,9,12}, | {1,4,5,7,13}, | {1,4,7,8,12}, | {1,4,13,14,15}, |
| {1,2,7,11,12}, | {1,3,4,5,15}, | {1,3,5,12,13}, | {1,3,8,9,13}, | {1,4,5,7,14}, | {1,4,7,8,15}, | {1,5,6,7,8}, |
| {1,2,7,11,15}, | {1,3,4,7,8}, | {1,3,5,12,15}, | {1,3,8,9,14}, | {1,4,5,7,15}, | {1,4,7,9,11}, | {1,5,6,7,9}, |
| {1,2,7,12,13}, | {1,3,4,7,9}, | {1,3,5,13,14}, | {1,3,8,9,15}, | {1,4,5,8,10}, | {1,4,7,9,13}, | {1,5,6,7,10}, |
| {1,2,7,12,14}, | {1,3,4,7,10}, | {1,3,5,14,15}, | {1,3,8,11,12}, | {1,4,5,8,11}, | {1,4,7,9,14}, | {1,5,6,7,11}, |
| {1,2,7,13,15}, | {1,3,4,7,11}, | {1,3,6,7,8}, | {1,3,8,11,13}, | {1,4,5,8,14}, | {1,4,7,10,11}, | {1,5,6,7,12}, |
| {1,2,7,14,15}, | {1,3,4,7,12}, | {1,3,6,7,9}, | {1,3,8,11,14}, | {1,4,5,8,15}, | {1,4,7,10,13}, | {1,5,6,7,13}, |
| {1,2,8,9,12}, | {1,3,4,7,13}, | {1,3,6,7,10}, | {1,3,8,11,15}, | {1,4,5,9,10}, | {1,4,7,10,14}, | {1,5,6,7,14}, |

TABLE 40-continued

| | | | | | | |
|---|---|---|---|---|---|---|
| {1,2,8,9,13}, | {1,3,4,7,14}, | {1,3,6,7,11}, | {1,3,8,12,13}, | {1,4,5,9,11}, | {1,4,7,11,12}, | {1,5,6,7,15}, |
| {1,2,8,9,14}, | {1,3,4,7,15}, | {1,3,6,7,12}, | {1,3,8,12,15}, | {1,4,5,9,14}, | {1,4,7,11,15}, | {1,5,6,8,9}, |
| {1,2,8,9,15}, | {1,3,4,8,9}, | {1,3,6,7,13}, | {1,3,8,13,14}, | {1,4,5,9,15}, | {1,4,7,12,13}, | {1,5,6,8,10}, |
| {1,2,8,10,12}, | {1,3,4,8,11}, | {1,3,6,7,14}, | {1,3,8,14,15}, | {1,4,5,10,12}, | {1,4,7,12,14}, | {1,5,6,8,13}, |
| {1,2,8,10,13}, | {2,3,4,8,12}, | {1,3,6,7,15}, | {1,3,9,10,12}, | {1,4,5,10,13}, | {1,4,7,13,15}, | {1,5,6,8,14}, |

TABLE 41

| | | | | | | |
|---|---|---|---|---|---|---|
| {1,5,6,9,11}, | {1,5,9,12,14}, | {1,6,9,10,15}, | {1,7,11,14,15}, | {1,9,12,13,14}, | {2,3,4,12,15}, | {2,3,6,11,12}, |
| {1,5,6,9,12}, | {1,5,9,12,15}, | {1,6,9,11,13}, | {1,7,12,13,14}, | {1,9,12,13,15}, | {2,3,4,13,14}, | {2,3,6,11,13}, |
| {1,5,6,9,15}, | {1,5,9,14,15}, | {1,6,9,11,15}, | {1,7,12,13,15}, | {1,9,12,14,15}, | {2,3,4,13,15}, | {2,3,6,12,14}, |
| {1,5,6,10,11}, | {1,5,10,11,12}, | {1,6,9,12,13}, | {1,7,12,14,15}, | {1,9,13,14,15}, | {2,3,5,6,8}, | {2,3,6,12,15}, |
| {1,5,6,10,12}, | {1,5,10,11,13}, | {1,6,9,12,15}, | {1,7,13,14,15}, | {1,10,11,12,14}, | {2,3,5,6,9}, | {2,3,6,13,14}, |
| {1,5,6,10,15}, | {1,5,10,12,13}, | {1,6,9,13,15}, | {1,8,9,10,12}, | {1,10,11,12,15}, | {2,3,5,6,10}, | {2,3,6,13,15}, |
| {1,5,6,11,13}, | {1,5,10,12,15}, | {1,6,10,11,14}, | {1,8,9,10,13}, | {1,10,11,13,14}, | {2,3,5,6,11}, | {2,3,7,8,10}, |
| {1,5,6,11,14}, | {1,5,10,13,15}, | {1,6,10,11,15}, | {1,8,9,10,14}, | {1,10,11,13,15}, | {2,3,5,6,12}, | {2,3,7,8,11}, |
| {1,5,6,12,13}, | {1,5,11,12,13}, | {1,6,10,12,14}, | {1,8,9,10,15}, | {1,10,12,13,14}, | {2,3,5,6,13}, | {2,3,7,8,14}, |
| {1,5,6,12,14}, | {1,5,11,12,14}, | {1,6,10,12,15}, | {1,8,9,11,12}, | {1,10,12,13,15}, | {2,3,5,6,14}, | {2,3,7,8,15}, |
| {1,5,6,13,15}, | {1,5,11,13,14}, | {1,6,10,14,15}, | {1,8,9,11,13}, | {1,10,12,14,15}, | {2,3,5,6,15}, | {2,3,7,9,10}, |
| {1,5,6,14,15}, | {1,5,12,13,14}, | {1,6,11,13,14}, | {1,8,9,11,14}, | {1,10,13,14,15}, | {2,3,5,7,8}, | {2,3,7,9,11}, |
| {1,5,7,8,9}, | {1,5,12,13,15}, | {1,6,11,13,15}, | {1,8,9,11,15}, | {1,11,12,13,14}, | {2,3,5,7,9}, | {2,3,7,9,14}, |
| {1,5,7,8,11}, | {1,5,12,14,15}, | {1,6,11,14,15}, | {1,8,9,12,14}, | {1,11,12,13,15}, | {2,3,5,7,10}, | {2,3,7,9,15}, |
| {1,5,7,8,13}, | {1,5,13,14,15}, | {1,6,12,13,14}, | {1,8,9,12,15}, | {1,11,12,14,15}, | {2,3,5,7,11}, | {2,3,7,10,12}, |
| {1,5,7,8,15}, | {1,6,7,8,10}, | {1,6,12,13,15}, | {1,8,9,13,14}, | {1,11,13,14,15}, | {2,3,5,7,12}, | {2,3,7,10,13}, |
| {1,5,7,9,10}, | {1,6,7,8,11}, | {1,6,12,14,15}, | {1,8,9,13,15}, | {2,3,4,6,8}, | {2,3,5,7,13}, | {2,3,7,11,12}, |
| {1,5,7,9,12}, | {1,6,7,8,12}, | {1,6,13,14,15}, | {1,8,10,11,12}, | {2,3,4,6,9}, | {2,3,5,7,14}, | {2,3,7,11,13}, |
| {1,5,7,9,14}, | {1,6,7,8,13}, | {1,7,8,9,10}, | {1,8,10,11,13}, | {2,3,4,6,10}, | {2,3,5,7,15}, | {2,3,7,12,14}, |
| {1,5,7,10,11}, | {1,6,7,9,10}, | {1,7,8,9,11}, | {1,8,10,11,14}, | {2,3,4,6,11}, | {2,3,5,8,10}, | {2,3,7,12,15}, |
| {1,5,7,10,13}, | {1,6,7,9,11}, | {1,7,8,9,12}, | {1,8,10,11,15}, | {2,3,4,6,12}, | {2,3,5,8,11}, | {2,3,7,13,14}, |
| {1,5,7,10,15}, | {1,6,7,9,12}, | {1,7,8,9,13}, | {1,8,10,12,13}, | {2,3,4,6,13}, | {2,3,5,8,12}, | {2,3,7,13,15}, |
| {1,5,7,11,12}, | {1,6,7,9,13}, | {1,7,8,10,11}, | {1,8,10,12,15}, | {2,3,4,6,14}, | {2,3,5,8,13}, | {2,3,8,10,12}, |
| {1,5,7,11,14}, | {1,6,7,10,14}, | {1,7,8,10,13}, | {1,8,10,13,14}, | {2,3,4,6,15}, | {2,3,5,9,10}, | {2,3,8,10,13}, |
| {1,5,7,12,13}, | {1,6,7,10,15}, | {1,7,8,10,15}, | {1,8,10,14,15}, | {2,3,4,7,8}, | {2,3,5,9,11}, | {2,3,8,10,14}, |
| {1,5,7,12,15}, | {1,6,7,11,14}, | {1,7,8,11,12}, | {1,8,11,12,13}, | {2,3,4,7,9}, | {2,3,5,9,12}, | {2,3,8,10,15}, |
| {1,5,7,13,14}, | {1,6,7,11,15}, | {1,7,8,11,15}, | {1,8,11,12,14}, | {2,3,4,7,10}, | {2,3,5,9,13}, | {2,3,8,11,12}, |
| {1,5,7,14,15}, | {1,6,7,12,14}, | {1,7,8,12,13}, | {1,8,11,13,15}, | {2,3,4,7,11}, | {2,3,5,10,14}, | {2,3,8,11,13}, |
| {1,5,8,9,10}, | {1,6,7,12,15}, | {1,7,8,12,15}, | {1,8,11,14,15}, | {2,3,4,7,12}, | {2,3,5,10,15}, | {2,3,8,11,14}, |
| {1,5,8,9,11}, | {1,6,7,13,14}, | {1,7,8,13,15}, | {1,8,12,13,14}, | {2,3,4,7,13}, | {2,3,5,11,14}, | {2,3,8,11,15}, |
| {1,5,8,9,14}, | {1,6,7,13,15}, | {1,7,9,10,11}, | {1,8,12,13,15}, | {2,3,4,7,14}, | {2,3,5,11,15}, | {2,3,8,12,14}, |
| {1,5,8,9,15}, | {1,6,8,9,10}, | {1,7,9,10,13}, | {1,8,12,14,15}, | {2,3,4,7,15}, | {2,3,5,12,14}, | {2,3,8,12,15}, |
| {1,5,8,10,11}, | {1,6,8,9,11}, | {1,7,9,10,14}, | {1,8,13,14,15}, | {2,3,4,8,10}, | {2,3,5,12,15}, | {2,3,8,13,14}, |
| {1,5,8,10,13}, | {1,6,8,9,12}, | {1,7,9,11,12}, | {1,9,10,11,12}, | {2,3,4,8,11}, | {2,3,5,13,14}, | {2,3,8,13,15}, |
| {1,5,8,10,15}, | {1,6,8,9,13}, | {1,7,9,11,14}, | {1,9,10,11,13}, | {2,3,4,8,12}, | {2,3,5,13,15}, | {2,3,9,10,12}, |
| {1,5,8,11,13}, | {1,6,8,10,11}, | {1,7,9,12,13}, | {1,9,10,11,14}, | {2,3,4,8,13}, | {2,3,6,8,10}, | {2,3,9,10,13}, |
| {1,5,8,11,14}, | {1,6,8,10,12}, | {1,7,9,12,14}, | {1,9,10,11,15}, | {2,3,4,9,10}, | {2,3,6,8,11}, | {2,3,9,10,14}, |
| {1,5,8,13,14}, | {1,6,8,10,14}, | {1,7,9,13,14}, | {1,9,10,12,13}, | {2,3,4,9,11}, | {2,3,6,8,14}, | {2,3,9,10,15}, |
| {1,5,8,13,15}, | {1,6,8,11,13}, | {1,7,10,11,14}, | {1,9,10,12,14}, | {2,3,4,9,12}, | {2,3,6,8,15}, | {2,3,9,11,12}, |
| {1,5,8,14,15}, | {1,6,8,11,14}, | {1,7,10,11,15}, | {1,9,10,13,15}, | {2,3,4,9,13}, | {2,3,6,9,10}, | {2,3,9,11,13}, |
| {1,5,9,10,11}, | {1,6,8,12,13}, | {1,7,10,13,14}, | {1,9,10,14,15}, | {2,3,4,10,14}, | {2,3,6,9,11}, | {2,3,9,11,14}, |
| {1,5,9,10,12}, | {1,6,8,12,14}, | {1,7,10,13,15}, | {1,9,11,12,13}, | {2,3,4,10,15}, | {2,3,6,9,14}, | {2,3,9,11,15}, |
| {1,5,9,10,15}, | {1,6,8,13,14}, | {1,7,10,14,15}, | {1,9,11,12,15}, | {2,3,4,11,14}, | {2,3,6,9,15}, | {2,3,9,12,14}, |
| {1,5,9,11,12}, | {1,6,9,10,11}, | {1,7,11,12,14}, | {1,9,11,13,14}, | {2,3,4,11,15}, | {2,3,6,10,12}, | {2,3,9,12,15}, |
| {1,5,9,11,14}, | {1,6,9,10,12}, | {1,7,11,12,15}, | {1,9,11,14,15}, | {2,3,4,12,14}, | {2,3,6,10,13}, | {2,3,9,13,14}, |

TABLE 42

| | | | | | | |
|---|---|---|---|---|---|---|
| {2,3,9,13,15}, | {2,4,6,7,12}, | {2,4,8,12,13}, | {2,5,6,13,15}, | {2,5,11,14,15}, | {2,6,10,13,15}, | {2,8,9,11,13}, |
| {2,3,10,12,14}, | {2,4,6,7,13}, | {2,4,8,12,15}, | {2,5,6,14,15}, | {2,5,12,13,14}, | {2,6,11,12,13}, | {2,8,9,11,14}, |
| {2,3,10,12,15}, | {2,4,6,7,14}, | {2,4,8,13,15}, | {2,5,7,8,9}, | {2,5,12,13,15}, | {2,6,11,12,14}, | {2,8,9,11,15}, |
| {2,3,10,13,14}, | {2,4,6,7,15}, | {2,4,9,10,11}, | {2,5,7,8,11}, | {2,5,12,14,15}, | {2,6,11,13,14}, | {2,8,9,12,14}, |
| {2,3,10,13,15}, | {2,4,6,8,9}, | {2,4,9,10,13}, | {2,5,7,8,12}, | {2,5,13,14,15}, | {2,6,12,13,14}, | {2,8,9,12,15}, |
| {2,3,11,12,14}, | {2,4,6,8,11}, | {2,4,9,10,14}, | {2,5,7,8,14}, | {2,6,7,8,10}, | {2,6,12,13,15}, | {2,8,9,13,14}, |
| {2,3,11,12,15}, | {2,4,6,8,13}, | {2,4,9,11,12}, | {2,5,7,9,10}, | {2,6,7,8,11}, | {2,6,12,14,15}, | {2,8,9,13,15}, |
| {2,3,11,13,14}, | {2,4,6,8,15}, | {2,4,9,11,14}, | {2,5,7,9,13}, | {2,6,7,8,14}, | {2,6,13,14,15}, | {2,8,10,11,12}, |
| {2,3,11,13,15}, | {2,4,6,9,10}, | {2,4,9,12,13}, | {2,5,7,9,15}, | {2,6,7,8,15}, | {2,7,8,9,10}, | {2,8,10,11,13}, |
| {2,4,5,6,8}, | {2,4,6,9,12}, | {2,4,9,12,14}, | {2,5,7,10,11}, | {2,6,7,9,10}, | {2,7,8,9,11}, | {2,8,10,11,14}, |
| {2,4,5,6,9}, | {2,4,6,9,14}, | {2,4,9,13,14}, | {2,5,7,10,12}, | {2,6,7,9,11}, | {2,7,8,9,14}, | {2,8,10,11,15}, |
| {2,4,5,6,10}, | {2,4,6,10,11}, | {2,4,10,11,14}, | {2,5,7,10,14}, | {2,6,7,9,14}, | {2,7,8,9,15}, | {2,8,10,12,13}, |
| {2,4,5,6,11}, | {2,4,6,10,13}, | {2,4,10,11,15}, | {2,5,7,11,13}, | {2,6,7,9,15}, | {2,7,8,10,11}, | {2,8,10,12,15}, |
| {2,4,5,6,12}, | {2,4,6,10,15}, | {2,4,10,13,14}, | {2,5,7,11,15}, | {2,6,7,10,12}, | {2,7,8,10,12}, | {2,8,10,13,14}, |
| {2,4,5,6,13}, | {2,4,6,11,12}, | {2,4,10,13,15}, | {2,5,7,12,13}, | {2,6,7,10,13}, | {2,7,8,10,14}, | {2,8,10,14,15}, |
| {2,4,5,6,14}, | {2,4,6,11,14}, | {2,4,10,14,15}, | {2,5,7,12,15}, | {2,6,7,11,12}, | {2,7,8,11,12}, | {2,8,11,12,13}, |
| {2,4,5,6,15}, | {2,4,6,12,13}, | {2,4,11,12,14}, | {2,5,7,13,14}, | {2,6,7,11,13}, | {2,7,8,11,15}, | {2,8,11,12,14}, |
| {2,4,5,7,8}, | {2,4,6,12,15}, | {2,4,11,12,15}, | {2,5,7,14,15}, | {2,6,7,12,14}, | {2,7,8,12,14}, | {2,8,11,13,15}, |

TABLE 42-continued

| | | | | | | |
|---|---|---|---|---|---|---|
| {2,4,5,7,9}, | {2,4,6,13,14}, | {2,4,11,14,15}, | {2,5,8,9,10}, | {2,6,7,12,15}, | {2,7,8,12,15}, | {2,8,11,14,15}, |
| {2,4,5,7,10}, | {2,4,6,14,15}, | {2,4,12,13,14}, | {2,5,8,9,11}, | {2,6,7,13,14}, | {2,7,8,14,15}, | {2,8,12,13,14}, |
| {2,4,5,7,11}, | {2,4,7,8,9}, | {2,4,12,13,15}, | {2,5,8,9,12}, | {2,6,7,13,15}, | {2,7,9,10,11}, | {2,8,12,13,15}, |
| {2,4,5,7,12}, | {2,4,7,8,10}, | {2,4,12,14,15}, | {2,5,8,9,13}, | {2,6,8,9,10}, | {2,7,9,10,13}, | {2,8,12,14,15}, |
| {2,4,5,7,13}, | {2,4,7,8,12}, | {2,4,13,14,15}, | {2,5,8,10,11}, | {2,6,8,9,11}, | {2,7,9,10,14}, | {2,8,13,14,15}, |
| {2,4,5,7,14}, | {2,4,7,8,15}, | {2,5,6,7,8}, | {2,5,8,10,12}, | {2,6,8,9,14}, | {2,7,9,11,13}, | {2,9,10,11,12}, |
| {2,4,5,7,15}, | {2,4,7,9,11}, | {2,5,6,7,9}, | {2,5,8,10,14}, | {2,6,8,9,15}, | {2,7,9,11,15}, | {2,9,10,11,13}, |
| {2,4,5,8,10}, | {2,4,7,9,13}, | {2,5,6,7,10}, | {2,5,8,11,13}, | {2,6,8,10,11}, | {2,7,9,13,14}, | {2,9,10,11,14}, |
| {2,4,5,8,11}, | {2,4,7,9,14}, | {2,5,6,7,11}, | {2,5,8,11,14}, | {2,6,8,10,13}, | {2,7,9,13,15}, | {2,9,10,11,15}, |
| {2,4,5,8,12}, | {2,4,7,10,11}, | {2,5,6,7,12}, | {2,5,8,12,13}, | {2,6,8,10,15}, | {2,7,9,14,15}, | {2,9,10,12,13}, |
| {2,4,5,8,13}, | {2,4,7,10,13}, | {2,5,6,7,13}, | {2,5,8,12,14}, | {2,6,8,11,13}, | {2,7,10,11,12}, | {2,9,10,12,14}, |
| {2,4,5,9,10}, | {2,4,7,10,14}, | {2,5,6,7,14}, | {2,5,8,13,14}, | {2,6,8,11,14}, | {2,7,10,11,13}, | {2,9,10,13,15}, |
| {2,4,5,9,11}, | {2,4,7,11,12}, | {2,5,6,7,15}, | {2,5,9,10,11}, | {2,6,8,13,14}, | {2,7,10,12,13}, | {2,9,10,14,15}, |
| {2,4,5,9,12}, | {2,4,7,11,15}, | {2,5,6,8,9}, | {2,5,9,10,12}, | {2,6,8,13,15}, | {2,7,10,12,14}, | {2,9,11,12,13}, |
| {2,4,5,9,13}, | {2,4,7,12,13}, | {2,5,6,8,10}, | {2,5,9,10,15}, | {2,6,8,14,15}, | {2,7,10,13,14}, | {2,9,11,12,15}, |
| {2,4,5,10,14}, | {2,4,7,12,14}, | {2,5,6,8,13}, | {2,5,9,11,13}, | {2,6,9,10,11}, | {2,7,11,12,13}, | {2,9,11,13,14}, |
| {2,4,5,10,15}, | {2,4,7,13,15}, | {2,5,6,8,14}, | {2,5,9,11,15}, | {2,6,9,10,12}, | {2,7,11,12,15}, | {2,9,11,14,15}, |
| {2,4,5,11,14}, | {2,4,7,14,15}, | {2,5,6,9,11}, | {2,5,9,12,13}, | {2,6,9,10,15}, | {2,7,11,13,15}, | {2,9,12,13,14}, |
| {2,4,5,11,15}, | {2,4,8,9,10}, | {2,5,6,9,12}, | {2,5,9,12,15}, | {2,6,9,11,12}, | {2,7,12,13,14}, | {2,9,12,13,15}, |
| {2,4,5,12,14}, | {2,4,8,9,11}, | {2,5,6,9,15}, | {2,5,9,13,15}, | {2,6,9,11,14}, | {2,7,12,13,15}, | {2,9,12,14,15}, |
| {2,4,5,12,15}, | {2,4,8,9,12}, | {2,5,6,10,11}, | {2,5,10,11,14}, | {2,6,9,12,14}, | {2,7,12,14,15}, | {2,9,13,14,15}, |
| {2,4,5,13,14}, | {2,4,8,9,13}, | {2,5,6,10,12}, | {2,5,10,11,15}, | {2,6,9,12,15}, | {2,7,13,14,15}, | {2,10,11,12,14}, |
| {2,4,5,13,15}, | {2,4,8,10,11}, | {2,5,6,10,15}, | {2,5,10,12,14}, | {2,6,9,14,15}, | {2,8,9,10,12}, | {2,10,11,12,15}, |
| {2,4,6,7,8}, | {2,4,8,10,13}, | {2,5,6,11,13}, | {2,5,10,12,15}, | {2,6,10,11,12}, | {2,8,9,10,13}, | {2,10,11,13,14}, |
| {2,4,6,7,9}, | {2,4,8,10,15}, | {2,5,6,11,14}, | {2,5,10,14,15}, | {2,6,10,11,13}, | {2,8,9,10,14}, | {2,10,11,13,15}, |
| {2,4,6,7,10}, | {2,4,8,11,12}, | {2,5,6,12,13}, | {2,5,11,13,14}, | {2,6,10,12,13}, | {2,8,9,10,15}, | {2,10,12,13,14}, |
| {2,4,6,7,11}, | {2,4,8,11,15}, | {2,5,6,12,14}, | {2,5,11,13,15}, | {2,6,10,12,15}, | {2,8,9,11,12}, | {2,10,12,13,15}, |

TABLE 43

| | | | | | | |
|---|---|---|---|---|---|---|
| {2,10,12,14,15}, | {3,4,6,7,15}, | {3,4,9,10,11}, | {3,5,7,8,11}, | {3,5,12,14,15}, | {3,6,11,13,15}, | {3,8,9,12,14}, |
| {2,10,13,14,15}, | {3,4,6,8,9}, | {3,4,9,10,12}, | {3,5,7,8,13}, | {3,5,13,14,15}, | {3,6,12,13,14}, | {3,8,9,12,15}, |
| {2,11,12,13,14}, | {3,4,6,8,11}, | {3,4,9,10,15}, | {3,5,7,8,15}, | {3,6,7,8,10}, | {3,6,12,13,15}, | {3,8,9,13,14}, |
| {2,11,12,13,15}, | {3,4,6,8,12}, | {3,4,9,11,13}, | {3,5,7,9,10}, | {3,6,7,8,11}, | {3,6,12,14,15}, | {3,8,9,13,15}, |
| {2,11,12,14,15}, | {3,4,6,8,14}, | {3,4,9,11,15}, | {3,5,7,9,12}, | {3,6,7,8,14}, | {3,6,13,14,15}, | {3,8,10,11,12}, |
| {2,11,13,14,15}, | {3,4,6,9,10}, | {3,4,9,12,13}, | {3,5,7,9,14}, | {3,6,7,8,15}, | {3,7,8,9,10}, | {3,8,10,11,13}, |
| {3,4,5,6,8}, | {3,4,6,9,13}, | {3,4,9,12,15}, | {3,5,7,10,11}, | {3,6,7,9,10}, | {3,7,8,9,11}, | {3,8,10,11,14}, |
| {3,4,5,6,9}, | {3,4,6,9,15}, | {3,4,9,13,15}, | {3,5,7,10,13}, | {3,6,7,9,11}, | {3,7,8,9,14}, | {3,8,10,11,15}, |
| {3,4,5,6,10}, | {3,4,6,10,11}, | {3,4,10,11,14}, | {3,5,7,10,15}, | {3,6,7,9,14}, | {3,7,8,9,15}, | {3,8,10,12,13}, |
| {3,4,5,6,11}, | {3,4,6,10,12}, | {3,4,10,11,15}, | {3,5,7,11,12}, | {3,6,7,9,15}, | {3,7,8,10,11}, | {3,8,10,12,15}, |
| {3,4,5,6,12}, | {3,4,6,10,14}, | {3,4,10,12,14}, | {3,5,7,11,14}, | {3,6,7,10,12}, | {3,7,8,10,13}, | {3,8,10,13,14}, |
| {3,4,5,6,13}, | {3,4,6,11,13}, | {3,4,10,12,15}, | {3,5,7,12,13}, | {3,6,7,10,13}, | {3,7,8,10,15}, | {3,8,10,14,15}, |
| {3,4,5,6,14}, | {3,4,6,11,15}, | {3,4,10,14,15}, | {3,5,7,12,15}, | {3,6,7,11,12}, | {3,7,8,11,13}, | {3,8,11,12,13}, |
| {3,4,5,6,15}, | {3,4,6,12,13}, | {3,4,11,13,14}, | {3,5,7,13,14}, | {3,6,7,11,13}, | {3,7,8,11,14}, | {3,8,11,12,14}, |
| {3,4,5,7,8}, | {3,4,6,12,15}, | {3,4,11,13,15}, | {3,5,7,14,15}, | {3,6,7,12,14}, | {3,7,8,13,14}, | {3,8,11,13,15}, |
| {3,4,5,7,9}, | {3,4,6,13,14}, | {3,4,11,14,15}, | {3,5,8,9,10}, | {3,6,7,12,15}, | {3,7,8,13,15}, | {3,8,11,14,15}, |
| {3,4,5,7,10}, | {3,4,6,14,15}, | {3,4,12,13,14}, | {3,5,8,9,11}, | {3,6,7,13,14}, | {3,7,8,14,15}, | {3,8,12,13,14}, |
| {3,4,5,7,11}, | {3,4,7,8,9}, | {3,4,12,13,15}, | {3,5,8,9,12}, | {3,6,7,13,15}, | {3,7,9,10,11}, | {3,8,12,13,15}, |
| {3,4,5,7,12}, | {3,4,7,8,10}, | {3,4,12,14,15}, | {3,5,8,9,13}, | {3,6,8,9,10}, | {3,7,9,10,12}, | {3,8,12,14,15}, |
| {3,4,5,7,13}, | {3,4,7,8,13}, | {3,4,13,14,15}, | {3,5,8,10,11}, | {3,6,8,9,11}, | {3,7,9,10,15}, | {3,8,13,14,15}, |
| {3,4,5,7,14}, | {3,4,7,8,14}, | {3,5,6,7,8}, | {3,5,8,10,13}, | {3,6,8,9,14}, | {3,7,9,11,12}, | {3,9,10,11,12}, |
| {3,4,5,7,15}, | {3,4,7,9,11}, | {3,5,6,7,9}, | {3,5,8,10,15}, | {3,6,8,9,15}, | {3,7,9,11,14}, | {3,9,10,11,13}, |
| {3,4,5,8,10}, | {3,4,7,9,12}, | {3,5,6,7,10}, | {3,5,8,11,12}, | {3,6,8,10,11}, | {3,7,9,12,14}, | {3,9,10,11,14}, |
| {3,4,5,8,11}, | {3,4,7,9,15}, | {3,5,6,7,11}, | {3,5,8,11,15}, | {3,6,8,10,12}, | {3,7,9,12,15}, | {3,9,10,11,15}, |
| {3,4,5,8,12}, | {3,4,7,10,11}, | {3,5,6,7,12}, | {3,5,8,12,13}, | {3,6,8,10,14}, | {3,7,9,14,15}, | {3,9,10,12,13}, |
| {3,4,5,8,13}, | {3,4,7,10,12}, | {3,5,6,7,13}, | {3,5,8,12,15}, | {3,6,8,11,12}, | {3,7,10,11,12}, | {3,9,10,12,14}, |
| {3,4,5,9,10}, | {3,4,7,10,15}, | {3,5,6,7,14}, | {3,5,8,13,15}, | {3,6,8,11,15}, | {3,7,10,11,13}, | {3,9,10,13,15}, |
| {3,4,5,9,11}, | {3,4,7,11,13}, | {3,5,6,7,15}, | {3,5,9,10,11}, | {3,6,8,12,14}, | {3,7,10,12,13}, | {3,9,10,14,15}, |
| {3,4,5,9,12}, | {3,4,7,11,14}, | {3,5,6,8,9}, | {3,5,9,10,13}, | {3,6,8,12,15}, | {3,7,10,12,15}, | {3,9,11,12,13}, |
| {3,4,5,9,13}, | {3,4,7,12,13}, | {3,5,6,8,10}, | {3,5,9,10,14}, | {3,6,8,14,15}, | {3,7,10,13,15}, | {3,9,11,12,15}, |
| {3,4,5,10,14}, | {3,4,7,12,14}, | {3,5,6,8,12}, | {3,5,9,11,12}, | {3,6,9,10,11}, | {3,7,11,12,13}, | {3,9,11,13,14}, |
| {3,4,5,10,15}, | {3,4,7,13,15}, | {3,5,6,8,15}, | {3,5,9,11,14}, | {3,6,9,10,13}, | {3,7,11,12,14}, | {3,9,11,14,15}, |
| {3,4,5,11,14}, | {3,4,7,14,15}, | {3,5,6,9,11}, | {3,5,9,12,13}, | {3,6,9,10,14}, | {3,7,11,13,14}, | {3,9,12,13,14}, |
| {3,4,5,11,15}, | {3,4,8,9,10}, | {3,5,6,9,13}, | {3,5,9,12,14}, | {3,6,9,11,13}, | {3,7,12,13,14}, | {3,9,12,13,15}, |
| {3,4,5,12,14}, | {3,4,8,9,11}, | {3,5,6,9,14}, | {3,5,9,13,14}, | {3,6,9,11,15}, | {3,7,12,13,15}, | {3,9,12,14,15}, |
| {3,4,5,12,15}, | {3,4,8,9,12}, | {3,5,6,10,11}, | {3,5,10,11,14}, | {3,6,9,13,14}, | {3,7,12,14,15}, | {3,9,13,14,15}, |
| {3,4,5,13,14}, | {3,4,8,9,13}, | {3,5,6,10,13}, | {3,5,10,11,15}, | {3,6,9,13,15}, | {3,7,13,14,15}, | {3,10,11,12,14}, |
| {3,4,5,13,15}, | {3,4,8,10,11}, | {3,5,6,10,14}, | {3,5,10,13,14}, | {3,6,9,14,15}, | {3,8,9,10,12}, | {3,10,11,12,15}, |
| {3,4,6,7,8}, | {3,4,8,10,12}, | {3,5,6,11,12}, | {3,5,10,13,15}, | {3,6,10,11,12}, | {3,8,9,10,13}, | {3,10,11,13,14}, |
| {3,4,6,7,9}, | {3,4,8,10,14}, | {3,5,6,11,15}, | {3,5,10,14,15}, | {3,6,10,11,13}, | {3,8,9,10,14}, | {3,10,11,13,15}, |
| {3,4,6,7,10}, | {3,4,8,11,13}, | {3,5,6,12,13}, | {3,5,11,12,14}, | {3,6,10,12,13}, | {3,8,9,10,15}, | {3,10,12,13,14}, |
| {3,4,6,7,11}, | {3,4,8,11,14}, | {3,5,6,12,14}, | {3,5,11,12,15}, | {3,6,10,12,14}, | {3,8,9,11,12}, | {3,10,12,13,15}, |
| {3,4,6,7,12}, | {3,4,8,12,13}, | {3,5,6,13,15}, | {3,5,11,14,15}, | {3,6,10,13,14}, | {3,8,9,11,13}, | {3,10,12,14,15}, |
| {3,4,6,7,13}, | {3,4,8,12,14}, | {3,5,6,14,15}, | {3,5,12,13,14}, | {3,6,11,12,13}, | {3,8,9,11,14}, | {3,10,13,14,15}, |
| {3,4,6,7,14}, | {3,4,8,13,14}, | {3,5,7,8,9}, | {3,5,12,13,15}, | {3,6,11,12,15}, | {3,8,9,11,15}, | {3,11,12,13,14}, |

TABLE 44

| | | | | | | |
|---|---|---|---|---|---|---|
| {3,11,12,13,15}, | {4,5,8,13,14}, | {4,6,8,11,15}, | {4,7,10,11,12}, | {4,9,10,12,14}, | {5,6,8,10,14}, | {5,7,9,14,15}, |
| {3,11,12,14,15}, | {4,5,8,13,15}, | {4,6,8,12,13}, | {4,7,10,11,13}, | {4,9,10,13,15}, | {5,6,8,10,15}, | {5,7,10,11,12}, |
| {3,11,13,14,15}, | {4,5,9,10,12}, | {4,6,8,12,15}, | {4,7,10,11,14}, | {4,9,10,14,15}, | {5,6,8,12,13}, | {5,7,10,11,13}, |
| {4,5,6,8,12}, | {4,5,9,10,13}, | {4,6,8,13,14}, | {4,7,10,11,15}, | {4,9,11,12,13}, | {5,6,8,12,14}, | {5,7,10,11,14}, |
| {4,5,6,8,13}, | {4,5,9,10,14}, | {4,6,8,14,15}, | {4,7,10,12,13}, | {4,9,11,12,15}, | {5,6,8,13,15}, | {5,7,10,11,15}, |
| {4,5,6,8,14}, | {4,5,9,10,15}, | {4,6,9,10,12}, | {4,7,10,12,14}, | {4,9,11,13,14}, | {5,6,8,14,15}, | {5,7,10,12,13}, |
| {4,5,6,8,15}, | {4,5,9,11,12}, | {4,6,9,10,13}, | {4,7,10,13,15}, | {4,9,11,14,15}, | {5,6,9,11,12}, | {5,7,10,12,15}, |
| {4,5,6,9,12}, | {4,5,9,11,13}, | {4,6,9,10,14}, | {4,7,10,14,15}, | {4,9,12,13,14}, | {5,6,9,11,13}, | {5,7,10,13,14}, |
| {4,5,6,9,13}, | {4,5,9,11,14}, | {4,6,9,10,15}, | {4,7,11,12,13}, | {4,9,12,13,15}, | {5,6,9,11,14}, | {5,7,10,14,15}, |
| {4,5,6,9,14}, | {4,5,9,11,15}, | {4,6,9,12,13}, | {4,7,11,12,14}, | {4,9,12,14,15}, | {5,6,9,11,15}, | {5,7,11,12,13}, |
| {4,5,6,9,15}, | {4,5,9,12,14}, | {4,6,9,12,15}, | {4,7,11,13,15}, | {4,9,13,14,15}, | {5,6,9,12,13}, | {5,7,11,12,15}, |
| {4,5,6,10,12}, | {4,5,9,12,15}, | {4,6,9,13,14}, | {4,7,11,14,15}, | {4,10,11,12,14}, | {5,6,9,12,14}, | {5,7,11,13,14}, |
| {4,5,6,10,13}, | {4,5,9,13,14}, | {4,6,9,14,15}, | {4,8,9,10,12}, | {4,10,11,12,15}, | {5,6,9,13,15}, | {5,7,11,14,15}, |
| {4,5,6,10,14}, | {4,5,9,13,15}, | {4,6,10,11,12}, | {4,8,9,10,13}, | {4,10,11,13,14}, | {5,6,9,14,15}, | {5,8,9,10,12}, |
| {4,5,6,10,15}, | {4,5,10,12,14}, | {4,6,10,11,13}, | {4,8,9,10,14}, | {4,10,11,13,15}, | {5,6,10,11,12}, | {5,8,9,10,13}, |
| {4,5,6,11,12}, | {4,5,10,12,15}, | {4,6,10,11,14}, | {4,8,9,10,15}, | {4,10,12,13,14}, | {5,6,10,11,13}, | {5,8,9,10,14}, |
| {4,5,6,11,13}, | {4,5,10,13,14}, | {4,6,10,11,15}, | {4,8,9,11,12}, | {4,10,12,13,15}, | {5,6,10,11,14}, | {5,8,9,10,15}, |
| {4,5,6,11,14}, | {4,5,10,13,15}, | {4,6,10,12,13}, | {4,8,9,11,13}, | {4,10,12,14,15}, | {5,6,10,11,15}, | {5,8,9,11,12}, |
| {4,5,6,11,15}, | {4,5,11,12,14}, | {4,6,10,12,15}, | {4,8,9,11,14}, | {4,10,13,14,15}, | {5,6,10,12,13}, | {5,8,9,11,13}, |
| {4,5,7,8,12}, | {4,5,11,12,15}, | {4,6,10,13,14}, | {4,8,9,11,15}, | {4,11,12,13,14}, | {5,6,10,12,14}, | {5,8,9,11,14}, |
| {4,5,7,8,13}, | {4,5,11,13,14}, | {4,6,10,14,15}, | {4,8,9,12,14}, | {4,11,12,13,15}, | {5,6,10,13,15}, | {5,8,9,11,15}, |
| {4,5,7,8,14}, | {4,5,11,13,15}, | {4,6,11,12,13}, | {4,8,9,12,15}, | {4,11,12,14,15}, | {5,6,10,14,15}, | {5,8,9,12,14}, |
| {4,5,7,8,15}, | {4,6,7,8,12}, | {4,6,11,12,15}, | {4,8,9,13,14}, | {4,11,13,14,15}, | {5,6,11,12,13}, | {5,8,9,12,15}, |
| {4,5,7,9,12}, | {4,6,7,8,13}, | {4,6,11,13,14}, | {4,8,9,13,15}, | {5,6,7,8,12}, | {5,6,11,12,14}, | {5,8,9,13,14}, |
| {4,5,7,9,13}, | {4,6,7,8,14}, | {4,6,11,14,15}, | {4,8,10,11,12}, | {5,6,7,8,13}, | {5,6,11,13,15}, | {5,8,9,13,15}, |
| {4,5,7,9,14}, | {4,6,7,8,15}, | {4,7,8,9,12}, | {4,8,10,11,13}, | {5,6,7,8,14}, | {5,6,11,14,15}, | {5,8,10,11,12}, |
| {4,5,7,9,15}, | {4,6,7,9,12}, | {4,7,8,9,13}, | {4,8,10,11,14}, | {5,6,7,8,15}, | {5,7,8,9,12}, | {5,8,10,11,13}, |
| {4,5,7,10,12}, | {4,6,7,9,13}, | {4,7,8,9,14}, | {4,8,10,11,15}, | {5,6,7,9,12}, | {5,7,8,9,13}, | {5,8,10,11,14}, |
| {4,5,7,10,13}, | {4,6,7,9,14}, | {4,7,8,9,15}, | {4,8,10,12,13}, | {5,6,7,9,13}, | {5,7,8,9,14}, | {5,8,10,11,15}, |
| {4,5,7,10,14}, | {4,6,7,9,15}, | {4,7,8,10,12}, | {4,8,10,12,15}, | {5,6,7,9,14}, | {5,7,8,9,15}, | {5,8,10,12,13}, |
| {4,5,7,10,15}, | {4,6,7,10,12}, | {4,7,8,10,13}, | {4,8,10,13,14}, | {5,6,7,9,15}, | {5,7,8,11,12}, | {5,8,10,12,15}, |
| {4,5,7,11,12}, | {4,6,7,10,13}, | {4,7,8,10,14}, | {4,8,10,14,15}, | {5,6,7,10,12}, | {5,7,8,11,13}, | {5,8,10,13,14}, |
| {4,5,7,11,13}, | {4,6,7,10,14}, | {4,7,8,10,15}, | {4,8,11,12,13}, | {5,6,7,10,13}, | {5,7,8,11,14}, | {5,8,10,14,15}, |
| {4,5,7,11,14}, | {4,6,7,10,15}, | {4,7,8,12,13}, | {4,8,11,12,14}, | {5,6,7,10,14}, | {5,7,8,11,15}, | {5,8,11,12,13}, |
| {4,5,7,11,15}, | {4,6,7,21,12}, | {4,7,8,12,14}, | {4,8,11,13,15}, | {5,6,7,10,15}, | {5,7,8,12,13}, | {5,8,11,12,14}, |
| {4,5,8,10,12}, | {4,6,7,11,13}, | {4,7,8,13,15}, | {4,8,11,14,15}, | {5,6,7,11,12}, | {5,7,8,12,15}, | {5,8,11,13,15}, |
| {4,5,8,10,13}, | {4,6,7,11,14}, | {4,7,8,14,15}, | {4,8,12,13,14}, | {5,6,7,11,13}, | {5,7,8,13,14}, | {5,8,11,14,15}, |
| {4,5,8,10,14}, | {4,6,7,11,15}, | {4,7,9,11,12}, | {4,8,12,13,15}, | {5,6,7,11,14}, | {5,7,8,14,15}, | {5,8,12,13,14}, |
| {4,5,8,10,15}, | {4,6,8,9,12}, | {4,7,9,11,13}, | {4,8,12,14,15}, | {5,6,7,11,15}, | {5,7,9,10,12}, | {5,8,12,13,15}, |
| {4,5,8,11,12}, | {4,6,8,9,13}, | {4,7,9,11,14}, | {4,8,13,14,15}, | {5,6,8,9,12}, | {5,7,9,10,13}, | {5,8,12,14,15}, |
| {4,5,8,11,13}, | {4,6,8,9,14}, | {4,7,9,11,15}, | {4,9,10,11,12}, | {5,6,8,9,13}, | {5,7,9,10,14}, | {5,8,13,14,15}, |
| {4,5,8,11,14}, | {4,6,8,9,15}, | {4,7,9,12,13}, | {4,9,10,11,13}, | {5,6,8,9,14}, | {5,7,9,10,15}, | {5,9,10,11,12}, |
| {4,5,8,11,15}, | {4,6,8,11,12}, | {4,7,9,12,14}, | {4,9,10,11,14}, | {5,6,8,9,15}, | {5,7,9,12,13}, | {5,9,10,11,13}, |
| {4,5,8,12,14}, | {4,6,8,11,13}, | {4,7,9,13,15}, | {4,9,10,11,15}, | {5,6,8,10,12}, | {5,7,9,12,15}, | {5,9,10,11,14}, |
| {4,5,8,12,15}, | {4,6,8,11,14}, | {4,7,9,14,15}, | {4,9,10,12,13}, | {5,6,8,10,13}, | {5,7,9,13,14}, | {5,9,10,11,15}, |

TABLE 45

| | | | |
|---|---|---|---|
| {5, 9, 10, 12, 13}, | {6, 7, 9, 12, 15}, | {6, 9, 10, 13, 15}, | {7, 8, 11, 14, 15}, |
| {5, 9, 10, 12, 14}, | {6, 7, 9, 13, 14}, | {6, 9, 10, 14, 15}, | {7, 8, 12, 13, 14}, |
| {5, 9, 10, 13, 15}, | {6, 7, 9, 13, 15}, | {6, 9, 11, 12, 13}, | {7, 8, 12, 13, 15}, |
| {5, 9, 10, 14, 15}, | {6, 7, 10, 12, 14}, | {6, 9, 11, 12, 15}, | {7, 8, 12, 14, 15}, |
| {5, 9, 11, 12, 13}, | {6, 7, 10, 12, 15}, | {6, 9, 11, 13, 14}, | {7, 8, 13, 14, 15}, |
| {5, 9, 11, 12, 15}, | {6, 7, 10, 13, 14}, | {6, 9, 11, 14, 15}, | {7, 9, 10, 11, 12}, |
| {5, 9, 11, 13, 14}, | {6, 7, 10, 13, 15}, | {6, 9, 12, 13, 14}, | {7, 9, 10, 11, 13}, |
| {5, 9, 11, 14, 15}, | {6, 7, 11, 12, 14}, | {6, 9, 12, 13, 15}, | {7, 9, 10, 11, 14}, |
| {5, 9, 12, 13, 14}, | {6, 7, 11, 12, 15}, | {6, 9, 12, 14, 15}, | {7, 9, 10, 11, 15}, |
| {5, 9, 12, 13, 15}, | {6, 7, 11, 13, 14}, | {6, 9, 13, 14, 15}, | {7, 9, 10, 12, 13}, |
| {5, 9, 12, 14, 15}, | {6, 7, 11, 13, 15}, | {6, 10, 11, 12, 14}, | {7, 9, 10, 12, 14}, |
| {5, 9, 13, 14, 15}, | {6, 8, 9, 10, 12}, | {6, 10, 11, 12, 15}, | {7, 9, 10, 13, 15}, |
| {5, 10, 11, 12, 14}, | {6, 8, 9, 10, 13}, | {6, 10, 11, 13, 14}, | {7, 9, 10, 14, 15}, |
| {5, 10, 11, 12, 15}, | {6, 8, 9, 10, 14}, | {6, 10, 11, 13, 15}, | {7, 9, 11, 12, 13}, |
| {5, 10, 11, 13, 14}, | {6, 8, 9, 10, 15}, | {6, 10, 12, 13, 14}, | {7, 9, 11, 12, 15}, |
| {5, 10, 11, 13, 15}, | {6, 8, 9, 11, 12}, | {6, 10, 12, 13, 15}, | {7, 9, 11, 13, 14}, |
| {5, 10, 12, 13, 14}, | {6, 8, 9, 11, 13}, | {6, 10, 12, 14, 15}, | {7, 9, 11, 14, 15}, |
| {5, 10, 12, 13, 15}, | {6, 8, 9, 11, 14}, | {6, 10, 13, 14, 15}, | {7, 9, 12, 13, 14}, |
| {5, 10, 12, 14, 15}, | {6, 8, 9, 11, 15}, | {6, 11, 12, 13, 14}, | {7, 9, 12, 13, 15}, |
| {5, 10, 13, 14, 15}, | {6, 8, 9, 12, 14}, | {6, 11, 12, 13, 15}, | {7, 9, 12, 14, 15}, |
| {5, 11, 12, 13, 14}, | {6, 8, 9, 12, 15}, | {6, 11, 12, 14, 15}, | {7, 9, 13, 14, 15}, |
| {5, 11, 12, 13, 15}, | {6, 8, 9, 13, 14}, | {6, 11, 13, 14, 15}, | {7, 10, 11, 12, 14}, |
| {5, 11, 12, 14, 15}, | {6, 8, 9, 13, 15}, | {7, 8, 9, 10, 12}, | {7, 10, 11, 12, 15}, |
| {5, 11, 13, 14, 15}, | {6, 8, 10, 11, 12}, | {7, 8, 9, 10, 13}, | {7, 10, 11, 13, 14}, |
| {6, 7, 8, 10, 12}, | {6, 8, 10, 11, 13}, | {7, 8, 9, 10, 14}, | {7, 10, 11, 13, 15}, |
| {6, 7, 8, 10, 13}, | {6, 8, 10, 11, 14}, | {7, 8, 9, 10, 15}, | {7, 10, 12, 13, 14}, |
| {6, 7, 8, 10, 14}, | {6, 8, 10, 11, 15}, | {7, 8, 9, 11, 12}, | {7, 10, 12, 13, 15}, |
| {6, 7, 8, 10, 15}, | {6, 8, 10, 12, 13}, | {7, 8, 9, 11, 13}, | {7, 10, 12, 14, 15}, |

TABLE 45-continued

| | | | |
|---|---|---|---|
| {6, 7, 8, 11, 12}, | {6, 8, 10, 12, 15}, | {7, 8, 9, 11, 14}, | {7, 10, 13, 14, 15}, |
| {6, 7, 8, 11, 13}, | {6, 8, 10, 13, 14}, | {7, 8, 9, 11, 15}, | {7, 11, 12, 13, 14}, |
| {6, 7, 8, 11, 14}, | {6, 8, 10, 14, 15}, | {7, 8, 9, 12, 14}, | {7, 11, 12, 13, 15}, |
| {6, 7, 8, 11, 15}, | {6, 8, 11, 12, 13}, | {7, 8, 9, 12, 15}, | {7, 11, 12, 14, 15}, |
| {6, 7, 8, 12, 14}, | {6, 8, 11, 12, 14}, | {7, 8, 9, 13, 14}, | {7, 11, 13, 14, 15} |
| {6, 7, 8, 12, 15}, | {6, 8, 11, 13, 15}, | {7, 8, 9, 13, 15}, | |
| {6, 7, 8, 13, 14}, | {6, 8, 11, 14, 15}, | {7, 8, 10, 11, 12}, | |
| {6, 7, 8, 13, 15}, | {6, 8, 12, 13, 14}, | {7, 8, 10, 11, 13}, | |
| {6, 7, 9, 10, 12}, | {6, 8, 12, 13, 15}, | {7, 8, 10, 11, 14}, | |
| {6, 7, 9, 10, 13}, | {6, 8, 12, 14, 15}, | {7, 8, 10, 11, 15}, | |
| {6, 7, 9, 10, 14}, | {6, 8, 13, 14, 15}, | {7, 8, 10, 12, 13}, | |
| {6, 7, 9, 10, 15}, | {6, 9, 10, 11, 12}, | {7, 8, 10, 12, 15}, | |
| {6, 7, 9, 11, 12}, | {6, 9, 10, 11, 13}, | {7, 8, 10, 13, 14}, | |
| {6, 7, 9, 11, 13}, | {6, 9, 10, 11, 14}, | {7, 8, 10, 14, 15}, | |
| {6, 7, 9, 11, 14}, | {6, 9, 10, 11, 15}, | {7, 8, 11, 12, 13}, | |
| {6, 7, 9, 11, 15}, | {6, 9, 10, 12, 13}, | {7, 8, 11, 12, 14}, | |
| {6, 7, 9, 12, 14}, | {6, 9, 10, 12, 14}, | {7, 8, 11, 13, 15}, | |

* * * * *